US010911520B2

(12) United States Patent
Plamondon

(10) Patent No.: US 10,911,520 B2
(45) Date of Patent: Feb. 2, 2021

(54) SYSTEMS AND METHODS OF USING THE REFRESH BUTTON TO DETERMINE FRESHNESS POLICY

(71) Applicant: Citrix Systems, Inc., Fort Lauderdale, FL (US)

(72) Inventor: Robert D. Plamondon, Blodgett, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 972 days.

(21) Appl. No.: 14/199,703

(22) Filed: Mar. 6, 2014

(65) Prior Publication Data

US 2014/0188976 A1 Jul. 3, 2014

Related U.S. Application Data

(63) Continuation of application No. 11/685,141, filed on Mar. 12, 2007, now Pat. No. 8,701,010.

(51) Int. Cl.
*H04L 29/08* (2006.01)
*G06F 12/0862* (2016.01)

(52) U.S. Cl.
CPC .......... *H04L 67/10* (2013.01); *G06F 12/0862* (2013.01); *H04L 67/28* (2013.01);
(Continued)

(58) Field of Classification Search
CPC .. G06F 15/16; G06F 12/0862; G06F 12/0855; G06F 16/9574; G06F 16/95;
(Continued)

(56) References Cited

U.S. PATENT DOCUMENTS 4,701,745 A 10/1987 Waterworth
5,315,711 A 5/1994 Barone et al.
(Continued)

FOREIGN PATENT DOCUMENTS

EP 1 343 296 A2 9/2003
EP 1 398 715 A2 3/2004
(Continued)

OTHER PUBLICATIONS

Ahmad and Geok; Enhanced client polling with multilevel prefetching algorithm for wireless networks, Publication Date: Mar. 1, 2007; Journal of Communications and Networks (vol. 9, Issue: 1, pp. 43-49) (Year: 2007).*
(Continued)

*Primary Examiner* — Sang H Kim
(74) *Attorney, Agent, or Firm* — Foley &, Lardner LLP

(57) ABSTRACT

The present solution provides a variety of techniques for accelerating and optimizing network traffic, such as HTTP based network traffic. The solution described herein provides techniques in the areas of proxy caching, protocol acceleration, domain name resolution acceleration as well as compression improvements. In some cases, the present solution provides various prefetching and/or prefreshening techniques to improve intermediary or proxy caching, such as HTTP proxy caching. In other cases, the present solution provides techniques for accelerating a protocol by improving the efficiency of obtaining and servicing data from an originating server to server to clients. In another cases, the present solution accelerates domain name resolution more quickly. As every HTTP access starts with a URL that includes a hostname that must be resolved via domain name resolution into an IP address, the present solution helps accelerate HTTP access. In some cases, the present solution improves compression techniques by prefetching non-ca-
(Continued)

cheable and cacheable content to use for compressing network traffic, such as HTTP. The acceleration and optimization techniques described herein may be deployed on the client as a client agent or as part of a browser, as well as on any type and form of intermediary device, such as an appliance, proxying device or any type of interception caching and/or proxying device.

18 Claims, 44 Drawing Sheets

(52) U.S. Cl.
CPC ...... *H04L 67/2847* (2013.01); *H04L 67/2852* (2013.01); *G06F 2212/1044* (2013.01); *H04L 67/2885* (2013.01)

(58) Field of Classification Search
CPC ..... G06F 16/957; H04L 67/322; H04L 67/28; H04L 67/2847
See application file for complete search history.

(56) References Cited

U.S. PATENT DOCUMENTS

| | | | |
|---|---|---|---|
| 5,390,318 A | 2/1995 | Ramakrishnan et al. | |
| 5,392,432 A | 2/1995 | Engelstad et al. | |
| 5,432,932 A | 7/1995 | Chen et al. | |
| 5,434,992 A | 7/1995 | Mattson | |
| 5,442,771 A | 8/1995 | Filepp et al. | |
| 5,457,797 A | 10/1995 | Butterworth et al. | |
| 5,511,208 A | 4/1996 | Boyles et al. | |
| 5,550,976 A | 8/1996 | Henderson et al. | |
| 5,651,136 A | 7/1997 | Denton et al. | |
| 5,717,893 A | 2/1998 | Mattson | |
| 5,754,939 A | 5/1998 | Herz et al. | |
| 5,774,670 A | 6/1998 | Montulli | |
| 5,787,479 A | 7/1998 | Jessani et al. | |
| 5,802,292 A | 9/1998 | Mogul | |
| 5,852,717 A * | 12/1998 | Bhide ................ H04L 29/06 709/203 | |
| 5,862,325 A | 1/1999 | Reed et al. | |
| 5,864,837 A | 1/1999 | Maimone | |
| 5,867,494 A | 2/1999 | Krishnaswamy et al. | |
| 5,903,727 A | 5/1999 | Nielsen | |
| 5,905,492 A | 5/1999 | Straub et al. | |
| 5,909,559 A | 6/1999 | So | |
| 5,913,033 A | 6/1999 | Grout | |
| 5,925,100 A | 7/1999 | Drewry et al. | |
| 5,931,904 A | 8/1999 | Banga et al. | |
| 5,956,038 A | 9/1999 | Rekimoto | |
| 5,978,842 A | 11/1999 | Noble et al. | |
| 5,978,847 A | 11/1999 | Kisor et al. | |
| 5,983,227 A | 11/1999 | Nazem et al. | |
| 5,999,179 A | 12/1999 | Kekic et al. | |
| 5,999,525 A | 12/1999 | Krishnaswamy et al. | |
| 5,999,940 A | 12/1999 | Ranger | |
| 6,016,535 A | 1/2000 | Krantz et al. | |
| 6,026,413 A * | 2/2000 | Challenger ......... G06F 12/0815 707/798 | |
| 6,029,175 A | 2/2000 | Chow et al. | |
| 6,061,715 A | 5/2000 | Hawes | |
| 6,088,717 A | 7/2000 | Reed et al. | |
| 6,094,662 A | 7/2000 | Hawes | |
| 6,128,627 A | 10/2000 | Mattis et al. | |
| 6,131,116 A | 10/2000 | Riggins et al. | |
| 6,161,902 A | 12/2000 | Lieberman | |
| 6,173,316 B1 | 1/2001 | De Boor et al. | |
| 6,175,869 B1 | 1/2001 | Ahuja et al. | |
| 6,178,461 B1 | 1/2001 | Chan et al. | |
| 6,182,142 B1 | 1/2001 | Win et al. | |
| 6,185,625 B1 | 2/2001 | Tso et al. | |
| 6,230,173 B1 | 5/2001 | Ferrel et al. | |
| 6,256,747 B1 | 7/2001 | Inohara et al. | |
| 6,256,773 B1 | 7/2001 | Bowman-Amuah | |
| 6,272,148 B1 | 8/2001 | Takagi et al. | |
| 6,272,537 B1 | 8/2001 | Kekic et al. | |
| 6,275,490 B1 | 8/2001 | Mattaway et al. | |
| 6,289,382 B1 | 9/2001 | Bowman-Amuah | |
| 6,289,461 B1 | 9/2001 | Dixon | |
| 6,298,372 B1 | 10/2001 | Yoshikawa | |
| 6,314,465 B1 | 11/2001 | Paul et al. | |
| 6,317,781 B1 | 11/2001 | De Boor et al. | |
| 6,324,647 B1 | 11/2001 | Bowman-Amuah | |
| 6,330,561 B1 * | 12/2001 | Cohen ................ G06F 16/9574 707/754 | |
| 6,332,163 B1 | 12/2001 | Bowman-Amuah | |
| 6,335,927 B1 | 1/2002 | Elliott et al. | |
| 6,339,787 B1 * | 1/2002 | Yohe ........................ G06T 9/00 709/203 | |
| 6,339,832 B1 | 1/2002 | Bowman-Amuah | |
| 6,345,288 B1 | 2/2002 | Reed et al. | |
| 6,370,573 B1 | 4/2002 | Bowman-Amuah | |
| 6,389,422 B1 | 5/2002 | Doi et al. | |
| 6,405,364 B1 | 6/2002 | Bowman-Amuah | |
| 6,427,195 B1 | 7/2002 | McGowen et al. | |
| 6,434,568 B1 | 8/2002 | Bowman-Amuah | |
| 6,434,628 B1 | 8/2002 | Bowman-Amuah | |
| 6,438,594 B1 | 8/2002 | Bowman-Amuah | |
| 6,442,748 B1 | 8/2002 | Bowman-Amuah | |
| 6,463,474 B1 | 10/2002 | Fuh et al. | |
| 6,470,381 B2 | 10/2002 | De Boor et al. | |
| 6,473,794 B1 | 10/2002 | Guheen et al. | |
| 6,477,580 B1 | 11/2002 | Bowman-Amuah | |
| 6,477,665 B1 | 11/2002 | Bowman-Amuah | |
| 6,496,850 B1 | 12/2002 | Bowman-Amuah | |
| 6,502,213 B1 | 12/2002 | Bowman-Amuah | |
| 6,507,854 B1 | 1/2003 | Dunsmoir et al. | |
| 6,519,571 B1 | 2/2003 | Guheen et al. | |
| 6,523,027 B1 | 2/2003 | Underwood | |
| 6,529,909 B1 | 3/2003 | Bowman-Amuah | |
| 6,529,948 B1 | 3/2003 | Bowman-Amuah | |
| 6,536,037 B1 | 3/2003 | Guheen et al. | |
| 6,539,396 B1 | 3/2003 | Bowman-Amuah | |
| 6,546,425 B1 | 4/2003 | Hanson et al. | |
| 6,549,949 B1 | 4/2003 | Bowman-Amuah | |
| 6,550,057 B1 | 4/2003 | Bowman-Amuah | |
| 6,553,376 B1 | 4/2003 | Lewis et al. | |
| 6,571,282 B1 | 5/2003 | Bowman-Amuah | |
| 6,571,285 B1 | 5/2003 | Groath et al. | |
| 6,578,066 B1 | 6/2003 | Logan et al. | |
| 6,578,068 B1 | 6/2003 | Bowman-Amuah | |
| 6,578,073 B1 | 6/2003 | Starnes et al. | |
| 6,584,480 B1 | 6/2003 | Ferrel et al. | |
| 6,584,569 B2 | 6/2003 | Reshef et al. | |
| 6,591,266 B1 | 7/2003 | Li et al. | |
| 6,594,692 B1 | 7/2003 | Reisman | |
| 6,601,192 B1 | 7/2003 | Bowman-Amuah | |
| 6,601,233 B1 | 7/2003 | Underwood | |
| 6,601,234 B1 | 7/2003 | Bowman-Amuah | |
| 6,606,660 B1 | 8/2003 | Bowman-Amuah | |
| 6,606,744 B1 | 8/2003 | Mikurak | |
| 6,609,128 B1 | 8/2003 | Underwood | |
| 6,609,154 B1 | 8/2003 | Fuh et al. | |
| 6,611,862 B2 | 8/2003 | Reisman | |
| 6,615,166 B1 | 9/2003 | Guheen et al. | |
| 6,615,199 B1 | 9/2003 | Bowman-Amuah | |
| 6,615,235 B1 | 9/2003 | Copeland et al. | |
| 6,615,253 B1 | 9/2003 | Bowman-Amuah | |
| 6,622,168 B1 | 9/2003 | Datta | |
| 6,628,304 B2 | 9/2003 | Mitchell et al. | |
| 6,629,081 B1 | 9/2003 | Cornelius et al. | |
| 6,631,416 B2 | 10/2003 | Bendinelli et al. | |
| 6,633,878 B1 | 10/2003 | Underwood | |
| 6,636,242 B2 | 10/2003 | Bowman-Amuah | |
| 6,640,238 B1 | 10/2003 | Bowman-Amuah | |
| 6,640,240 B1 | 10/2003 | Hoffman et al. | |
| 6,640,244 B1 | 10/2003 | Bowman-Amuah | |
| 6,640,249 B1 | 10/2003 | Bowman-Amuah | |
| 6,658,464 B2 | 12/2003 | Reisman | |
| 6,662,357 B1 | 12/2003 | Bowman-Amuah | |
| 6,664,978 B1 | 12/2003 | Kekic et al. | |
| 6,675,204 B2 | 1/2004 | De Boor et al. | |

(56) References Cited

U.S. PATENT DOCUMENTS

| | | |
|---|---|---|
| 6,687,734 B1 | 2/2004 | Sellink et al. |
| 6,701,345 B1 | 3/2004 | Carley et al. |
| 6,704,873 B1 | 3/2004 | Underwood |
| 6,715,145 B1 | 3/2004 | Bowman-Amuah |
| 6,718,535 B1 | 4/2004 | Underwood |
| 6,721,713 B1 | 4/2004 | Guheen et al. |
| 6,731,625 B1 | 5/2004 | Eastep et al. |
| 6,742,015 B1 | 5/2004 | Bowman-Amuah |
| 6,750,877 B2 | 6/2004 | Rosenberg et al. |
| 6,754,181 B1 | 6/2004 | Elliott et al. |
| 6,754,699 B2 | 6/2004 | Swildens et al. |
| 6,757,274 B1 | 6/2004 | Bedingfield et al. |
| 6,757,710 B2 | 6/2004 | Reed |
| 6,772,203 B1 | 8/2004 | Feiertag et al. |
| 6,775,692 B1 | 8/2004 | Albert et al. |
| 6,785,653 B1 | 8/2004 | White et al. |
| 6,788,315 B1 | 9/2004 | Kekic et al. |
| 6,792,461 B1 | 9/2004 | Hericourt |
| 6,820,133 B1 | 11/2004 | Grove et al. |
| 6,836,806 B1 | 12/2004 | Raciborski et al. |
| 6,842,906 B1 | 1/2005 | Bowman-Amuah |
| 6,857,009 B1 | 2/2005 | Ferreria et al. |
| 6,877,043 B2 | 4/2005 | Mallory et al. |
| 6,882,634 B2 | 4/2005 | Bagchi et al. |
| 6,888,844 B2 | 5/2005 | Mallory et al. |
| 6,891,881 B2 | 5/2005 | Trachewsky et al. |
| 6,898,204 B2 | 5/2005 | Trachewsky et al. |
| 6,907,429 B2 | 6/2005 | Carneal et al. |
| 6,909,708 B1 | 6/2005 | Krishnaswamy et al. |
| 6,918,113 B2 | 7/2005 | Patel et al. |
| 6,925,485 B1 | 8/2005 | Wang et al. |
| 6,954,800 B2 | 10/2005 | Mallory |
| 6,957,186 B1 | 10/2005 | Guheen et al. |
| 6,959,320 B2 | 10/2005 | Shah et al. |
| 6,963,928 B1 | 11/2005 | Bagley et al. |
| 6,975,655 B2 | 12/2005 | Fischer et al. |
| 6,983,465 B2 | 1/2006 | Mandal et al. |
| 6,985,901 B1 | 1/2006 | Sachse et al. |
| 6,988,236 B2 | 1/2006 | Ptasinski et al. |
| 6,993,014 B2 | 1/2006 | Bedingfield et al. |
| 6,993,101 B2 | 1/2006 | Trachewsky et al. |
| 6,996,374 B1 | 2/2006 | Bao et al. |
| 6,996,628 B2 | 2/2006 | Keane et al. |
| 7,000,031 B2 | 2/2006 | Fischer et al. |
| 7,007,064 B2 | 2/2006 | Faris |
| 7,020,719 B1 | 3/2006 | Grove et al. |
| 7,027,055 B2 | 4/2006 | Anderson et al. |
| 7,027,975 B1 | 4/2006 | Pazandak et al. |
| 7,028,333 B2 | 4/2006 | Tuomenoksa et al. |
| 7,028,334 B2 | 4/2006 | Tuomenoksa |
| 7,035,285 B2 | 4/2006 | Holloway et al. |
| 7,035,907 B1 | 4/2006 | Decasper et al. |
| 7,042,879 B2 | 5/2006 | Eschbach et al. |
| 7,047,424 B2 | 5/2006 | Bendinelli et al. |
| 7,047,485 B2 | 5/2006 | Klein et al. |
| 7,051,126 B1 | 5/2006 | Franklin |
| 7,054,818 B2 | 5/2006 | Sharma et al. |
| 7,054,902 B2 | 5/2006 | Toporek et al. |
| 7,055,169 B2 | 5/2006 | Delpuch et al. |
| 7,069,234 B1 | 6/2006 | Cornelius et al. |
| 7,076,409 B2 | 7/2006 | Agrawala et al. |
| 7,085,683 B2 | 8/2006 | Anderson et al. |
| 7,085,854 B2 | 8/2006 | Keane et al. |
| 7,092,370 B2 | 8/2006 | Jiang et al. |
| 7,092,399 B1 | 8/2006 | Cheriton et al. |
| 7,100,195 B1 | 8/2006 | Underwood |
| 7,103,799 B2 | 9/2006 | Dixon |
| 7,113,934 B2 | 9/2006 | Levesque et al. |
| 7,117,250 B1 | 10/2006 | Wu |
| 7,117,504 B2 | 10/2006 | Smith et al. |
| 7,124,101 B1 | 10/2006 | Mikurak |
| 7,127,525 B2 | 10/2006 | Coleman et al. |
| 7,130,812 B1 | 10/2006 | Iyer et al. |
| 7,139,999 B2 | 11/2006 | Bowman-Amuah |
| 7,145,898 B1 | 12/2006 | Elliott |
| 7,149,698 B2 | 12/2006 | Guheen et al. |
| 7,155,676 B2 | 12/2006 | Land et al. |
| 7,159,014 B2 | 1/2007 | Kausik et al. |
| 7,165,041 B1 | 1/2007 | Guheen et al. |
| 7,167,844 B1 | 1/2007 | Leong et al. |
| 7,171,464 B1 | 1/2007 | Raghuraman et al. |
| 7,181,766 B2 | 2/2007 | Bendinelli et al. |
| 7,185,075 B1 | 2/2007 | Mishra et al. |
| 7,194,552 B1 | 3/2007 | Schneider |
| 7,194,553 B2 | 3/2007 | Lucco et al. |
| 7,197,751 B2 | 3/2007 | Fedotov et al. |
| 7,200,681 B1 | 4/2007 | Lewin et al. |
| 7,206,805 B1 | 4/2007 | McLaughlin, Jr. |
| 7,206,811 B2 | 4/2007 | Skurikhin et al. |
| 7,219,127 B2 | 5/2007 | Huck et al. |
| 7,222,305 B2 | 5/2007 | Teplov et al. |
| 7,228,340 B2 | 6/2007 | De Boor et al. |
| 7,228,350 B2 | 6/2007 | Hong et al. |
| 7,260,840 B2 | 8/2007 | Swander et al. |
| 7,330,938 B2 | 2/2008 | Nenov et al. |
| 7,363,347 B2 | 4/2008 | Thomas |
| 7,389,462 B1 | 6/2008 | Wang et al. |
| 7,392,348 B2* | 6/2008 | Dumont ............ G06F 17/30902 707/E17.12 |
| 7,424,720 B2 | 9/2008 | Chagoly et al. |
| 7,454,457 B1 | 11/2008 | Lowery et al. |
| 7,506,359 B1* | 3/2009 | Ling ..................... G06F 21/128 726/2 |
| 7,552,220 B2 | 6/2009 | Marmigere et al. |
| 7,565,450 B2 | 7/2009 | Garcia-Luna-Aceves et al. |
| 7,584,500 B2 | 9/2009 | Dillon et al. |
| 7,720,936 B2 | 5/2010 | Plamondon |
| 7,761,594 B1 | 7/2010 | Mowat |
| 7,783,757 B2 | 8/2010 | Plamondon |
| 7,865,585 B2 | 1/2011 | Samuels et al. |
| 7,984,493 B2 | 7/2011 | Jones |
| 8,037,126 B2* | 10/2011 | Plamondon ............. H04L 67/28 709/203 |
| 8,103,783 B2 | 1/2012 | Plamondon |
| 8,352,605 B2 | 1/2013 | Samuels et al. |
| 2001/0049717 A1 | 12/2001 | Freeman |
| 2001/0056547 A1 | 12/2001 | Dixon |
| 2002/0007404 A1 | 1/2002 | Vange et al. |
| 2002/0035596 A1 | 3/2002 | Yang et al. |
| 2002/0046262 A1 | 4/2002 | Heilig et al. |
| 2002/0055966 A1* | 5/2002 | Border ............... G06F 17/30902 709/200 |
| 2002/0073167 A1 | 6/2002 | Powell et al. |
| 2002/0083183 A1 | 6/2002 | Pujare et al. |
| 2002/0091859 A1 | 7/2002 | Tuomenoksa et al. |
| 2002/0098840 A1 | 7/2002 | Hanson et al. |
| 2002/0156831 A1 | 10/2002 | Suorsa et al. |
| 2002/0163882 A1 | 11/2002 | Bornstein et al. |
| 2002/0174262 A1 | 11/2002 | Marcos et al. |
| 2002/0194382 A1 | 12/2002 | Kausik et al. |
| 2002/0194434 A1 | 12/2002 | Kurasugi |
| 2003/0009538 A1 | 1/2003 | Shah et al. |
| 2003/0018891 A1 | 1/2003 | Hall et al. |
| 2003/0037108 A1* | 2/2003 | Peiffer .................... H04L 29/06 709/203 |
| 2003/0115421 A1 | 6/2003 | McHenry et al. |
| 2003/0120811 A1 | 6/2003 | Hanson et al. |
| 2003/0135507 A1* | 7/2003 | Hind ................. G06F 17/30592 |
| 2003/0182423 A1 | 9/2003 | Shafir et al. |
| 2003/0187917 A1 | 10/2003 | Cohen |
| 2003/0188106 A1* | 10/2003 | Cohen ................. H04L 67/1095 711/133 |
| 2003/0191812 A1 | 10/2003 | Agarwalla et al. |
| 2003/0229605 A1 | 12/2003 | Herrera et al. |
| 2003/0236887 A1 | 12/2003 | Kesselman et al. |
| 2004/0003101 A1 | 1/2004 | Roth et al. |
| 2004/0010621 A1 | 1/2004 | Afergan et al. |
| 2004/0015463 A1 | 1/2004 | Herrera et al. |
| 2004/0039798 A1 | 2/2004 | Hotz et al. |
| 2004/0043770 A1 | 3/2004 | Amit et al. |
| 2004/0044731 A1 | 3/2004 | Chen et al. |
| 2004/0073512 A1 | 4/2004 | Maung |
| 2004/0073701 A1 | 4/2004 | Huang et al. |
| 2004/0073707 A1 | 4/2004 | Dillon |

(56) References Cited

U.S. PATENT DOCUMENTS

| | | |
|---|---|---|
| 2004/0114529 A1 | 6/2004 | Dong-Hi et al. |
| 2004/0128346 A1 | 7/2004 | Melamed et al. |
| 2004/0215746 A1 | 10/2004 | McCanne et al. |
| 2005/0004942 A1 | 1/2005 | Madsen et al. |
| 2005/0027788 A1 | 2/2005 | Koopmans et al. |
| 2005/0044108 A1 | 2/2005 | Shah et al. |
| 2005/0108517 A1 | 5/2005 | Dillon et al. |
| 2005/0132030 A1 | 6/2005 | Hopen et al. |
| 2005/0144481 A1 | 6/2005 | Hopen et al. |
| 2005/0177865 A1 | 8/2005 | Ng et al. |
| 2005/0262357 A1 | 11/2005 | Araujo et al. |
| 2006/0015570 A1 | 1/2006 | Khemani et al. |
| 2006/0041635 A1 | 2/2006 | Alexander et al. |
| 2006/0053253 A1 | 3/2006 | Roth et al. |
| 2006/0059246 A1 | 3/2006 | Grove |
| 2006/0059370 A1 | 3/2006 | Asnis et al. |
| 2006/0064500 A1 | 3/2006 | Roth et al. |
| 2006/0068755 A1 | 3/2006 | Shraim et al. |
| 2006/0080546 A1 | 4/2006 | Brannon et al. |
| 2006/0173959 A1* | 8/2006 | McKelvie ............... H04L 51/04 709/204 |
| 2006/0212599 A1 | 9/2006 | Lucco et al. |
| 2006/0248285 A1* | 11/2006 | Petev ..................... G06F 12/084 711/141 |
| 2006/0294223 A1 | 12/2006 | Glasgow et al. |
| 2007/0008883 A1 | 1/2007 | Kobayashi |
| 2007/0156852 A1 | 7/2007 | Sundarrajan et al. |
| 2007/0168394 A1* | 7/2007 | Vivekanand .......... H04L 67/322 |
| 2007/0192444 A1 | 8/2007 | Ackaouy et al. |
| 2007/0192853 A1 | 8/2007 | Shraim et al. |
| 2007/0204051 A1 | 8/2007 | Zhang |
| 2007/0214251 A1 | 9/2007 | Li |
| 2007/0245409 A1 | 10/2007 | Harris et al. |
| 2007/0250601 A1 | 10/2007 | Amlekar et al. |
| 2007/0294762 A1 | 12/2007 | Shraim et al. |
| 2007/0299915 A1 | 12/2007 | Shraim et al. |
| 2008/0034416 A1 | 2/2008 | Kumar et al. |
| 2008/0046616 A1 | 2/2008 | Verzunov et al. |
| 2008/0049786 A1 | 2/2008 | Ram et al. |
| 2008/0140938 A1 | 6/2008 | Khemani et al. |
| 2008/0208789 A1 | 8/2008 | Almog |
| 2008/0209120 A1* | 8/2008 | Almog ................ H04L 67/2852 711/106 |
| 2008/0225720 A1 | 9/2008 | Khemani et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |
| 2008/0320151 A1 | 12/2008 | McCanne et al. |
| 2009/0037393 A1* | 2/2009 | Fredricksen ........ G06F 16/9574 |
| 2009/0083494 A1 | 3/2009 | Bhanoo et al. |
| 2009/0125633 A1 | 5/2009 | Watsen et al. |
| 2011/0173436 A1 | 7/2011 | Vanheyningen et al. |

FOREIGN PATENT DOCUMENTS

| | | |
|---|---|---|
| EP | 1 575 246 A1 | 9/2005 |
| WO | WO-98/02814 A1 | 1/1998 |
| WO | WO-99/03047 A1 | 1/1999 |
| WO | WO-01/90912 A1 | 11/2001 |
| WO | WO-02/23362 A1 | 3/2002 |
| WO | WO-2004/090672 A2 | 10/2004 |
| WO | WO-2004/114529 A2 | 12/2004 |
| WO | WO-2006/074072 A3 | 7/2006 |
| WO | WO-2007/024647 A2 | 3/2007 |
| WO | WO-2008/112691 A2 | 9/2008 |
| WO | WO-2008/112698 A2 | 9/2008 |

OTHER PUBLICATIONS

CN Office Action for Application No. 200880015868.1 dated May 18, 2012.
CN Office Action for Application No. 200880015868.1 dated Feb. 17, 2013.
US Ex Parte Quayle Action for U.S. Appl. No. 12/634,339 dated Jul. 19, 2012.
U.S. Notice of Allowance for U.S. Appl. No. 11/685139, dated Apr. 15, 2011.
U.S. Notice of Allowance for U.S. Appl. No. 12/506,587 dated May 25, 2012.
U.S. Notice of Allowance for U.S. Appl. No. 12/634,339 dated Sep. 26, 2012.
U.S. Notice of Allowance for U.S. Appl. No. 11/685,130, dated Aug. 5, 2011.
U.S. Notice of Allowance for U.S. Appl. No. 11/685,131, dated Sep. 19, 2011.
U.S. Office Action for U.S. Appl. No. 11/685,130, dated Jul. 22, 2009.
U.S. Office Action for U.S. Appl. No. 12/506,587, dated Dec. 27, 2010.
U.S. Office Action for U.S. Appl. No. 11/685,134, dated Jul. 15, 2009.
U.S. Office Action for U.S. Appl. No. 11/685,134, dated Aug. 12, 2011.
U.S. Office Action for U.S. Appl. No. 11/685,137, dated Jun. 1, 2011.
U.S. Office Action for U.S. Appl. No. 11/685,137, dated Jan. 27, 2011.
U.S. Office Action for U.S. Appl. No. 11/685139, dated May 28, 2009.
U.S. Office Action for U.S. Appl. No. 11/685,141, dated Oct. 7, 2010.
U.S. Office Action for U.S. Appl. No. 11/685,142, dated Jun. 22, 2009.
U.S. Office Action for U.S. Appl. No. 11/685,130, dated Oct. 28, 2010.
U.S. Office Action for U.S. Appl. No. 11/685,134, dated Dec. 1, 2011.
U.S. Office Action for U.S. Appl. No. 11/685,134. dated Dec. 2, 2010.
U.S. Office Action for U.S. Appl. No. 11/685,139, dated Jan. 6, 2011.
U.S. Office Action for U.S. Appl. No. 11/685,141, dated Jul. 7, 2011.
U.S. Office Action for U.S. Appl. No. 12/634,339, dated Dec. 5, 2011.
U.S. Office Action for U.S. Appl. No. 11/685,131 dated May 26, 2011.
U.S. Office Action for U.S. Appl. No. 11/685,134 dated Apr. 3, 2012.
U.S. Office Action for U.S. Appl. No. 11/685,134 dated Sep. 26, 2012.
U.S. Office Action for U.S. Appl. No. 11/685,137 dated May 10, 2012.
U.S. Office Action for U.S. Appl. No. 11/685,137 dated Sep. 14, 2012.
U.S. Office Action for U.S. Appl. No. 11/685,137 dated Sep. 20, 2011.
U.S. Office Action for U.S. Appl. No. 11/685,141 dated Dec. 23, 2011.
U.S. Office Action for U.S. Appl. No. 11/685,141 dated Dec. 26, 2012.
U.S. Office Action for U.S. Appl. No. 11/685,141 dated Sep. 10, 2012.
U.S. Office Action for U.S. Appl. No. 12/506,587 dated Jan. 31, 2012.
U.S. Office Action for U.S. Appl. No. 12/506,587 dated Jun. 14, 2011.
U.S. Office Action for U.S. Appl. No. 12/634,339 dated Apr. 3, 2012.
U.S. Office Action for U.S. Appl. No. 12/835,430 dated Oct. 12, 2012.
U.S. Office Action for U.S. Appl. No. 12/835,430 dated Feb. 13, 2012.
U.S. Office Action for U.S. Appl. No. 12/835,430 dated Jun. 27, 2012.
U.S. Office Action for U.S. Appl. No. 11/685130, dated Apr. 13, 2011.

(56) References Cited

OTHER PUBLICATIONS

U.S. Office Action for U.S. Appl. No. 11/685134, dated Mar. 17, 2011.
U.S. Office Action for U.S. Appl. No. 11/685141, dated Jan. 20, 2011.
Pei Cao, Jin Zhang, and Kevin Beach. "Active Cache: Caching Dynamic Contents on the Web." 1999. The British Computer Society. Distributed Systems Engineering. vol. 6. No. 1.
R. Fielding et al. "Hypertext Transfer Protocol—HTTP/1.1." 1999. The Internet Society. RFC 2616. pp. 67-72.
Terence Kelly and Jeffrey Mogul. "Aliasing on the World Wide Web: Prevalence and Performace Implications." May 2002. ACM. WWW2002.
U.S. Notice of Allowance for U.S. Appl. No. 11/685,134 dated Apr. 2, 2013.
U.S. Notice of Allowance for U.S. Appl. No. 11/685,141 dated Nov. 26, 2013.
U.S. Notice of Allowance for U.S. Appl. No. 12/835,430 dated Aug. 23, 2013.
U.S. Office Action for U.S. Appl. No. 11/685,137 dated Apr. 26, 2013.
U.S. Office Action for U.S. Appl. No. 11/685,141 dated Jul. 16, 2013.
U.S. Office Action for U.S. Appl. No. 12/835,430 dated May 20, 2013.
U.S. Office Action for U.S. Appl. No. 12/835,430 dated Jul. 22, 2013.
Objects, Images, and Applets in HTML documents. W3C. HTML 4.01 Specification. Dec. 1999. Chapter 13.
Written Opinion for PCT/US2008/056672, dated Jun. 22, 2009.
"Cisco Distributed Director," Posted Feb. 21, 1997, 16 pages, [Online] [Retrieved on Dec. 4, 1997] Retrieved from the Internet<URL:http://www.cisco.com/wart/public/751/distdir/dd_wp.htm>.
Barron C. Housel, George Samara, and David B. Lindquist. "WebExpress: A client/intercept based system for optimizing Web browsing in a wireless environment." 1998. Mobile Networks and Applications. vol. 3. No. 4 pp. 419-431.
Chinese First Office Action on 200880015868.1 dated May 18, 2012.
Chinese Office Action dated Feb. 17, 2013 in Chinese Patent Application No. 200880015868.1.
CN Office Action for Application No. 200880015868.1 dated Sep. 9, 2013.
Cohen et al., "Proactive Caching of DNS Records: Addressing a Performance Bottleneck", Elsevier Science B. V., Computer Networks, Feb. 19, 2000.
Daniel, Zeng, Fei-Yue Wang and Mingkuan Lie. "Efficent Web Content Delivery Using Proxy Caching Techniques." Aug. 2004. IEEE. IEEE Transactions on Systems, Man, and Cybernetics. vol. 34. No. 3. pp. 270-280.
Ex Parte Quayle Action on U.S. Appl. No. 12/634,339 dated Jul. 19, 2012.
International Preliminary Report on Patentability on PCT/US2008/056672, dated Sep. 15, 2009.
International Search Report for PCT/US2008/056672, dated Jun. 22, 2009.
Jeffrey C. Mogul, Fred Douglii, Anja Feldman, and Balachander Krishnamurthy. "Potential benefits of delta encoding and data compression for HTTP." 1997. ACM. Sigcomm '97.
Michael Rabinovich and Oliver Spatscheck. Web Caching and Replication. 2001. Addison-Wesley Professional. pp. 162-178.
Notice of Allowance for U.S. Appl. No. 11/685,139, dated Apr. 15, 2011.
Notice of Allowance for U.S. Appl. No. 11/685,131, dated Sep. 19, 2011.
Notice of Allowance on U.S. Appl. No. 12/506,587 dated May 25, 2012.
Notice of Allowance on U.S. Appl. No. 12/634,339 dated Sep. 26, 2012.
Notice of Allowance on U.S. Appl. No. 11/685,130, dated Aug. 5, 2011.
Notice of Allowance, U.S. Appl. No. 11/685,131, dated Sep. 19, 2011.
Office Action for U.S. Appl. No. 11/685,130, dated Jul. 22, 2009.
Office Action for U.S. Appl. No. 11/685,134, dated Jul. 15, 2009.
Office Action for U.S. Appl. No. 11/685,134, dated Aug. 12, 2011.
Office Action for U.S. Appl. No. 11/685,137, dated Jun. 1, 2011.
Office Action for U.S. Appl. No. 11/685,137, dated Jan. 27, 2011.
Office Action for U.S. Appl. No. 11/685,139, dated May 28, 2009.
Office Action for U.S. Appl. No. 11/685,141, dated Oct. 7, 2010.
Office Action for U.S. Appl. No. 11/685,142, dated Jun. 22, 2009.
Office Action for U.S. Appl. No. 11/685,130, dated Oct. 28, 2010.
Office Action for U.S. Appl. No. 11/685,134, dated Dec. 1, 2011.
Office Action for U.S. Appl. No. 11/685,134. dated Dec. 2, 2010.
Office Action for U.S. Appl. No. 11/685,139, dated Jan. 6, 2011.
Office Action for U.S. Appl. No. 11/685,141, mailed Jul. 7, 2011.
Office Action for U.S. Appl. No. 12/634,339, dated Dec. 5, 2011.
Office Action on U.S. Appl. No. 11/685,131 dated May 26, 2011.
Office Action on U.S. Appl. No. 11/685,134 dated Apr. 3, 2012.
Office Action on U.S. Appl. No. 11/685,134 dated Sep. 26, 2012.
Office Action on U.S. Appl. No. 11/685,137 dated May 10, 2012.
Office Action on U.S. Appl. No. 11/685,137 dated Sep. 14, 2012.
Office Action on U.S. Appl. No. 11/685,137 dated Sep. 20, 2011.
Office Action on U.S. Appl. No. 11/685,141 dated Dec. 23, 2011.
Office Action on U.S. Appl. No. 11/685,141 dated Dec. 26, 2012.
Office Action on U.S. Appl. No. 11/685,141 dated Sep. 10, 2012.
Office Action on U.S. Appl. No. 12/506,587 dated Jan. 31, 2012.
Office Action on U.S. Appl. No. 12/506,587 dated Jun. 14, 2011.
Office Action on U.S. Appl. No. 12/634,339 dated Apr. 3, 2012.
Office Action on U.S. Appl. No. 12/835,430 dated Oct. 12, 2012.
Rabinovich, Michael and Spatscheck, Oliver, "Web Caching and Replication", Dec. 2001, Addison-Wesley, p. 148.

* cited by examiner

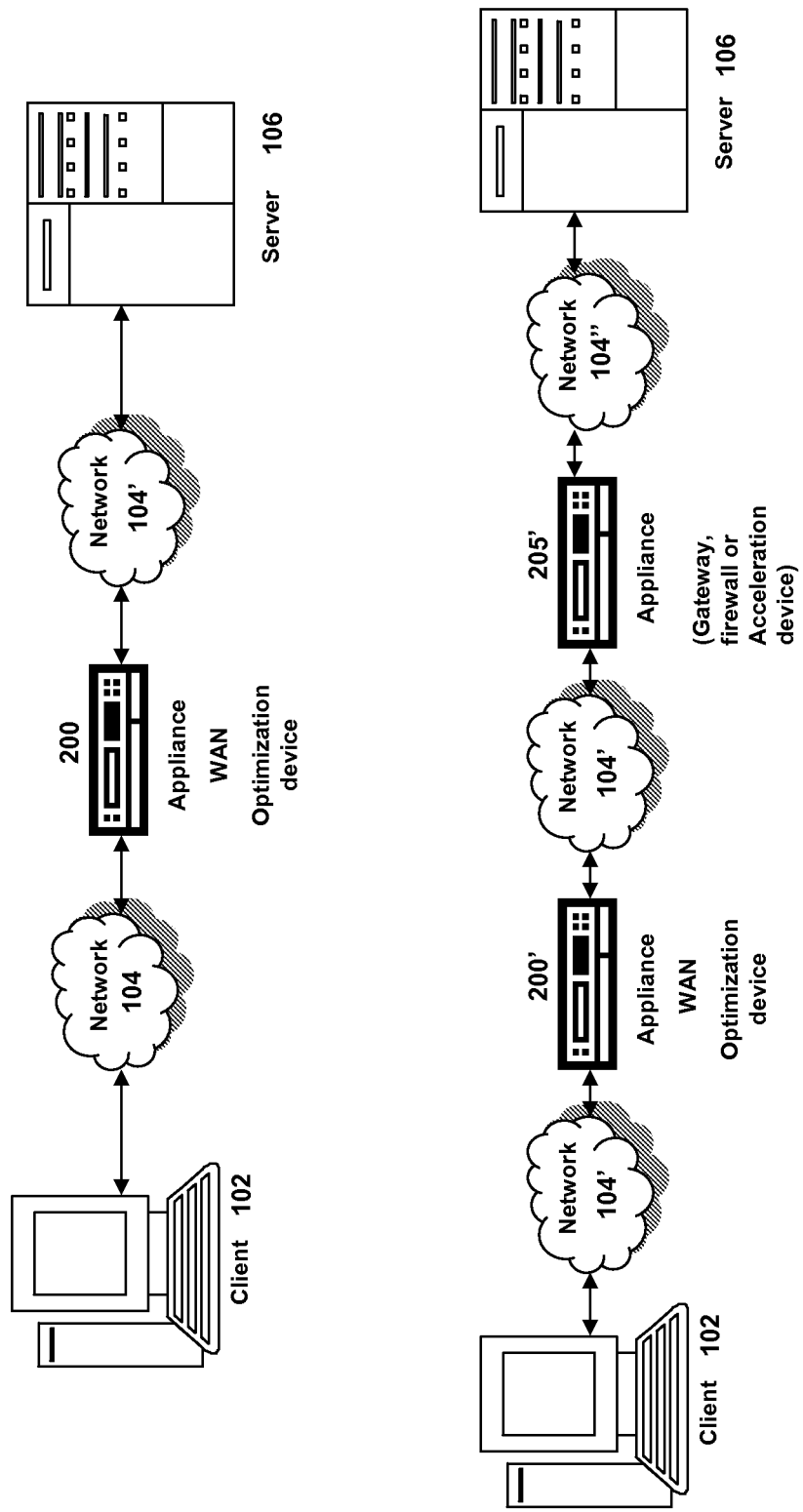

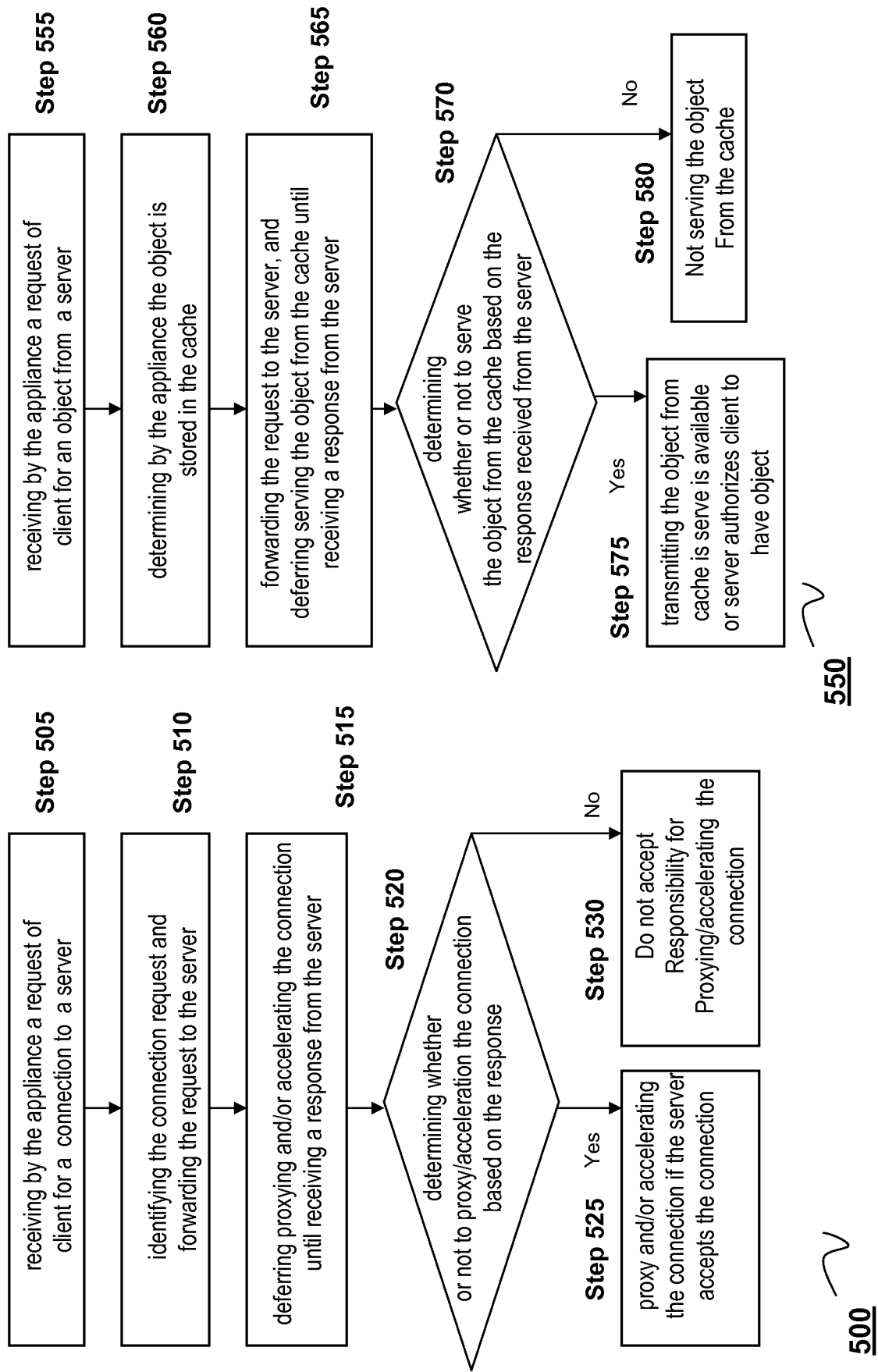

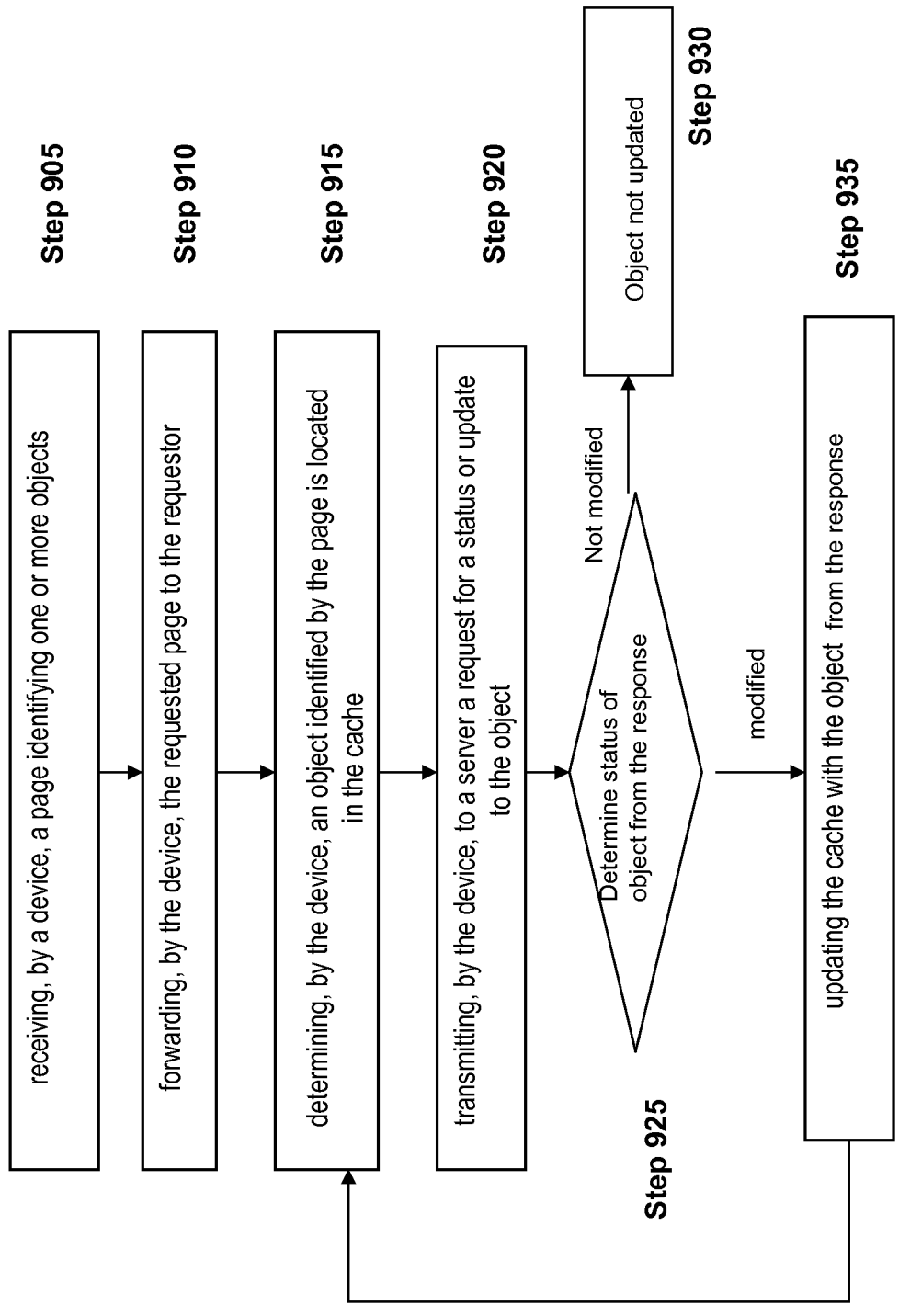

SYSTEMS AND METHODS OF USING THE REFRESH BUTTON TO DETERMINE FRESHNESS POLICY

RELATED APPLICATION

The present application claims priority to and is a continuation of U.S. Non-provisional application Ser. No. 11/685,141 entitled "Systems and Methods Of Using the Refresh Button To Determine Freshness Policy" and filed on Mar. 12, 2007, which is incorporated herein by reference in its entirety for all purposes.

FIELD OF THE INVENTION

The present invention generally relates to data communication networks. In particular, the present invention relates to systems and methods for acceleration network traffic, such as using the refresh button to determine freshness policy.

BACKGROUND OF THE INVENTION

Business entities continue to distribute geographically their operations. However, at the same time, many business entities desire to consolidate their computing infrastructure to a single geographic location in order to simplify maintenance and administration. These competing efforts often require that a remote business operation communicate with a centralized data center over a wide area network (WAN). Delays associated with communication over a WAN typically results in a user experience that is not satisfying to the user. Therefore techniques for accelerating the network traffic over the WAN are often employed.

One such acceleration technique is disk-based traffic caching, i.e., maintaining a history of previously-transmitted network traffic on disk in order to identify and send in place of the network traffic a tag or other identifier over the WAN. However, traditional disk-based caching techniques typically fail to provide acceptable performance because cache index entries, which are stored in memory, tend to scale with the number of cache entries, meaning that traditional disk-based caches consume large amounts of memory. In some cases, the size of the disk cache is artificially constrained because there is not enough memory to properly index the cache.

Another acceleration technique is traffic caching, i.e., maintaining a history of previously-transmitted network traffic in order to identify and send in place of the network traffic a tag or other identifier over the WAN. Such caches generally associate a "freshness" value with each cached entry. If a requested object is stored in the cache, and its freshness value indicates that the cached object is still valid, the object is sent to the client. However, this approach generally suffers from a drawback that the freshness value may not accurately reflect whether the object has changed. Therefore, reliance on freshness values can result in the cache transmitting outdated information to a user, perhaps many times, before the freshness value expires.

Another such acceleration technique is traffic caching, i.e., maintaining a history of previously-transmitted network traffic on disk in order to identify and send in place of the network traffic a tag or other identifier over the WAN. This approach, however, requires construction of a compression history in order to function well and such construction may require that many different files and objects are requested before providing a user with any perception of acceleration.

These caches generally associate a "freshness" value with each cached entry. If a requested object is stored in the cache, and its freshness value indicates that the cached object is still valid, the object is sent to the client. However, this approach generally suffers from a drawback that many web objects are delivered without an associated freshness value. In these cases a browser application or cache typically assigns a freshness value to the object and, in most cases, the freshness value is selected according to a rule that does not vary with the type of object encountered. This approach is not optimal since it can result both in the provision of stale objects as well as the validation or freshening of cached objects that are not stale.

If a requested object is stored in the cache, and its freshness value indicates that the cached object is still valid, the object is sent to the client. However, this approach generally suffers from a drawback that the freshness value may not accurately reflect whether the object has changed. Therefore, reliance on freshness values can result in the cache transmitting outdated information to a user, perhaps many times, before the freshness value expires.

In some cases, proxy servers providing cache memories may be deployed in an attempt to ameliorate the delays encountered by WAN traffic, i.e., a proxy server may be able to respond to a user request with data stored in a cache, rather than requiring the user to retrieve the requested file or object from the data center. However, proxy servers pose a security risk for businesses because they typically do not require user authentication. Therefore, a proxy server may incorrectly respond to a request from a user that does not have authority to retrieve a particular file or object, compromising data security.

One technique that may be used is prefetching, i.e., identifying a file or object that is likely to be requested by a user and requesting that file or object before it is actually requested. However, this technique usually does not increase performance as much as might be expected because the prefetching traffic competes with actual requests for files and objects. That contention slows down actual requests and can actually exacerbate the delays perceived by users.

In some cases, the "freshness" of an object is validated before it is transmitted to the client. For example, a conditional HTTP GET command may be issued to determine if a requested object is still valid. However, validating an object takes almost as long as fetching it and, therefore, encountering a series of stale objects results in poor performance because the validation happens while the user is waiting.

Each request sent by a user begins with resolving a Uniform Resource Locator (URL) to an IP address. In some cases this resolution may take more than a second to complete, which appears to the user as a delay. Acceleration of DNS resolution would result in a better user experience.

BRIEF SUMMARY OF THE INVENTION

The present solution provides a variety of techniques for accelerating and optimizing network traffic, such as HTTP based network traffic. The solution described herein provides techniques in the areas of proxy caching, protocol acceleration, domain name resolution acceleration as well as compression improvements. In some cases, the present solution provides various prefetching and/or prefreshening techniques to improve intermediary or proxy caching, such as HTTP proxy caching. In other cases, the present solution provides techniques for accelerating a protocol by improving the efficiency of obtaining and servicing data from an originating server to server to clients. In another cases, the present solution accelerates domain name resolution more quickly. As every HTTP access starts with a URL that includes a hostname that must be resolved via domain name resolution into an IP address, the present solution helps accelerate HTTP access. In some cases, the present solution improves compression techniques by prefetching non-cacheable and cacheable content to use for compressing network traffic, such as HTTP. The acceleration and optimization techniques described herein may be deployed on the client as a client agent or as part of a browser, as well as on any type and form of intermediary device, such as an appliance, proxying device or any type of interception caching and/or proxying device.

With the techniques described herein, the caching features of the present solution works on both accelerated and non-accelerated connections. For example, the present solution may deployed as a double-ended solution in which cooperating intermediaries or devices work together to accelerate network traffic, such as one device on a client-side of a WAN connection, e.g., at a branch office, and a second device on a server-side of the WAN connection, such as a corporate data center. The present solution may also be deployed as a single-ended solution, such as on a client-side connection to WAN to accelerate network traffic. As most users connection to both the Internet and to a WAN, the caching techniques of the present solution may accelerate the user experience in a single device mode.

The caching techniques of the present solution accelerate protocols such as HTTP or Common Internet File System (CIFS) which tend to perform a certain minimum number of round-trips per object regardless of size. By serving data locally from a caching intermediary, the intermediary turns WAN round-trips into LAN-round trips to reduce latency. The caching techniques described herein further help reduce the latency and round-trips times for these objects and improve the user experience.

The techniques of the present solution also reduce the load on the server. In responding to client requests, the intermediary cache may not communicate with the originating server and serve a response from the cache. In other cases, the techniques of the present solution more efficiently communicate with the server to determine if an object should be obtained from the server. This also reduces the load on the server.

By providing improvements to caching to increase the cache hits or otherwise reduce cache misses, the present solution also increases the lifetime of compression history. For example, if the caching device is on the LAN side of the system only cache misses and validation requests are sent over the WAN. By reducing the total amount of data going through the compressing device, the lifetime of the compression history is increased.

In one aspect, the present invention relates to a method of storing objects in a cache using multiple storage tiers based on size of objects and maintaining a number of smaller objects stored to the cache within a predetermined threshold. In one embodiment, the method includes establishing a size of a storage for a cache to store cached objects, where the cache uses a first portion of the storage for storing objects smaller than or equal to a first threshold object size and a second portion of the storage for storing objects larger than the first threshold object size. The method also includes identifying a number of objects the cache is allowed to store to the first portion of the storage. The cache may receive an object for caching, and determines to store the object in either the first portion of the storage or the second portion of the storage based on a size of the object. The cache also maintains the number of objects the cache is allowed to store to the first portion of the storage below a predetermined threshold.

In one embodiment, the method includes the caching determining the size of the object is smaller than or equal to the first threshold object size and storing the object in the first portion of the storage. In other embodiments, the cache determines the size of the object is larger than the first threshold object size and storing the object in the second portion of the storage. In some other embodiments, the method includes determining by the cache the number of objects stored to the first portion of the storage has reached the predetermined threshold. In some embodiments, the cache may not store the received object in the cache based on the determination that the number of objects stored to the first portion of the storage has reached the predetermined threshold. In some other embodiments, the method includes removing by the cache a previously cached object from the cache based on the determination that the number of objects stored to the first portion of the storage has reached the predetermined threshold, and storing the received object in the cache.

In another embodiment, a predetermined size of the second portion of storage is established for storing objects by the cache larger than the first threshold object size. In some embodiments, the cache may identify a second threshold object size for storing objects in the first portion of the storage. In still another embodiment, the cache receives a second object for caching, and stores the second object in the first portion of the storage responsive to determining a size of the second object is greater than the second threshold object size and less than the first threshold object size. In some embodiments, the cache receives a second object for caching, and does not store the second object to the cache responsive to determining a size of the second object is less than the second threshold object size. In some other embodiments, a size of memory used by the cache for indexing objects stored to the storage of the cache is established. In still other embodiments, the cache maintains the size of memory for indexing objects responsive to a change in the size of the storage used by the cache.

In another aspect, the present invention relates to a method of storing objects in a cache using multiple storage tiers based on size of objects and storing objects larger than an object threshold size to a portion of storage used by the cache. In one embodiment, the method includes establishing a predetermined size for a first portion of storage used by a cache for storing objects larger than a first threshold object size, the cache storing objects smaller than the first threshold object size to a remaining portion of storage used by the cache. The method also includes receiving by the cache an object for caching. The cache determines a size of the object is greater than a first threshold object size, and stores the object in the first portion of storage responsive to the determination.

In another embodiment, the caching device may maintain a number of objects the cache is allowed to store to the remaining portion of the storage below a predetermined threshold. In other embodiments, the method includes determining the number of objects stored to the remaining portion of the storage has reached the predetermined threshold and not storing a second received object smaller than the first threshold object size to the remaining portion of the storage. In some embodiments, the caching device receives a second object, and determines a size of the second object is less than the first threshold object size. In some embodiments, the cache stores the second object to the remaining portion of storage used by the cache if space is available to store the second object. In other embodiments, the caching device determines the remaining portion of storage used by the cache does not have space available to store the second object. In still other embodiments, the cache may not store the second object to the cache. In still some other embodiments, the cache removes a previously cached object from the remaining portion of storage used by cache and stores the second object in the remaining portion of storage.

In still another embodiment, a second predetermined size for the remaining portion of the storage used by the cache is established to store objects smaller than the first threshold object size. In some other embodiments, the cache determines the available space of first portion of storage used by the cache is either at or near the predetermined size, and increasing the predetermined size of the first portion of storage by allocating space from the remaining portion of storage to the first portion of storage. In some embodiments, the method includes establishing a size of memory used by a cache for holding indexes to objects stored to a storage. In other embodiments, the method includes maintaining the size of memory used by the cache for indexing objects responsive to a change in the size of the first portion of storage used by the cache.

In one aspect, the present invention relates to a method of managing a size of objects stored in a cache using multiple storage tiers based on size of objects, the method allocating a portion of storage used by the cache for storing larger objects. In one embodiment, the method includes establishing a size of memory used by a cache for holding indexes to objects stored to a storage, the storage having a storage size. The method also includes establishing a first predetermined size of a first portion of a storage of a cache for storing objects larger than a first threshold object size, the cache using a second portion of the storage of the cache to store objects smaller than the first threshold object size. The method also includes changing either the size of memory or the storage size used by the cache. The cache may maintain the first predetermined size of the first portion of the storage of the cache in response to changing either the size of memory or the storage size used by the cache.

In another embodiment, the method includes increasing or decreasing the storage size used by the cache for storing objects. In other embodiments, the size of the memory used by the cache for indexing objects is increased or decreased. In some embodiments, the method includes identifying a number of objects the cache is allowed to store to the first portion of the storage. In some other embodiments, the method includes maintaining the number of objects the cache is allowed to store to the first portion of the storage in response to changing either the size of memory or the storage size used by the cache.

In still another embodiment, the method includes adjusting the first threshold object size in response to changing either the size of memory or the storage size used by the cache. In some embodiments, the method includes adjusting a number of objects the cache is allowed to store to the second portion of the storage while maintaining the first predetermined size of the first portion of the storage. In other embodiments, the method includes adjusting the number of objects the cache is allowed to store to the first portion of the storage in response to changing either the size of the memory or the storage size used by the cache. In still other embodiments, the method includes adjusting the number of objects the cache is allowed to store to the second portion of the disk relative to an amount of change to either the size of the memory or the storage size used by the cache.

In another embodiment, the method includes establishing a second threshold object size for objects the cache is allowed to store to the second portion of the storage, the second threshold object size smaller than the first threshold object size. In some embodiments, the cache includes a third portion of the storage established for storing objects smaller than the second threshold object size. In some other embodiments, the method includes adjusting the second threshold object size in response to changing either the size of memory or the storage size used by the cache.

In one aspect, the present invention relates to a method of providing security or reliability to serving cached objects for a session communicated via a transport layer connection between a client and a server. In one embodiment, the method includes the following steps: receiving, by a device, a request for an object via a session communicated over a transport layer connection between a client to a server; determining, by the device, the object is stored in a cache; forwarding, by the device, the request to the server; deferring, by the device, serving the object from the cache until receiving a response from the server; and determining, by the device, to serve the object from the cache based on the response received from the server.

In one embodiment, the method includes determining, by the device, from the received response that the server would provide the object to the client. In some embodiments, the method also includes determining, by the device, from the received response that the server authorizes one of the client or user of the client to receive the object. In other embodiments, the method includes determining, by the device, from the received response that the server is one of available or able to serve the object to the client. In still other embodiments, the method includes determining, by the device, the server is transmitting the object to the client.

In another embodiment, the method includes deferring, by the device, serving the object from the cache until determining the server has transferred the object to the client at least once. In some embodiments, the device determines, from the received response, that the server would not provide the object to the client, and in response to the determination, not serving the object from the cache. In some embodiments, the device determines, from the received response, that the server does not authorize one of the client or user of the client to receive the object, and in response to the determination, not serving the object from the cache. In other embodiments, the device determines from the received response that the server requires authentication of one of a user of the client, and in response to the determination, not serving the object from the cache. In some embodiments, the device determines from the received response that the server is one of not available or not able to provide the object to the client, and in response to the determination, not serving the object from the cache. In other embodiments, the device is a client or an appliance.

In one aspect, the present invention relates to an appliance for providing security or reliability to serving cached objects for a session communicated via a transport layer connection between a client and a server. In one embodiment, the appliance includes a means for receiving a request for an object via a session communicated over a transport layer connection between a client and a server. The appliance also includes a means for determining the object is stored in a cache. The appliance also includes a means for forwarding the request to the server. The appliance further includes a means for deferring serving the object from the cache until receiving a response from the server. The appliance also includes a means for determining to serve the object from the cache based on the response received from the server. In some embodiments, the appliance determines from the received response that the server would provide the object to the client. In other embodiments, the appliance determines from the received response that the server authorizes one of the client or user of the client to receive the object.

In one embodiment, the appliance determines from the received response that the server is either available or able to serve the object to the client. In some embodiments, the appliance determines the server is transmitting the object to the client. In other embodiments, the appliance defers serving the object from the cache until determining the server has transferred the object to the client at least once. In some other embodiments, the appliance determines from the received response that the server would not provide the object to the client, and in response to the determination, not serving the object from the cache. In some embodiments, the appliance determines from the received response that the server does not authorize either the client or user of the client to receive the object, and in response to the determination, not serving the object from the cache. In some embodiments, the appliance determines from the received response that the server requires authentication of either a client or a user of the client, and in response to the determination, not serving the object from the cache.

In another embodiment, the appliance determines from the received response that the server is either not available or not able to provide the object to the client, and in response to the determination, not serving the object from the cache. In some embodiments, the appliance is a proxy transparent to the client and the server.

In one aspect, the present invention relates to a second method of providing security or reliability to proxying a connection between a client and a server. In one embodiment, the second method includes the following steps: forwarding, by a device, to a server a transport layer connection request received from a client; deferring, by the device, acceptance of the transport layer connection as a connection to proxy until receiving a response from the server to the transport layer connection request of the client; identifying, by the device, from the response of the server that the server accepts the transport layer connection; and determining, by the device, to proxy the transport layer connection in response to identifying the server's acceptance of the transport layer connection.

In one embodiment, the method includes receiving by the device a SYN packet of the transport control protocol connection request of the client, and forwards the intercepted SYN packet to the server. In other embodiments, the method includes receiving a SYN-ACK packet as the response from the server to the client's transport control protocol connection request. In some other embodiments, the device is constructed to perform one or more acceleration techniques on the transport layer connection. In some embodiments, the device performs an acceleration technique on the transport layer connection in response to the determination.

In another embodiment, the device identifies that the server does not accept the transport layer connection request, and determines to not accept the transport layer connection as a connection to proxy. In some embodiments, the device identifies that the server is either unavailable or unable to establish the transport layer connection, and the appliance determines to not proxy the transport layer connection. In some embodiments, the device defers acceptance of the transport layer connection until the device receives an indication that the server is either available or able to establish the transport layer connection. In other embodiments, the device identifies if the server does not authorize the client to establish a transport layer connection with the server, and in response, the appliance determines to not accept the transport layer connection as a connection to proxy. In some embodiments, the device identifies the server requires authentication to establish a transport layer connection with the server, and in response, the appliance defers accepting the transport layer connection as a connection to proxy until receiving an indication from the server a user of the client is authenticated.

In another embodiment, the device defers proxying the transport layer connection between the client and server until the server successfully transfers an object to the client. In some embodiments, the device comprises a proxy transparent to the client and the server. In other embodiments, the device is either the client or an appliance.

In one aspect, the present invention relates to an appliance providing security or reliability to proxying a connection between a client and a server. In one embodiment, the appliance includes a means for forwarding to a server a transport layer connection request received from a client. The appliance also includes a means for deferring acceptance of the transport layer connection as a connection to proxy until receiving a response from the server to the transport layer connection request of the client. The appliance also includes a means for identifying from the response of the server that the server accepts the transport layer connection. The appliance further includes a means for determining to proxy the transport layer connection in response to identifying the server's acceptance of the transport layer connection.

In one embodiment, the appliance receives a SYN packet of the transport control protocol connection request of the client, and forwarding the intercepted SYN packet to the server. In other embodiments, the appliance receives a SYN-ACK packet as the response from the server to the client's transport control protocol connection request.

In another embodiment, the appliance is constructed to perform one or more acceleration techniques on the transport layer connection. In some embodiments, the appliance performs an acceleration technique on the transport layer connection in response to the determination.

In a further embodiment, the appliance identifies the server does not accept the transport layer connection request, and determining, by the appliance, to not accept the transport layer connection as a connection to proxy. In other embodiments, the appliance identifies the server is one of unavailable or unable to establish the transport layer connection, and determining, by the appliance, to not proxy the transport layer connection. In some other embodiments, the appliance defers acceptances of the transport layer connection with the client as a connection to proxy until receiving an indication that the server is one of available or able to establish the transport layer connection. In some embodiments, the appliance identifies that the server does not authorize the client to establish a transport layer connection with the server, and determining, by the appliance, to not accept the transport layer connection as a connection to proxy. In other embodiments, the appliance identifies that the server requires authentication to establish a transport layer connection with the server, and deferring, by the appliance, accepting the transport layer connection as a connection to proxy until receiving an indication from the server a user of the client is authenticated. In some other embodiments, the appliance defers proxying the transport layer connection between the client and server until the server successfully transfers an object to the client.

In one aspect, the present invention relates to a method for revalidating an object stored in cache while serving the object to a requestor. In one embodiment, a request for an object is received from a requestor. The method also includes determining that the object exists in a cache. The method includes transmitting to the requestor in response to the request. The method includes transmitting to a remote object server to determine a status of the object in response to the determination. In one embodiment, the cached object is transmitted to the request and a request is transmitted to the object server substantially simultaneously. In other embodiments, the cached object is transmitted to the request and a request is transmitted to the object serve occur in parallel. In still other embodiments, a request is transmitted to the object server prior to transmitting the cached object to the requestor.

In another embodiment, the method includes transmitting the cached object to the requestor prior to receiving a response from the remote object server. In some embodiments, the method includes transmitting to a remote object server, responsive to the determination, a conditional request to retrieve the object. In other embodiments, the method includes receiving a response to the conditional request indicating the object has not changed. In some other embodiments, the method includes receiving an updated version of the object from the remote object server in response to the conditional request. In some embodiments, the method includes storing the updated version of the object in the local cache.

In still another embodiment, the method includes receiving a request for an object from a requestor. In some embodiments, the method includes determining (i) that the object exists in the local cache and (ii) that a status identifier associated with the object indicates that the object is valid. In other embodiments, the method includes transmitting via a network, responsive to the determination, the requested object from the cache to the requestor. In some other embodiments, the method includes a step of transmitting to the remote object server a request to retrieve an updated version of the object in response to the determination.

In another aspect, the present invention relates to a system for revalidating an object stored in cache while serving the object to a requestor. In one embodiment, the system includes a cache manager in communication with a requestor, a remote object server and a local cache storing an object, the cache manager receiving a first request for the object from the requestor. In response to locating the object in the local cache, the cache manager transmits the object to the requestor in response to the first request, and in response to locating the object in the local cache, transmits a second request to obtain a status of the object from the remote object server.

In one embodiment, the cache manager is either software or hardware. In some embodiments, the local cache is either random access memory or disk storage. In some other embodiments, the remote object server is a web server.

In another embodiment, the cache manager communicates with the requestor via a network. In some embodiments, the cache manager transmits the object to requestor and transmits the second request to the remote object server substantially simultaneously. In other embodiments, the cache manager transmits the object to requestor and transmits the second request to the remote object server in parallel. In still other embodiments, the cache manager transmits the cached object to the requestor prior to receiving a response from the remote object server.

In still another embodiment, the cache manager transmits to the remote object server, in response to the determination, a conditional request to retrieve the object. In some embodiments, the cache manager receives a response to the conditional request indicating the object has not changed. In some other embodiments, the cache manager receives an updated version of the object from the remote object server in response to the conditional request. In some embodiments, the cache manager stores the updated version of the object in the local cache.

In another aspect, the present invention relates to a method for revalidation objects cached by the appliance while also serving the objects to the client in a networked environment including a network appliance acting as a proxy between a client requesting objects and an object server responding to client requests. In one embodiment, an appliance intercepts a request from a client for an object from a remote object server. The appliance determines that the object exists in a cache of the appliance. The appliance transmits, in response to the determination, the cached object to the client in response to the request. The appliance transmits, in response to the determination, a request to obtain a status of the object from the remote object server. In one embodiment, the appliance comprises a transparent proxy.

In one embodiment, the appliance transmits the cached object to the client substantially simultaneously to transmitting the request to the object server. In other embodiments, the appliance transmits the cached object to the client in parallel to transmitting the request to the object server. In still other embodiments, the appliance transmits the request to the object server prior to transmitting the cached object to the client.

In another embodiment, the appliance transmits the cached object to the client prior to receiving a response from the remote object server. In some embodiments, the method includes transmitting, by the appliance, a remote object server, responsive to the determination, a conditional request to retrieve the object.

In still another embodiment, the appliance receives a response to the conditional request indicating the object has not changed. In some other embodiments, the appliance receives an updated version of the object. In some embodiments, the appliance stores the updated version of the object in the cache. In some embodiments, the method includes determining, by the appliance, (i) that the object exists in a local cache element and (ii) that a status identifier associated with the object indicates that the object is valid.

In still another aspect, the present invention relates to an appliance revalidating objects cached by the appliance while also serving the objects to the client in a networked environment including a network appliance acting as a proxy between a client requesting objects and an object server responding to client requests. In one embodiment, the appliance includes a packet processing engine intercepting a first request from a client for an object from a server. The appliance also includes a cache manager in communication with the packet processing engine, the cache manager determining whether the object is stored in a cache of the appliance responsive to the packet processing engine. The appliance, in response to locating the object in the cache, transmits the object to the client in response to the first request, and in response to locating the object in the cache, transmits a second request to the server to obtain a status of the object.

In another embodiment, the cache manager includes software or hardware. In some embodiments, the cache is random access memory or disk storage.

In still another embodiment, the appliance transmits the object to the client and transmits the second request to the server substantially simultaneously. In other embodiments, the appliance transmits the object to the client and transmits the second request to the server in parallel. In some other embodiments, the appliance transmits the cached object to the client prior to receiving a response to the second request from the server.

In a further embodiment, the appliance transmits to the server, responsive to the determination, a conditional request to retrieve the object. In some embodiments, the appliance receives a response to the conditional request indicating the object has not changed. In other embodiments, the cache manager receives an updated version of the object from the server in response to the conditional request. In still other embodiments, the cache manager stores the updated version of the object in the local cache.

In one aspect, the current invention relates to a method for speculatively prefetching an object using idle network bandwidth. In one embodiment, a device receives via a network a communication identifying an object. The device generates a request to an object server for the object, where the request is identified as a speculative request. The device determines the availability of idle network bandwidth to obtain the object from the object server. The device transmits, in response to the determination of availability of idle network bandwidth, the generated request to the object server according to a transmission rate to maintain bandwidth usage from the speculative request within a predetermined level.

In another embodiment, the device transmits the communication to a requestor. In other embodiments, the method includes transmitting the generated request prior to a user requesting the object identified by the communication. In some other embodiments, the method includes generating the request prior to a user requesting the object identified by the communication. In some embodiments, the device receives the object in response to the transmitted request. In other embodiments, the device stores the received object in a cache. In still other embodiments, the method includes receiving a page having a hyperlink identifying an object.

In a further embodiment, the device identifies the generated request as a speculative request by encoding a field of one of a transport layer or internet protocol layer header option to a predetermined value. In some embodiments, the device identifies the generated request as a speculative request by encoding a value of an application layer protocol option to a predetermined value. In some other embodiments, the device identifies the generated request as a speculative request by setting a value of one of a Type of Service (TOS) or a DiffServ Codepoint (DSCP) in a field of an Internet Protocol (IP) frame to a predetermined value. In other embodiments, the device identifies the generated request as a speculative request by making an entry in a connection state table identifying the request as speculative.

In another embodiment, the device identifies the generated request as a lower priority for transmission than non-speculative requests for objects. In other embodiments, the device is either a client, a server, or an appliance between the client and the server.

In another aspect, the current invention relates to a system for speculatively prefetching an object using idle network bandwidth. In one embodiment, the system includes a means for intercepting a communication transmitted via a network, where the communication comprising an identifier of an object. The system also includes a means for generating a request packet to an object server for the object identified, the request identified as a speculative request. The system further includes a means for determining availability of idle network bandwidth to obtain the object from the object server. In response to the determination of availability of idle network bandwidth, the system includes a means for transmitting the generated request packet to the object server, according to a transmission rate to maintain bandwidth usage from the speculative request within a predetermined level.

In another embodiment, the system forwards the communication to a requestor. In some embodiments, the system transmits the generated request packet prior to a user requesting the object identified by the page. In other embodiments, the system generates the request packet prior to a user requesting the object identified by the page. In some embodiments, the system stores the received object in a cache. In still further embodiments, the page includes a hyperlink identifying an object.

In still another embodiment, the system identifies the generated request as a speculative request by encoding a field in either a transport layer or internet protocol layer header option to a predetermined value. In other embodiments, the system identifies the generated request as a speculative request by encoding a value of an application layer protocol option to a predetermined value. In some other embodiments, the system identifies the generated request as a speculative request by setting a value of either a Type of Service (TOS) or a DiffServ Codepoint (DSCP) in a field of an Internet Protocol (IP) frame to a predetermined value. In some embodiments, the system identifies the generated request as a speculative request by making an entry in a connection state table identifying the request as speculative. In other embodiments, the system identifies the generated request as a lower priority for transmission than non-speculative requests for objects.

In a further aspect, the current invention relates to a method of speculatively prefetching an object via multiple devices using idle network bandwidth. In one embodiment, a first device receives a communication transmitted from a server to a client, where the communication specifies an identifier of an object, and the first appliance forwards the communication to the requestor. The first device transmits a request to the server for the object identified by the communication, and the first device generates the request and identifies the request as speculative. A second device identifies the request received from the first device as a speculative request. The second device determines the availability of idle network bandwidth to obtain the object from the server. The second device, in response to the determination of availability of idle network bandwidth, transmits the request according to a transmission rate to maintain bandwidth usage from the speculative request within a predetermined level.

In another embodiment, a step in the method includes transmitting the generated request prior to a user requesting the object identified by the communication. In other embodiments, a step in the method includes generating the request prior to a user requesting the object identified by the communication.

In still another embodiment, the second device receives the object in response to the transmitted request. In other embodiments, the second device stores the received object in a cache. In some embodiments, the second device transmits the object to the first device. In some other embodiments, the first device stores the received object in a cache.

In another embodiment, the first device receives a page including a hyperlink identifying the object. In some embodiments, the first device identifies the generated request as a speculative request by encoding a field of one of a transport layer or internet protocol layer header option to a predetermined value. In other embodiments, the first device identifies the generated request as a speculative request by encoding a value of an application layer protocol option to a predetermined value. In some other embodiments, the first device identifies the generated request as a speculative request by encoding a value of either a Type of Service (TOS) or a DiffServ Codepoint (DSCP) in a field of an Internet Protocol (IP) frame to a predetermined value. In still other embodiments, the second device identifies the generated request is a speculative request by identifying an encoded value of an application layer protocol option specifies a predetermined value. In further embodiments, the second device identifies the generated request is a speculative request by identifying an encoded value of either a Type of Service (TOS) or a DiffServ Codepoint (DSCP) field of an Internet Protocol (IP) frame specifies a predetermined value.

In a further embodiment, the second device identifies the generated request is a speculative request by identifying by an entry in a connection state table identifying the request as speculative. In some embodiments, the method includes transmitting, by the first device or the second device, the request at a lower priority of transmission than non-speculative requests for objects.

In another embodiment, the first device is either a client or an appliance. In some embodiments, the second device is an appliance. In other embodiments, the method includes transmitting, by either the first device or the second device, the request at a lower priority of transmission than non-speculative requests for objects.

In one aspect, the current invention relates to a method for refreshing cached objects based on user requests for pages identifying the cached objects. In one embodiment, a device receives a page via a network, where the page identifies an object. The device forwards the page to a user requesting the page. The device determines that the object is stored in a cache. The device transmits a request for a status of the object to a remote object server prior to the user requesting the object from the page.

In another embodiment, the device transmits to the remote object server, in response to the determination, a conditional request to retrieve the object. In some embodiments, the device receives, in response to the request, an indication from the remote object server that the object is valid. In other embodiments, the device receives, in response to the request, an updated version of the object from the remote object server. In some other embodiments, the method includes determining, by the device, an expiry of the object has expired. In still other embodiments, the method includes determining, by the device, the object is stale.

In still another embodiment, the device determines that the remote object server is not available to provide the object, and not serving the object from the cache in response to the determination. In other embodiments, the device determines that the remote object server does not allow the user access to the object, and not serving the object from the cache in response to the determination. In some embodiments, the method includes determining that the object exists in the cache and that a status identifier associated with the object indicates that the object is valid. In other embodiments, the method includes not transmitting, by the device, the request to the remote object server in response to the determination. In still other embodiments, a step in the method includes determining that a size of the object is below a predetermined threshold and transmitting the request for the status of the object to the remote object server in response to the determination. In other embodiments, the device identifies one or more levels of the page having objects, determines objects at each of the one or more levels are located in the cache, and transmits requests for a status of the objects to the remote object server in response to the determination.

In another embodiment, the device transmits the requests prior to the user requesting a level from the one or more levels of the page. In other embodiments, the device identifies the request to the remote object server as a speculative request. In some embodiments, the device includes either a client or a server. In some other embodiments, the device includes an appliance intercepting and forwarding communications between a client and a server.

In another further aspect, the current invention relates to a device for refreshing cached objects based on user requests for pages identifying the object. In one embodiment, the device includes a means for receiving a page via a network, the page identifying an object. The device also includes a means for forwarding the page to a user requesting the page. The device further includes means for determining that the object is stored in a cache. The device also includes a means for transmitting a request for a status of the object to a remote object server prior to the user requesting the object from the page.

In another embodiment, the device transmits to the remote object server, responsive to the determination, a conditional request to retrieve the object. In some embodiments, the device receives in response to the request an indication from the remote object server that the object is valid. In other embodiments, the device receives, in response to the request, an updated version of the object from the remote object server. In some embodiments, the device determines an expiry of the object has expired. In some other embodiments, the device determines the object is stale.

In still another embodiment, the device determines that the remote object server is not available to provide the object, and does not serve the object from the cache in response to the determination. In some embodiments, the device determines that the remote object server does not allow the user access to the object, and does not serve the object from the cache in response to the determination. In some other embodiments, the device determines that the object exists in the cache and that a status identifier associated with the object indicates that the object is valid. In still other embodiments, the device does not transmit the request to the remote object server in response to the determination. In still further embodiments, the device determines that a size of the object is below a predetermined threshold and transmits the request for the status of the object to the remote object server in response to the determination. In some embodiments, the device identifies one or more levels of the page having objects, determining objects at each of the one or more levels are located in the cache, and the device transmits requests for a status of the objects to the remote object server in response to the determination.

In another embodiment, the device transmits the requests prior to the user requesting a level from the one or more levels of the page. In some embodiments, the device identifies the request to the remote object server as a speculative request. In other embodiments, the device is either a client or a server. In some other embodiments, the device intercepts and forwards communications between a client and a server.

In still another aspect, the current invention relates to a method, in a networked environment including a network appliance acting as a proxy between a client requesting pages and a server responding to client requests, for refreshing objects cached by the appliance. In one embodiment, the appliance receives a page transmitted by a server to a client in response to a request from a user of the client, where the page identifies an object. The appliance forwards the intercepted page to the client. The method includes determining, by a cache manager of the appliance, that the object is stored in a cache of the appliance. The appliance transmits a request for a status of the object to the server prior to the user of the client requesting the object from the page.

In another embodiment, the appliance transmits to the server, in response to the determination, a conditional request to retrieve the object. In some embodiments, the appliance receives, in response to the request, an indication from the remote object server that the object is valid. In other embodiments, the appliance receives, in response to the request, an updated version of the object from the remote object server.

In still another embodiment, the method includes determining, by the cache manager, an expiry of the object has expired. In other embodiments, the method includes determining, by the cache manager, the object is stale.

In another embodiment, the appliance determines that the server is not available to provide the object, and not serving the object from the cache in response to the determination. In some embodiments, the appliance determines that the server does not allow the user access to the object, and does not serve the object from the cache in response to the determination. In other embodiments, the method includes determining, by the cache manager, the object exists in the cache and that a status identifier associated with the object indicates that the object is valid. In still other embodiments, the appliance does not transmit the request to the remote in response to the determination. In some embodiments, the method includes determining, by the cache manager, that a size of the object in the cache is below a predetermined threshold and transmitting by the appliance the request for the status of the object to the remote object server in response to the determination. In some other embodiments, the appliance identifies one or more levels of the page having objects, and determines, by the cache manager, objects at each of the one or more levels are located in the cache, and transmitting, by the appliances, requests for a status of the objects to the server in response to the determination.

In still another embodiment, the appliance transmits the requests prior to the user requesting a level from the one or more levels of the page. In some embodiments, the appliance identifies the request to the server as a speculative request.

In one aspect, the present invention relates to a method for determining by a device whether to prefetch an object identified from a page by fetching header information of the object from a remote object server. In one embodiment, a device receives a page including an identifier of an object. The device transmits a request generated by the device to obtain header information of the object from a remote object server. The method further includes receiving, by the device, in response to the generated request, header information for the object. The device determines, in response to the received header information, whether to prefetch the object from the remote object server.

In another embodiment, the method includes determining to store the object in a cache in response to the received information. In some embodiments, the device identifies the identifier of the object from the page, and determines the object is not stored in a cache. In other embodiments, the device forwards the page to either a user, a client or a browser. In still another embodiment, the device prefetches the object prior to the user requesting the object or prior to receiving a request for the object. In some embodiments, the method includes intercepting the page including a hyperlink identifying an object. In some embodiments, the method includes transmitting, by the device, an HTTP HEAD command to a remote object server identified by a uniform resource locator associated with the object of the page.

In another embodiment, the method includes receiving, in response to the generated request, header information of the object identifying a maximum amount of time for which the object is valid. In other embodiments, the method includes receiving, in response to the generated request, header information of the object identifying a date on which the object was last modified.

In another embodiment, the method includes determining, in response to the received header information, identifying the object already stored in a cache as valid. In some embodiments, the method includes determining, in response to the received header information, to modify the time period for which an object that is already stored in a cache is valid.

In still another embodiment, the device transmits a request to obtain the object from the remote object server in response to the received header information. In some embodiments, the device stores in a cache the object received from the remote object server. In other embodiments, the method includes determining, responsive to the received header information, to modify a time period for which an object that is already stored in a cache is valid. In some embodiments, the device is either a client or an appliance intercepting and forwarding communications between a client and a server.

In another aspect, the present invention relates to a device for determining whether to prefetch an object identified from an intercepted page by fetching header information of the object from a remote object server. In one embodiment, the device includes a means for receiving a page including an identifier of an object. The device also includes a means for transmitting a request generated by the device to obtain header information of the object from a remote object server. The device may further include a means for receiving in response to the generated request, a header for the object. The device also includes a means for determining responsive to the received header information whether to prefetch the object from the remote object server.

In another embodiment, the device determines, responsive to the received information, to store the object in a cache. In some embodiments, the device identifies the identifier of the object from the page, and determines the object is not stored in a cache. In other embodiments, the device forwards the page to one of a user, a client or a browser. In some other embodiments, the device transmits the generated request to the remote object server prior to a user requesting the object.

In still another embodiment, the device includes a means for receiving the page including a hyperlink identifying an object. In other embodiments, the device transmits an HTTP HEAD command to the remote object server identified by a uniform resource locator associated with the object of the intercepted page. In some other embodiments, the device receives, in response to the generated request, header information of the object identifying a maximum amount of time for which the object is valid. In other embodiments, the device receives, in response to the generated request, header information of the object identifying a date on which the object was last modified. In other embodiments, the device determines, responsive to the received header information, to identify the object already stored in a cache as valid. In some embodiments, the device determines responsive to the received header information, to modify the time period for which an object that is already stored in a cache is valid.

In another embodiment, the device transmits a request to obtain the object from the remote object server in response to the received header information. In some embodiments, the device stores the object received from the remote object server in a cache. In some other embodiments, the device determines, responsive to the received header information, to modify a time period for which an object that is already stored in a cache is valid. In some embodiments, the device is either a client or an appliance intercepting and forwarding communications between the client and the server.

In another aspect, the present invention relates to a method for prefetching by a device header information of an object from a remote object server. In one embodiment, a device receives a page including an identifier of an object. The method also includes determining, by the device, that a header of the object identified by the page is stored in a cache. The method further includes generating, by the device, in response to the determination, a request for the header of the object from a remote object server prior to the user requesting the object from the page.

In another embodiment, the device receives, in response to the generated request, header information for the object. In some embodiments, the device updates the cached header information based on the received header information. In other embodiments, the device receives a request from a requestor for the header information of the object.

In another embodiment, the device transmits the header information stored in the cache to the requestor. In some embodiments, the request comprises an HTTP HEAD command. In other embodiments, the request comprises an HTTP GET command using an "if-modified-since." In some embodiments, the device determines the object of the request has not been modified, and responding to the request with the header information stored in the cache. In other embodiments, the device determines the object of the request has been modified and in response to the determination, forwarding the request to a server. In some embodiments, the device receives the object from the request. In some other embodiments, the device responds to the request with the object received from the server. In some embodiments, the device stores the object to the cache.

In still another aspect, the present invention relates to a device for prefetching by a device header information of an object from a remote object server. In one embodiment, the device includes a means for receiving a page including an identifier of an object. The device also includes a means for determining that a header of the object identified by the page is stored in a cache. The device may include a means for generating, in response to the determination, a request for the header of the object from a remote object server prior to the user requesting the object from the page.

In another embodiment, the device includes a means for receiving, by the device, in response to the generated request, header information for the object. In other embodiments, the device includes a means for updating the cached header information based on the received header information.

In still another embodiment, the device includes a means for receiving a request from a requestor for the header information of the object. In other embodiments, the device includes transmitting the header information stored in the cache to the requestor. In some embodiments, the request comprises an HTTP HEAD command. In other embodiments, the request comprises an HTTP GET command using an "if-modified-since." In some embodiments, the device includes a means for determining whether the object of the request has not been modified, and responding to the request with the header information stored in the cache. In other embodiments, the device includes a means for determining that the object of the request has been modified and in response to the determination, forwarding the request to a server.

In another embodiment, the device includes a means for receiving the object from the requestor. In some embodiments, the device includes a means for responding to the request with the object received from the server. In some other embodiments, the device includes a means for storing the object to the cache. In some embodiments, the device is either a client or an appliance intercepting and forwarding communications between the client and a server.

In one aspect, the present invention is related to a method of prefetching non-cacheable content to store in a compression history to improve compression of subsequently transmitted pages having non-cacheable content. A device receives, a first page transmitted by a server to a client, the first page identifying a non-cacheable object. The method includes generating, by the device, a request for the non-cacheable object identified by the page prior to a user requesting the non-cacheable object from the first page. The device transmits the request to the server. The device stores the non-cacheable object received from the server to a first compression history.

In one embodiment, the device receives the first page transmitted via a first session of a user. In another embodiment, the method includes the first page, which includes a personalized version of a page for the user. In some embodiments, the non-cacheable object is dynamically generated by the server. In other embodiments, the device receives a second page transmitted by the server to the client, the second page comprising non-cacheable content.

In yet one embodiment, the server transmits the second page via either a first session or a second session of a user. The second page comprises a personalized version of a page for the user. In another embodiment, the device determines a portion of the second page matches a portion of the non-cacheable object stored in the compression history. In some embodiments, the device compresses, in response to the determination, the second page using the matching portion of the non-cacheable object. The device transmits the compressed second page to the client.

In one embodiment, a second device receives the compressed second page, and uncompressing the compressed second page using the matching non-cacheable object of the first page stored in a second compression history. The second device receives the first page forwarded by the device. In another embodiment, the second device transmits a request generated by the second device to obtain from the server the non-cacheable object identified by the first page.

In one embodiment, the second device stores to a second compression history the non-cacheable object received from the server in response to the generated request. In another embodiment, the device receives, via multiple user sessions multiple pages identifying multiple non-cacheable objects, transmitting multiple requests generated by the device to obtain the non-cacheable objects from one or more servers. The device stores the multiple non-cacheable objects received in response to the request to the first compression history.

In yet another embodiment, the device receives a third page, and determines a portion of the third page matches one or more portions of the multiple non-cacheable objects stored in the first compression history. A portion of the compression history is stored in one of memory or disk storage. In another embodiment, the device transmits at least a portion of the first compression history to a second device to store in a second compression history. The device comprises one of a client or an appliance.

In one aspect, the present invention is related to a method of prefetching content via a network file transfer to use as a compression history for compressing Hypertext Protocol (HTTP) communications. The method includes executing a non-HTTP network file transfer of one or more files from a first device to a second device prior to a user requesting a file of the one or more files via an HTTP request. An appliance intercepts packets of the non-HTTP network file transfer. The appliance stores content of the one or more files from the intercepted packets to a compression history.

In one embodiment, the appliance receives a page transmitted by a server to a client via an HTTP protocol in response to an HTTP request. In another embodiment, the appliance determines a portion of the page matches at least a portion of the content of the one or more files stored in the first compression history. In some embodiments, the appliance compresses the page based on the determination. In other embodiments, the appliance transmits the compressed page to the client. The method includes intercepting, by one of the client or a second appliance, the compressed page, and uncompressing the compressed page using one or more files from the network file transfer stored in a second compression history. The page comprises a file from the one or more files of the network file transfer.

In yet another embodiment, an administrator of the appliance initiates execution of the network file transfer to preload the compression history of the appliance. The network file transfer comprises a remote file copy. In another embodiment, the packets comprise one of a remote copy protocol or file transfer protocol. The appliance forwards the intercepted network packets to the second device. In another embodiment, the second device discards the one or more files from the network file transfer.

In one embodiment, a second appliance intercepts the forwarded network packets, and storing content of the one or more files from the intercepted packets to a second compression history. The appliance initiates the execution of the network file transfer. In another embodiment, the appliance initiates execution of the network file transfer in response to a policy of a policy engine.

In one aspect, the present invention is related to a method for dynamically determining whether to check a status of a cached object based on an operational characteristic of a connection to a remote object server. The method includes, intercepting, by a device, an object transmitted from a server to a requestor via a transport layer connection. The device stores the object in a cache. The method includes detecting, by the device, whether an operational characteristic of the transport layer connection to the server is within a predetermined threshold. The device determines, in response to the detection, whether to transmit a request to the server to obtain a status of the object.

In one embodiment, the device forwards the object to the requestor. In another embodiment, the device detects available bandwidth via the transport layer connection to the server is not within the predetermined threshold. In some embodiments, the device determines, in response to the detection, to not transmit the request to the server. In other embodiments, the device detects a speed of the transport layer connection to the server is not within the predetermined threshold. In another embodiment, the device determines, in response to the detection, to not transmit the request to the server.

In one embodiments, the device detects a round-trip time of the transport layer connection to the server is not within the predetermined threshold. In another embodiment, the device determines, in response to the detection, to not transmit the request to the server. In some embodiments, the device detects if the server is not available via the transport layer connection or the transport layer connection is not operational. In other embodiments, the device determines, in response to the detection, to not transmit the request to the server.

In yet another embodiment, the device detects an operational characteristic of the transport layer connection to the server is within the predetermined threshold for freshening the object in the cache. In some embodiments, the device transmits, in response to the detection, the request to the server to obtain the status of the object. The device transmits the request to the server prior to a user requesting the object from the page. In another embodiment, the device transmits a conditional request for the object to the server. In other embodiments, the device receives an updated version of the object from the server, and stores the object in the cache.

In still another embodiment, the device receives the status of the object indicating the object in the cache is stale, and in response to the status, transmitting a second request for the object to the server. In some embodiments, the device detects that the transport layer connection to the server has available bandwidth greater than a predetermined bandwidth threshold. The device transmits the request to the server in response to the detection. In some embodiments, the device includes a client, while in other embodiments, the device includes an appliance intercepting and forwarding communications between the client and the server.

In another aspect, the present invention is related to an appliance of a networked environment including a network appliance acting as a proxy between a client requesting pages and a server responding to client requests, an appliance for dynamically determining whether to check a status of a cached object based on an operational characteristic of a connection to the server. The appliance includes means for intercepting an object transmitted from a server to a client via a transport layer connection and storing the object in a cache. The means for detecting whether an operational characteristic of the transport layer connection to the server is within a predetermined threshold. The appliance includes a means for determining, in response to the detection, whether to transmit a request to the server to obtain a status of the object. The appliance forwards the object to the client.

In one embodiment, the appliance includes means for detecting available bandwidth via the transport layer connection to the server is not within the predetermined threshold. In another embodiment, the appliance includes a means for determining, in response to the detection, to not transmit the request to the server. The appliance detects speed of the transport layer connection to the server is not within the predetermined threshold. In some embodiments, the appliance includes a means for determining, in response to the detection, to not transmit the request to the server.

In yet another embodiment, the appliance includes a means for detecting a round-trip time of the transport layer connection to the server is not within the predetermined threshold. In some embodiments, the appliance determines, in response to the detection, to not transmit the request to the server. In other embodiments, the appliance includes detecting one of the server is not available via the transport layer connection or the transport layer connection is not operational. In some embodiments, the appliance includes determining, in response to the detection, to not transmit the request to the server.

In still another embodiment, the appliance includes detecting an operational characteristic of the transport layer connection to the server is within the predetermined threshold for freshening the object in the cache. In another embodiment, the appliance includes transmitting, in response to the detection, the request to the server to obtain the status of the object. In some embodiments, the appliance includes a means for transmitting the request to the server prior to a user requesting the object from the page. In other embodiments, the appliance transmits a conditional request for the object to the server.

In another embodiment, the appliance includes a cache manager for receiving an updated version of the object from the server, and storing the object in the cache. In some embodiments, the appliance includes receiving the status of the object indicating the object in the cache is stale, and in response to the status, transmitting a second request for the object to the server.

In one embodiment, the appliance includes a means for detecting that the transport layer connection to the server has available bandwidth greater than a predetermined bandwidth threshold, and transmitting the request to the server in response to the detection.

In one aspect, the current invention relates to a method for updating an expiration period of a cached object responsive to one or more requests to refresh the object on a page. In one embodiment, a device intercepts a request to refresh a page identifying an object, the device storing the object in a cache with an expiration period. The device determines, in response to the request, a second expiration period for the cached object. The device establishes the second expiration period as the expiration period for the cached object in the cache.

In another embodiment, the device sets the second expiration period shorter than the expiration period in response to the request. In other embodiments, the method includes the device intercepting the request generated by selecting a refresh button provided by a browser application. In some other embodiments, the device intercepts the request to refresh a page generated by a user selecting a button of a browser application.

In still another embodiment, the device intercepts multiple requests to refresh the page. In other embodiments, in response to the multiple requests, the device determines to decrease the expiration period of the cached object by a predetermined threshold. In some other embodiments, the device intercepts the request to refresh the page after a predetermined time threshold. In other embodiments, the device intercepts the request to refresh the page beyond a predetermined time after forwarding the page to a requestor. In some other embodiments, the device intercepts the request to refresh the page beyond a predetermined time after receiving a previous request to refresh the page.

In another embodiment, the device sets the second expiration period longer than the expiration period. In some embodiments, the device is either a client, a server, or an appliance intercepting and forwarding communications between the client and the server.

In another aspect, the current invention relates to a device for updating an expiration period of a cached object responsive to one or more requests to refresh the object on a page. In one embodiment, the device includes a means for intercepting a request to refresh a page identifying an object, the object stored in a cache with an expiration period. The device also includes a means for determining, in response to the request, a second expiration period for the cached object. The device also includes a means for establishing the second expiration period as the expiration period for the cached object in the cache.

In another embodiment, the device sets the second expiration period shorter than the expiration period in response to the request. In some embodiments, the request to refresh a page includes a request generated by selecting a refresh button provided by a browser application. In other embodiments, the request to refresh a page is generated by a user selecting a button of a browser application.

In another embodiment, the device intercepts multiple requests to refresh the page. In some embodiments, in response to the multiple requests, the device decreases the expiration period of the cached object by a predetermined threshold. In some embodiments, the device intercepts the request to refresh the page after a predetermined time threshold. In other embodiments, the request to refresh the page is received by device beyond a predetermined time after forwarding the page to a requestor. In still other embodiments, the request to refresh the page is received by device beyond a predetermined time after intercepting a previous request to refresh the page.

In still another embodiment, the device includes a means for setting the second expiration period longer than the expiration period. In other embodiments, device is either a client, a server, or an appliance intercepting and forwarding communications between the client and the server.

In one aspect, the current invention relates to a method in a network environment having an appliance acting as a proxy between a client requesting pages and a server responding to client requests, where the method resolves an address of a host name identified by a uniform resource locator using the internet protocol address identified as a destination of a request. In one embodiment, the method includes intercepting, by an appliance, a request packet from a client requesting via an application protocol layer a uniform resource locator of a page. The method also includes identifying, by the appliance, from the request packet an internet protocol address of a destination of the request. The appliance associates the internet protocol address of the destination with a host name identified by the uniform resource locator. The method also includes storing, by the appliance, in a cache an entry identifying the internet protocol address as an address of the host name. The method includes intercepting, by the appliance, one of a Domain Name Server (DNS) request of the client to resolve the host name or a second request of the client for the uniform resource locator identifying the host name. The method also includes identifying, by the appliance, the entry in the cache as a resolved address of the host name.

In another embodiment, the appliance does not query a DNS server to resolve the address of the host name. In other embodiments, the client resolves the internet protocol address of the host name identified by the uniform resource locator requested by the client prior to transmitting the request packet.

In still another embodiment, the client transmits via the request packet a request to open a transport layer connection to the destination identified by the internet protocol address of the host name. In some embodiments, the method includes extracting, by the appliance, the internet protocol address of the destination from a field of a header of the request packet. In other embodiments, the method includes identifying, by the appliance, the internet protocol address from either a network layer or transport layer of the request packet. In still other embodiments, the method includes responding by the appliance to the DNS request of the client with the entry in the cache. In some other embodiments, the method includes identifying, by the appliance, a cached URL of the second request using the entry in the cache providing the resolved address of the host name.

In another aspect, the current invention relates to a method, in a network environment having an appliance acting as a proxy between a client requesting pages and a server responding to client requests, for updating by the appliance a cached domain name server (DNS) address of a host name. In one embodiment, the method includes intercepting, by an appliance, either a Domain Name Server (DNS) request of a client to resolve a host name or a request of the client for a uniform resource locator identifying the host name. The method also includes storing, by the appliance, in a cache a resolved DNS address of the host name. The method further includes intercepting, by the appliance, a second request from the client for a page. The method also includes forwarding, by the appliance, the page to the client. The method also further includes determining, by the appliance, a uniform resource locator of the forwarded page identifies the host name. The method also includes transmitting, by the appliance in response to the determination, a request generated by the appliance to resolve the address of the host name with a server.

In one embodiment, the method includes the appliance transmitting a DNS resolution request to a DNS server, and receiving an address resolution of the host name. In some embodiment, the appliance stores the address resolution of the host name in the cache. In other embodiments, the method includes the appliance transmitting the request prior to a user requesting the uniform resource locator from the page. In some other embodiments, the method the appliance transmitting the request prior to the client requesting DNS resolution of the host name identified by the uniform resource locator of the page. In further embodiments, the appliance determines the address for the host name is located in the cache.

In a further embodiment, the method includes establishing, by the appliance, an expiration period in the cache for the cached DNS address of the host name. In some embodiments, the method includes the appliance determining the expiration period for the cached DNS address has expired. In other embodiments, the method the appliance determining a remaining time of the expiration period for the cached DNS address is within a predetermined threshold.

In another embodiment, the appliance generates the request as a speculative request. In other embodiments, the appliance transmits the generated request at a lower priority of transmission than non-speculative requests.

In still another embodiment, the method includes forwarding, by the appliance in response to receiving the second request, the second request to the cached DNS address of the host name identified by the uniform resource locator and transmitting a third request to a DNS server to obtain an updated resolution of the DNS address of the host name stored in the cache. In other embodiments, the method includes forwarding, by the appliance the second request to the cached DNS address of the host name, and the third request to the DNS server, either substantially simultaneously or in parallel to each other.

In one aspect, the current invention relates to an appliance acting as a proxy between a client requesting pages and a server responding to client requests, the appliance updating a cached domain name server (DNS) address of a host name. In one embodiment, the appliance includes a means for intercepting one of a Domain Name Server (DNS) request of a client to resolve a host name or a request of the client for a uniform resource locator identifying the host name. In an embodiment, the appliance includes a cache manager for storing in a cache a resolved DNS address of the host name. The appliance also includes, a means for intercepting a second request from the client for a page. The appliance further includes a means for forwarding the page to the client. The appliance further also includes a means for determining a uniform resource locator of the forwarded page identifies the host name. The appliance also includes a means for transmitting, in response to the determination, a request generated by the appliance to resolve he address of the host name with a server.

In another embodiment, the appliance transmits a DNS resolution request to a DNS server, and receives an address resolution of the host name. In other embodiments, the cache manager stores the address resolution of the host name in the cache.

In still another embodiment, the appliance transmits the request prior to a user requesting the uniform resource locator from the page. In other embodiments, the appliance transmits the request prior to the client requesting DNS resolution of the host name identified by the uniform resource locator of the page.

In another embodiment, the cache manager determines the address for the host name is located in the cache. In some other embodiment, the cache manager establishes an expiration period in the cache for the cached address of the host name. In some embodiments, the cache manager determines the expiration period for the cached address has expired. In still other embodiment, the cache manager determines a remaining time of the expiration period for the cached address is within a predetermined threshold.

In another embodiment, the appliance includes a means for generating the request as a speculative request. In some embodiments, the appliance transmits the generated request at a lower priority of transmission than non-speculative requests. In some other embodiments, the appliance forwards, in response to receiving the second request, the second request to the cached address of the host name identified by the uniform resource locator and transmits a third request to a DNS server to obtain an updated resolution of the address of the host name stored in the cache. In still other embodiments, the appliance forwards the second request to the cached address of the host name, and the third request to the DNS server one of substantially simultaneously or in parallel to each other.

The details of various embodiments of the invention are set forth in the accompanying drawings and the description below.

BRIEF DESCRIPTION OF THE DRAWINGS

The foregoing and other objects, aspects, features, and advantages of the invention will become more apparent and better understood by referring to the following description taken in conjunction with the accompanying drawings, in which:

FIG. 1C is a block diagram of another embodiment of a network environment for a client to access a server via a single network optimization appliance deployed stand-alone or in conjunction with other network appliances;

FIG. 5B has multiple flow diagrams of steps of embodiments for method to perform security and reliability techniques for proxying a connection;

FIG. 9B is a flow diagram of steps of an embodiment of a method for prefreshening objects in the cache prior to user requests for the object;

Figure 1A:
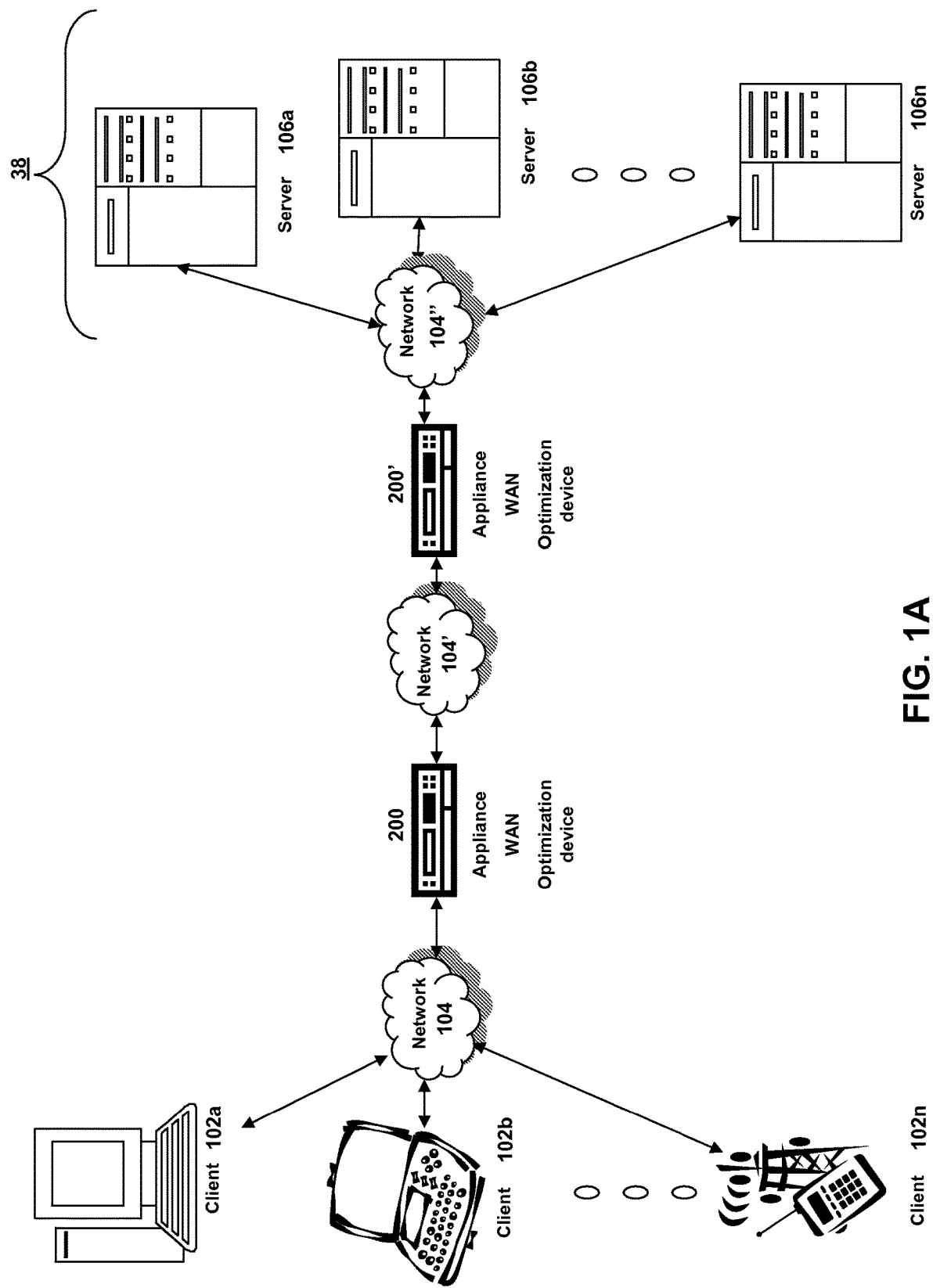
FIG. 1A is a block diagram of an embodiment of a network environment for a client to access a server via one or more network optimization appliances.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

Figure 13A:
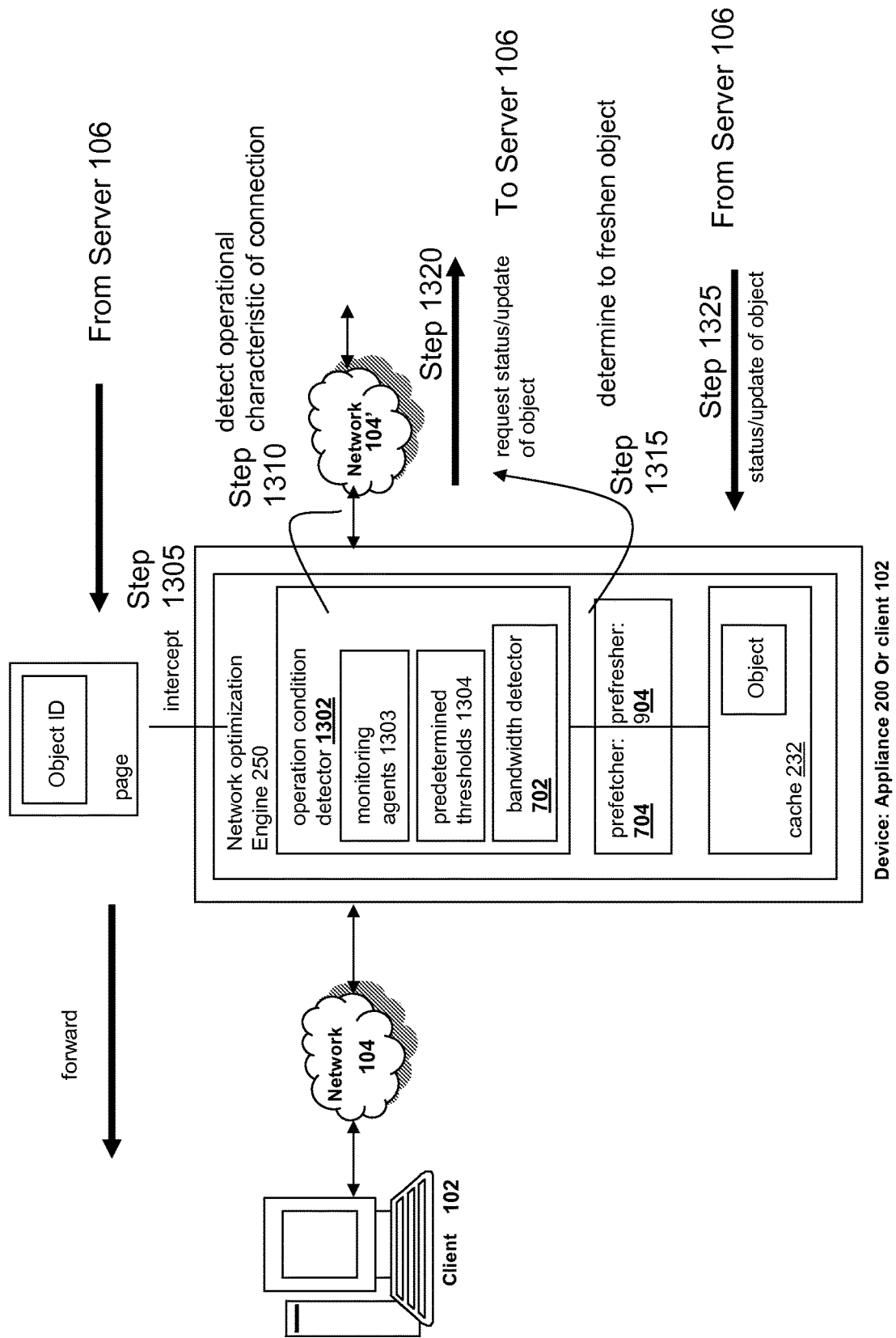
FIG. 13A is a block diagram of an example embodiment of a system for determining whether to prefetch/prefresh an object based on operational condition of the device or a status of the connection as described in conjunction with FIG. 13B.
Figure 13B:
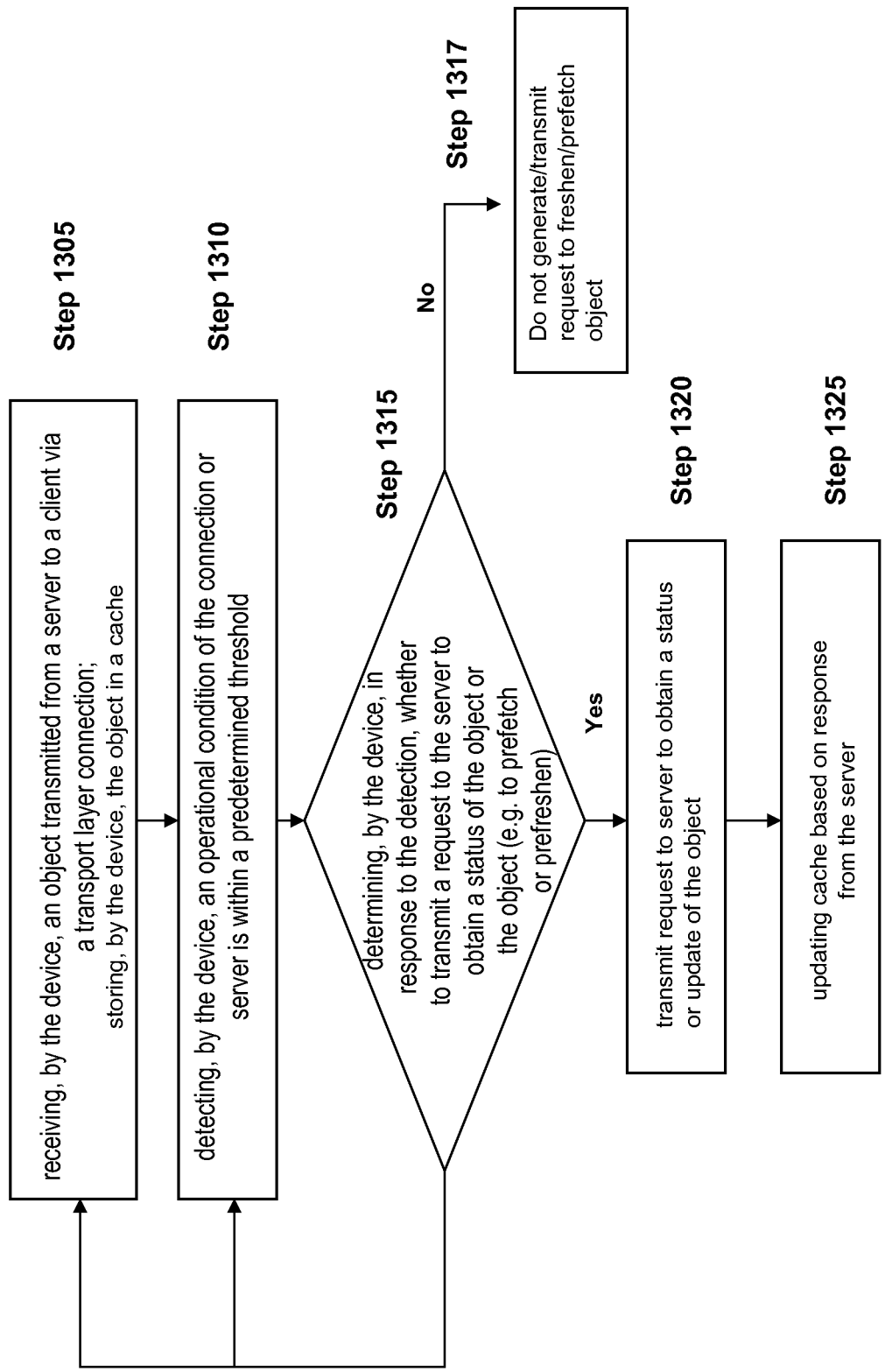
FIG. 13B is a flow diagram of steps of an embodiment of a method for freshening, prefreshening or prefetching cached objects based on operational condition of the device or status of the connection.

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user;

Section C describes embodiments of a client agent for accelerating communications between a client and a server;

Section D describes embodiments of systems and methods for a multiple-tier cache and indexing system;

Section E describes embodiments of systems and methods for providing security and reliability techniques in proxying connections;

Section F describes embodiments of systems and methods of parallel revalidation of cached objects;

Section G describes embodiments of systems and methods of providing speculative QoS to prefeshening/prefetching cached objects;

Section H describes embodiments of systems and methods for using a stack-oriented technique to prefetching objects for caching;

Section I describes embodiments of systems and methods for prefreshening cached object;

Section J describes embodiments of systems and methods for determining whether to prefetch an object based on header information of the object requested from a server;

Section K describes embodiments of systems and methods for prefetching or using non-cacheable content of dynamically generated pages as compression history;

Section L describes embodiments of systems and methods for using non-HTTP network file transfer as compression history for HTTP based traffic;

Section M describes embodiments of systems and methods for determining whether to prefetch/prefresh an object based on operational condition of the device or a status of the connection as described in conjunction with FIG. 13B;

Section N describes embodiments of systems and methods for determining expiration of a cached object responsive to refresh requests for the object; and Section O describes embodiments of systems and methods for Domain Name Resolution interception caching and prefeshening/prefetching techniques for cached DNS information.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment has one or more clients 102a-102n (also generally referred to as local machine(s) 102, or client(s) 102) in communication with one or more servers 106a-106n (also generally referred to as server(s) 106, or remote machine(s) 106) via one or more networks 104, 104', 104". In some embodiments, a client 102 communicates with a server 106 via one or more network optimization appliances 200, 200' (generally referred to as appliance 200). In one embodiment, the network optimization appliance 200 is designed, configured or adapted to optimize Wide Area Network (WAN) network traffic. In some embodiments, a first appliance 200 works in conjunction or cooperation with a second appliance 200' to optimize network traffic. For example, a first appliance 200 may be located between a branch office and a WAN connection while the second appliance 200' is located between the WAN and a corporate Local Area Network (LAN). The appliances 200 and 200' may work together to optimize the WAN related network traffic between a client in the branch office and a server on the corporate LAN.

Although FIG. 1A shows a network 104, network 104' and network 104" (generally referred to as network(s) 104) between the clients 102 and the servers 106, the clients 102 and the servers 106 may be on the same network 104. The networks 104, 104', 104" can be the same type of network or different types of networks. The network 104 can be a local-area network (LAN), such as a company Intranet, a metropolitan area network (MAN), or a wide area network (WAN), such as the Internet or the World Wide Web. The networks 104, 104', 104" can be a private or public network. In one embodiment, network 104' or network 104" may be a private network and network 104 may be a public network. In some embodiments, network 104 may be a private network and network 104' and/or network 104" a public network. In another embodiment, networks 104, 104', 104" may be private networks. In some embodiments, clients 102 may be located at a branch office of a corporate enterprise communicating via a WAN connection over the network 104 to the servers 106 located on a corporate LAN in a corporate data center.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

As depicted in FIG. 1A, a first network optimization appliance 200 is shown between networks 104 and 104' and a second network optimization appliance 200' is also between networks 104' and 104". In some embodiments, the appliance 200 may be located on network 104. For example, a corporate enterprise may deploy an appliance 200 at the branch office. In other embodiments, the appliance 200 may be located on network 104'. In some embodiments, the appliance 200' may be located on network 104' or network 104". For example, an appliance 200 may be located at a corporate data center. In one embodiment, the appliance 200 and 200' are on the same network. In another embodiment, the appliance 200 and 200' are on different networks.

In one embodiment, the appliance 200 is a device for accelerating, optimizing or otherwise improving the performance, operation, or quality of service of any type and form of network traffic. In some embodiments, the appliance 200 is a performance enhancing proxy. In other embodiments, the appliance 200 is any type and form of WAN optimization or acceleration device, sometimes also referred to as a WAN optimization controller. In one embodiment, the appliance 200 is any of the product embodiments referred to as WANScaler manufactured by Citrix Systems, Inc. of Ft. Lauderdale, Fla. In other embodiments, the appliance 200 includes any of the product embodiments referred to as BIG-IP link controller and WANjet manufactured by F5 Networks, Inc. of Seattle, Wash. In another embodiment, the appliance 200 includes any of the WX and WXC WAN acceleration device platforms manufactured by Juniper Networks, Inc. of Sunnyvale, Calif. In some embodiments, the appliance 200 includes any of the steelhead line of WAN optimization appliances manufactured by Riverbed Technology of San Francisco, Calif. In other embodiments, the appliance 200 includes any of the WAN related devices manufactured by Expand Networks Inc. of Roseland, N.J. In one embodiment, the appliance 200 includes any of the WAN related appliances manufactured by Packeteer Inc. of Cupertino, Calif., such as the PacketShaper, iShared, and SkyX product embodiments provided by Packeteer. In yet another embodiment, the appliance 200 includes any WAN related appliances and/or software manufactured by Cisco Systems, Inc. of San Jose, Calif., such as the Cisco Wide Area Network Application Services software and network modules, and Wide Area Network engine appliances.

In some embodiments, the appliance 200 provides application and data acceleration services for branch-office or remote offices. In one embodiment, the appliance 200 includes optimization of Wide Area File Services (WAFS). In another embodiment, the appliance 200 accelerates the delivery of files, such as via the Common Internet File System (CIFS) protocol. In other embodiments, the appliance 200 provides caching in memory and/or storage to accelerate delivery of applications and data. In one embodiment, the appliance 205 provides compression of network traffic at any level of the network stack or at any protocol or network layer. In another embodiment, the appliance 200 provides transport layer protocol optimizations, flow control, performance enhancements or modifications and/or management to accelerate delivery of applications and data over a WAN connection. For example, in one embodiment, the appliance 200 provides Transport Control Protocol (TCP) optimizations. In other embodiments, the appliance 200 provides optimizations, flow control, performance enhancements or modifications and/or management for any session or application layer protocol. Further details of the optimization techniques, operations and architecture of the appliance 200 are discussed below in Section B.

Still referring to FIG. 1A, the network environment may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be file servers, application servers, web servers, proxy servers, and/or gateway servers. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, a server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Deployed with Other Appliances.

Figure 1B:
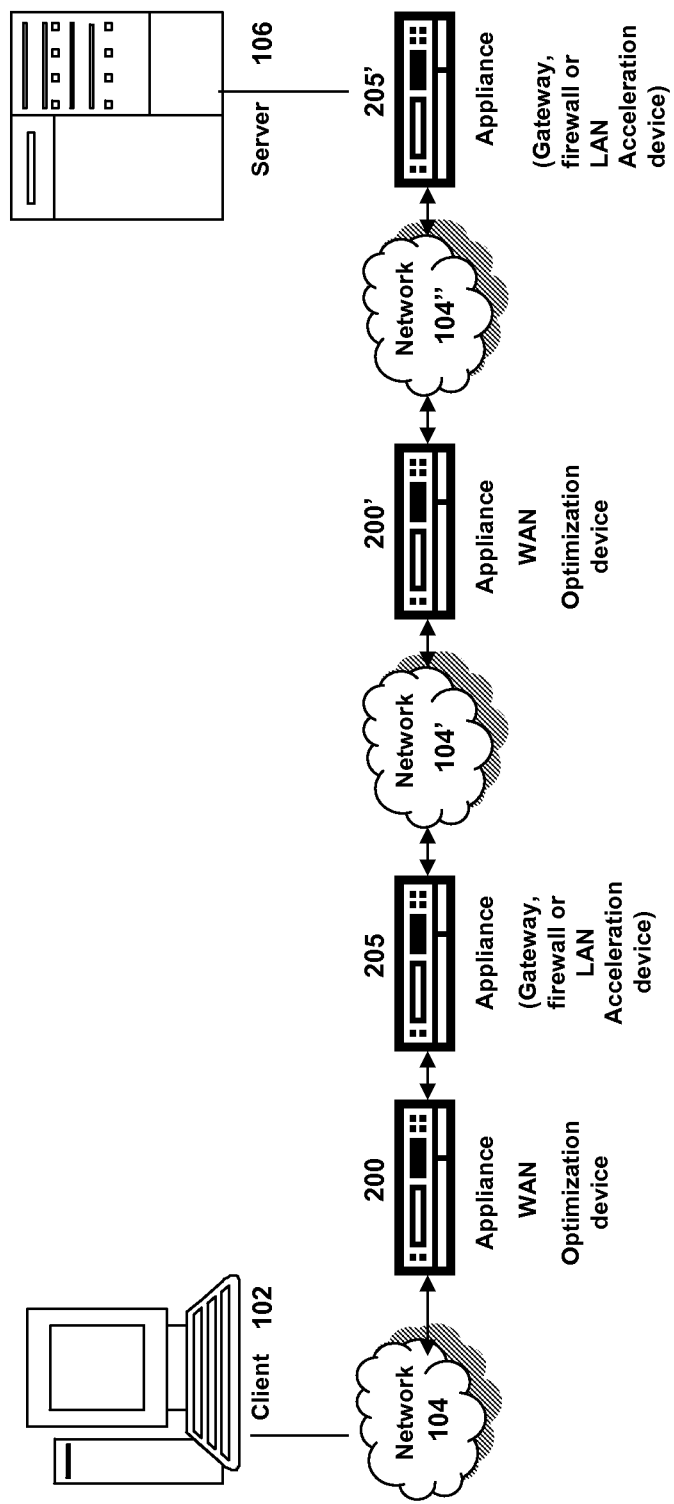
FIG. 1B is a block diagram of another embodiment of a network environment for a client to access a server via one or more network optimization appliances in conjunction with other network appliances.

Referring now to FIG. 1B, another embodiment of a network environment is depicted in which the network optimization appliance 200 is deployed with one or more other appliances 205, 205' (generally referred to as appliance 205 or second appliance 205) such as a gateway, firewall or acceleration appliance. For example, in one embodiment, the appliance 205 is a firewall or security appliance while appliance 205' is a LAN acceleration device. In some embodiments, a client 102 may communicate to a server 106 via one or more of the first appliances 200 and one or more second appliances 205.

One or more appliances 200 and 205 may be located at any point in the network or network communications path between a client 102 and a server 106. In some embodiments, a second appliance 205 may be located on the same network 104 as the first appliance 200. In other embodiments, the second appliance 205 may be located on a different network 104 as the first appliance 200. In yet another embodiment, a first appliance 200 and second appliance 205 is on the same network, for example network 104, while the first appliance 200' and second appliance 205' is on the same network, such as network 104".

In one embodiment, the second appliance 205 includes any type and form of transport control protocol or transport later terminating device, such as a gateway or firewall device. In one embodiment, the appliance 205 terminates the transport control protocol by establishing a first transport control protocol connection with the client and a second transport control connection with the second appliance or server. In another embodiment, the appliance 205 terminates the transport control protocol by changing, managing or controlling the behavior of the transport control protocol connection between the client and the server or second appliance. For example, the appliance 205 may change, queue, forward or transmit network packets in manner to effectively terminate the transport control protocol connection or to act or simulate as terminating the connection.

In some embodiments, the second appliance 205 is a performance enhancing proxy. In one embodiment, the appliance 205 provides a virtual private network (VPN) connection. In some embodiments, the appliance 205 provides a Secure Socket Layer VPN (SSL VPN) connection. In other embodiments, the appliance 205 provides an IPsec (Internet Protocol Security) based VPN connection. In some embodiments, the appliance 205 provides any one or more of the following functionality: compression, acceleration, load-balancing, switching/routing, caching, and Transport Control Protocol (TCP) acceleration.

In one embodiment, the appliance 205 is any of the product embodiments referred to as Access Gateway, Application Firewall, Application Gateway, or NetScaler manufactured by Citrix Systems, Inc. of Ft. Lauderdale, Fla. As such, in some embodiments, the appliance 205 includes any logic, functions, rules, or operations to perform services or functionality such as SSL VPN connectivity, SSL offloading, switching/load balancing, Domain Name Service resolution, LAN acceleration and an application firewall.

In some embodiments, the appliance 205 provides a SSL VPN connection between a client 102 and a server 106. For example, a client 102 on a first network 104 requests to establish a connection to a server 106 on a second network 104'. In some embodiments, the second network 104" is not routable from the first network 104. In other embodiments, the client 102 is on a public network 104 and the server 106 is on a private network 104', such as a corporate network. In one embodiment, a client agent intercepts communications of the client 102 on the first network 104, encrypts the communications, and transmits the communications via a first transport layer connection to the appliance 205. The appliance 205 associates the first transport layer connection on the first network 104 to a second transport layer connection to the server 106 on the second network 104. The appliance 205 receives the intercepted communication from the client agent, decrypts the communications, and transmits the communication to the server 106 on the second network 104 via the second transport layer connection. The second transport layer connection may be a pooled transport layer connection. In one embodiment, the appliance 205 provides an end-to-end secure transport layer connection for the client 102 between the two networks 104, 104'

In one embodiment, the appliance 205 hosts an intranet internet protocol or intranetIP address of the client 102 on the virtual private network 104. The client 102 has a local network identifier, such as an internet protocol (IP) address and/or host name on the first network 104. When connected to the second network 104' via the appliance 205, the appliance 205 establishes, assigns or otherwise provides an IntranetIP, which is a network identifier, such as IP address and/or host name, for the client 102 on the second network 104'. The appliance 205 listens for and receives on the second or private network 104' for any communications directed towards the client 102 using the client's established IntranetIP. In one embodiment, the appliance 205 acts as or on behalf of the client 102 on the second private network 104.

In some embodiments, the appliance 205 has an encryption engine providing logic, business rules, functions or operations for handling the processing of any security related protocol, such as SSL or TLS, or any function related thereto. For example, the encryption engine encrypts and decrypts network packets, or any portion thereof, communicated via the appliance 205. The encryption engine may also setup or establish SSL or TLS connections on behalf of the client 102a-102n, server 106a-106n, or appliance 200, 205. As such, the encryption engine provides offloading and acceleration of SSL processing. In one embodiment, the encryption engine uses a tunneling protocol to provide a virtual private network between a client 102a-102n and a server 106a-106n. In some embodiments, the encryption engine uses an encryption processor. In other embodiments, the encryption engine includes executable instructions running on an encryption processor.

In some embodiments, the appliance 205 provides one or more of the following acceleration techniques to communications between the client 102 and server 106: 1) compression, 2) decompression, 3) Transmission Control Protocol pooling, 4) Transmission Control Protocol multiplexing, 5) Transmission Control Protocol buffering, and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 205 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 205, and the destination network address is changed to that of the intended server. In the case of an outbound packet (that is, one received from a server 106), the source network address is changed from that of the server 106 to that of an output port of appliance 205 and the destination address is changed from that of appliance 205 to that of the requesting client 102. The sequence numbers and acknowledgment numbers of the packet are also translated to sequence numbers and acknowledgement expected by the client 102 on the appliance's 205 transport layer connection to the client 102. In some embodiments, the packet checksum of the transport layer protocol is recalculated to account for these translations.

In another embodiment, the appliance 205 provides switching or load-balancing functionality for communications between the client 102 and server 106. In some embodiments, the appliance 205 distributes traffic and directs client requests to a server 106 based on layer 4 payload or application-layer request data. In one embodiment, although the network layer or layer 2 of the network packet identifies a destination server 106, the appliance 205 determines the server 106 to distribute the network packet by application information and data carried as payload of the transport layer packet. In one embodiment, a health monitoring program of the appliance 205 monitors the health of servers to determine the server 106 for which to distribute a client's request. In some embodiments, if the appliance 205 detects a server 106 is not available or has a load over a predetermined threshold, the appliance 205 can direct or distribute client requests to another server 106.

In some embodiments, the appliance 205 acts as a Domain Name Service (DNS) resolver or otherwise provides resolution of a DNS request from clients 102. In some embodiments, the appliance intercepts' a DNS request transmitted by the client 102. In one embodiment, the appliance 205 responds to a client's DNS request with an IP address of or hosted by the appliance 205. In this embodiment, the client 102 transmits network communication for the domain name to the appliance 200. In another embodiment, the appliance 200 responds to a client's DNS request with an IP address of or hosted by a second appliance 200'. In some embodiments, the appliance 205 responds to a client's DNS request with an IP address of a server 106 determined by the appliance 200.

In yet another embodiment, the appliance 205 provides application firewall functionality for communications between the client 102 and server 106. In one embodiment, a policy engine 295' provides rules for detecting and blocking illegitimate requests. In some embodiments, the application firewall protects against denial of service (DoS) attacks. In other embodiments, the appliance inspects the content of intercepted requests to identify and block application-based attacks. In some embodiments, the rules/policy engine includes one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall of the appliance provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall of the appliance 205 ensures cookies are not modified. In other embodiments, the appliance 205 protects against forceful browsing by enforcing legal URLs.

In still yet other embodiments, the application firewall appliance 205 protects any confidential information contained in the network communication. The appliance 205 may inspect or analyze any network communication in accordance with the rules or polices of the policy engine to identify any confidential information in any field of the network packet. In some embodiments, the application firewall identifies in the network communication one or more occurrences of a credit card number, password, social security number, name, patient code, contact information, and age. The encoded portion of the network communication may include these occurrences or the confidential information. Based on these occurrences, in one embodiment, the application firewall may take a policy action on the network communication, such as prevent transmission of the network communication. In another embodiment, the application firewall may rewrite, remove or otherwise mask such identified occurrence or confidential information.

Although generally referred to as a network optimization or first appliance 200 and a second appliance 205, the first appliance 200 and second appliance 205 may be the same type and form of appliance. In one embodiment, the second appliance 205 may perform the same functionality, or portion thereof, as the first appliance 200, and vice-versa. For example, the first appliance 200 and second appliance 205 may both provide acceleration techniques. In one embodiment, the first appliance may perform LAN acceleration while the second appliance performs WAN acceleration, or vice-versa. In another example, the first appliance 200 may also be a transport control protocol terminating device as with the second appliance 205. Furthermore, although appliances 200 and 205 are shown as separate devices on the network, the appliance 200 and/or 205 could be a part of any client 102 or server 106.

Referring now to FIG. 1C, other embodiments of a network environment for deploying the appliance 200 are depicted. In another embodiment as depicted on the top of FIG. 1C, the appliance 200 may be deployed as a single appliance or single proxy on the network 104. For example, the appliance 200 may be designed, constructed or adapted to perform WAN optimization techniques discussed herein without a second cooperating appliance 200'. In other embodiments as depicted on the bottom of FIG. 1C, a single appliance 200 may be deployed with one or more second appliances 205. For example, a WAN acceleration first appliance 200, such as a Citrix WANScaler appliance, may be deployed with a LAN accelerating or Application Firewall second appliance 205, such as a Citrix NetScaler appliance.

Computing Device

Figure 1D:
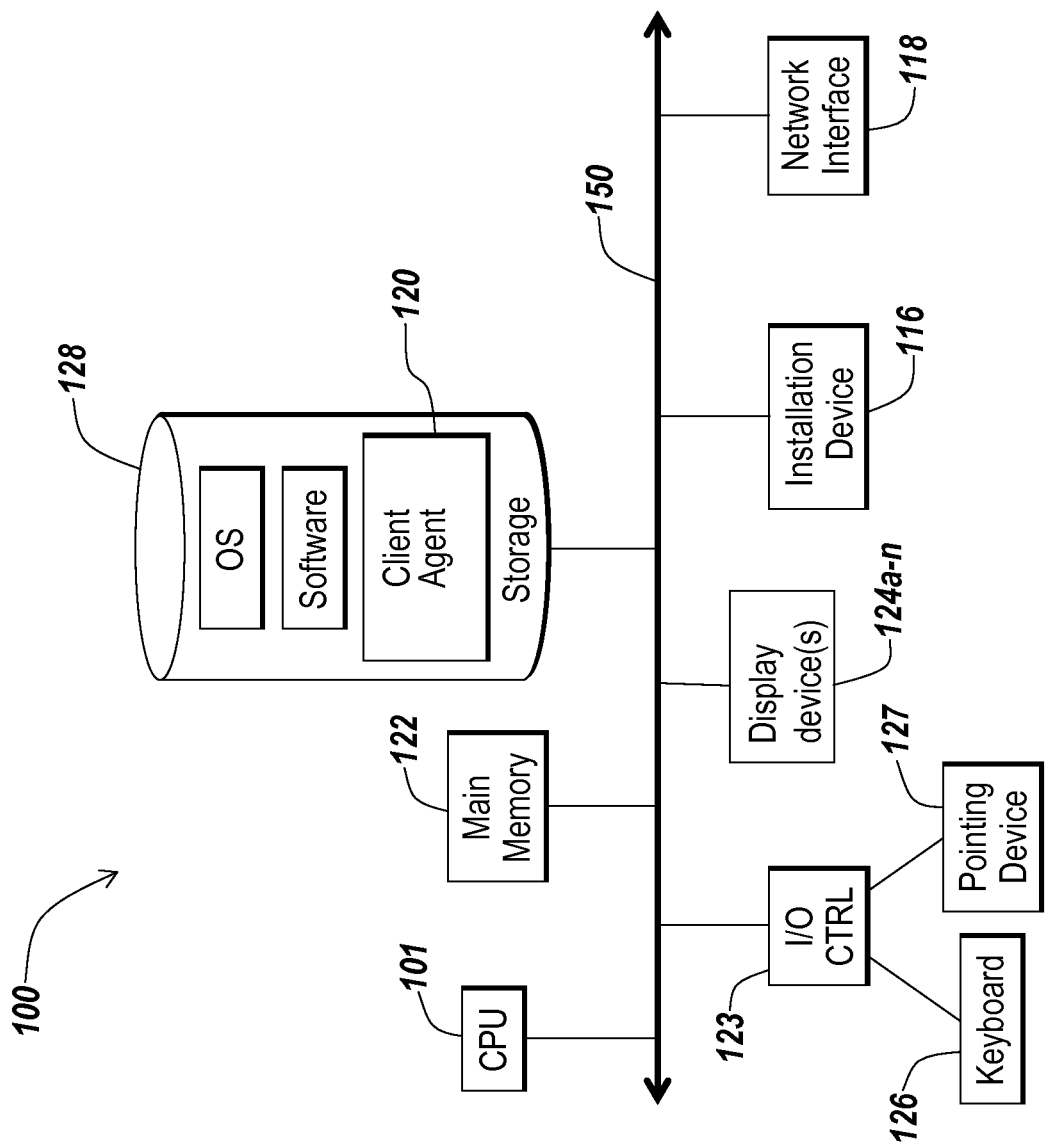
FIGS. 1D and 1E are block diagrams of embodiments of a computing device.

The client 102, server 106, and appliance 200 and 205 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® or OS X for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS 2003, WINDOWS XP, and WINDOWS VISTA all of which are manufactured by Microsoft Corporation of Redmond, Wash.; MacOS and OS X, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, (such as those versions of Unix referred to as Solaris/Sparc, Solaris/x86, AIX IBM, HP UX, and SGI (Silicon Graphics)), among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. In another example, the computing device 100 may be a WinCE or PocketPC device with an ARM (Advanced RISC Machine) type of processor. In one example, the computing device 100 includes a Series 80 (Nokia 9500 or Nokia 9300) type of smart phone manufactured by Nokia of Finland, which may run the Symbian OS or EPOC mobile operating system manufactured by Symbian Software Limited of London, United Kingdom. In another example, the computing device 100 may include a FOMA M100 brand smart phone manufactured by Motorola, Inc. of Schaumburg, Ill., and operating the EPOC or Symbian OS operating system. In yet another example, the computing device 100 includes a Sony Ericsson P800, P900 or P910 Alpha model phone manufactured by Sony Ericsson Mobile Communications (USA) Inc. of Research Triangle Park, N.C. Moreover, the computing device 100 can be any workstation, desktop computer, laptop or notebook computer, server, handheld computer, mobile telephone, smart phone, any other computer, or other form of computing or telecommunications device that is capable of communication and that has sufficient processor power and memory capacity to perform the operations described herein.

B. System and Appliance Architecture

Figure 2A:
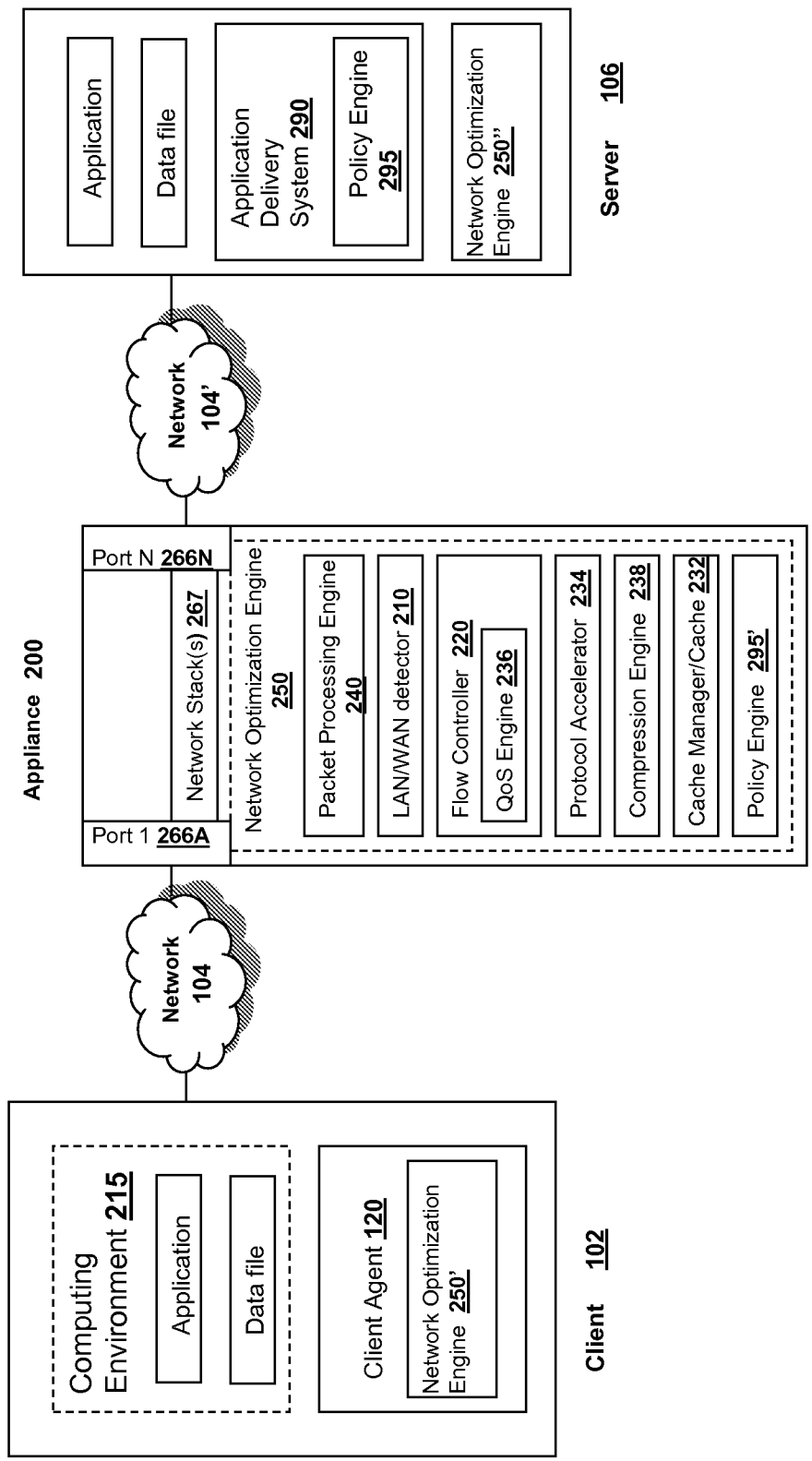
FIG. 2A is a block diagram of an embodiment of an appliance for processing communications between a client and a server.

Referring now to FIG. 2A, an embodiment of a system environment and architecture of an appliance 200 for delivering and/or operating a computing environment on a client is depicted. In some embodiments, a server 106 includes an application delivery system 290 for delivering a computing environment or an application and/or data file to one or more clients 102. In brief overview, a client 102 is in communication with a server 106 via network 104 and appliance 200. For example, the client 102 may reside in a remote office of a company, e.g., a branch office, and the server 106 may reside at a corporate data center. The client 102 has a client agent 120, and a computing environment 215. The computing environment 215 may execute or operate an application that accesses, processes or uses a data file. The computing environment 215, application and/or data file may be delivered via the appliance 200 and/or the server 106.

In some embodiments, the appliance 200 accelerates delivery of a computing environment 215, or any portion thereof, to a client 102. In one embodiment, the appliance 200 accelerates the delivery of the computing environment 215 by the application delivery system 290. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. In another embodiment, the appliance 200 controls, manages, or adjusts the transport layer protocol to accelerate delivery of the computing environment. In some embodiments, the appliance 200 uses caching and/or compression techniques to accelerate delivery of a computing environment.

In some embodiments, the application delivery management system 290 provides application delivery techniques to deliver a computing environment to a desktop of a user, remote or otherwise, based on a plurality of execution methods and based on any authentication and authorization policies applied via a policy engine 295. With these techniques, a remote user may obtain a computing environment and access to server stored applications and data files from any network connected device 100. In one embodiment, the application delivery system 290 may reside or execute on a server 106. In another embodiment, the application delivery system 290 may reside or execute on a plurality of servers 106a-106n. In some embodiments, the application delivery system 290 may execute in a server farm 38. In one embodiment, the server 106 executing the application delivery system 290 may also store or provide the application and data file. In another embodiment, a first set of one or more servers 106 may execute the application delivery system 290, and a different server 106n may store or provide the application and data file. In some embodiments, each of the application delivery system 290, the application, and data file may reside or be located on different servers. In yet another embodiment, any portion of the application delivery system 290 may reside, execute or be stored on or distributed to the appliance 200, or a plurality of appliances.

The client 102 may include a computing environment 215 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 290 and/or server 106 may deliver the application and data file to the client 102. For example, in one embodiment, the server 106 may transmit the application as an application stream to operate in computing environment 215 on client 102.

In some embodiments, the application delivery system 290 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 290 may deliver one or more applications to clients 102 or users via a remote-display protocol or otherwise via remote-based or server-based computing. In another embodiment, the application delivery system 290 may deliver one or more applications to clients or users via steaming of the application.

In one embodiment, the application delivery system 290 includes a policy engine 295 for controlling and managing the access to applications, selection of application execution methods and the delivery of applications. In some embodiments, the policy engine 295 determines the one or more applications a user or client 102 may access. In another embodiment, the policy engine 295 determines how the application should be delivered to the user or client 102, e.g., the method of execution. In some embodiments, the application delivery system 290 provides a plurality of delivery techniques from which to select a method of application execution, such as a server-based computing, streaming or delivering the application locally to the client 120 for local execution.

In one embodiment, a client 102 requests execution of an application program and the application delivery system 290 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 290 enumerates a plurality of application programs available to the client 102. The application delivery system 290 receives a request to execute an enumerated application. The application delivery system 290 selects one of a predetermined number of methods for executing the enumerated application, for example, responsive to a policy of a policy engine. The application delivery system 290 may select a method of execution of the application enabling the client 102 to receive application-output data generated by execution of the application program on a server 106. The application delivery system 290 may select a method of execution of the application enabling the client or local machine 102 to execute the application program locally after retrieving a plurality of application files comprising the application. In yet another embodiment, the application delivery system 290 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiment the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes, as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Example Appliance Architecture

Figure 1E:
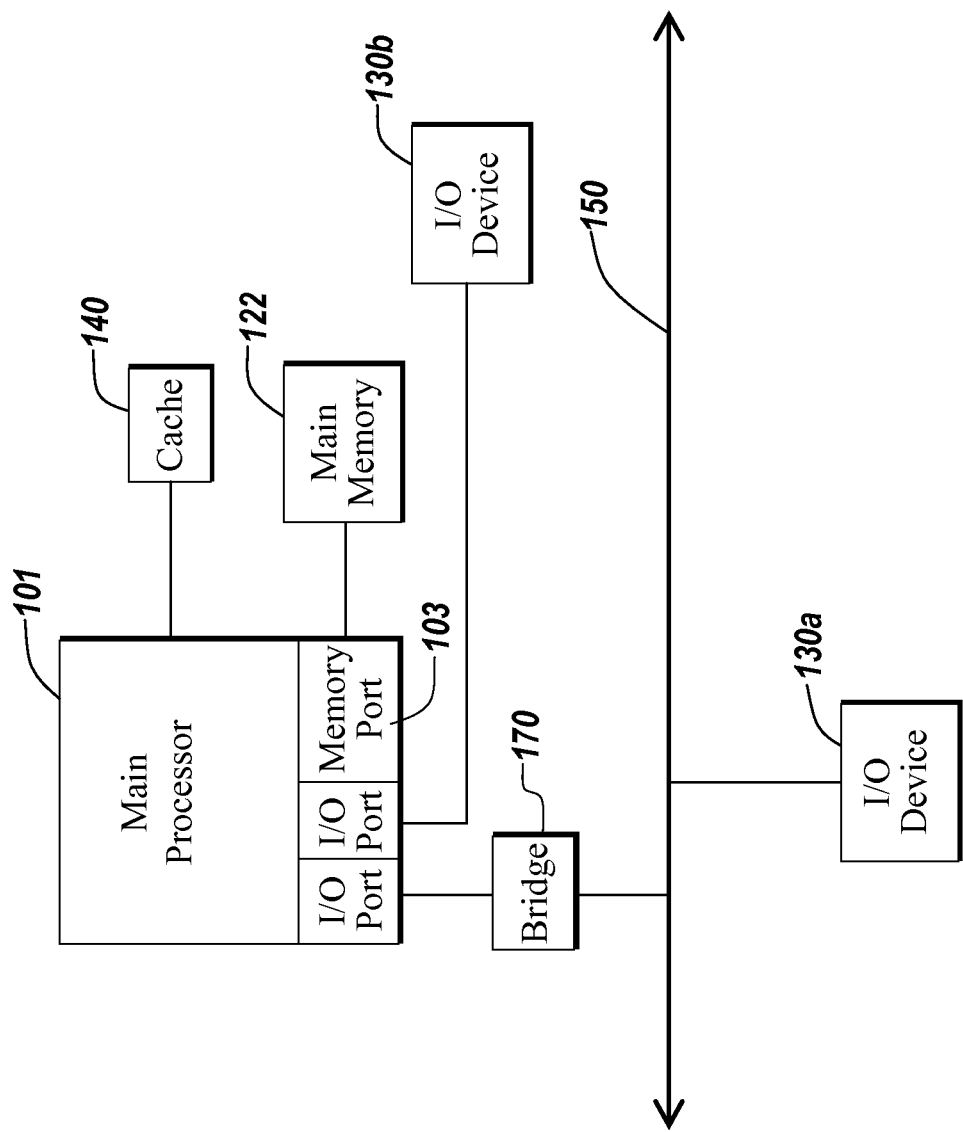

FIG. 2A also illustrates an example embodiment of the appliance 200. The architecture of the appliance 200 in FIG. 2A is provided by way of illustration only and is not intended to be limiting in any manner. The appliance 200 may include any type and form of computing device 100, such as any element or portion described in conjunction with FIGS. 1D and 1E above. In brief overview, the appliance 200 has one or more network ports 266A-226N and one or more networks stacks 267A-267N for receiving and/or transmitting communications via networks 104. The appliance 200 also has a network optimization engine 250 for optimizing, accelerating or otherwise improving the performance, operation, or quality of any network traffic or communications traversing the appliance 200.

The appliance 200 includes or is under the control of an operating system. The operating system of the appliance 200 may be any type and/or form of UNIX operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The operating system of appliance 200 allocates, manages, or otherwise segregates the available system memory into what is referred to as kernel or system space, and user or application space. The kernel space is typically reserved for running the kernel, including any device drivers, kernel extensions or other kernel related software. As known to those skilled in the art, the kernel is the core of the operating system, and provides access, control, and management of resources and hardware-related elements of the appliance 200. In accordance with an embodiment of the appliance 200, the kernel space also includes a number of network services or processes working in conjunction with the network optimization engine 250, or any portion thereof. Additionally, the embodiment of the kernel will depend on the embodiment of the operating system installed, configured, or otherwise used by the device 200. In contrast to kernel space, user space is the memory area or portion of the operating system used by user mode applications or programs otherwise running in user mode. A user mode application may not access kernel space directly and uses service calls in order to access kernel services. The operating system uses the user or application space for executing or running applications and provisioning of user level programs, services, processes and/or tasks.

The appliance 200 has one or more network ports 266 for transmitting and receiving data over a network 104. The network port 266 provides a physical and/or logical interface between the computing device and a network 104 or another device 100 for transmitting and receiving network communications. The type and form of network port 266 depends on the type and form of network and type of medium for connecting to the network. Furthermore, any software of, provisioned for or used by the network port 266 and network stack 267 may run in either kernel space or user space.

In one embodiment, the appliance 200 has one network stack 267, such as a TCP/IP based stack, for communicating on a network 105, such with the client 102 and/or the server 106. In one embodiment, the network stack 267 is used to communicate with a first network, such as network 104, and also with a second network 104'. In another embodiment, the appliance 200 has two or more network stacks, such as first network stack 267A and a second network stack 267N. The first network stack 267A may be used in conjunction with a first port 266A to communicate on a first network 104. The second network stack 267N may be used in conjunction with a second port 266N to communicate on a second network 104'. In one embodiment, the network stack(s) 267 has one or more buffers for queuing one or more network packets for transmission by the appliance 200.

The network stack 267 includes any type and form of software, or hardware, or any combinations thereof, for providing connectivity to and communications with a network. In one embodiment, the network stack 267 includes a software implementation for a network protocol suite. The network stack 267 may have one or more network layers, such as any networks layers of the Open Systems Interconnection (OSI) communications model as those skilled in the art recognize and appreciate. As such, the network stack 267 may have any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 267 includes a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 267 has any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 267 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 267, such as for voice communications or real-time data communications.

Furthermore, the network stack 267 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 267 may be customized, modified or adapted to provide a custom or modified portion of the network stack 267 in support of any of the techniques described herein.

In one embodiment, the appliance 200 provides for or maintains a transport layer connection between a client 102 and server 106 using a single network stack 267. In some embodiments, the appliance 200 effectively terminates the transport layer connection by changing, managing or controlling the behavior of the transport control protocol connection between the client and the server. In these embodiments, the appliance 200 may use a single network stack 267. In other embodiments, the appliance 200 terminates a first transport layer connection, such as a TCP connection of a client 102, and establishes a second transport layer connection to a server 106 for use by or on behalf of the client 102, e.g., the second transport layer connection is terminated at the appliance 200 and the server 106. The first and second transport layer connections may be established via a single network stack 267. In other embodiments, the appliance 200 may use multiple network stacks, for example 267A and 267N. In these embodiments, the first transport layer connection may be established or terminated at one network stack 267A, and the second transport layer connection may be established or terminated on the second network stack 267N. For example, one network stack may be for receiving and transmitting network packets on a first network, and another network stack for receiving and transmitting network packets on a second network.

As shown in FIG. 2A, the network optimization engine 250 includes one or more of the following elements, components or modules: network packet processing engine 240, LAN/WAN detector 210, flow controller 220, QoS engine 236, protocol accelerator 234, the compression engine 238, cache manager 232 and policy engine 295'. The network optimization engine 250, or any portion thereof, may include a software, hardware or any combination of software and hardware. Furthermore, any software of, provisioned for or used by the network optimization engine 250 may run in either kernel space or user space. For example, in one embodiment, the network optimization engine 250 may run in kernel space. In another embodiment, the network optimization engine 250 may run in user space. In yet another embodiment, a first portion of the network optimization engine 250 runs in kernel space while a second portion of the network optimization engine 250 runs in user space.

Network Packet Processing Engine

The network packet engine 240, also generally referred to as a packet processing engine or packet engine, is responsible for controlling and managing the processing of packets received and transmitted by appliance 200 via network ports 266 and network stack(s) 267. The network packet engine 240 may operate at any layer of the network stack 267. In one embodiment, the network packet engine 240 operates at layer 2 or layer 3 of the network stack 267. In some embodiments, the packet engine 240 intercepts or otherwise receives packets at the network layer, such as the IP layer in a TCP/IP embodiment. In another embodiment, the packet engine 240 operates at layer 4 of the network stack 267. For example, in some embodiments, the packet engine 240 intercepts or otherwise receives packets at the transport layer, such as intercepting packets as the TCP layer in a TCP/IP embodiment. In other embodiments, the packet engine 240 operates at any session or application layer above layer 4. For example, in one embodiment, the packet engine 240 intercepts or otherwise receives network packets above the transport layer protocol layer, such as the payload of a TCP packet in a TCP embodiment.

The packet engine 240 may include a buffer for queuing one or more network packets during processing, such as for receipt of a network packet or transmission of a network packet. Additionally, the packet engine 240 is in communication with one or more network stacks 267 to send and receive network packets via network ports 266. The packet engine 240 may include a packet processing timer. In one embodiment, the packet processing timer provides one or more time intervals to trigger the processing of incoming, i.e., received, or outgoing, i.e., transmitted, network packets.

In some embodiments, the packet engine 240 processes network packets responsive to the timer. The packet processing timer provides any type and form of signal to the packet engine 240 to notify, trigger, or communicate a time related event, interval or occurrence. In many embodiments, the packet processing timer operates in the order of milliseconds, such as for example 100 ms, 50 ms, 25 ms, 10 ms, 5 ms or 1 ms.

During operations, the packet engine 240 may be interfaced, integrated or be in communication with any portion of the network optimization engine 250, such as the LAN/WAN detector 210, flow controller 220, QoS engine 236, protocol accelerator 234, the compression engine 238, cache manager 232 and/or policy engine 295'. As such, any of the logic, functions, or operations of the LAN/WAN detector 210, flow controller 220, QoS engine 236, protocol accelerator 234, the compression engine 238, cache manager 232 and policy engine 295' may be performed responsive to the packet processing timer and/or the packet engine 240. In some embodiments, any of the logic, functions, or operations of the encryption engine 234, cache manager 232, policy engine 236 and multi-protocol compression logic 238 may be performed at the granularity of time intervals provided via the packet processing timer, for example, at a time interval of less than or equal to 10 ms. For example, in one embodiment, the cache manager 232 may perform expiration of any cached objects responsive to the integrated packet engine 240 and/or the packet processing timer 242. In another embodiment, the expiry or invalidation time of a cached object can be set to the same order of granularity as the time interval of the packet processing timer, such as at every 10 ms.

Cache Manager

The cache manager 232 may include software, hardware or any combination of software and hardware to store data, information and objects to a cache in memory or storage, provide cache access, and control and manage the cache. The data, objects or content processed and stored by the cache manager 232 may include data in any format, such as a markup language, or any type of data communicated via any protocol. In some embodiments, the cache manager 232 duplicates original data stored elsewhere or data previously computed, generated or transmitted, in which the original data may require longer access time to fetch, compute or otherwise obtain relative to reading a cache memory or storage element. Once the data is stored in the cache, future use can be made by accessing the cached copy rather than refetching or recomputing the original data, thereby reducing the access time. In some embodiments, the cache may comprise a data object in memory of the appliance 200. In another embodiment, the cache may comprise any type and form of storage element of the appliance 200, such as a portion of a hard disk. In some embodiments, the processing unit of the device may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any caching techniques of the appliance 200. In some embodiments, the cache manager 232 may operate as an application, library, program, service, process, thread or task. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

Policy Engine

The policy engine 295' includes any logic, function or operations for providing and applying one or more policies or rules to the function, operation or configuration of any portion of the appliance 200. The policy engine 295' may include, for example, an intelligent statistical engine or other programmable application(s). In one embodiment, the policy engine 295 provides a configuration mechanism to allow a user to identify, specify, define or configure a policy for the network optimization engine 250, or any portion thereof. For example, the policy engine 295 may provide policies for what data to cache, when to cache the data, for whom to cache the data, when to expire an object in cache or refresh the cache. In other embodiments, the policy engine 236 may include any logic, rules, functions or operations to determine and provide access, control and management of objects, data or content being cached by the appliance 200 in addition to access, control and management of security, network traffic, network access, the compression or any other function or operation performed by the appliance 200.

In some embodiments, the policy engine 295' provides and applies one or more policies based on any one or more of the following: a user, identification of the client, identification of the server, the type of connection, the time of the connection, the type of network, or the contents of the network traffic. In one embodiment, the policy engine 295' provides and applies a policy based on any field or header at any protocol layer of a network packet. In another embodiment, the policy engine 295' provides and applies a policy based on any payload of a network packet. For example, in one embodiment, the policy engine 295' applies a policy based on identifying a certain portion of content of an application layer protocol carried as a payload of a transport layer packet. In another example, the policy engine 295' applies a policy based on any information identified by a client, server or user certificate. In yet another embodiment, the policy engine 295' applies a policy based on any attributes or characteristics obtained about a client 102, such as via any type and form of endpoint detection (see for example the collection agent of the client agent discussed below).

In one embodiment, the policy engine 295' works in conjunction or cooperation with the policy engine 295 of the application delivery system 290. In some embodiments, the policy engine 295' is a distributed portion of the policy engine 295 of the application delivery system 290. In another embodiment, the policy engine 295 of the application delivery system 290 is deployed on or executed on the appliance 200. In some embodiments, the policy engines 295, 295' both operate on the appliance 200. In yet another embodiment, the policy engine 295', or a portion thereof, of the appliance 200 operates on a server 106.

Multi-Protocol and Multi-Layer Compression Engine

The compression engine 238 includes any logic, business rules, function or operations for compressing one or more protocols of a network packet, such as any of the protocols used by the network stack 267 of the appliance 200. The compression engine 238 may also be referred to as a multi-protocol compression engine 238 in that it may be designed, constructed or capable of compressing a plurality of protocols. In one embodiment, the compression engine 238 applies context insensitive compression, which is compression applied to data without knowledge of the type of data. In another embodiment, the compression engine 238 applies context-sensitive compression. In this embodiment, the compression engine 238 utilizes knowledge of the data type to select a specific compression algorithm from a suite of suitable algorithms. In some embodiments, knowledge of the specific protocol is used to perform context-sensitive compression. In one embodiment, the appliance 200 or compression engine 238 can use port numbers (e.g., well-known ports), as well as data from the connection itself to determine the appropriate compression algorithm to use. Some protocols use only a single type of data, requiring only a single compression algorithm that can be selected when the connection is established. Other protocols contain different types of data at different times. For example, POP, IMAP, SMTP, and HTTP all move files of arbitrary types interspersed with other protocol data.

In one embodiment, the compression engine 238 uses a delta-type compression algorithm. In another embodiment, the compression engine 238 uses first site compression as well as searching for repeated patterns among data stored in cache, memory or disk. In some embodiments, the compression engine 238 uses a lossless compression algorithm. In other embodiments, the compression engine uses a lossy compression algorithm. In some cases, knowledge of the data type and, sometimes, permission from the user are required to use a lossy compression algorithm. In some embodiments, the compression is not limited to the protocol payload. The control fields of the protocol itself may be compressed. In some embodiments, the compression engine 238 uses a different algorithm for control fields than that used for the payload.

In some embodiments, the compression engine 238 compresses at one or more layers of the network stack 267. In one embodiment, the compression engine 238 compresses at a transport layer protocol. In another embodiment, the compression engine 238 compresses at an application layer protocol. In some embodiments, the compression engine 238 compresses at a layer 2-4 protocol. In other embodiments, the compression engine 238 compresses at a layer 5-7 protocol. In yet another embodiment, the compression engine compresses a transport layer protocol and an application layer protocol. In some embodiments, the compression engine 238 compresses a layer 2-4 protocol and a layer 5-7 protocol.

In some embodiments, the compression engine 238 uses memory-based compression, cache-based compression or disk-based compression or any combination thereof. As such, the compression engine 238 may be referred to as a multi-layer compression engine. In one embodiment, the compression engine 238 uses a history of data stored in memory, such as RAM. In another embodiment, the compression engine 238 uses a history of data stored in a cache, such as L2 cache of the processor. In other embodiments, the compression engine 238 uses a history of data stored to a disk or storage location. In some embodiments, the compression engine 238 uses a hierarchy of cache-based, memory-based and disk-based data history. The compression engine 238 may first use the cache-based data to determine one or more data matches for compression, and then may check the memory-based data to determine one or more data matches for compression. In another case, the compression engine 238 may check disk storage for data matches for compression after checking either the cache-based and/or memory-based data history.

In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of HyperText Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 may accelerate performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine by integrating with packet processing engine 240 accessing the network stack 267 is able to compress any of the protocols carried by a transport layer protocol, such as any application layer protocol.

LAN/WAN Detector

The LAN/WAN detector 238 includes any logic, business rules, function or operations for automatically detecting a slow side connection (e.g., a wide area network (WAN) connection such as an Intranet) and associated port 267, and a fast side connection (e.g., a local area network (LAN) connection) and an associated port 267. In some embodiments, the LAN/WAN detector 238 monitors network traffic on the network ports 267 of the appliance 200 to detect a synchronization packet, sometimes referred to as a "tagged" network packet. The synchronization packet identifies a type or speed of the network traffic. In one embodiment, the synchronization packet identifies a WAN speed or WAN type connection. The LAN/WAN detector 238 also identifies receipt of an acknowledgement packet to a tagged synchronization packet and on which port it is received. The appliance 200 then configures itself to operate the identified port on which the tagged synchronization packet arrived so that the speed on that port is set to be the speed associated with the network connected to that port. The other port is then set to the speed associated with the network connected to that port.

For ease of discussion herein, reference to "slow" side will be made with respect to connection with a wide area network (WAN), e.g., the Internet, and operating at a network speed of the WAN. Likewise, reference to "fast" side will be made with respect to connection with a local area network (LAN) and operating at a network speed the LAN. However, it is noted that "fast" and "slow" sides in a network can change on a per-connection basis and are relative terms to the speed of the network connections or to the type of network topology. Such configurations are useful in complex network topologies, where a network is "fast" or "slow" only when compared to adjacent networks and not in any absolute sense.

In one embodiment, the LAN/WAN detector 238 may be used to allow for auto-discovery by an appliance 200 of a network to which it connects. In another embodiment, the LAN/WAN detector 238 may be used to detect the existence or presence of a second appliance 200' deployed in the network 104. For example, an auto-discovery mechanism in operation in accordance with FIG. 1A functions as follows: appliance 200 and 200' are placed in line with the connection linking client 102 and server 106. The appliances 200 and 200' are at the ends of a low-speed link, e.g., Internet, connecting two LANs. In one example embodiment, appliances 200 and 200' each include two ports—one to connect with the "lower" speed link and the other to connect with a "higher" speed link, e.g., a LAN. Any packet arriving at one port is copied to the other port. Thus, appliance 200 and 200' are each configured to function as a bridge between the two networks 104.

When an end node, such as the client 102, opens a new TCP connection with another end node, such as the server 106, the client 102 sends a TCP packet with a synchronization (SYN) header bit set, or a SYN packet, to the server 106. In the present example, client 102 opens a transport layer connection to server 106. When the SYN packet passes through appliance 200, the appliance 200 inserts, attaches or otherwise provides a characteristic TCP header option to the packet, which announces its presence. If the packet passes through a second appliance, in this example appliance 200' the second appliance notes the header option on the SYN packet. The server 106 responds to the SYN packet with a synchronization acknowledgment (SYN-ACK) packet. When the SYN-ACK packet passes through appliance 200', a TCP header option is tagged (e.g., attached, inserted or added) to the SYN-ACK packet to announce appliance 200' presence to appliance 200. When appliance 200 receives this packet, both appliances 200, 200' are now aware of each other and the connection can be appropriately accelerated.

Further to the operations of the LAN/WAN detector 238, a method or process for detecting "fast" and "slow" sides of a network using a SYN packet is described. During a transport layer connection establishment between a client 102 and a server 106, the appliance 200 via the LAN/WAN detector 238 determines whether the SYN packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configures the port receiving the untagged packet as the "fast" side. The appliance 200 then tags the SYN packet with an ACK and copies the packet to the other port.

In another embodiment, the LAN/WAN detector 238 detects fast and slow sides of a network using a SYN-ACK packet. The appliance 200 via the LAN/WAN detector 238 determines whether the SYN-ACK packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configures the port receiving the untagged packet as the "fast" side. The LAN/WAN detector 238 determines whether the SYN packet was tagged. If the SYN packet was not tagged, the appliance 200 copied the packet to the other port. If the SYN packet was tagged, the appliance tags the SYN-ACK packet before copying it to the other port.

The appliance 200, 200' may add, insert, modify, attach or otherwise provide any information or data in the TCP option header to provide any information, data or characteristics about the network connection, network traffic flow, or the configuration or operation of the appliance 200. In this manner, not only does an appliance 200 announce its presence to another appliance 200' or tag a higher or lower speed connection, the appliance 200 provides additional information and data via the TCP option headers about the appliance or the connection. The TCP option header information may be useful to or used by an appliance in controlling, managing, optimizing, acceleration or improving the network traffic flow traversing the appliance 200, or to otherwise configure itself or operation of a network port.

Although generally described in conjunction with detecting speeds of network connections or the presence of appliances, the LAN/WAN detector 238 can be used for applying any type of function, logic or operation of the appliance 200 to a port, connection or flow of network traffic. In particular, automated assignment of ports can occur whenever a device performs different functions on different ports, where the assignment of a port to a task can be made during the unit's operation, and/or the nature of the network segment on each port is discoverable by the appliance 200.

Flow Control

The flow controller 220 includes any logic, business rules, function or operations for optimizing, accelerating or otherwise improving the performance, operation or quality of service of transport layer communications of network packets or the delivery of packets at the transport layer. A flow controller, also sometimes referred to as a flow control module, regulates, manages and controls data transfer rates. In some embodiments, the flow controller 220 is deployed at or connected at a bandwidth bottleneck in the network 104. In one embodiment, the flow controller 220 effectively regulates, manages and controls bandwidth usage or utilization. In other embodiments, the flow control modules may also be deployed at points on the network of latency transitions (low latency to high latency) and on links with media losses (such as wireless or satellite links).

In some embodiments, a flow controller 220 may include a receiver-side flow control module for controlling the rate of receipt of network transmissions and a sender-side flow control module for the controlling the rate of transmissions of network packets. In other embodiments, a first flow controller 220 includes a receiver-side flow control module and a second flow controller 220' includes a sender-side flow control module. In some embodiments, a first flow controller 220 is deployed on a first appliance 200 and a second flow controller 220' is deployed on a second appliance 200'. As such, in some embodiments, a first appliance 200 controls the flow of data on the receiver side and a second appliance 200' controls the data flow from the sender side. In yet another embodiment, a single appliance 200 includes flow control for both the receiver-side and sender-side of network communications traversing the appliance 200.

In one embodiment, a flow control module 220 is configured to allow bandwidth at the bottleneck to be more fully utilized, and in some embodiments, not overutilized. In some embodiments, the flow control module 220 transparently buffers (or rebuffers data already buffered by, for example, the sender) network sessions that pass between nodes having associated flow control modules 220. When a session passes through two or more flow control modules 220, one or more of the flow control modules controls a rate of the session(s).

In one embodiment, the flow control module 200 is configured with predetermined data relating to bottleneck bandwidth. In another embodiment, the flow control module 220 may be configured to detect the bottleneck bandwidth or data associated therewith. A receiver-side flow control module 220 may control the data transmission rate. The receiver-side flow control module controls 220 the sender-side flow control module, e.g., 220, data transmission rate by forwarding transmission rate limits to the sender-side flow control module 220. In one embodiment, the receiver-side flow control module 220 piggybacks these transmission rate limits on acknowledgement (ACK) packets (or signals) sent to the sender, e.g., client 102, by the receiver, e.g., server 106. The receiver-side flow control module 220 does this in response to rate control requests that are sent by the sender side flow control module 220'. The requests from the sender-side flow control module 220' may be "piggybacked" on data packets sent by the sender 106.

In some embodiments, the flow controller 220 manipulates, adjusts, simulates, changes, improves or otherwise adapts the behavior of the transport layer protocol to provide improved performance or operations of delivery, data rates and/or bandwidth utilization of the transport layer. The flow controller 220 may implement a plurality of data flow control techniques at the transport layer, including but not limited to 1) pre-acknowledgements, 2) window virtualization, 3) recongestion techniques, 3) local retransmission techniques, 4) wavefront detection and disambiguation, 5) transport control protocol selective acknowledgements, 6) transaction boundary detection techniques and 7) repacketization.

Although a sender may be generally described herein as a client 102 and a receiver as a server 106, a sender may be any end point such as a server 106 or any computing device 100 on the network 104. Likewise, a receiver may be a client 102 or any other computing device on the network 104.

Pre-Acknowledgements

In brief overview of a pre-acknowledgement flow control technique, the flow controller 220, in some embodiments, handles the acknowledgements and retransmits for a sender, effectively terminating the sender's connection with the downstream portion of a network connection. In reference to FIG. 1B, one possible deployment of an appliance 200 into a network architecture to implement this feature is depicted. In this example environment, a sending computer or client 102 transmits data on network 104, for example, via a switch, which determines that the data is destined for VPN appliance 205. Because of the chosen network topology, all data destined for VPN appliance 205 traverses appliance 200, so the appliance 200 can apply any necessary algorithms to this data.

Continuing further with the example, the client 102 transmits a packet, which is received by the appliance 200. When the appliance 200 receives the packet, which is transmitted from the client 102 to a recipient via the VPN appliance 205, the appliance 200 retains a copy of the packet and forwards the packet downstream to the VPN appliance 205. The appliance 200 then generates an acknowledgement packet (ACK) and sends the ACK packet back to the client 102 or sending endpoint. This ACK, a pre-acknowledgment, causes the sender 102 to believe that the packet has been delivered successfully, freeing the sender's resources for subsequent processing. The appliance 200 retains the copy of the packet data in the event that a retransmission of the packet is required, so that the sender 102 does not have to handle retransmissions of the data. This early generation of acknowledgements may be called "preacking."

If a retransmission of the packet is required, the appliance 200 retransmits the packet to the sender. The appliance 200 may determine whether retransmission is required as a sender would in a traditional system, for example, determining that a packet is lost if an acknowledgement has not been received for the packet after a predetermined amount of time. To this end, the appliance 200 monitors acknowledgements generated by the receiving endpoint, e.g., server 106 (or any other downstream network entity) so that it can determine whether the packet has been successfully delivered or needs to be retransmitted. If the appliance 200 determines that the packet has been successfully delivered, the appliance 200 is free to discard the saved packet data. The appliance 200 may also inhibit forwarding acknowledgements for packets that have already been received by the sending endpoint.

In the embodiment described above, the appliance 200 via the flow controller 220 controls the sender 102 through the delivery of pre-acknowledgements, also referred to as "preacks", as though the appliance 200 was a receiving endpoint itself. Since the appliance 200 is not an endpoint and does not actually consume the data, the appliance 200 includes a mechanism for providing overflow control to the sending endpoint. Without overflow control, the appliance 200 could run out of memory because the appliance 200 stores packets that have been preacked to the sending endpoint but not yet acknowledged as received by the receiving endpoint. Therefore, in a situation in which the sender 102 transmits packets to the appliance 200 faster than the appliance 200 can forward the packets downstream, the memory available in the appliance 200 to store unacknowledged packet data can quickly fill. A mechanism for overflow control allows the appliance 200 to control transmission of the packets from the sender 102 to avoid this problem.

In one embodiment, the appliance 200 or flow controller 220 includes an inherent "self-clocking" overflow control mechanism. This self-clocking is due to the order in which the appliance 200 may be designed to transmit packets downstream and send ACKs to the sender 102 or 106. In some embodiments, the appliance 200 does not preack the packet until after it transmits the packet downstream. In this way, the sender 102 will receive the ACKs at the rate at which the appliance 200 is able to transmit packets rather than the rate at which the appliance 200 receives packets from the sender 100. This helps to regulate the transmission of packets from a sender 102.

Window Virtualization

Another overflow control mechanism that the appliance 200 may implement is to use the TCP window size parameter, which tells a sender how much buffer the receiver is permitting the sender to fill up. A nonzero window size (e.g., a size of at least one Maximum Segment Size (MSS)) in a preack permits the sending endpoint to continue to deliver data to the appliance, whereas a zero window size inhibits further data transmission. Accordingly, the appliance 200 may regulate the flow of packets from the sender, for example when the appliance's 200 buffer is becoming full, by appropriately setting the TCP window size in each preack.

Another technique to reduce this additional overhead is to apply hysteresis. When the appliance 200 delivers data to the slower side, the overflow control mechanism in the appliance 200 can require that a minimum amount of space be available before sending a nonzero window advertisement to the sender. In one embodiment, the appliance 200 waits until there is a minimum of a predetermined number of packets, such as four packets, of space available before sending a nonzero window packet, such as a packet indicating a window size of four packets. This may reduce the overhead by approximately a factor of four, since only two ACK packets are sent for each group of four data packets, instead of eight ACK packets for four data packets.

Another technique the appliance 200 or flow controller 220 may use for overflow control is the TCP delayed ACK mechanism, which skips ACKs to reduce network traffic. The TCP delayed ACKs automatically delay the sending of an ACK, either until two packets are received or until a fixed timeout has occurred. This mechanism alone can result in cutting the overhead in half; moreover, by increasing the numbers of packets above two, additional overhead reduction is realized. But merely delaying the ACK itself may be insufficient to control overflow, and the appliance 200 may also use the advertised window mechanism on the ACKs to control the sender. When doing this, the appliance 200 in one embodiment avoids triggering the timeout mechanism of the sender by delaying the ACK too long.

In one embodiment, the flow controller 220 does not preack the last packet of a group of packets. By not preacking the last packet, or at least one of the packets in the group, the appliance avoids a false acknowledgement for a group of packets. For example, if the appliance were to send a preack for a last packet and the packet were subsequently lost, the sender would have been tricked into thinking that the packet is delivered when it was not. Thinking that the packet had been delivered, the sender could discard that data. If the appliance also lost the packet, there would be no way to retransmit the packet to the recipient. By not preacking the last packet of a group of packets, the sender will not discard the packet until it has been delivered.

In another embodiment, the flow controller 220 may use a window virtualization technique to control the rate of flow or bandwidth utilization of a network connection. Though it may not immediately be apparent from examining conventional literature such as RFC 1323, there is effectively a send window for transport layer protocols such as TCP. The send window is similar to the receive window, in that it consumes buffer space (though on the sender). The sender's send window consists of all data sent by the application that has not been acknowledged by the receiver. This data must be retained in memory in case retransmission is required. Since memory is a shared resource, some TCP stack implementations limit the size of this data. When the send window is full, an attempt by an application program to send more data results in blocking the application program until space is available. Subsequent reception of acknowledgements will free send-window memory and unblock the application program. This window size is known as the socket buffer size in some TCP implementations.

In one embodiment, the flow control module 220 is configured to provide access to increased window (or buffer) sizes. This configuration may also be referenced to as window virtualization. In an embodiment including TCP as the transport layer protocol, the TCP header may include a bit string corresponding to a window scale. In one embodiment, "window" may be referenced in a context of send, receive, or both.

One embodiment of window virtualization is to insert a preacking appliance 200 into a TCP session. In reference to any of the environments of FIG. 1A or 1B, initiation of a data communication session between a source node, e.g., client 102 (for ease of discussion, now referenced as source node 102), and a destination node, e.g., server 106 (for ease of discussion, now referenced as destination node 106) is established. For TCP communications, the source node 102 initially transmits a synchronization signal ("SYN") through its local area network 104 to first flow control module 220. The first flow control module 220 inserts a configuration identifier into the TCP header options area. The configuration identifier identifies this point in the data path as a flow control module.

The appliances 200 via a flow control module 220 provide window (or buffer) to allow increasing data buffering capabilities within a session despite having end nodes with small buffer sizes, e.g., typically 16 k bytes. However, RFC 1323 requires window scaling for any buffer sizes greater than 64 k bytes, which must be set at the time of session initialization (SYN, SYN-ACK signals). Moreover, the window scaling corresponds to the lowest common denominator in the data path, often an end node with small buffer size. This window scale often is a scale of 0 or 1, which corresponds to a buffer size of up to 64 k or 128 k bytes. Note that because the window size is defined as the window field in each packet shifted over by the window scale, the window scale establishes an upper limit for the buffer, but does not guarantee the buffer is actually that large. Each packet indicates the current available buffer space at the receiver in the window field.

In one embodiment of scaling using the window virtualization technique, during connection establishment (i.e., initialization of a session) when the first flow control module 220 receives from the source node 102 the SYN signal (or packet), the flow control module 220 stores the windows scale of the source node 102 (which is the previous node) or stores a for window scale if the scale of the previous node is missing. The first flow control module 220 also modifies the scale, e.g., increases the scale to 4 from 0 or 1, in the SYN-FCM signal. When the second flow control module 220 receives the SYN signal, it stores the increased scale from the first flow control signal and resets the scale in the SYN signal back to the source node 103 scale value for transmission to the destination node 106. When the second flow controller 220 receives the SYN-ACK signal from the destination node 106, it stores the scale from the destination node 106 scale, e.g., 0 or 1, and modifies it to an increased scale that is sent with the SYN-ACK-FCM signal. The first flow control node 220 receives and notes the received window scale and revises the windows scale sent back to the source node 102 back down to the original scale, e.g., 0 or 1. Based on the above window shift conversation during connection establishment, the window field in every subsequent packet, e.g., TCP packet, of the session must be shifted according to the window shift conversion.

The window scale, as described above, expresses buffer sizes of over 64 k and may not be required for window virtualization. Thus, shifts for window scale may be used to express increased buffer capacity in each flow control module 220. This increase in buffer capacity in may be referenced as window (or buffer) virtualization. The increase in buffer size allows greater packet throughput from and to the respective end nodes 102 and 106. Note that buffer sizes in TCP are typically expressed in terms of bytes, but for ease of discussion "packets" may be used in the description herein as it relates to virtualization.

By way of example, a window (or buffer) virtualization performed by the flow controller 220 is described. In this example, the source node 102 and the destination node 106 are configured similar to conventional end nodes having a limited buffer capacity of 16 k bytes, which equals approximately 10 packets of data. Typically, an end node 102, 106 must wait until the packet is transmitted and confirmation is received before a next group of packets can be transmitted. In one embodiment, using increased buffer capacity in the flow control modules 220, when the source node 103 transmits its data packets, the first flow control module 220 receives the packets, stores it in its larger capacity buffer, e.g., 512 packet capacity, and immediately sends back an acknowledgement signal indicating receipt of the packets ("REC-ACK") back to the source node 102. The source node 102 can then "flush" its current buffer, load the buffer with 10 new data packets, and transmit those onto the first flow control module 220. Again, the first flow control module 220 transmits a REC-ACK signal back to the source node 102 and the source node 102 flushes its buffer and loads it with 10 more new packets for transmission.

As the first flow control module 220 receives the data packets from the source nodes, it loads up its buffer accordingly. When it is ready the first flow control module 220 can begin transmitting the data packets to the second flow control module 230, which also has an increased buffer size, for example, to receive 512 packets. The second flow control module 220' receives the data packets and begins to transmit 10 packets at a time to the destination node 106. Each REC-ACK received at the second flow control node 220 from the destination node 106 results in 10 more packets being transmitted to the destination node 106 until all the data packets are transferred. Hence, the present invention is able to increase data transmission throughput between the source node (sender) 102 and the destination node (receiver) 106 by taking advantage of the larger buffer in the flow control modules 220, 220' between the devices.

It is noted that by "preacking" the transmission of data as described previously, a sender (or source node 102) is allowed to transmit more data than is possible without the preacks, thus affecting a larger window size. For example, in one embodiment this technique is effective when the flow control module 220, 220' is located "near" a node (e.g., source node 102 or destination node 106) that lacks large windows.

Recongestion

Another technique or algorithm of the flow controller 220 is referred to as recongestion. The standard TCP congestion avoidance algorithms are known to perform poorly in the face of certain network conditions, including: large RTTs (round trip times), high packet loss rates, and others. When the appliance 200 detects a congestion condition such as long round trip times or high packet loss, the appliance 200 intervenes, substituting an alternate congestion avoidance algorithm that better suits the particular network condition. In one embodiment, the recongestion algorithm uses preacks to effectively terminate the connection between the sender and the receiver. The appliance 200 then resends the packets from itself to the receiver, using a different congestion avoidance algorithm. Recongestion algorithms may be dependent on the characteristics of the TCP connection. The appliance 200 monitors each TCP connection, characterizing it with respect to the different dimensions, selecting a recongestion algorithm that is appropriate for the current characterization.

In one embodiment, upon detecting a TCP connection that is limited by round trip times (RTT), a recongestion algorithm is applied which behaves as multiple TCP connections. Each TCP connection operates within its own performance limit but the aggregate bandwidth achieves a higher performance level. One parameter in this mechanism is the number of parallel connections that are applied (N). Too large a value of N and the connection bundle achieves more than its fair share of bandwidth. Too small a value of N and the connection bundle achieves less than its fair share of bandwidth. One method of establishing "N" relies on the appliance 200 monitoring the packet loss rate, RTT, and packet size of the actual connection. These numbers are plugged into a TCP response curve formula to provide an upper limit on the performance of a single TCP connection in the present configuration. If each connection within the connection bundle is achieving substantially the same performance as that computed to be the upper limit, then additional parallel connections are applied. If the current bundle is achieving less performance than the upper limit, the number of parallel connections is reduced. In this manner, the overall fairness of the system is maintained since individual connection bundles contain no more parallelism than is required to eliminate the restrictions imposed by the protocol itself. Furthermore, each individual connection retains TCP compliance.

Another method of establishing "N" is to utilize a parallel flow control algorithm such as the TCP "Vegas" algorithm or the TCP "Stabilized Vegas" algorithm. In this method, the network information associated with the connections in the connection bundle (e.g., RTT, loss rate, average packet size, etc.) is aggregated and applied to the alternate flow control algorithm. The results of this algorithm are in turn distributed among the connections of the bundle controlling their number (i.e., N). Optionally, each connection within the bundle continues using the standard TCP congestion avoidance algorithm.

In another embodiment, the individual connections within a parallel bundle are virtualized, i.e., actual individual TCP connections are not established. Instead the congestion avoidance algorithm is modified to behave as though there were N parallel connections. This method has the advantage of appearing to transiting network nodes as a single connection. Thus the QOS, security and other monitoring methods of these nodes are unaffected by the recongestion algorithm. In yet another embodiment, the individual connections within a parallel bundle are real, i.e., a separate. TCP connection is established for each of the parallel connections within a bundle. The congestion avoidance algorithm for each TCP connection need not be modified.

Retransmission

In some embodiments, the flow controller 220 may apply a local retransmission technique. One reason for implementing preacks is to prepare to transit to a high-loss link (e.g., wireless). In these embodiments, the preacking appliance 200 or flow control module 220 is located most beneficially "before" the wireless link. This allows retransmissions to be performed closer to the high loss link, removing the retransmission burden from the remainder of the network. The appliance 200 may provide local retransmission, in which case, packets dropped due to failures of the link are retransmitted directly by the appliance 200. This is advantageous because it eliminates the retransmission burden upon an end node, such as server 106, and infrastructure of any of the networks 104. With appliance 200 providing local retransmissions, the dropped packet can be retransmitted across the high loss link without necessitating a retransmit by an end node and a corresponding decrease in the rate of data transmission from the end node.

Another reason for implementing preacks is to avoid a receive time out (RTO) penalty. In standard TCP there are many situations that result in an RTO, even though a large percentage of the packets in flight were successfully received. With standard TCP algorithms, dropping more than one packet within an RTT window would likely result in a timeout. Additionally, most TCP connections experience a timeout if a retransmitted packet is dropped. In a network with a high bandwidth delay product, even a relatively small packet loss rate will cause frequent Retransmission timeouts (RTOs). In one embodiment, the appliance 200 uses a retransmit and timeout algorithm is avoid premature RTOs. The appliance 200 or flow controller 220 maintains a count of retransmissions is maintained on a per-packet basis. Each time that a packet is retransmitted, the count is incremented by one and the appliance 200 continues to transmit packets. In some embodiments, only if a packet has been retransmitted a predetermined number of times is an RTO declared.

Wavefront Detection and Disambiguation

In some embodiments, the appliance 200 or flow controller 220 uses wavefront detection and disambiguation techniques in managing and controlling flow of network traffic. In this technique, the flow controller 220 uses transmit identifiers or numbers to determine whether particular data packets need to be retransmitted. By way of example, a sender transmits data packets over a network, where each instance of a transmitted data packet is associated with a transmit number. It can be appreciated that the transmit number for a packet is not the same as the packet's sequence number, since a sequence number references the data in the packet while the transmit number references an instance of a transmission of that data. The transmit number can be any information usable for this purpose, including a timestamp associated with a packet or simply an increasing number (similar to a sequence number or a packet number). Because a data segment may be retransmitted, different transmit numbers may be associated with a particular sequence number.

As the sender transmits data packets, the sender maintains a data structure of acknowledged instances of data packet transmissions. Each instance of a data packet transmission is referenced by its sequence number and transmit number. By maintaining a transmit number for each packet, the sender retains the ordering of the transmission of data packets. When the sender receives an ACK or a SACK, the sender determines the highest transmit number associated with packets that the receiver indicated has arrived (in the received acknowledgement). Any outstanding unacknowledged packets with lower transmit numbers are presumed lost.

In some embodiments, the sender is presented with an ambiguous situation when the arriving packet has been retransmitted: a standard ACK/SACK does not contain enough information to allow the sender to determine which transmission of the arriving packet has triggered the acknowledgement. After receiving an ambiguous acknowledgement, therefore, the sender disambiguates the acknowledgement to associate it with a transmit number. In various embodiments, one or a combination of several techniques may be used to resolve this ambiguity.

In one embodiment, the sender includes an identifier with a transmitted data packet, and the receiver returns that identifier or a function thereof with the acknowledgement. The identifier may be a timestamp (e.g., a TCP timestamp as described in RFC 1323), a sequential number, or any other information that can be used to resolve between two or more instances of a packet's transmission. In an embodiment in which the TCP timestamp option is used to disambiguate the acknowledgement, each packet is tagged with up to 32-bits of unique information. Upon receipt of the data packet, the receiver echoes this unique information back to the sender with the acknowledgement. The sender ensures that the originally sent packet and its retransmitted version or versions contain different values for the timestamp option, allowing it to unambiguously eliminate the ACK ambiguity. The sender may maintain this unique information, for example, in the data structure in which it stores the status of sent data packets. This technique is advantageous because it complies with industry standards and is thus likely to encounter little or no interoperability issues. However, this technique may require ten bytes of TCP header space in some implementations, reducing the effective throughput rate on the network and reducing space available for other TCP options.

In another embodiment, another field in the packet, such as the IP ID field, is used to disambiguate in a way similar to the TCP timestamp option described above. The sender arranges for the ID field values of the original and the retransmitted version or versions of the packet to have different ID fields in the IP header. Upon reception of the data packet at the receiver, or a proxy device thereof, the receiver sets the ID field of the ACK packet to a function of the ID field of the packet that triggers the ACK. This method is advantageous, as it requires no additional data to be sent, preserving the efficiency of the network and TCP header space. The function chosen should provide a high degree of likelihood of providing disambiguation. In a preferred embodiment, the sender selects IP ID values with the most significant bit set to 0. When the receiver responds, the IP ID value is set to the same IP ID value with the most significant bit set to a one.

In another embodiment, the transmit numbers associated with non-ambiguous acknowledgements are used to disambiguate an ambiguous acknowledgement. This technique is based on the principle that acknowledgements for two packets will tend to be received closer in time as the packets are transmitted closer in time. Packets that are not retransmitted will not result in ambiguity, as the acknowledgements received for such packets can be readily associated with a transmit number. Therefore, these known transmit numbers are compared to the possible transmit numbers for an ambiguous acknowledgement received near in time to the known acknowledgement. The sender compares the transmit numbers of the ambiguous acknowledgement against the last known received transmit number, selecting the one closest to the known received transmit number. For example, if an acknowledgement for data packet 1 is received and the last received acknowledgement was for data packet 5, the sender resolves the ambiguity by assuming that the third instance of data packet 1 caused the acknowledgement.

Selective Acknowledgements

Another technique of the appliance 200 or flow controller 220 is to implement an embodiment of transport control protocol selective acknowledgements, or TCP SACK, to determine what packets have or have not been received. This technique allows the sender to determine unambiguously a list of packets that have been received by the receiver as well as an accurate list of packets not received. This functionality may be implemented by modifying the sender and/or receiver, or by inserting sender- and receiver-side flow control modules 220 in the network path between the sender and receiver. In reference to FIG. 1A or FIG. 1B, a sender, e.g., client 102, is configured to transmit data packets to the receiver, e.g., server 106, over the network 104. In response, the receiver returns a TCP Selective Acknowledgment option, referred to as SACK packet to the sender. In one embodiment, the communication is bi-directional, although only one direction of communication is discussed here for simplicity. The receiver maintains a list, or other suitable data structure, that contains a group of ranges of sequence numbers for data packets that the receiver has actually received. In some embodiments, the list is sorted by sequence number in an ascending or descending order. The receiver also maintains a left-off pointer, which comprises a reference into the list and indicates the left-off point from the previously generated SACK packet.

Upon reception of a data packet, the receiver generates and transmits a SACK packet back to the sender. In some embodiments, the SACK packet includes a number of fields, each of which can hold a range of sequence numbers to indicate a set of received data packets. The receiver fills this first field of the SACK packet with a range of sequence numbers that includes the landing packet that triggered the SACK packet. The remaining available SACK fields are filled with ranges of sequence numbers from the list of received packets. As there are more ranges in the list than can be loaded into the SACK packet, the receiver uses the left-off pointer to determine which ranges are loaded into the SACK packet. The receiver inserts the SACK ranges consecutively from the sorted list, starting from the range referenced by the pointer and continuing down the list until the available SACK range space in the TCP header of the SACK packet is consumed. The receiver wraps around to the start of the list if it reaches the end. In some embodiments, two or three additional SACK ranges can be added to the SACK range information.

Once the receiver generates the SACK packet, the receiver sends the acknowledgement back to the sender. The receiver then advances the left-off pointer by one or more SACK range entries in the list. If the receiver inserts four SACK ranges, for example, the left-off pointer may be advanced two SACK ranges in the list. When the advanced left-off pointer reaches at the end of the list, the pointer is reset to the start of the list, effectively wrapping around the list of known received ranges. Wrapping around the list enables the system to perform well, even in the presence of large losses of SACK packets, since the SACK information that is not communicated due to a lost SACK packet will eventually be communicated once the list is wrapped around.

It can be appreciated, therefore, that a SACK packet may communicate several details about the condition of the receiver. First, the SACK packet indicates that, upon generation of the SACK packet, the receiver had just received a data packet that is within the first field of the SACK information. Secondly, the second and subsequent fields of the SACK information indicate that the receiver has received the data packets within those ranges. The SACK information also implies that the receiver had not, at the time of the SACK packet's generation, received any of the data packets that fall between the second and subsequent fields of the SACK information. In essence, the ranges between the second and subsequent ranges in the SACK information are "holes" in the received data, the data therein known not to have been delivered. Using this method, therefore, when a SACK packet has sufficient space to include more than two SACK ranges, the receiver may indicate to the sender a range of data packets that have not yet been received by the receiver.

In another embodiment, the sender uses the SACK packet described above in combination with the retransmit technique described above to make assumptions about which data packets have been delivered to the receiver. For example, when the retransmit algorithm (using the transmit numbers) declares a packet lost, the sender considers the packet to be only conditionally lost, as it is possible that the SACK packet identifying the reception of this packet was lost rather than the data packet itself. The sender thus adds this packet to a list of potentially lost packets, called the presumed lost list. Each time a SACK packet arrives, the known missing ranges of data from the SACK packet are compared to the packets in the presumed lost list. Packets that contain data known to be missing are declared actually lost and are subsequently retransmitted. In this way, the two schemes are combined to give the sender better information about which packets have been lost and need to be retransmitted.

Transaction Boundary Detection

In some embodiments, the appliance 200 or flow controller 220 applies a technique referred to as transaction boundary detection. In one embodiment, the technique pertains to ping-pong behaved connections. At the TCP layer, ping-pong behavior is when one communicant—a sender—sends data and then waits for a response from the other communicant—the receiver. Examples of ping-pong behavior include remote procedure call, HTTP and others. The algorithms described above use retransmission timeout (RTO) to recover from the dropping of the last packet or packets associated with the transaction. Since the TCP RTO mechanism is extremely coarse in some embodiments, for example requiring a minimum one second value in all cases), poor application behavior may be seen in these situations.

In one embodiment, the sender of data or a flow control module 220 coupled to the sender detects a transaction boundary in the data being sent. Upon detecting a transaction boundary, the sender or a flow control module 220 sends additional packets, whose reception generates additional ACK or SACK responses from the receiver. Insertion of the additional packets is preferably limited to balance between improved application response time and network capacity utilization. The number of additional packets that is inserted may be selected according to the current loss rate associated with that connection, with more packets selected for connections having a higher loss rate.

One method of detecting a transaction boundary is time based. If the sender has been sending data and ceases, then after a period of time the sender or flow control module 200 declares a transaction boundary. This may be combined with other techniques. For example, the setting of the PSH (TCP Push) bit by the sender in the TCP header may indicate a transaction boundary. Accordingly, combining the time-based approach with these additional heuristics can provide for more accurate detection of a transaction boundary. In another technique, if the sender or flow control module 220 understands the application protocol, it can parse the protocol data stream and directly determine transaction boundaries. In some embodiments, this last behavior can be used independent of any time-based mechanism.

Responsive to detecting a transaction boundary, the sender or flow control module 220 transmits additional data packets to the receiver to cause acknowledgements therefrom. The additional data packets should therefore be such that the receiver will at least generate an ACK or SACK in response to receiving the data packet. In one embodiment, the last packet or packets of the transaction are simply retransmitted. This has the added benefit of retransmitting needed data if the last packet or packets had been dropped, as compared to merely sending dummy data packets. In another embodiment, fractions of the last packet or packets are sent, allowing the sender to disambiguate the arrival of these packets from their original packets. This allows the receiver to avoid falsely confusing any reordering adaptation algorithms. In another embodiment, any of a number of well-known forward error correction techniques can be used to generate additional data for the inserted packets, allowing for the reconstruction of dropped or otherwise missing data at the receiver.

In some embodiments, the boundary detection technique described herein helps to avoid a timeout when the acknowledgements for the last data packets in a transaction are dropped. When the sender or flow control module 220 receives the acknowledgements for these additional data packets, the sender can determine from these additional acknowledgements whether the last data packets have been received or need to be retransmitted, thus avoiding a timeout. In one embodiment, if the last packets have been received but their acknowledgements were dropped, a flow control module 220 generates an acknowledgement for the data packets and sends the acknowledgement to the sender, thus communicating to the sender that the data packets have been delivered. In another embodiment, if the last packets have not been received, a flow control module 200 sends a packet to the sender to cause the sender to retransmit the dropped data packets.

Repacketization

In yet another embodiment, the appliance 200 or flow controller 220 applies a repacketization technique for improving the flow of transport layer network traffic. In some embodiments, performance of TCP is proportional to packet size. Thus increasing packet sizes improves performance unless it causes substantially increased packet loss rates or other nonlinear effects, like IP fragmentation. In general, wired media (such as copper or fibre optics) have extremely low bit-error rates, low enough that these can be ignored. For these media, it is advantageous for the packet size to be the maximum possible before fragmentation occurs (the maximum packet size is limited by the protocols of the underlying transmission media). Whereas for transmission media with higher loss rates (e.g., wireless technologies such as WiFi, etc., or high-loss environments such as power-line networking, etc.), increasing the packet size may lead to lower transmission rates, as media-induced errors cause an entire packet to be dropped (i.e., media-induced errors beyond the capability of the standard error correcting code for that media), increasing the packet loss rate. A sufficiently large increase in the packet loss rate will actually negate any performance benefit of increasing packet size. In some cases, it may be difficult for a TCP endpoint to choose an optimal packet size. For example, the optimal packet size may vary across the transmission path, depending on the nature of each link.

By inserting an appliance 200 or flow control module 220 into the transmission path, the flow controller 220 monitors characteristics of the link and repacketizes according to determined link characteristics. In one embodiment, an appliance 200 or flow controller 220 repacketizes packets with sequential data into a smaller number of larger packets. In another embodiment, an appliance 200 or flow controller 220 repacketizes packets by breaking part a sequence of large packets into a larger number of smaller packets. In other embodiments, an appliance 200 or flow controller 220 monitors the link characteristics and adjusts the packet sizes through recombination to improve throughput.

QoS

Still referring to FIG. 2A, the flow controller 220, in some embodiments, may include a QoS Engine 236, also referred to as a QoS controller. In another embodiment, the appliance 200 and/or network optimization engine 250 includes the QoS engine 236, for example, separately but in communication with the flow controller 220. The QoS Engine 236 includes any logic, business rules, function or operations for performing one or more Quality of Service (QoS) techniques improving the performance, operation or quality of service of any of the network connections. In some embodiments, the QoS engine 236 includes network traffic control and management mechanisms that provide different priorities to different users, applications, data flows or connections. In other embodiments, the QoS engine 236 controls, maintains, or assures a certain level of performance to a user, application, data flow or connection. In one embodiment, the QoS engine 236 controls, maintains or assures a certain portion of bandwidth or network capacity for a user, application, data flow or connection. In some embodiments, the QoS engine 236 monitors the achieved level of performance or the quality of service corresponding to a user, application, data flow or connection, for example, the data rate and delay. In response to monitoring, the QoS engine 236 dynamically controls or adjusts scheduling priorities of network packets to achieve the desired level of performance or quality of service.

In some embodiments, the QoS engine 236 prioritizes, schedules and transmits network packets according to one or more classes or levels of services. In some embodiments, the class or level service may include: 1) best efforts, 2) controlled load, 3) guaranteed or 4) qualitative. For a best efforts class of service, the appliance 200 makes reasonable effort to deliver packets (a standard service level). For a controlled load class of service, the appliance 200 or QoS engine 236 approximates the standard packet error loss of the transmission medium or approximates the behavior of best-effort service in lightly loaded network conditions. For a guaranteed class of service, the appliance 200 or QoS engine 236 guarantees the ability to transmit data at a determined rate for the duration of the connection. For a qualitative class of service, the appliance 200 or QoS engine 236 the qualitative service class is used for applications, users, data flows or connection that require or desire prioritized traffic but cannot quantify resource needs or level of service. In these cases, the appliance 200 or QoS engine 236 determines the class of service or prioritization based on any logic or configuration of the QoS engine 236 or based on business rules or policies. For example, in one embodiment, the QoS engine 236 prioritizes, schedules and transmits network packets according to one or more policies as specified by the policy engine 295, 295'.

Protocol Acceleration

The protocol accelerator 234 includes any logic, business rules, function or operations for optimizing, accelerating, or otherwise improving the performance, operation or quality of service of one or more protocols. In one embodiment, the protocol accelerator 234 accelerates any application layer protocol or protocols at layers 5-7 of the network stack. In other embodiments, the protocol accelerator 234 accelerates a transport layer or a layer 4 protocol. In one embodiment, the protocol accelerator 234 accelerates layer 2 or layer 3 protocols. In some embodiments, the protocol accelerator 234 is configured, constructed or designed to optimize or accelerate each of one or more protocols according to the type of data, characteristics and/or behavior of the protocol. In another embodiment, the protocol accelerator 234 is configured, constructed or designed to improve a user experience, response times, network or computer load, and/or network or bandwidth utilization with respect to a protocol.

In one embodiment, the protocol accelerator 234 is configured, constructed or designed to minimize the effect of WAN latency on file system access. In some embodiments, the protocol accelerator 234 optimizes or accelerates the use of the CIFS (Common Internet File System) protocol to improve file system access times or access times to data and files. In some embodiments, the protocol accelerator 234 optimizes or accelerates the use of the NFS (Network File System) protocol. In another embodiment, the protocol accelerator 234 optimizes or accelerates the use of the File Transfer protocol (FTP).

In one embodiment, the protocol accelerator 234 is configured, constructed or designed to optimize or accelerate a protocol carrying as a payload or using any type and form of markup language. In other embodiments, the protocol accelerator 234 is configured, constructed or designed to optimize or accelerate a HyperText Transfer Protocol (HTTP). In another embodiment, the protocol accelerator 234 is configured, constructed or designed to optimize or accelerate a protocol carrying as a payload or otherwise using XML (eXtensible Markup Language).

Transparency and Multiple Deployment Configurations

In some embodiments, the appliance 200 and/or network optimization engine 250 is transparent to any data flowing across a network connection or link, such as a WAN link. In one embodiment, the appliance 200 and/or network optimization engine 250 operates in such a manner that the data flow across the WAN is recognizable by any network monitoring, QOS management or network analysis tools. In some embodiments, the appliance 200 and/or network optimization engine 250 does not create any tunnels or streams for transmitting data that may hide, obscure or otherwise make the network traffic not transparent. In other embodiments, the appliance 200 operates transparently in that the appliance does not change any of the source and/or destination address information or port information of a network packet, such as internet protocol addresses or port numbers. In other embodiments, the appliance 200 and/or network optimization engine 250 is considered to operate or behave transparently to the network, an application, client, server or other appliances or computing device in the network infrastructure. That is, in some embodiments, the appliance is transparent in that network related configuration of any device or appliance on the network does not need to be modified to support the appliance 200.

The appliance 200 may be deployed in any of the following deployment configurations: 1) in-line of traffic, 2) in proxy mode, or 3) in a virtual in-line mode. In some embodiments, the appliance 200 may be deployed inline to one or more of the following: a router, a client, a server or another network device or appliance. In other embodiments, the appliance 200 may be deployed in parallel to one or more of the following: a router, a client, a server or another network device or appliance. In parallel deployments, a client, server, router or other network appliance may be configured to forward, transfer or transit networks to or via the appliance 200.

In the embodiment of in-line, the appliance 200 is deployed inline with a WAN link of a router. In this way, all traffic from the WAN passes through the appliance before arriving at a destination of a LAN.

In the embodiment of a proxy mode, the appliance 200 is deployed as a proxy device between a client and a server. In some embodiments, the appliance 200 allows clients to make indirect connections to a resource on a network. For example, a client connects to a resource via the appliance 200, and the appliance provides the resource either by connecting to the resource, a different resource, or by serving the resource from a cache. In some cases, the appliance may alter the client's request or the server's response for various purposes, such as for any of the optimization techniques discussed herein. In one embodiment, the client 102 send requests addressed to the proxy. In one case, the proxy responds to the client in place of or acting as a server 106. In other embodiments, the appliance 200 behaves as a transparent proxy, by intercepting and forwarding requests and responses transparently to a client and/or server. Without client-side configuration, the appliance 200 may redirect client requests to different servers or networks. In some embodiments, the appliance 200 may perform any type and form of network address translation, referred to as NAT, on any network traffic traversing the appliance.

In some embodiments, the appliance 200 is deployed in a virtual in-line mode configuration. In this embodiment, a router or a network device with routing or switching functionality is configured to forward, reroute or otherwise provide network packets destined to a network to the appliance 200. The appliance 200 then performs any desired processing on the network packets, such as any of the WAN optimization techniques discussed herein. Upon completion of processing, the appliance 200 forwards the processed network packet to the router to transmit to the destination on the network. In this way, the appliance 200 can be coupled to the router in parallel but still operate as it if the appliance 200 were inline. This deployment mode also provides transparency in that the source and destination addresses and port information are preserved as the packet is processed and transmitted via the appliance through the network.

End Node Deployment

Although the network optimization engine 250 is generally described above in conjunction with an appliance 200, the network optimization engine 250, or any portion thereof, may be deployed, distributed or otherwise operated on any end node, such as a client 102 and/or server 106. As such, a client or server may provide any of the systems and methods of the network optimization engine 250 described herein in conjunction with one or more appliances 200 or without an appliance 200.

Figure 2B:
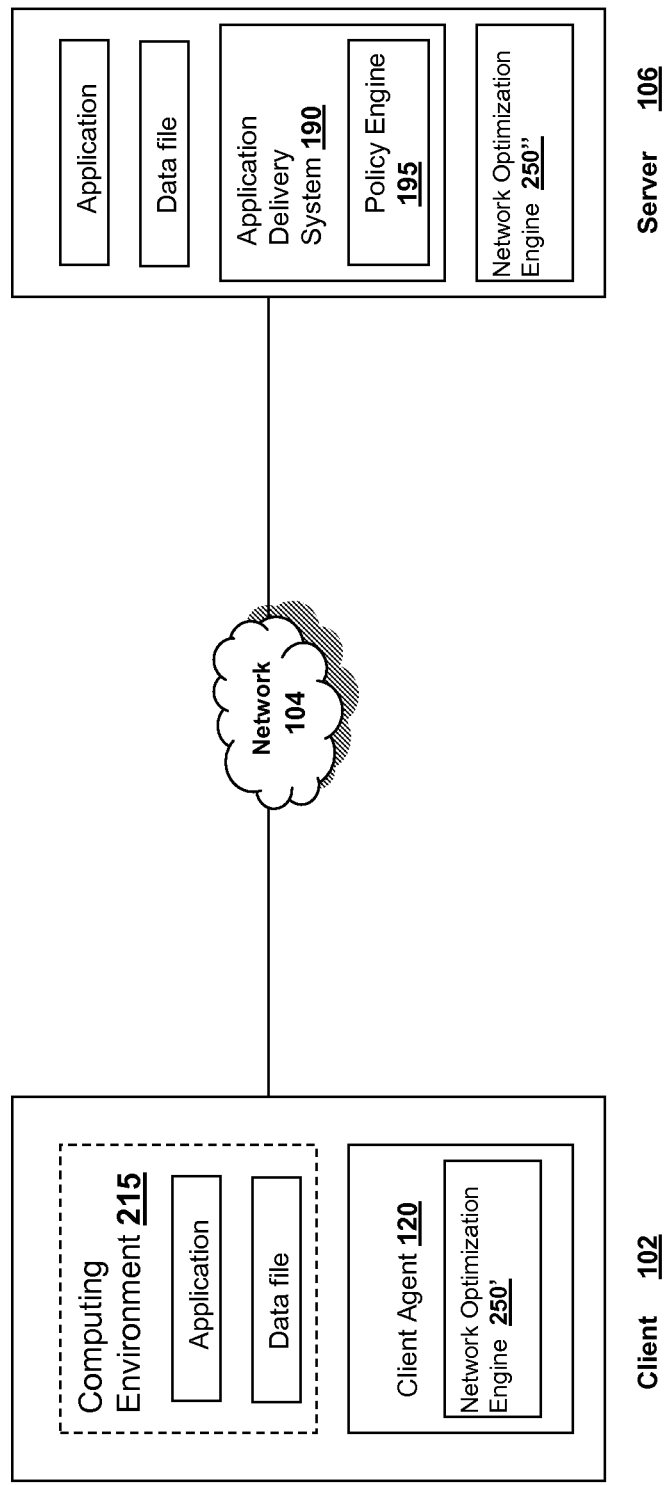
FIG. 2B is a block diagram of another embodiment of a client and/or server deploying the network optimization features of the appliance.

Referring now to FIG. 2B, an example embodiment of the network optimization engine 250 deployed on one or more end nodes is depicted. In brief overview, the client 102 may include a first network optimization engine 250' and the server 106 may include a second network optimization engine 250". The client 102 and server 106 may establish a transport layer connection and exchange communications with or without traversing an appliance 200.

In one embodiment, the network optimization engine 250' of the client 102 performs the techniques described herein to optimize, accelerate or otherwise improve the performance, operation or quality of service of network traffic communicated with the server 106. In another embodiment, the network optimization engine 250" of the server 106 performs the techniques described herein to optimize, accelerate or otherwise improve the performance, operation or quality of service of network traffic communicated with the client 102. In some embodiments, the network optimization engine 250' of the client 102 and the network optimization engine 250" of the server 106 perform the techniques described herein to optimize, accelerate or otherwise improve the performance, operation or quality of service of network traffic communicated between the client 102 and the server 106. In yet another embodiment, the network optimization engine 250' of the client 102 performs the techniques described herein in conjunction with an appliance 200 to optimize, accelerate or otherwise improve the performance, operation or quality of service of network traffic communicated with the client 102. In still another embodiment, the network optimization engine 250" of the server 106 performs the techniques described herein in conjunction with an appliance 200 to optimize, accelerate or otherwise improve the performance, operation or quality of service of network traffic communicated with the server 106.

C. Client Agent

As illustrated in FIGS. 2A and 2B, a client deployed in the system or with an appliance 200 or 205 may include a client agent 120. In one embodiment, the client agent 120 is used to facilitate communications with one or more appliances 200 or 205. In some embodiments, any of the systems and methods of the appliance 200 or 205 described herein may be deployed, implemented or embodied in a client, such as via a client agent 120. In other embodiments, the client agent 120 may include applications, programs, or agents providing additional functionality such as end point detection and authorization, virtual private network connectivity, and application streaming. Prior to discussing other embodiments of systems and methods of the appliance 200, embodiments of the client agent 120 will be described.

Figure 3:
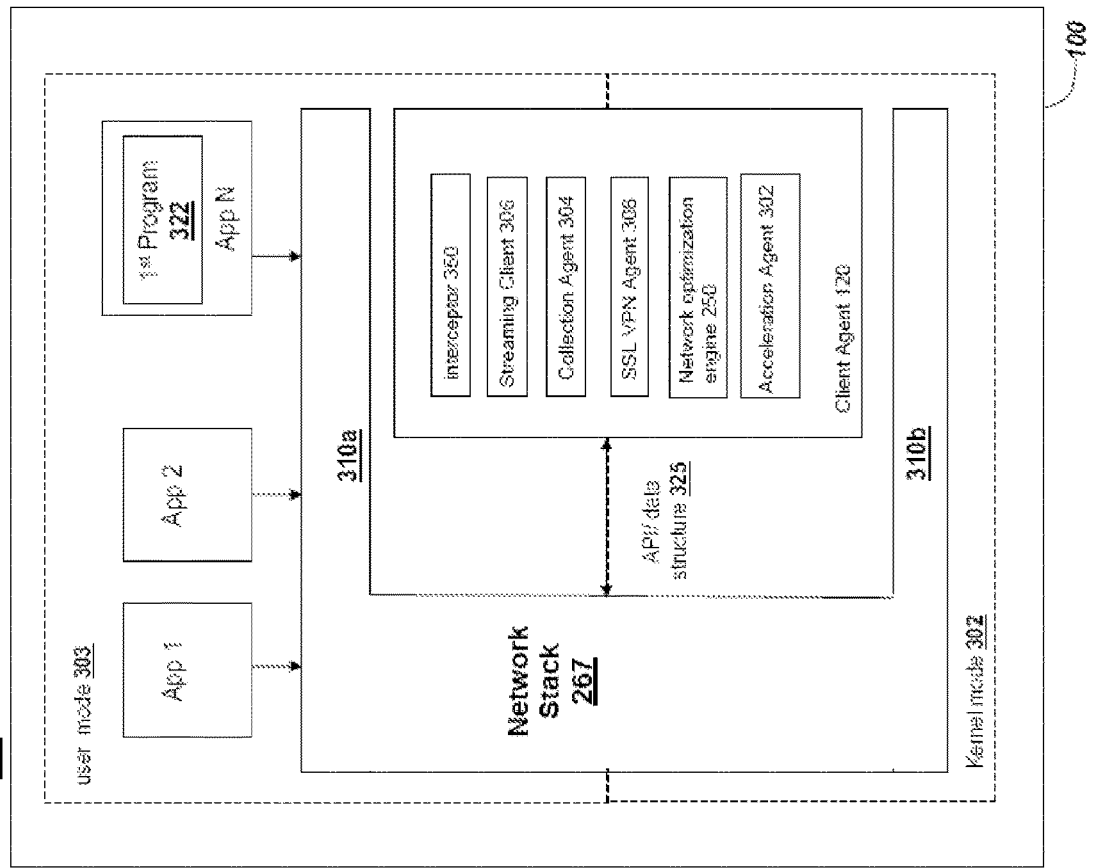
FIG. 3 is a block diagram of an embodiment of a client for communicating with a server using the network optimization feature.

Referring now to FIG. 3, an embodiment of a client agent 120 is depicted. The client 102 has a client agent 120 for establishing, exchanging, managing or controlling communications with the appliance 200, appliance 205 and/or server 106 via a network 104. In some embodiments, the client agent 120, which may also be referred to as a WAN client, accelerates WAN network communications and/or is used to communicate via appliance 200 on a network. In brief overview, the client 102 operates on computing device 100 having an operating system with a kernel mode 302 and a user mode 303, and a network stack 267 with one or more layers 310a-310b. The client 102 may have installed and/or execute one or more applications. In some embodiments, one or more applications may communicate via the network stack 267 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 267 from the one or more applications.

As with the appliance 200, the client has a network stack 267 including any type and form of software, hardware, or any combinations thereof, for providing connectivity to and communications with a network 104. The network stack 267 of the client 102 includes any of the network stack embodiments described above in conjunction with the appliance 200. In some embodiments, the client agent 120, or any portion thereof, is designed and constructed to operate with or work in conjunction with the network stack 267 installed or otherwise provided by the operating system of the client 102.

In further details, the network stack 267 of the client 102 or appliance 200 (or 205) may include any type and form of interfaces for receiving, obtaining, providing or otherwise accessing any information and data related to network communications of the client 102. In one embodiment, an interface to the network stack 267 includes an application programming interface (API). The interface may also have any function call, hooking or filtering mechanism, event or call back mechanism, or any type of interfacing technique. The network stack 267 via the interface may receive or provide any type and form of data structure, such as an object, related to functionality or operation of the network stack 267. For example, the data structure may include information and data related to a network packet or one or more network packets. In some embodiments, the data structure includes, references or identifies a portion of the network packet processed at a protocol layer of the network stack 267, such as a network packet of the transport layer. In some embodiments, the data structure 325 is a kernel-level data structure, while in other embodiments, the data structure 325 is a user-mode data structure. A kernel-level data structure may have a data structure obtained or related to a portion of the network stack 267 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 267 may execute or operate in kernel-mode 302, for example, the data link or network layer, while other portions execute or operate in user-mode 303, such as an application layer of the network stack 267. For example, a first portion 310*a* of the network stack may provide user-mode access to the network stack 267 to an application while a second portion 310*a* of the network stack 267 provides access to a network. In some embodiments, a first portion 310*a* of the network stack has one or more upper layers of the network stack 267, such as any of layers 5-7. In other embodiments, a second portion 310*b* of the network stack 267 includes one or more lower layers, such as any of layers 1-4. Each of the first portion 310*a* and second portion 310*b* of the network stack 267 may include any portion of the network stack 267, at any one or more network layers, in user-mode 303, kernel-mode, 302, or combinations thereof, or at any portion of a network layer or interface point to a network layer or any portion of or interface point to the user-mode 302 and kernel-mode 203.

The interceptor 350 may include software, hardware, or any combination of software and hardware. In one embodiment, the interceptor 350 intercepts or otherwise receives a network communication at any point in the network stack 267, and redirects or transmits the network communication to a destination desired, managed or controlled by the interceptor 350 or client agent 120. For example, the interceptor 350 may intercept a network communication of a network stack 267 of a first network and transmit the network communication to the appliance 200 for transmission on a second network 104. In some embodiments, the interceptor 350 includes or is a driver, such as a network driver constructed and designed to interface and work with the network stack 267. In some embodiments, the client agent 120 and/or interceptor 350 operates at one or more layers of the network stack 267, such as at the transport layer. In one embodiment, the interceptor 350 includes a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 includes a driver complying with the Network Driver Interface Specification (NDIS), or a NDIS driver. In another embodiment, the interceptor 350 may be a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts or receives any transport layer connection requests. In these embodiments, the interceptor 350 executes transport layer application programming interface (API) calls to set the destination information, such as destination IP address and/or port to a desired location for the location. In this manner, the interceptor 350 intercepts and redirects the transport layer connection to an IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may include two agents 120 and 120'. In one embodiment, a first agent 120 may include an interceptor 350 operating at the network layer of the network stack 267. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 267. For example, in one embodiment, the interceptor 350 operates or interfaces with the transport layer of the network stack 267 transparently to any protocol layer below the transport layer, such as the network layer, and any protocol layer above the transport layer, such as the session, presentation or application layer protocols. This allows the other protocol layers of the network stack 267 to operate as desired and without modification for using the interceptor 350. As such, the client agent 120 and/or interceptor 350 interfaces with or operates at the level of the transport layer to secure, optimize, accelerate, route or load-balance any communications provided via any protocol carried by the transport layer, such as any application layer protocol over TCP/IP.

Furthermore, the client agent 120 and/or interceptor 350 may operate at or interface with the network stack 267 in a manner transparent to any application, a user of the client 102, the client 102 and/or any other computing device 100, such as a server or appliance 200, 206, in communications with the client 102. The client agent 120, or any portion thereof, may be installed and/or executed on the client 102 in a manner without modification of an application. In one embodiment, the client agent 120, or any portion thereof, is installed and/or executed in a manner transparent to any network configuration of the client 102, appliance 200, 205 or server 106. In some embodiments, the client agent 120, or any portion thereof, is installed and/or executed with modification to any network configuration of the client 102, appliance 200, 205 or server 106. In one embodiment, the user of the client 102 or a computing device in communications with the client 102 are not aware of the existence, execution or operation of the client agent 12, or any portion thereof. As such, in some embodiments, the client agent 120 and/or interceptor 350 is installed, executed, and/or operated transparently to an application, user of the client 102, the client 102, another computing device, such as a server or appliance 200, 2005, or any of the protocol layers above and/or below the protocol layer interfaced to by the interceptor 350.

The client agent 120 includes a streaming client 306, a collection agent 304, SSL VPN agent 308, a network optimization engine 250, and/or acceleration program 302. In one embodiment, the client agent 120 is an Independent Computing Architecture (ICA) client, or any portion thereof, developed by Citrix Systems, Inc. of Fort Lauderdale, Fla., and is also referred to as an ICA client. In some embodiments, the client agent 120 has an application streaming client 306 for streaming an application from a server 106 to a client 102. In another embodiment, the client agent 120 includes a collection agent 304 for performing end-point detection/scanning and collecting end-point information for the appliance 200 and/or server 106. In some embodiments, the client agent 120 has one or more network accelerating or optimizing programs or agents, such as a network optimization engine 250 and an acceleration program 302. In one embodiment, the acceleration program 302 accelerates communications between client 102 and server 106 via appliance 205'. In some embodiments, the network optimization engine 250 provides WAN optimization techniques as discussed herein.

The streaming client 306 is an application, program, process, service, task or set of executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 is an application, program, process, service, task or set of executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 is an end-point detection and scanning program, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or version of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

The SSL VPN agent 308 is an application, program, process, service, task or set of executable instructions for establishing a Secure Socket Layer (SSL) virtual private network (VPN) connection from a first network 104 to a second network 104', 104", or a SSL VPN connection from a client 102 to a server 106. In one embodiment, the SSL VPN agent 308 establishes a SSL VPN connection from a public network 104 to a private network 104' or 104". In some embodiments, the SSL VPN agent 308 works in conjunction with appliance 205 to provide the SSL VPN connection. In one embodiment, the SSL VPN agent 308 establishes a first transport layer connection with appliance 205. In some embodiments, the appliance 205 establishes a second transport layer connection with a server 106. In another embodiment, the SSL VPN agent 308 establishes a first transport layer connection with an application on the client, and a second transport layer connection with the appliance 205. In other embodiments, the SSL VPN agent 308 works in conjunction with WAN optimization appliance 200 to provide SSL VPN connectivity.

In some embodiments, the acceleration program 302 is a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

In one embodiment, the acceleration program 302 is designed, constructed or configured to work with appliance 205 to provide LAN side acceleration or to provide acceleration techniques provided via appliance 205. For example, in one embodiment of a NetScaler appliance 205 manufactured by Citrix Systems, Inc., the acceleration program 302 includes a NetScaler client. In some embodiments, the acceleration program 302 provides NetScaler acceleration techniques stand-alone in a remote device, such as in a branch office. In other embodiments, the acceleration program 302 works in conjunction with one or more NetScaler appliances 205. In one embodiment, the acceleration program 302 provides LAN-side or LAN based acceleration or optimization of network traffic.

In some embodiments, the network optimization engine 250 may be designed, constructed or configured to work with WAN optimization appliance 200. In other embodiments, network optimization engine 250 may be designed, constructed or configured to provide the WAN optimization techniques of appliance 200, with or without an appliance 200. For example, in one embodiment of a WANScaler appliance 200 manufactured by Citrix Systems, Inc. the network optimization engine 250 includes the WANscaler client. In some embodiments, the network optimization engine 250 provides WANScaler acceleration techniques stand-alone in a remote location, such as a branch office. In other embodiments, the network optimization engine 250 works in conjunction with one or more WANScaler appliances 200.

In another embodiment, the network optimization engine 250 includes the acceleration program 302, or the function, operations and logic of the acceleration program 302. In some embodiments, the acceleration program 302 includes the network optimization engine 250 or the function, operations and logic of the network optimization engine 250. In yet another embodiment, the network optimization engine 250 is provided or installed as a separate program or set of executable instructions from the acceleration program 302. In other embodiments, the network optimization engine 250 and acceleration program 302 are included in the same program or same set of executable instructions.

In some embodiments and still referring to FIG. 3, a first program 322 may be used to install and/or execute the client agent 120, or any portion thereof, automatically, silently, transparently, or otherwise. In one embodiment, the first program 322 is a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 is designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers and the client agent 120, or any portion thereof, on the operating system of the client 102.

In some embodiments, each or any of the portions of the client agent 120—a streaming client 306, a collection agent 304, SSL VPN agent 308, a network optimization engine 250, acceleration program 302, and interceptor 350—may be installed, executed, configured or operated as a separate application, program, process, service, task or set of executable instructions. In other embodiments, each or any of the portions of the client agent 120 may be installed, executed, configured or operated together as a single client agent 120.

D. Systems and Methods for a Multiple-Tier Cache and Cache Indexing System

Referring now FIGS. 4A-4E, systems and methods for a multiple tiered caching and cache indexing system is depicted. In some embodiments, a cache management system 232 uses a memory based object index to reference or identify corresponding objects stored in disk. In one embodiment, the memory used to index object grows proportionally or in relation to growth in the size of the disk. The techniques described herein minimize, reduce or maintain the size of memory for an object index although the size of storage for storing objects is changed. These techniques allow for more optimal use of memory for object indexing while increasing or decreasing disk size for object storage.

Figure 4A:
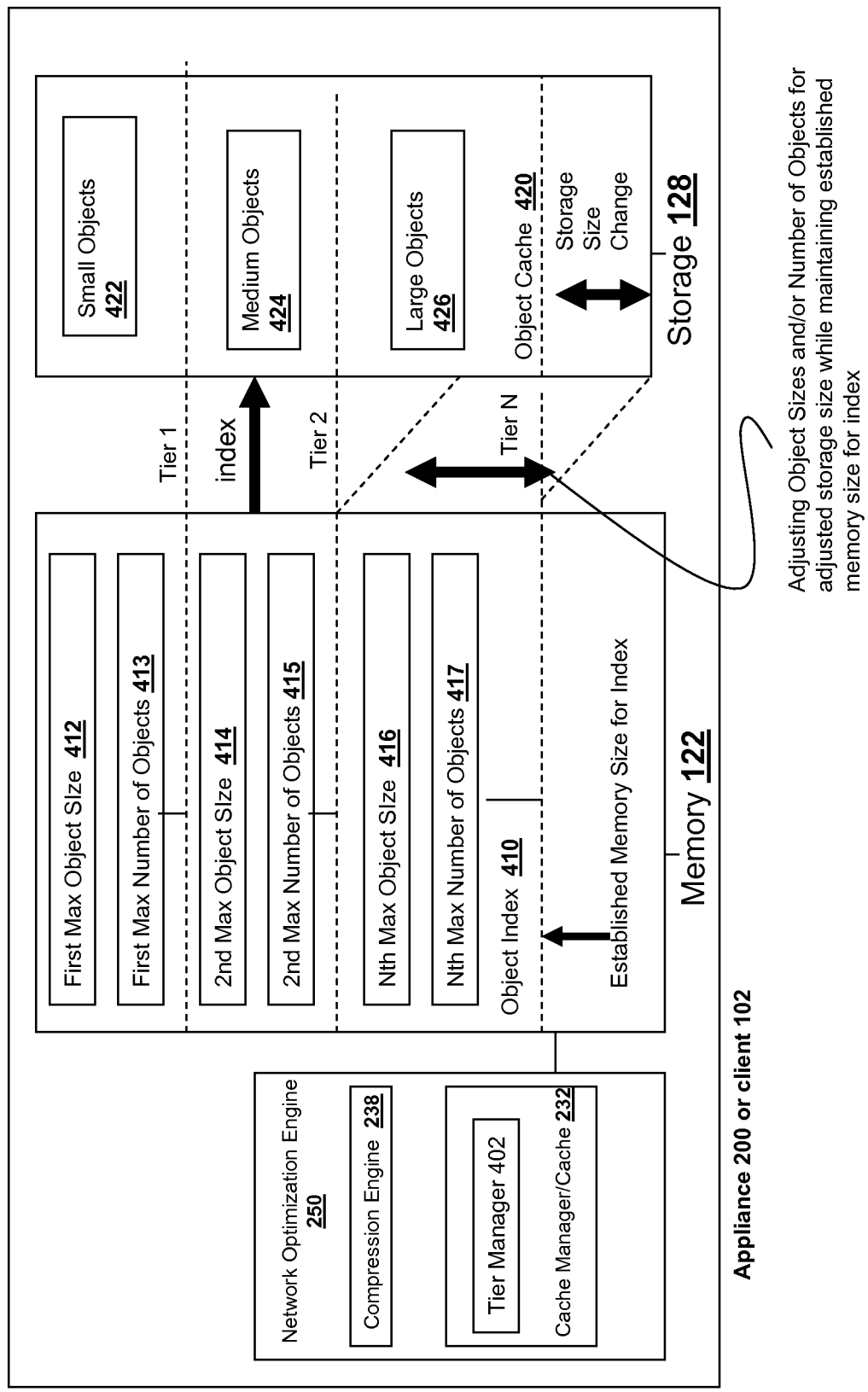
FIG. 4A is a block diagram of an embodiment of a multiple-tier cache and indexing system for maintaining the size of memory for object indexes while adjusting the size of disk storage for storing the objects.

Referring now to FIG. 4A, an example embodiment of an appliance or device having a multiple-tiered cache indexing and storage system is depicted. In brief overview, the appliance 200 includes network optimization engine having a cache manager 232 for managing an object index 410 in memory 122 which indexes objects stored in a portion storage 128 used by the cache 232. The object index 410 and/or object cache 420 of the cache 232 may be arranged into multiple tiers. The first tier has a first maximum object size 412 and a first maximum number of objects 412 for storing objects 422, referred to as small objects, in storage 128 for the object cache 420. The second tier has a second maximum object size 414 and a second maximum number of objects 415 for storing objects 424 in storage 128 for the object cache 420. The cache 232 may also include a third or nth tier having an nth maximum object size 416 and nth maximum number of objects 417 for storing objects 426, referred to as large objects 426, in storage 128 for the object cache 420. The cache manager 232 may include a tier manager 402 for managing or adjusting the maximum number of objects and object sizes for each of the tiers. The cache manager 232 and/or tier manager 402 may operate responsive to changes in size of the storage used for the object cache 232. In one embodiment, the cache manager 232 and/or tier manager 402 maintains the memory size of the object index while the size of the storage 128 for the object cache 420 is changed.

In some embodiments, the cache manager 232 establishes a first size of memory 122 to be used for or allocated to the object index 410. Any type and form of memory of the device 100 may be used for the object index 410. In one embodiment, the cache manager 232 establishes all of the available memory of a first memory element 122 for the object index 410. In another embodiment, the cache manager 232 establishes a first portion of a first memory element 122 for the object index. In some embodiments, the cache manager 232 uses either all available memory or a first portion of a first memory element 122 and all of the available memory or a second a portion of a second memory element 122'. In one embodiment, the device or appliance uses a portion of the memory 122 for other processing tasks, programs, services or processes of the device. In some embodiments, the cache manager 232 maintains a memory size or allocates fixed size or portion of memory 122 for the object index 410.

In one embodiment, the cache manager 232 establishes a size of storage 128, or a portion thereof, to be used or allocated for the object cache. Any type and form of storage may be used for the object cache, including fixed or portable disks and storage I/O devices. In some embodiments, the cache manager 232 establishes or allocates all of a first storage 128 for the object cache 410. In other embodiments, the cache manager 232 establishes or allocates a first portion of a first storage 128 and a second portion of a second storage 128' for the object cache 420. In some embodiments, the cache manager 232 establishes or allocates a portion of storage 128 for each of the tiers. In another embodiment, the cache manager 232 establishes or allocates separate storages 128, 128', 128", or portions thereof, for each of the tiers. In some embodiments, the cache manager 232 establishes a first portion of storage 128 for the object cache 420 while the device maintains any remaining portions of storage 128 for other device functionality or use.

In yet another embodiment, the cache manager 232 establishes, organizes, arranges or maintains logical storage units, referred to as "chunks" of the storage 128. The device, such as via the cache manager 232, may maintain a unique identifier for each logical storage unit and associate a size and starting and end points in storage of the "chunk". In some embodiments, the cache manager 232 assigns a first set of one or more chunks for small objects 422, a second set of one or more objects for medium objects 424, and a third set of one or more chunks for large objects 426. In some embodiments, the cache manager 232 may designed a first portion or area of a first storage 128 for small objects 422, a second portion or area of a first storage 128 or second storage 128' for medium objects 424, and a third portion or area of a first, second or third storage for large objects 426. In one embodiment, the type and form of storage used for any of the objects 422, 424, 426 may be determined or established based on access rates and the frequency of which the objects are accessed during operation of the device 100 or appliance 200.

The object index 410 comprises any type and form of indexing scheme for corresponding an index to an object in cache. In one embodiment, the object index is maintained in memory while the corresponding object is stored to disk. In some embodiments, the object index 410 comprises an entry that references or identifies a location or pointer to the object stored in the object cache 420. In one embodiment, the object index 410 uses any type of hash, checksum or fingerprinting function on a name or identifier of the object as an entry or index. In some embodiments, the object index 410 performs a hash, checksum or fingerprint on the object. In another embodiment, the entry of the object index 410 is a name or identifier of the object. In some embodiments, the value for the entry or index is a location identifier for the location in storage of the object. For example, the index value may comprises a pointer to a starting address or location of the object. In another example, the index value includes an identifier of a chunk and an offset into the chunk for the starting location of the object.

The tier manager 402 includes software, hardware or any combination of software and hardware. The tier manager 402 may include an application, program, script, library, process, service, driver, task, thread or any type and form of executable instructions. The tier manager 402 includes or provides logic, business rules, functions or operations for establishing, managing, or adjusting the number of objects and object sizes for any of the tiers of the cache. The maximum object size 412, 414 and 416 and the maximum number of objects 412, 414 and 416 may include any suitable value, such as an integer value that can range from 0 into the 100s of thousands, millions or billions of objects depending on the capacity of the device 100. In some cases, the values for these parameters may be set to some negative number or other non-useful value, such as a string, to identify the value is not to be used. In some embodiments, the values for these parameters 412, 414 and 416 and 412, 414 and 416 may be set as a function of one or more other values or parameters, such as the size of the memory 122 for the object index 410 and/or the size of storage 128 for the object cache 420. By way of example and not in any way to be limiting, the following table describes an example embodiment of a three-tier cache in view of FIG. 4B:

| Tier | Cache Object | Max Object Size | Max Number of Objects | Max Storage size |
|------|--------------|-----------------|-----------------------|------------------|
| 1 | Small | 10 KB | 200,000 | 2 GB |
| 2 | Medium | 10 MB | 100,000 | 10 GB |
| 3 | Large | 1 GB | 100 | 100 GB |

In some embodiments, the tier manager 402 may increase or decrease a maximum object size 412, 414, or 416 of an object index 410 responsive to a change in the size of memory 122 or a change in the size of storage 128 for the object cache 420. In other embodiments, the tier manager 402 may increase or decrease a maximum number of objects for an object index 410 responsive to a change in the size of memory 122 or a change in the size of storage 128 for the object cache 420. In one embodiment, the tier manager 402 maintains the maximum object size 412 and maximum number of objects 413 for a first tier while changing the other tier's object sizes 414, 416 and number of object 415, 417 upon detection of a change in the size of storage 128 for the object cache 420. In other embodiments, the tier manager 402 maintains the maximum object size 412, 414 and maximum number of objects 413, 415 of the first and second tiers in view of detecting a change in the size of storage 128 for the object cache 420. Even though the size of the storage used for a cache storage 420 is increased or decreased, the cache manager 232 may maintain the object size and number of objects for one, two or all of the tiers of the cache.

In yet another embodiment, the tier manager 402 may increase or decrease a maximum number of objects or a maximum object size for any one of the tiers responsive to operational conditions or characteristics of the device or appliance, such as a number of concurrent connections, historical information on the number and size of objects requested and/or cached, the number of cache hits, and the portions of memory and/or storage of a tier not used or having remaining space. In some embodiments, the cache manager 232 or tier manager 402 may include or provide any type and form of user interface for establishing, managing, adjusting or configuring any of the following: number of tiers, maximum number of objects and object sizes for each tier, size of memory for the object index, size of storage for the object cache. The user interface may be a graphical user interface or a command line user interface. In some embodiments, the appliance 200 or device 100 may establish, manage, adjust or configure any of the above information responsive to one or more policies of a policy engine 295.

Figure 4B:
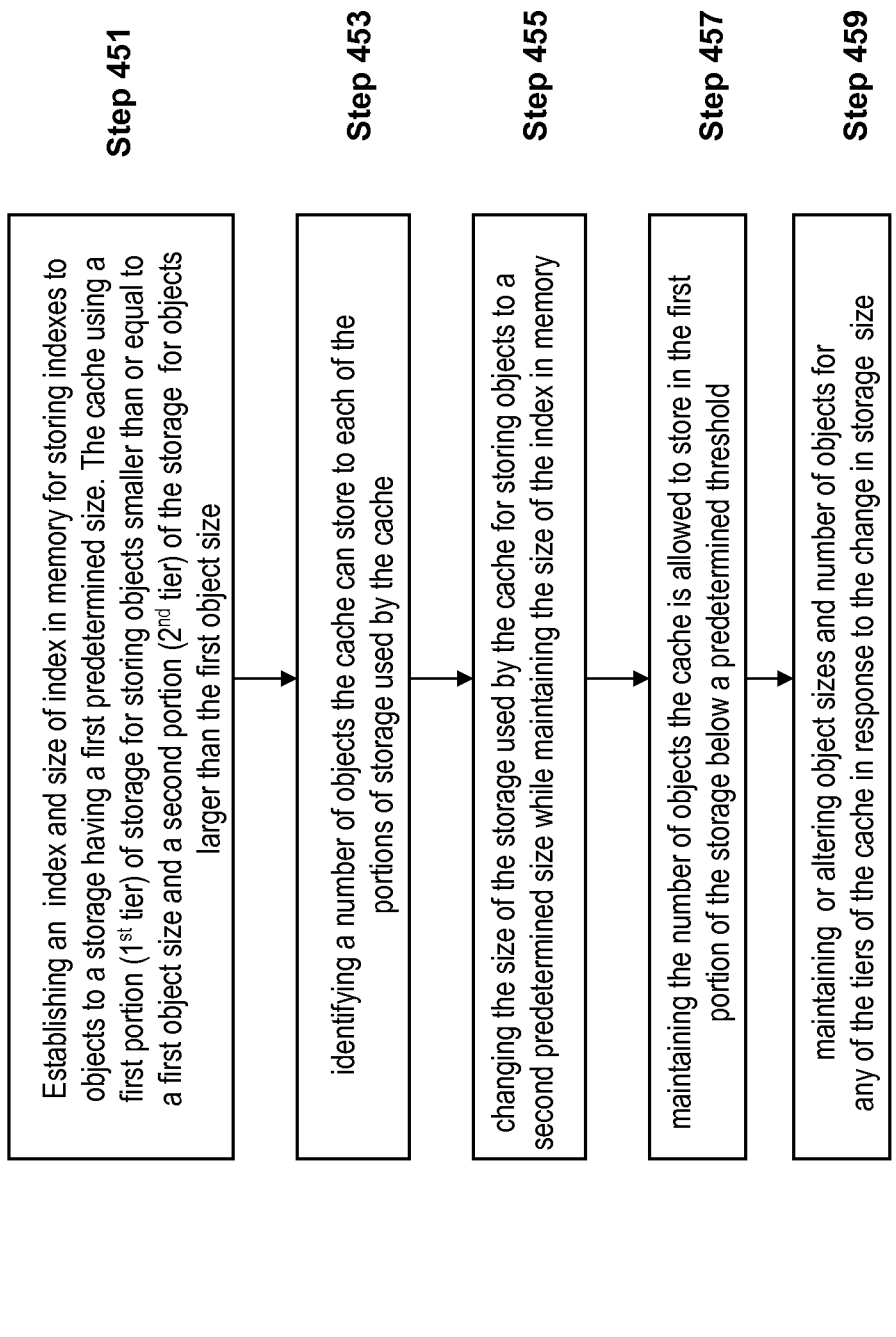
FIG. 4B is a flow diagram of steps in an embodiment of a method for maintaining the number of objects the cache is allowed to store to a portion of the cache while adjusting the size of the storage used by the cache.

Referring to FIG. 4B, an embodiment of a method 450 for managing the multiple-tier object index responsive to changes in size of storage used for the object cache is depicted. In brief overview, at step 451, the size of the object index in memory is established to a predetermined size. The object index storing indexes to objects stored to one or more portions of storage 128 having a predetermined size. The cache uses the first portion of the storage, or first tier, for storing objects smaller than or equal to a first object size and a second portion of the storage, or second tier, for storing objects larger than the first object size. At step 453, the method includes identifying a maximum number of objects the cache is allowed to store to each of the portions of storage or tiers used by the cache 232. At step 455, the size of the storage for storing cached objects is altered or changed to a second predetermined size while the size of memory for the object index remains unchanged. At step 457, the cache manager 232 maintains the maximum number of objects the cache is allowed to store to the first portion of the storage 128 or first tier below a predetermined threshold. At step 459, the cache manager 232 alters or maintains the object size and number of objects of one or more tiers of the cache in response to the change in storage size.

In further details, at step 451, the appliance 200 or cache manager 232 establishes a predetermined size of memory 122 for the object index 410. In one embodiment, the predetermined size of the object index in memory is established in relation to or proportional to a size of the storage used for the object cache 420. In some embodiments, an initial size of memory allocated to the object index 410 may represent any ratio of memory to storage used by the cache, such as 10 MB, 20 MB or 30 MB of memory for each gigabyte of storage used by the cache. In other embodiments, the cache manager 232 allocates a portion of memory for the object index 410 based on the available memory in the device. In one embodiment, the cache manager 232 allocates a percentage of available memory to the object index 410, such as 10%, 20%, 30%, 40%, 50%, 60%, 70%, 80% or 90%. In another embodiment, a user or system administrator may configure the size of memory for the object index 410 via a user interface of the device 100 or cache manager 232. In yet another embodiment, the cache manager 232 uses the size of a memory element 122 dedicated for storing the object index 410.

At step 451, the cache manager 232 establishes a first portion or storage tier used by the cache for storing objects smaller than or equal to a first maximum object size 412. The cache manager 232 also establishes a second portion or storage tier used by the cache for storing objects larger than the first maximum object size. In one embodiment, the cache manager 232 may establish and maintain two tiers. In another embodiment, the cache manager 232 may establish and maintain three tiers. In other embodiments, the cache manager 232 may establish four, five or six tiers. In some embodiments, the appliance 200 or cache manager 232 may establish any granular number of tiers, object sizes, and number of objects desirable for the operation and performance of the appliance 200.

In some embodiments, the appliance 200 or cache manager 232 provides a user interface for a user or system administrator to establish the number of tiers, and the maximum object size and number of objects for each tier. In other embodiments, the appliance 200 or cache manager 232 is configured by default or as installed or shipped with a predetermined number of tiers and predetermined maximum object size and number of objects for each tier. In yet another embodiment, an application, program or agent performs an analysis on the network environment, system environment, applications used by the system, the client and server, and number of objects used between clients and servers, and recommends the number of tiers, and the maximum object size and number of objects for each tier, or the settings for each.

At step 453, the appliance 200 and/or cache manager 232 identifies or establishes the number of objects the cache manager 232 may be allowed store to each of the portions or tiers of the cache. In some embodiments, the cache manager 232 establishes a maximum object size 412, 414, 416 and maximum number of objects 413, 415, 417 for a plurality of portions, or tiers of the cache. For example, in one embodiment, the cache manager 232 may establish a maximum object size of 10 KB 412 for the small objects 422 in the object cache 420. Further to the example, the cache manager 232 may establish that the cache 232 stores up to a maximum of 200,000 small objects 412 in the object cache 420. In some embodiments, any object greater than the first maximum object size is stored in the second tier of the cache. For example, if the object is greater than 10 KB, such as a 1M file, the object is stored as a medium object 424 in the object storage. In other embodiments, if the object is greater than the first maximum object size 412 or less than or equal to the second maximum object size 414, for example, 10 MB, the cache manager 232 stores the object in the second tier as a medium object 424. In yet another embodiment, the cache manager 232 establishes a minimum object size for the first tier. For example, if an object is less than 1 KB, the cache manager 232 does not cache the object.

Likewise, based on the number of tiers and the corresponding object size, the cache manager 232 determines the size of the object and stores the object accordingly to the appropriate tier. The cache manager 232 tracks using any type and form of tracking mechanism, including objects, counters, variables or data structures, to track the number of objects stored in each tier. If the number of objects stored to a tier reaches the maximum number of objects for the tier, the cache manager 232 either skips storing the next object to the tier or replaces an old object in storage with a new object. In some embodiments, the cache manager 232 may remove objects from the cache based on staleness, last access time, frequency of access or any other condition. In other embodiments, the cache manager 232 may refresh, update, maintain or remove objects from the cache in accordance with any one or more policies of a policy engine 295.

In some embodiments, the cache manager 232 receives an object that has a size exceeding a maximum threshold of the cache, such as the nth maximum object size 417. For example, the cache manager 232 may receive a 10 GB object that is larger than the nth maximum object size setting of 1 GB. In one embodiment, the cache manager 232 may skip storing this object to cache. In another embodiment, the cache manager 232 may dynamically establish another tier for storing objects greater than the nth maximum object size 417. In some embodiments, the cache manager 232 may segment the object into multiple portions and store the portions in one or more of the storage tiers according to the maximum object size of the tier.

At step 455, the storage used by or allocated to the object cache 420 may be changed. In one embodiment, the storage 128 is replaced with a second storage 128' having a greater or smaller storage capacity. In some embodiments, a second storage 128' is added to the device 100 to increase the storage capacity available for use as the object cache 420. In another embodiment, the appliance 200 or cache manager 232 establishes or allocates a greater or smaller portion of storage 128 for the object cache 420. In some embodiments, a user or administrator of the appliance 200 changes the size of storage allocated to use as the object cache 420. In other embodiments, the cache manager or user may change the size of one or each of the storage tiers. In yet another embodiment, a portion of storage 128 may become corrupted or otherwise not useable for the object cache 420. In these embodiments, the storage capacity of the storage 128 may be decreased.

In one embodiment, upon altering the size of the storage used for the object cache 232, the size of memory 122 for the object index may be maintained. For example, at step 451, a 10 MB object index 410 may be used for a 20 GB object store 420. The portion of storage 128 used for the object cache 420 may be increased to 40 GB but the memory size of the object index 410 maintained at 10 MB. In another embodiment, upon altering the size of the portion of storage 128 established for the object cache 232, the size of memory 122 for the object index may be decreased. For example, the size of memory for the object index 410 may be decreased from 10 MB to 5 MB although the portion of storage 128 used for the object cache maintains the same or is increased.

In yet another embodiment, the size of memory 122 for the object index may be increased or decreased but not to the same proportions or ratios to the increase or decrease of portion of the storage 128 or storage tiers used by or allocated to the object cache 420. For example, the size of memory 122 for the object index 410 may be have been set to a 1 MB to 1 GB ratio to the size of storage used for the object cache 420, such as 10 MB of memory to 10 GB of storage. The size of the storage for the object cache 420 may be doubled to 20 GB while only increasing the size of memory 122 for the object index 122 by a relatively smaller ratio, such as to 2 MB. Likewise, the size of the storage allocated to the object cache 420 may be reduced by a half to 5 GB while the size of memory 122 for the object index 122 is decreased by a higher ratio, such as to 250 KB.

At step 457, the cache manager 232, in one embodiment, maintains the maximum number of objects 412 and/or maximum size of objects 413 below a predetermined threshold in response to altering storage size of the object cache, such as the storage size of any tier. In one embodiment, although the storage size used by the cache has changed, the cache manager 232 does not change the maximum number of objects 413 or maximum object size 412 for the first tier. In another embodiment, the cache manager 234 also does not change the maximum number of objects 413 or maximum object size 414 for the second tier. In some embodiments, the cache manager 232 increases or decreases the object size 412 or number of object 413 but maintains the increase or decrease within a predetermined threshold. For example, if the storage used for the object cache 420 increased by a predetermined amount, such as 20%, the cache manager 232 increases the object size 412 or number of objects 413 for the first tier by no more than 20%.

In this manner, the cache manager 232 better leverages the object index and object storage to those objects larger the smaller objects 422 with more efficient use of memory. In some embodiments, the cache manager 232 more efficiently utilizes the second and third tiers of the cache without increasing the memory usage or increasing the memory usage of the object index 410 in a manner corresponding directly to the size of the disk adjustment. As such, the appliance 200 or cache manager 232 does not need to increase the memory size for the object index 410 because the size of the storage has increased. Accordingly, the same amount of memory for the object index 410 can be configured to support any size of storage, or storage tiers, used for the object cache 420. In some cases, this will reduce system or appliance upgrades maintenance, and configuration. A new disk can be added or to replace an old disk without changing the memory on the appliance or system. The techniques described herein also allow to use on-board memory and other types of memory not easily upgradeable or changeable. Furthermore, the device may more efficiently support or allow the use of memory and storage by other applications, systems or resources while maintaining efficient performance or use of the cache.

Depending on the size of the first maximum object size 412, the number of smaller objects 422 stored in the object cache 420 may grow significantly without using much more storage. For example, 100,000 smaller objects of 10 kb or less take up less than 1 GB of storage 128. In some embodiments, however, the smaller cached objects 422 have a lesser effect on reducing bandwidth and response time than the medium objects 424 or larger objects 426. That is, in some embodiments, the appliance 200 or cache manager 232 would improve the reduction of network bandwidth and/or further increase response time by having more of the medium and larger objects stored in the cache to serve. Thus, in one embodiment, by maintaining or limiting the number of smaller objects 422 or first tier objects stored in the cache as the storage is increased, the appliance 200 or cache manager 232 has more storage capacity for caching medium and larger objects. In some embodiments, by maintaining or limiting the number of smaller objects 422 and medium objects stored in the cache as the storage is increased, the appliance 200 or cache manager 232 has more storage capacity for caching and serving larger objects.

At step 459, the cache manager 232 may alter or maintain any of the object sizes and number of objects for any of the tiers in response to the change in storage size used by or allocated to the object cache 420. In some embodiments, a user or administrator of the appliance 200 or cache manager 232 may configure or specify different object sizes and number of objects for each tier. In one case, the user or administrator may establish a new tier or remove a tier. In other embodiments, the cache manager 232 is designed and constructed to change the object sizes and number of objects for the tiers based on the change in the size of the storage for cache, the current number of objects and size of objects in each tier, the remaining available memory and/or storage, or any operations characteristics, such as frequency of access, number of cached hits per tier, number of missed cached opportunities and the number of concurrent users or connections.

The multiple tiered caching and index system described herein provides great flexibility and granularity in determining and managing memory and storage for caching objects to obtain desired performance based on the system's memory and disk specifications. Although generally described above in connection with an appliance 200 of FIG. 4A, the method 450 and the multiple tiered cache system may be deployed on any node in a network, such as a client 102, server 106, a second appliance 200' or another type of appliance 205'.

Figure 4C:
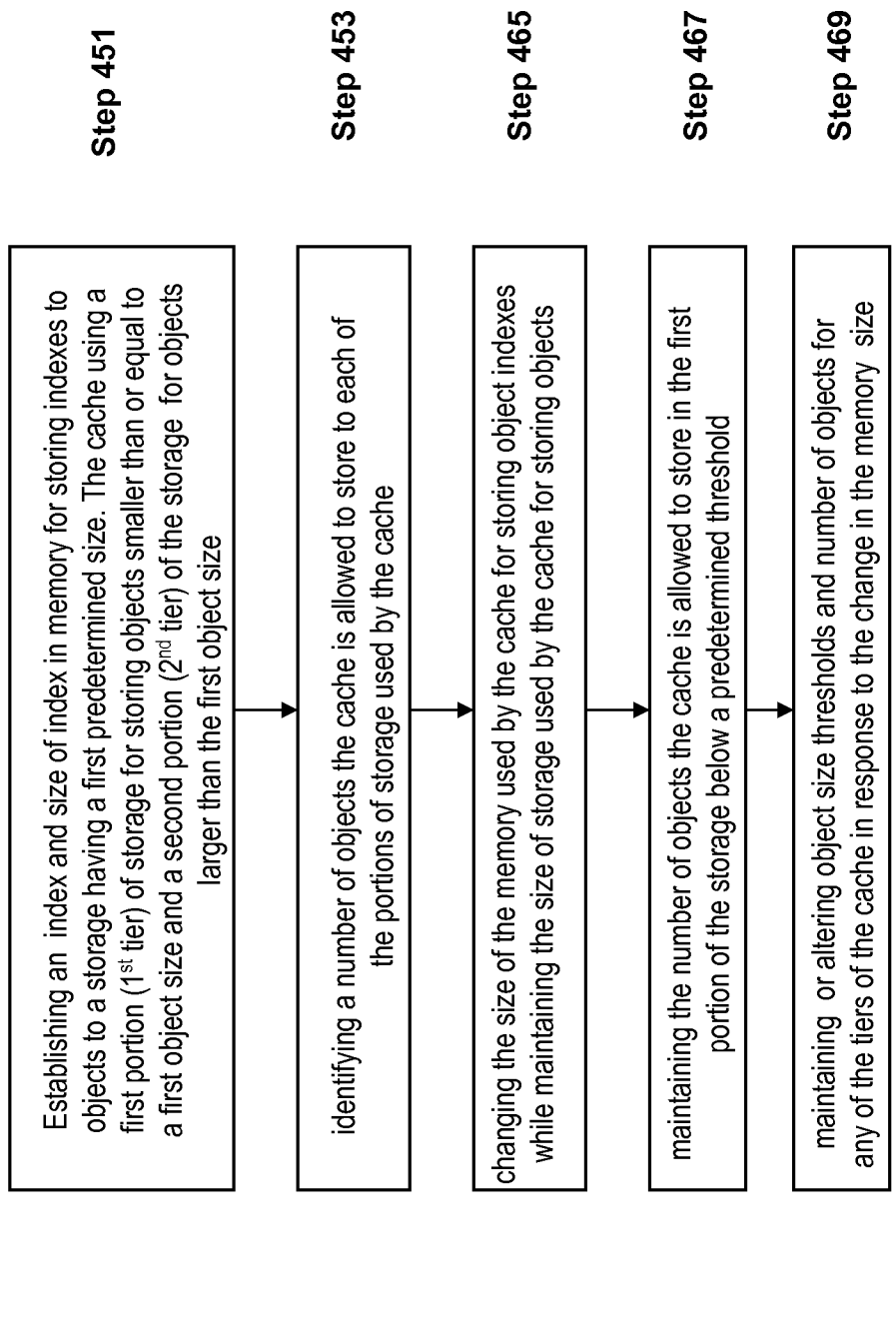
FIG. 4C is a flow diagram of steps of an embodiment of a method for maintaining the number of objects the cache is allowed to store to a portion of the cache while adjusting the size of the memory used by the cache.

Referring now to FIG. 4C, another embodiment of a method 460 for managing the multiple-tier object index responsive to changes in size of memory used for the object cache is depicted. In brief overview, at step 451, the size of the object index in memory is established to a predetermined size. The object index storing indexes to objects stored to tiers of storage used by the cache. The cache uses the first portion of the storage, or first tier, for storing objects smaller than or equal to a first object size and a second portion of the storage, or second tier, for storing objects larger than the first object size. At step 453, the method includes identifying a maximum number of objects the cache is allowed to store to each of the portions of storage or tiers used by the cache 232. At step 465, the size of the memory for used for object indexes is altered or changed to a second size while the size of storage used by the cache remains unchanged. At step 467, the cache manager 232 maintains the maximum number of objects the cache is allowed to store to the first portion of the storage or first tier below a predetermined threshold.

At step 469, the cache manager 232 may alter or maintains the object size and number of objects of one or more tiers of the cache in response to the change in memory size.

In further details, at step 451 and discussed above in conjunction with FIG. 4B, the appliance 200 or cache manager 232 establishes a predetermined size of memory 122 for the object index 410. In one embodiment, the predetermined size of memory to be used by the cache is established in relation to or proportional to a size of the storage used for the object cache 420. In some embodiments, the size of memory allocated to the object index 410 may represent any ratio of memory to storage used by the cache. In other embodiments, the cache manager 232 allocates a portion of memory for the object index 410 based on the available memory in the device. In some embodiments, a user or network administrator determines the size of memory to be used by the cache 232. For example, a user may configure the cache manager 232 to use a predetermined amount of memory.

As also discussed above in conjunction with FIG. 4B, a step 451, the cache manager 232 establishes a first portion or storage tier used by the cache for storing objects smaller than or equal to a first maximum object size 412. The cache manager 232 also establishes a second portion or storage tier used by the cache for storing objects larger than the first maximum object size. In one embodiment, the cache manager 232 may establish and maintain two, three or four or more tiers with any object sizes and number of objects desirable for the operation and performance of the cache 232.

At step 453 and as also discussed above in conjunction with FIG. 4B, the appliance 200 and/or cache manager 232 identifies or establishes the number of objects the cache manager 232 may be allowed store to each of the portions or tiers of the cache. In some embodiments, the cache manager 232 establishes a maximum object size 412, 414, 416 and maximum number of objects 413, 415, 417 for a plurality of portions, or tiers of the cache.

At step 465, the size of memory used by or allocated to the cache and/or the object index 410 may be changed. In one embodiment, the memory 122 is replaced with a second storage 122' having a greater or smaller memory capacity. In some embodiments, a second memory element 121' is added to the device 100 to increase the memory capacity available for use as the object index 410. In another embodiment, the appliance 200 or cache manager 232 establishes or allocates a greater or smaller portion of memory 122 for use by the cache. In some embodiments, a user or administrator of the appliance 200 changes the size of memory allocated to use for the object index 410. In yet another embodiment, a portion of memory 122 may become corrupted or otherwise not useable by the cache and/or object index. In these embodiments, the memory capacity available for the object index 410 may be decreased.

In one embodiment, upon altering the size of the memory used for the object cache 232, the size of storage for the object cache 420 may be maintained. For example, at step 451, a 10 MB object index 410 may be used for a 20 GB object store 420. The portion of memory 122 used for the object index 410 may be increased to 20 GB but the storage size of the object cache 420 maintained at 20 MB. In another embodiment, upon altering the size of the portion of memory 122 established for the cache 232, the size of storage for the object cache 420 may be decreased. For example, the size of storage for the object storage 420 may be decreased from 20 MB to 15 MB although the portion of memory used for the object index 410 maintains the same, is increased or decreased.

In yet another embodiment, the size of storage used for or allocated to the object cache 420 may be increased or decreased but not to the same proportions or ratios to the increase or decrease of the size of memory used by or allocated to the object index 410. For example, the size of memory used for the object index 410 may be set to a 1 MB to 1 GB ratio to the size of storage used for the object cache 420, such as 10 MB of memory to 10 GB of storage. The size of the memory used for the object index 410 may double from 20 MB to 40 MB while only increasing the size of storage for the object cache 420 by a relatively smaller ratio, such as to 1.2 GB. Likewise, the size of the memory allocated to the object index 410 may be reduced by a half to 5 MB while the size of storage for the object cache 420 is decreased by a higher ratio, such as to 250 MB.

At step 467, the cache manager 232, in one embodiment, maintains the maximum number of objects 412 and/or maximum size of objects 413 below a predetermined threshold in response to altering memory size used by the object cache. In one embodiment, although the amount of memory used by the object index 410 has changed, the cache manager 232 does not change the maximum number of objects 413 or maximum object size 412 for the first tier. In another embodiment, the cache manager 234 may not also change the maximum number of objects 413 or maximum object size 414 for the second tier in response to the change in memory used by the cache. In some embodiments, the cache manager 232 increases or decreases the object size 412 or number of object 413 but maintains the increase or decrease within a predetermined threshold. For example, if the memory used for the object index 410 increased by a predetermined amount, such as 20%, the cache manager 232 may increase the object size 412 or number of objects 413 for the first tier by no more than 20%.

In this manner, the cache manager 232 better leverages the object index and object storage to cache object with more efficient use of storage. In some embodiments, the cache manager 232 more efficiently utilizes the second and third tiers of the cache without changing the storage size used by the cache to correspond to the change in memory size used by the cache. As such, the appliance 200 or cache manager 232 does not need to increase the storage size used for the object cache 430 because the size of memory used by the object index 410 has increased. Accordingly, the same amount of storage for the object cache 420 can be configured to support any size of the object index 410, or memory used thereof. In some cases, this will reduce system or appliance upgrades maintenance, and configuration. A new memory element can be added or memory replaced without changing the storage on the appliance or system Furthermore, the device may more efficiently support or allow the use of storage by other applications, systems or resources while maintaining efficient performance or use of the cache.

At step 469, the cache manager 232 may alter or maintain any of the object sizes and number of objects for any of the tiers in response to the change in memory size used by or allocated to the object index 410. In some embodiments, a user or administrator of the appliance 200 or cache manager 232 may configure or specify different object sizes and number of objects for each tier. In one case, the user or administrator may establish a new tier or remove a tier. In other embodiments, the cache manager 232 is designed and constructed to change the object sizes and number of objects for the tiers based on the change in the size of the memory used by the cache, the current number of objects and size of objects in each tier, the remaining available memory and/or storage, or any operations characteristics, such as frequency of access, number of cached hits per tier, number of missed cached opportunities and the number of concurrent users or connections.

Figure 4D:
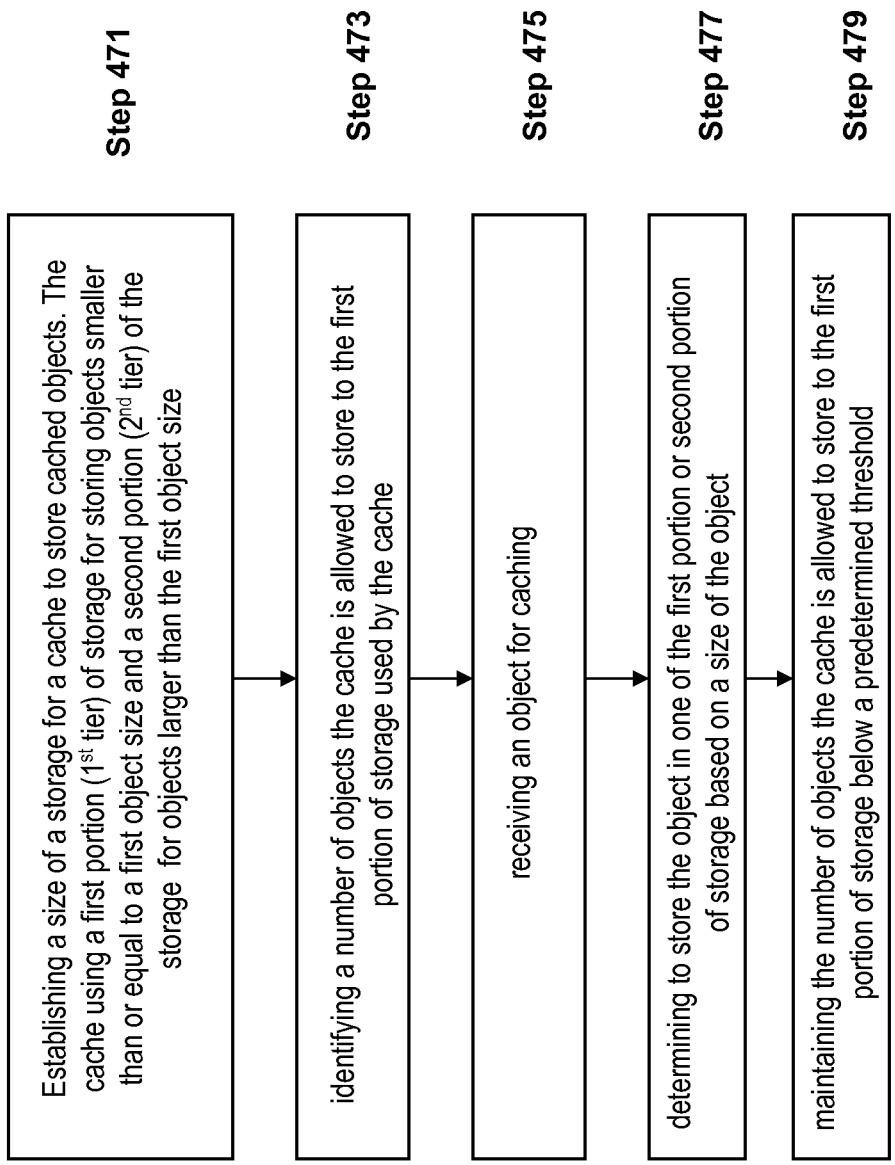
FIG. 4D is a flow diagram of steps of an embodiment of a method for determining a tier of the cache to store an object.

Referring now to FIG. 4D, an embodiment of a method of storing objects in a cache 420 using multiple storage tiers 422-426 based on the size of objects and maintaining a number of smaller objects stored to the cache within a predetermined threshold is depicted. In brief overview, at step 471, a size of a storage used for a cache 420 to store cached objects is established, where the cache 420 uses a first portion of the storage 422 for storing objects smaller than or equal to a first threshold object size 412 and a second portion of the storage 424 for storing objects larger than the first threshold object size 412 The number of objects 413 the cache 420 is allowed to store to the first portion of the storage 422 is identified at step 473. At step 475, the cache manager 232 receives an object for caching. At step 477, the cache manager 232 determines in which portion of the storage 420, the first portion 422 or the second portion 424, to store the object based on a size of the object. At step 479, the cache manager 232 may also maintain the number of objects 413 the cache 420 is allowed to store to the first portion of the storage 422 below a predetermined threshold.

In further detail, at step 471, the appliance 200 or cache manager establishes a size of a storage to use for a cache 420 to store cached objects. The cache 232 uses a first portion of the storage 422 for storing objects smaller than or equal to a first threshold object size 412 and a second portion of the storage 424 for storing objects larger than the first threshold object size 412. In some embodiments, the cache 420 resides on a client 102. In other embodiments, the cache 420 resides on an appliance 200. In one embodiment, the size of storage to be used by the cache is established in relation to or proportional to a size of the memory used for the object index 420. In some embodiments, the size of storage allocated to the object cache 420 may represent any ratio of memory to storage used by the cache. In other embodiments, the cache manager 232 allocates a portion of storage for the object cache 420 based on the available storage in the device. In some embodiments, a user or network administrator determines the size of storage to be used by the cache 232. For example, a user may configure the cache manager 232 to use a predetermined amount of storage.

At step 473, in one embodiment, the appliance or cache manager also identifies a number of objects 413 the cache 420 is allowed to store to the first portion of the storage 422. As also discussed above in conjunction with FIG. 4B, the appliance 200 and/or cache manager 232 identifies or establishes the number of objects the cache manager 232 may be allowed store to each of the portions or tiers of the cache. In some embodiments, the cache manager 232 establishes a maximum object size 412, 414, 416 and maximum number of objects 413, 415, 417 for a plurality of portions, or tiers of the cache. In some embodiments, the cache manager 232 counts the number of current objects stored in the first portion of the storage 422. In other embodiments, the cache manager 232 tracks the number of free space in the first portion of the storage 422. In some other embodiments, the appliance 200 calculates the maximum number of objects allowed in the first portion of the storage 413 in response to the amount of storage space in the first portion of storage 422.

At step 475, the appliance or cache manager intercepts or otherwise receives an object for caching. In some embodiments, the appliance intercepts the object from a page communication between a client and a server. In other embodiments, the appliance receives the object from the client agent 120. In some embodiments, the cache manager receives the object from a second appliance 200'. In still other embodiments, the appliance receives the object from the server 106.

At step 477, the appliance or cache manger determines in which portion or tier of the object cache 420 to store the object based on a size of the object. In some embodiments, the method determines that the size of the object is smaller than or equal to the first threshold object size 412 and stores the object in the first portion of the object cache 422. In other embodiments, the method determines that the size of the object is larger than the first threshold object size 412 and stores the object in the second portion of the object cache.

At step 479, the appliance or cache manager also maintains the number of objects 413 the object cache 420 is allowed to store to the first portion of the object cache 422 below a predetermined threshold. In some embodiments, the cache manager 232 determines the number of objects stored to the first tier 422 of the object cache has reached the predetermined threshold 413. In other embodiments, the cache manager 232 does not store the received object in the cache 420 based on the determination that the number of objects stored to the first portion of the storage 422 has reached the predetermined threshold 413. In still other embodiments, the cache manager 232 removes a previously cached object from the cache 420 based on the determination that the number of objects stored to the first portion of the storage 422 has reached the predetermined threshold 413, and stores the received object in the cache 420.

In another embodiment, the appliance or cache manager establishes a predetermined size of the second portion of storage 424 for storing objects larger than the first threshold object size 412. In some embodiments, the appliance or cache manager identifies a second threshold object size for storing objects in the first portion of the storage 424. In some other embodiments, the appliance or cache manager receives a second object for caching, and, in response to determining that the size of the second object is greater than the second threshold object size and less than the first threshold object size 412, the cache manager stores the second object in the first portion of the storage 422. In other embodiments, the appliance or cache manager receives a second object for caching, and, in response to determining a size of the second object is less than the second threshold object size, the cache manager does not store the second object to the cache 420.

In another embodiment, the appliance or cache manager establishes a size of memory 122 used by the cache for indexing 410 objects stored to the storage of the cache 420. In some embodiments, the cache manager maintains the size of memory 122 used by the cache 232 for indexing objects in response to a change in the size of the storage used by the cache 232.

Figure 4E:
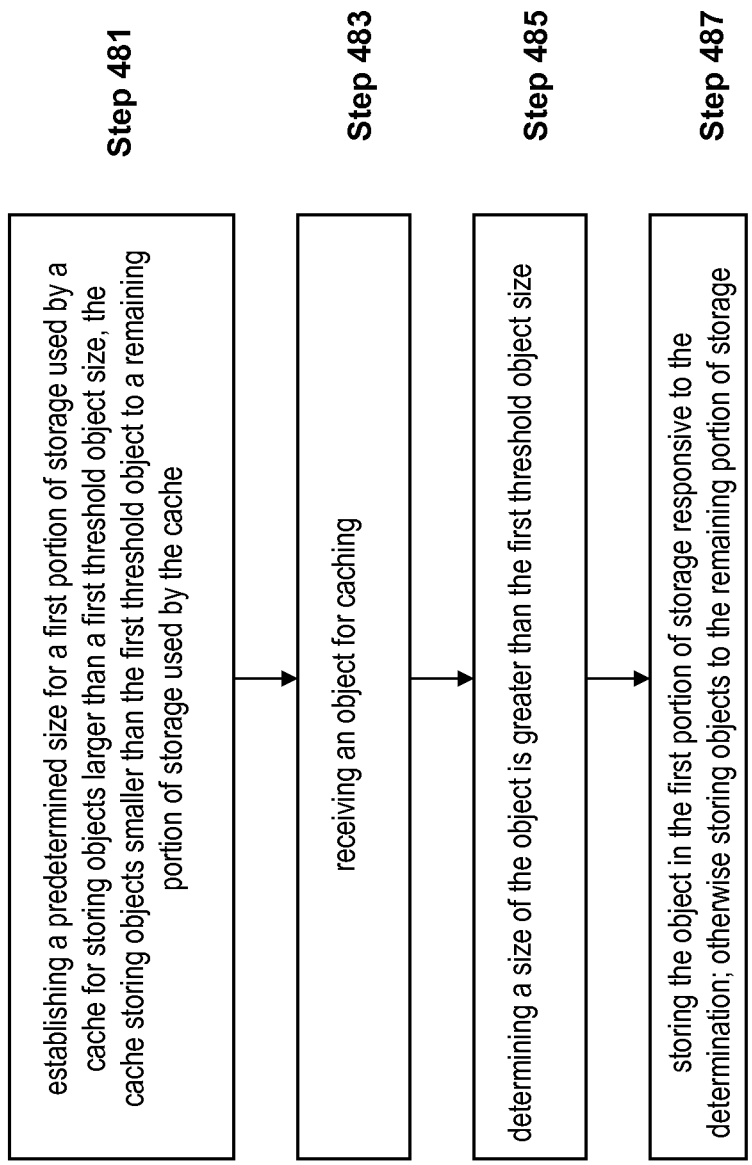
FIG. 4E is a flow diagram of steps in an embodiment of a method for storing larger objects to a storage tier of the cache and smaller objects to remaining portion of storage used by the cache.

Referring now to FIG. 4E, an embodiment of a method of storing objects in a cache using multiple storage tiers based on the size of objects and storing objects larger than an object threshold size to a portion of storage used by the cache is shown. In brief overview, the method at step 481 includes establishing a predetermined size for a first portion of storage used by a cache 232 for storing objects larger than a first threshold object size 412, the cache 232 storing objects smaller than the first threshold object size 412 to a remaining portion of storage used by the cache. At step 483, appliance or cache manager intercepts or otherwise receives an object for caching. At step 485, the cache manager 232 determines a size of the object is greater than a first threshold object size 412. In response to the determination, at step 487 the cache manager also stores the object in the first portion, or tier, of storage.

In further details, at step 481, the appliance or cache manager establishes a predetermined size for a first portion of storage used by a cache 232 for storing objects larger than a first threshold object size 412, the cache 232 storing objects smaller than the first threshold object size 412 to a remaining portion of storage used by the cache 422. In some embodiments, the cache manager maintains a number of the objects the cache 232 is allowed to store to the remaining portion of the storage below a predetermined threshold 412. In some other embodiments, the cache manager 232 determines the number of objects stored to the remaining portion of the storage has reached the predetermined threshold. The cache manager 232 may not storing a second received object smaller than the first threshold object size 412 to the remaining portion of the storage used by the cache. In some embodiments, the cache manager establishes a size of memory used by the cache 232 for holding indexes to objects stored to the object cache. In still other embodiments, the cache manager 232 maintains the size of memory used by the cache for indexing objects in response to a change in the size of the first portion of storage, or tier, used by the cache 232.

In another embodiment, the appliance or cache manager establishes a second predetermined size for the remaining portion of the storage used by the cache 232 to store objects smaller than the first threshold object size 412. In some embodiments, the cache manager determines whether the available space of first portion of storage 422 used by the cache is either at or near the predetermined size. If the available space of first portion of storage used by the cache 232 is at or near the predetermined size, the cache manager may increase the predetermined size of the first portion of storage by allocating space from the remaining portion of storage to the first portion of storage.

At step 483, the appliance or cache manager receives an object for caching. In some embodiments, the appliance 200 receives the object from the client agent 120. In other embodiments, the appliance 200 intercepts or receives the object from the server 106. In another embodiment, the appliance intercepts the object, as the object is communicated from the client 102 to the server 106. In some other embodiments, the appliance intercepts the object, as the object is communicated from the server to the client.

At step 485, the cache manager determines whether the size of the object is greater than a first threshold object size 412. The cache manager may identifying the received object's size from header information of the object. In other embodiments, the cache manager 232 computes the size of the object. In one embodiment, the cache manager 232 estimates the size of the object. In another embodiment, the appliance 200 or cache manager 232 receives the object's size via the network stack, such as via any API. The cache manager may compare the object's determined size with the first threshold object size 412

In response to the determination, at step 487, if the object's size is less than the first threshold object size, the cache manager stores the object in the first portion or tier of storage 422. If the cache manager determines that the object's size is greater than the first threshold object size, the method stores the object in the second portion or tier of storage 424.

In one embodiment, the cache manager receives a second object, and determines that the size of the second object is less than the first threshold object size 412. In some embodiments, the cache manager stores the second object to the remaining portion of storage used by the cache 232 if space is available to store the second object. In other embodiments, the cache manager determines the remaining portion of storage used by the cache 232 does not have space available to store the second object. In some embodiments, the cache manager does not store the second object to the cache 420. In still other embodiments, the cache manger removes a previously cached object from the remaining portion of storage used by cache 232 and stores the second object in the remaining portion of storage.

Figure 4F:
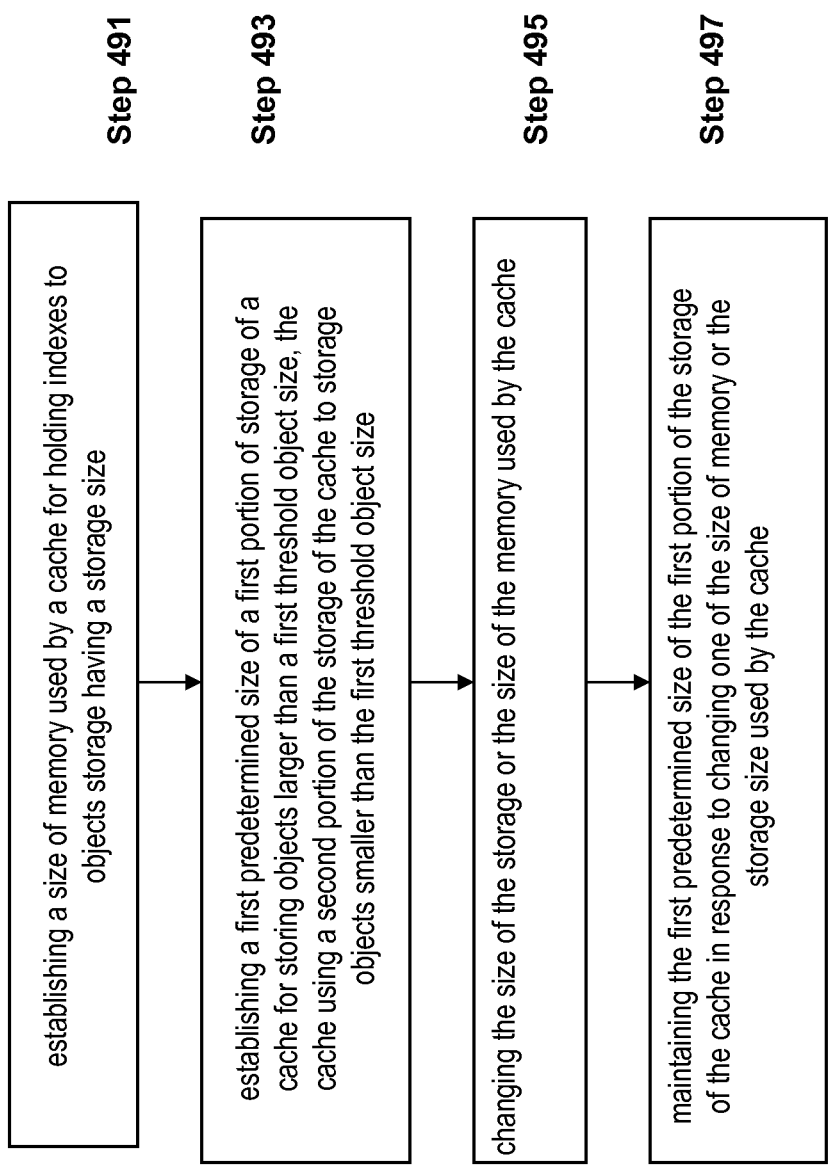
FIG. 4F is a flow diagram of steps in an embodiment of a method for maintaining a size of a storage tier used by the cache in response to changing the storage size or memory size used by the cache.

Referring now to FIG. 4F, an embodiment of a method of managing the size of objects stored in a cache using multiple storage tiers based on the size of objects is depicted. The method includes allocating a portion of storage used by the cache for storing larger objects. In brief overview at step 491, the size of memory used by a cache 232 is established for holding indexes 410 to objects stored to in the object cache. The storage used by the cache has a predetermined storage size. At step 492, the cache manager establishes a first predetermined size of a first portion of a storage used by the cache for storing objects larger than a first threshold object size. At step 492, the cache 232 uses a second portion of the storage of the cache to store objects smaller than the first threshold object size. At step 495, the size of memory or the storage size used by the cache 232 may be changed or altered. At step 497, the cache manager may also maintain the first predetermined size of the first portion of the storage used by the cache 232 in response to changing either the size of memory or the storage 128 size used by the cache.

In further detail, at step 491, the appliance or cache manager establishes the size of memory used by a cache 232 for holding indexes 410 to objects. The object indexes correspond to objects stored to an object storage. The cache manager may establish the size of memory based on the available memory of the device. In some embodiments, the cache manager may establish the size of memory based on the size of storage available to the cache.

At step 493, the appliance or cache manager establishes a first predetermined size of a first portion of a storage used by a cache 232 for storing objects larger than a first threshold object size. The cache 232 may use a second portion of the storage to store objects smaller than the first threshold object size. In some embodiments, the cache manager identifies the number of objects the cache 232 is allowed to store to the first portion of the storage At step 495, the size of memory 122 or the storage size used by the cache 232 is changed. In some embodiments, the size of memory used by the cache is changed. In other embodiments, the size of storage used by the cache is changed. In another embodiment, the size of storage and size of memory used by the cache is changes.

At step 499, the cache manager may also maintain the size of the first portion of the storage of the cache 232 in response to changing either the size of memory or the storage size used by the cache. In some embodiments, in response to changing either the size of memory or the storage size used by the cache 232, the cache manager maintains the number of objects the cache 232 is allowed to store to the first portion of the storage. In other embodiments, in response to changing either the size of memory 128 or the storage size used by the cache 232, the cache manager 232 adjusts the first threshold object size. In still other embodiments, the cache manager adjusts the number of objects the cache 232 is allowed to store to the second portion of the storage while maintaining the first predetermined size of the first portion of the storage. In some other embodiments, the cache manager adjusts the number of objects the cache is allowed to store to the first portion of the storage in response to changes in either the size of the memory or the storage size used by the cache. In other embodiments, the cache manager adjusts the number of objects the cache 232 is allowed to store to the second portion of the disk relative to an amount of change to either the size of the memory 128 or the storage size used by the cache.

In another embodiment, the cache manager establishes a second threshold object size for objects the cache 232 is allowed to store to the second portion of the storage. The second threshold object size may be smaller than the first threshold object size. In some embodiments, the cache 420 includes a third portion of the storage 128 established for storing objects smaller than the second threshold object size. In other embodiments, the cache manager adjusts the second threshold object size in response to changes in either the size of memory or the storage size used by the cache.

E. Systems and Methods for Providing Security and Reliability Techniques in Proxying Connections Referring now to FIGS. 5A and 5B, systems and methods for an appliance 200 to provide security and/or reliability to proxying a connection, such as a transport layer connection, are depicted. In one embodiment, the appliance 200 using the tagged SYN and SYN-ACK packet techniques described above in connection with the automatic LAN/WAN detection functionality can defer accepting proxying a connection request until receipt of an acknowledgement that the connection has been established. Instead of accepting responsibility to proxy or accelerate a transport layer connection upon receiving the initial SYN packet from a requestor of the connection, the appliance 200 described herein may defer responsibility for the connection until the server's SYN-ACK response packet is received and/or an end-to-end connection with the requestor has been established. This technique provides reliability and security advantages. If the server would refuse to accept the connection requested by the client, then the server may refuse to accept a connection from the appliance 200 on behalf of the client 102. If the server is not available to accept the client's connection request, then the appliance should not accept responsibility for proxying or accelerating a connection that will not be established or not be reliable.

This technique can also be applied to the application or session level sessions and connections as well as cached objects. In some embodiments, the appliance 200 can defer proxying or accelerating an application or session level connection request until a server accepts the application or session level connection and/or an end-to-end session has been established. For example, the appliance 200 may defer the protocol accelerator 234 from accelerating HTTP application traffic until an HTTP session been established with a web server 106.

In other embodiments, the appliance 200 may defer serving objects stored in a cache 232 until the appliance 200 determines the server providing the object would serve the object to the client. The appliance 200 may defer access to cached data by forwarding requests to the origin server instead and waiting until the appliance 2002 determines a successful transfer of the object has occurred or will occur. For example, the appliance 200 may serve the object from the cache upon receiving an "OK" response. In another example, the appliance 200 may receive a "Forbidden" or "Authentication Required" or "Gateway Timeout" or "Not Found" message and determine not to serve the object from the cache 232. In this way, the appliance 200 only serve object that server would authorize for transfer to the client. Also, if the server is not available to serve the object, this technique prevents the appliance 200 from serving an object which the server may not be available to server.

Figure 5A:
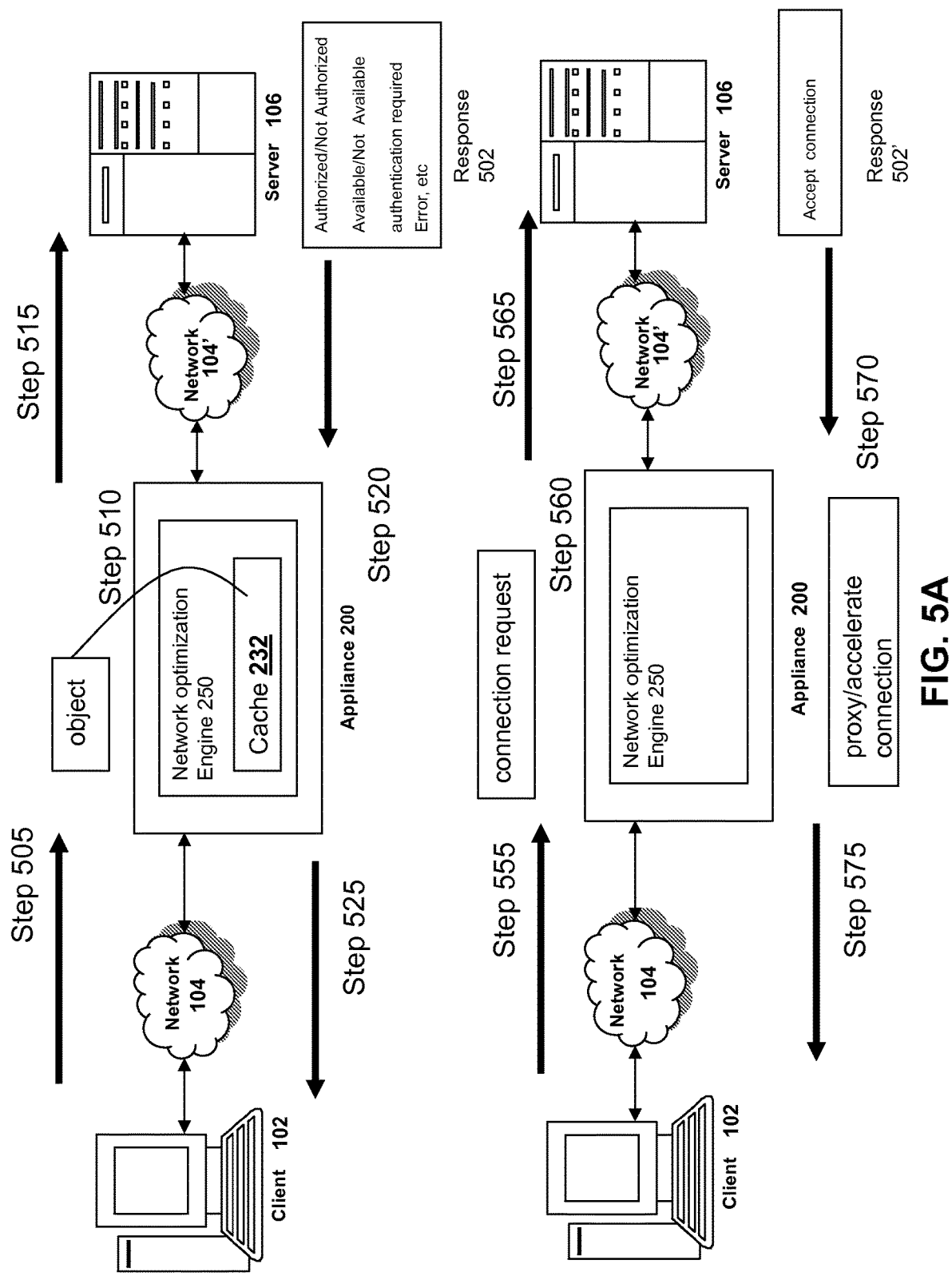
FIG. 5A is a block diagram of an example embodiment of a system used to illustrate the security and reliability techniques described in conjunctions with FIG. 5B.

Referring to method 500 of FIG. 5B in view of the bottom portion of the diagram of FIG. 5A, an embodiment of a technique for deferring responsibility for proxying and/or accelerating a connection is depicted. In brief overview, at step 505, the appliance 200 intercepts a connection request from a client 102 to a server 106. At step 510, the appliance 200 identifies the connection request and forwards the request to the destination, such as a server 106. At step 515, the appliance 200 defers acceptance of proxying and/or accelerating the connection until receiving a response from the server 106. At step 520, the appliance 200 determines whether to proxy and/or accelerate the connection based upon the response received from the server 106. At step 525, the appliance 200 proxies and/or accelerates the connection if the server accepts the connection or an end-to-end connection is established. At step 530, the appliance 200 may not proxy and/or accelerate the connection if the server does not accept the connection or an end-to-end connection is established.

In further details, at step 505, the appliance 200 may intercept or otherwise receive any type and form of connection or session request. Although generally referred herein as a connection request, for example, a transport layer connection, a connection may include session layer connections or application layer connections, which may also be referred to as sessions. In one embodiment, the appliance 200 receives a transport layer connection request from a client 102 to a server 106. In another embodiment, the appliance 200 intercepts or receives an application or session layer connection request of a client 102 to a server 106. For example, in one embodiment, the appliance 200 intercepts an ICA or RDP session request to a server 106, such as via application delivery system 290 as depicted in FIG. 2A. In another example, the appliance 200 intercepts an HTTP session request to a sever 106, such as a web server. In some embodiments, the appliance 200 intercepts the connection request transparently to the client 102 and/or server 106. In one embodiment, the appliance 200 is a transparent proxy or transparent intermediary between the client 102 and the server 106. In other embodiments, the appliance 200 is a known proxy to the client 102 and the client 102 transmits the request to the appliance 200.

At step 510, the appliance 200 identifies the intercepted communication from the client 102 as a connection request. In some embodiments, the appliance 200 determines the client 102 has transmitted a SYN packet to request a transport layer connection with a server 106. In other embodiments, the appliance 200 determines from an application or session layer of a network packet from the client 102 that the client is requesting to establish an application session with a server 106. In one embodiment, the appliance 200 determines from a session or application layer of the network packet that the client 102 is requesting an ICA or RDP session with a server 106. In another embodiment, the appliance 200 determines from a session layer of the network packet that the client 102 is requesting a Secure Socket Layer (SSL) or Transport Layer Security (TLS) session with a server. In yet another embodiment, the appliance 200 determines form an application layer of the network packet that the client 102 is requesting to establish an HTTP based session with an HTTP server.

At step 515, the appliance 200 defers performing any proxying or accelerating function of the appliance on the request or the connection of the request. The appliance 200 forwards the intercepted communication to the intended destination, or server 106. The appliance 200 may track the request and/or establishment of the requested connection in any type and form of data structure or table, such as a connection table. In some embodiments, the appliance 200 tracks whether or not a response to the forwarded request is received from the server 106. For example, in some embodiments, the server 106 may be down and the request times out.

In one embodiment, the appliance 200 defers proxying and/or acceleration the connection request only for a first connection request from a user or client. In other embodiments, the appliance 200 defers proxying and/or accelerating the connection for each connection request from a user or client. In yet other embodiments, the appliance defers accepting the connection for proxying or accelerating if the request is received from a client or user that has not requested the connection before. In still further embodiments, the appliance defers proxying or accelerating the connection if the request is received from the same user or client or a different user or client exceeds a predetermined time threshold of a previous connection request. In yet another embodiment, the appliance defers proxying or accelerating a connection request between a client and server previously proxied or accelerated by the appliance upon detection of a security or reliability issue. For example, the appliance 200 may detect the server 106 was unavailable at a time between connection requests. In another example, the appliance 200 may have detected a security breach or violation to the server from the same client or another client.

At step 520, the appliance 200 determines whether to proxy and/or accelerate the connection based upon the response received from the server 106. In one embodiment, the appliance 200 receives a response from the server indicating the server accepts or has accepted the client's connection request. For example, in the case of a transport layer connection request, the appliance 200 receives or intercepts a SYN-ACK packet transmitted by the server 106 to the client 102. In another example, the appliance 200 receives or intercepts an HTTP OK message in response to a session request. In a further example, the appliance 200 receives or intercepts the next expected response in a multiple transaction handshake between a client and server, such as for SSL. In some embodiments, the appliance 200 intercepts a response from the client of the server's response to the client's connection request. In one embodiment, the appliance 200 determines to accept responsibility for the connection only if the client 102 accepts the server's response to the client's connection request.

In some embodiments, the appliance 200 receives a response from the server 106 that the server does not accept the connection. In one embodiment, the appliance 200 receives a message indicating there was an error with the connection request. In another embodiment, the appliance 200 receives a message from the server 106 indicating that the server 106 does not authorize a connection from the client 102 or a user of the client 102. In some embodiments, the appliance 200 receives a message from the server 106 indicating that the server requires authentication of the client or user of the client 102 before establishing the connection. In yet another embodiment, the appliance 200 receives a message that the server 106 is too busy to accept the connection, has reached a maximum number of connections or is otherwise not allowing any more connections.

In still further embodiments, the appliance 200 receives a network packet or message indicating the request to the server has timed out. In another embodiment, the appliance 200 receives a network packet or message indicating the server is not reachable or is not routable via a network. In yet another embodiment, the appliance 200 does not receive any response from the server to the request. In one embodiment, the appliance 200 determines the request to the server has not be been responded by the server within a predetermined time threshold, and thus, identifies the server as down or otherwise unavailable.

If the appliance 200 receives an indication the connection or session has been accepted by the server or that an end-to-end connection or session between the client and server has been established, then, at step 525, the appliance 200, in one embodiment, accepts responsibility to proxy the connection. In some embodiments, the appliance 200 determines to perform any acceleration or proxying technique on the connection. For example, the appliance 200 may perform any of the flow control, transport control protocol optimization, acceleration, the compression and/or caching techniques described herein. In other embodiments, the appliance 200 may perform a first one or more proxying or acceleration technique of a plurality of techniques before receiving the server's acceptance of the connection or session or detecting an end-to-end connection or session has been established. Then, upon detecting the acceptance or establishment of the connection or the session, the appliance 200 may perform a second set of one or more additional proxying or acceleration techniques of the plurality of techniques.

If the appliance 200 receives an indication the connection or session has not been accepted by the server or that an end-to-end connection or session between the client and server has not been established, then the appliance 200, at step 530, may determine not to accept responsibility for proxying a connection or session between the client and server 106. In some embodiments, the appliance 200 continues transparently to intercept and forward communications between the client and the server without performing any functionality to the intercepted communications. In one embodiment, the appliance 200 may perform a first one or more proxying or acceleration techniques on the connection or session until receipt from the server that the server has not accepted the connection or session. In response, the appliance 200 may either stop performing the first ser of one or more proxying/acceleration techniques or determine not to perform any additional proxying or acceleration techniques.

Referring now to method 550 of FIG. 5B in view of the top portion of the diagram of FIG. 5A, an embodiment of a technique for deferring serving a cached object until security and/or reliability of serving the object can be can be determined from the server. In brief overview, at step 555, the appliance 200 intercepts or otherwise receives a request for an object from a client 102 to a server 106. At step 560, the appliance 200 determines the object is stored in a cache, such as a cache 232 of the appliance. At step 565, the appliance 200 defers providing the object from the cache until receiving a response for the object forwarded by the appliance to the server 106. At step 570, the appliance 200 determines whether to server the object from the cache based upon the response received from the server 106. At step 575, the appliance 200 determines to the serve the client the cached object. At step 580, the appliance 200 determines not to serve the object from the cache.

In further details, at step 555, the appliance 200 may intercept or otherwise receive any type and form of request for an object from a server. In one embodiment, the appliance 200 intercepts a transport layer network packet having a payload identifying a request for an object. In another embodiment, the appliance 200 intercepts application layer network traffic and identifies a request for an object in the application layer data. For example, in some embodiments, the appliance 200 intercepts network packets and determines that the network packets include an HTTP request for an object. In other embodiments, the appliance 200 may receive a request from the client 102 for an object in a cache, such as the cache 232 of the appliance 200.

At step 560, the appliance 200 determines the object identified by the request is stored in a cache. In one embodiment, the appliance 200 identifies, parses, extracts or otherwise determines a name or identifier of the object of the request, such as the uniform resource locator of the request. In some embodiments, the appliance 200 uses an index comprising a hash of the name or identifier of the object to determine if the object exists in the cache. In one embodiment, the cache index may be maintained in memory while the cached object is stored on a disk of the appliance 200. In other embodiments, the cache manager 232 determines if the object exists in the cache by a query or any other means the cache manager uses for tracking the location or existence of object in a cache. In some embodiments, the cache 232 resides on the appliance 200. In other embodiments, the cache 232 is located on another device 100, such as an appliance 200', 205 or server 106. In further embodiments, the appliance 200 may transmit a message or request to a cache manager on the appliance or another device 100 to determine if the object exists or is located in the cache.

At step 565, the appliance 200 defers providing the object from the cache until receiving a response for the object forwarded by the appliance to the server 106. In one embodiment, although the object is located in the cache, the appliance 200 forwards the request for the object to the intended destination or server 106. In some embodiments, the appliance 200 waits for a response to the request from the server before serving the object located in the cache or before deciding to serve the object found in the cache. In another embodiment, the appliance 200 does not forward the client's request but instead generates a second request or packet for a status of the object, header information of the object or a conditional request for the object. In still other embodiments, the appliance 200 generates a second request or packet to determine if the server is available, reachable or otherwise able to serve the object.

In some embodiments, the appliance 200 defers serving the object from the cache only for the first request for the object from a user or a client. In other embodiments, the appliance 200 defers serving the cached object for each request from a user or client. In yet other embodiments, the appliance defers serving the cached object only if the request is received from a client or user that has not requested the object before. In still further embodiments, the appliance defers serving the cached object if the request is received from the same user or client or a different user or client after expiration of a predetermined time threshold of a previous request for the object. In yet another embodiment, the appliance defers serving a cached object to a client to which the appliance previously served the same object or upon request of a different object if the appliance detects or has detected a security or reliability issue. For example, the appliance 200 may defer serving a cached object if the appliance has detected the server 106 was unavailable at a time between object requests. In another example, the appliance 200 may defer serving a cached if the appliance has detected a security breach or violation to the server from the same client or another client.

At step 570, the appliance 200 determines whether to serve the object from the cache based upon the response received from the server 106. If the server provides a response indicating the server would transfer the object to the client, is available to the serve the object, or authorizes or allows the client or user of the client to receive the object, then at step 575, the appliance 200 serves the object from the cache in response to the client's request. If the server provides no response or a response indicate the server is not available, the server would not transfer the object to the client, or the server does not allow or authorize the client or user of the client to receive the object, then at step 580, the appliance 200 does not serve the object from the cache in response to the client's request.

In one embodiment of step 575, the appliance 200 receives a portion of the transfer of the object to the client indicating that the server is transmitting the object to the client. Upon receipt or interception of this portion of the transfer, the appliance 200 may respond to the client's request with the object stored in the cache. In some embodiments, upon intercepting or receiving an HTTP OK indicator of an HTTP object transfer of an HTTP object request, the appliance 200 transmits a response to the client's request using the object stored in cache instead of the object currently being received by the appliance 200. For example, the protocol accelerator 234 of the network optimization engine 250 may be HTTP aware to identify an HTTP transfer of the object, including any leading header or status information. In another embodiment, the appliance 200 waits for a complete transfer of the object from the server to be intercepted or received by the appliance 200. For example, the appliance 200 may wait for the complete transfer of the object upon a second request for the object or a request for the object after a predetermined time threshold. In one embodiment, upon a complete or successful transfer of the object received by the appliance, the appliance 200 responds to the client's request with the cached object. In some embodiments, the appliance 200 responds to the client's request with the object received from the server 106. In another embodiment, the appliance 200 responds to the client's request with the cached object and updates the cached object based on the object received from the server.

In some embodiments, the appliance 200 receives a response indicating the server is available or the server is reachable on the network. Upon receipt of such a response, the appliance 200 in one embodiment serves the object from the cache in response to the client's request. In another embodiment, the appliance 200 may receive a response from a conditional request for the object that the object has not changed. Upon receipt of this response, in another embodiment, the appliance 200 transmits a response to the client's request with the cached object. In some embodiments, the appliance 200 may receive a response from a conditional request for the object that the object has changed and the response includes an updated version of the object. Upon receipt of this response, in other embodiments, the appliance 200 may transmit a response to the client's request with the cached object or with the updated version of the object. In still other embodiments, the appliance 200 may forward the server's response to the client without the cached object. In yet other embodiments, the appliance 200 may forward the server's response to the client with the cached object.

At step 580, the appliance 200 determines not to serve the object from the cache. In one embodiment, the server 106 transmits a response that the client or user of the client is not allowed or authorized to receive the object. In some embodiments, the server transmits a response that the client or user of the client requires authentication before receiving the object. In some embodiments, the server 106 transmits a response that the server no longer has the object or the object is no longer valid. In still other embodiments, the server 106 does not send a response or otherwise the appliance 200 determines the request to the server for the object or status of the object has timed out. In another embodiment, the appliance 200 receives a response indicating the server is not available or is not reachable. In other embodiments, the appliance 200 receives a response indicating the server is too busy to server the object or is not accepting any more requests at this time. In any of these embodiments, the appliance 200 may choose not to serve the object from the cache in response to the client's request. In some embodiments, the appliance 200 forwards the server's response to the client 102 instead of the object from the cache. In one embodiment, the appliance 200 via cache manager 232 removes the object from the cache. In another embodiment, the appliance 200 via cache manager 232 expires the object in the cache.

Any of the techniques or portions thereof, of method 500 and 550 described above may be performed together in the same appliance 200 or in a plurality of appliances acting in conjunction or cooperation with each other. In some cases, one appliance 200 may perform method 500 while a second appliance 200' may perform method 550.

Furthermore, the determination of proxying or accelerating a connection or for caching objects in method 500 or method 550 may be identified, specified or configured via a one or more policies of a policy engine 295 of the appliance 200 or server 106. For example, the policy engine 295 may specify the type or content of server responses or other conditions for which the appliance 200 should proxy or accelerate a connection or serve a cached object.

In yet other embodiments, the appliance 200 may make a determination on proxying, accelerating or caching in accordance with the techniques of methods 500 and 550 based on information from any end point detection and authorization. For example, as described in connection with FIG. 3, a collection agent 302, or client agent 120, may transmit a variety of information identifying a status, condition, operation, attribute, profile or characteristic of the client 102. The appliance 200 may determine when and how to defer and accept to proxy, or accelerate a connection or when and how to defer and server a cached object in accordance with the techniques of method 500 and 550 based on this end point detection information. Additionally, the appliance 200 may use a combination of policies and end point detection information to determine when and how to defer and accept to proxy and/or accelerate a connection or when and how to defer and serve a cached object.

F. Systems and Methods of Performing Parallel Revalidation of Cached Objects

Figure 6A:
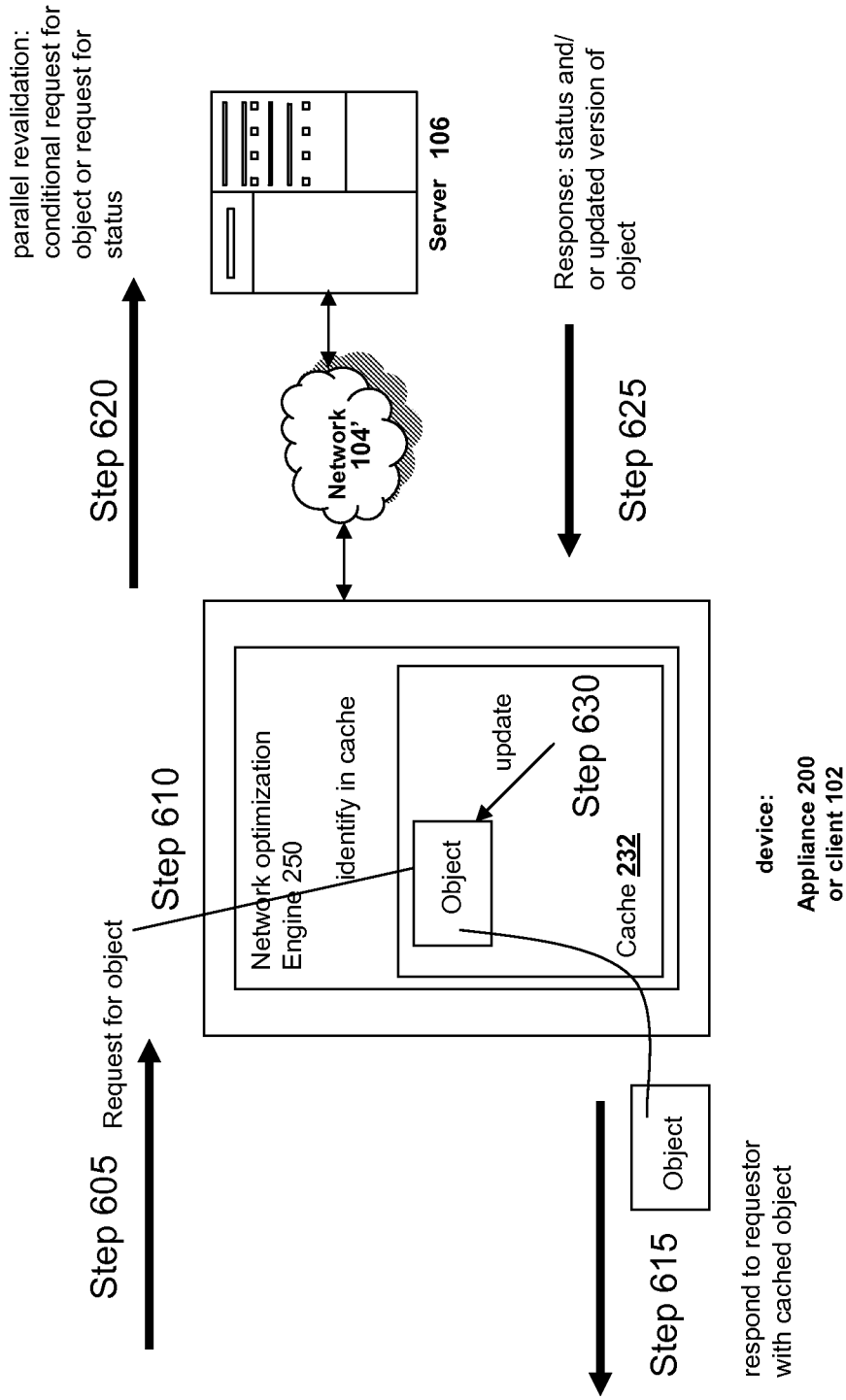
FIG. 6A is a block diagram of an example embodiment of a system for illustrating the parallel revalidation technique of cached objects as described in conjunction with FIG. 6B.
Figure 6B:
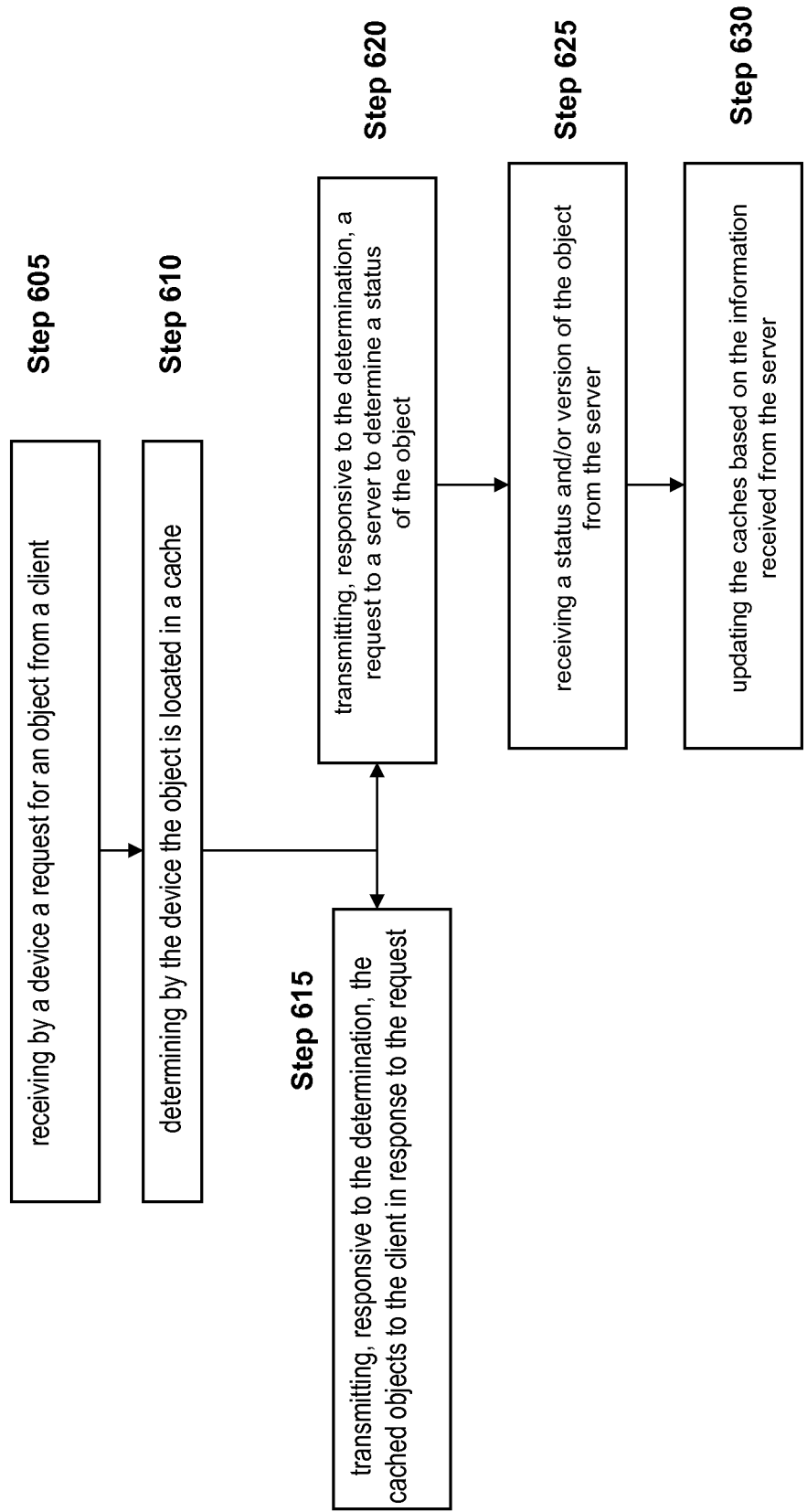
FIG. 6B is a flow diagram of steps of an embodiment of a method to perform a parallel revalidation technique of a cached object.

Referring now to FIGS. 6A and 6B, systems and methods for performing a technique referred to as parallel revalidation are depicted. This parallel revalidation technique minimizes the problem of serving outdated data in the cache considered fresh as its freshness period has not expired although the object is outdated on the server. When serving a cached object to a client request, the cache may not be aware that the object has changed on the originating server. The cache may serve the object multiple times while the freshness period has not expired. With the parallel revalidation technique described herein, the cache revalidates the object with the originating server in parallel with serving the cached object in response the request. For example, if the object in the cache is still considered fresh, the cache serves the object to the client immediately, but, in parallel, the cache also transmits a conditional request to the server. If the object has changed after all, the cache gets an updated copy in response to the conditional request, and future object requests will get the updated object in the cache. Otherwise, you get a response that reports that it has not been modified.

FIG. 6A depicts an example embodiment of an appliance based system for serving and revalidating an object in a cache. Although this technique will be described generally in reference to a cache of the appliance 200, this technique as described in conjunction with FIG. 6B can be performed by any device having a cache, such as the client 102 or another intermediary device, such as device 205.

Referring now to FIG. 6B, an embodiment of a method 600 of parallel revalidation is depicted. In brief overview, at step 605, the appliance 200 intercepts or otherwise receives a request for an object from a client 102. At step 610, the appliance 200 identifies the object of the request and determines the object is located in the cache 232. At step 615, the appliance 200 transmits, in response to the determination, the cached object to the client. At step 620, also in response to the determination, the appliance transmits a request for a status the object from an originating server. The appliance may serve the object at step 615 and transmit a request at step 620 substantially simultaneously to each other. At step 625, the appliance 200 receives a status of the object or an updated copy of the object from the server. Based on the response from the server, the appliance 200 updates the cache accordingly. If the object has changed, the appliance 200 stores the updated object to the cache 232.

In further detail, at step 605, the appliance 200 intercepts or otherwise receives any type and form of request for an object from a client 102. In one embodiment, the appliance 200 intercepts a request for an object via an application layer protocol. For example, in some embodiments, the appliance 200 intercepts an object request via the HTTP protocol. In one embodiment, the protocol accelerator 234 of the network optimization engine 250 is HTTP aware and identifies an object request over HTTP from the client 102. In yet another embodiment, the client requests via a transport layer connection an object from the appliance 200 or cache 232.

At step 610, the appliance 200 the appliance 200 determines the object identified by the request is stored in a cache. In one embodiment, the appliance 200 identifies, parses, extracts or otherwise determines a name or identifier of the object of the request, such as the uniform resource locator of the request. In some embodiments, the appliance 200 uses an index comprising a hash of the name or identifier of the object to determine if the object exists in the cache. In one embodiment, the cache index may be maintained in memory while the cached object is stored on a disk of the appliance 200. In other embodiments, the cache manager 232 determines if the object exists in the cache by a query or any other means the cache manager uses for tracking the location or existence of object in a cache. In some embodiments, the cache 232 resides on the appliance 200. In other embodiments, the cache 232 is located on another device 100, such as an appliance 200', 205 or server 106. In further embodiments, the appliance 200 may transmit a message or request to a cache manager on the appliance or another device 100 to determine if the object exists or is located in the cache.

Based on determining that the object exists or is located in the cache, the appliance transmits the, the cached object to the client 102 in response to the client's request at step 615 and at step 620, also transmits a request for a status the object from an originating server. In one embodiment, the appliance serves the object at step 615 and transmits a request for a status of the object at step 620 substantially simultaneously or concurrently to each other. In another embodiment, the appliance serves the object at step 615 and transmits a request for a status of the object at step 620 in parallel to each other. In other embodiments, the appliance transmits the request for a status of the object at 620 prior to serving the cached object to the client at step 615. In one embodiment, the appliance serves the cached object to the client at step 615 before transmitting the request for the status of the object at step 620.

In some embodiments, the appliance 200 executes code or executable instructions for transmitting the request to the server for a status of the object is executed immediately before or after the executable instructions to serve the object from the cache to the client 102. In other embodiments, the executable instructions for serving the cached object to the client 102 execute in a separate process, service, driver, task or thread and at the same time as or concurrently with the executable instructions in a process, service, driver task or thread for requesting the status of the object from the server. In some embodiments, the transmission of the cached object to the client at step 615 occurs within a predetermined time period of the transmission of the request of the status of the object to the server at step 620, or vice-versa. The predetermined time period may be configurable and set by the appliance. In some embodiments, the predetermined time period may be set in the order of milliseconds or based on a packet processing timer of the packet processing engine. For example, the predetermined time period may be 1 ms, 2 ms, 3 ms, 4 ms, 5 ms, 10 ms, 25 ms, 50 ms or 100 ms. In other examples, the predetermined time period may be any value between 1 ms and 1 second.

In some embodiments, the appliance 200 at step 620 transmits a status of the object. In one embodiment, the appliance 200 transmits the request via an application layer protocol, such as HTTP. In other embodiments, the appliance 200 transmits a conditional get of the object. For example, the appliance 200 transmits a conditional HTTP get request. In yet another embodiment, the appliance 200 transmits a request to obtain the current version of the object from the server 106. In one embodiment, the appliance 200 forwards to the server the request of the client intercepted by the appliance.

At step 625, the appliance 200 receives a status of the object or an updated copy of the object from the server. In one embodiment, the appliance 200 receives a status that the object has not changed. In another embodiment, the appliance 200 receives a status that the object has changed. In some embodiments, the status indicates an identifier of a version of the object. In other embodiments, the appliance 200 receives an updated copy of the object. In yet another embodiment, the appliance 200 receives those portions of the object has changed instead of an entire updated copy of the object. Based on the response from the server, the appliance 200 updates the cache accordingly. If the object has changed, the appliance 200 stores the updated object or the changes to the object to the cache 232. In some embodiments, the appliance 200 updates the version information of the object in the cache 232. In another embodiment, the appliance 200 updates the expiration period for the cached object. In other embodiments, the appliance 200, for example, via the cache manager 232, updates the status of the object in the cache to indicate the object is fresh or up-to-date.

In one embodiment, while revalidating the cached object in parallel to serving the cached object to a first requests for the object, the appliance 200 receives a second request for the object from the same client 102 or a different client 102'. In some embodiments, the appliance 200 performs a second revalidation of step 620 in response to the second request. In other embodiments, the appliance 200 is aware the revalidation of the first request of the object has recently occurred or is occurring and does not transmit a request for a status of the object to the server in response to the second request. In another embodiment, the appliance 200 in response to the second request determines the remaining period of the expiration of the cached object in within a predetermined threshold and in response to the determination, the appliance 200 does not transmit a request for a status of the object. In some embodiments, the appliance 200 in response to the second request determines the remaining period of the expiration of the cached object exceeds a predetermined threshold and in response to the determination, the appliance 200 transmits a request for a status of the object. In still another embodiment, the appliance 200 serves the object received from the server at step 625 in response to the first request and serves the received object to the client in response to the second request.

As mentioned above, the techniques of method 600 may be performed on any device although generally described in connection with the appliance 200. In one embodiment, a client agent 120 having the network optimization engine 250 discussed herein in conjunction with FIG. 3 may perform the techniques of method 600. In other embodiments, the techniques of method 600 may be performed on any device in the network path between a client and a server, including either the client or server or a second appliance 200' or 205'. In some embodiments, the cache management functionality may reside on a first device, such as the client 102 or appliance 200 while the cache storing the object resides on a second device, such as a server 106, or second appliance 200' or 205.

Furthermore, the appliance 200 may determine which objects to perform parallel revalidation based on one or more policies of a policy engine 295. A policy may identify objects to serve and revalidate based on one or more of the following: 1) the size of the object, 2) the type or identifier of object, 3) the client requesting the object or any attributes or characteristics of the client 4) the server originating the object or any attributes or characteristics of the server 5) the user or group of the user, 6) the remaining time period of the cached object, and 7) frequency of object updates.

G. Systems and Methods of Providing Speculative QoS to Prefeshening/Prefetching Objects Referring now to FIGS. 7A and 7B, systems and methods for techniques of providing Quality of Service (QoS) to speculative prefetching of objects are depicted. As the appliance 200 described herein has the ability to determine the link speed of a network connection as well as allocating bandwidth and controlling flow of network traffic in real time provides an advantage in performing QoS for prefetching. Since speculative requests compete with real requests or other requests from clients to servers, the techniques described herein provides a mechanism for prefetching objects to better utilize idle bandwidth and reduce network contention with non-prefetching requests. The technique tags, encodes or otherwise identifies prefetching requests as speculative so that an appliance transmits the request as a lower priority than other request and when idle bandwidth is available.

Figure 7A:
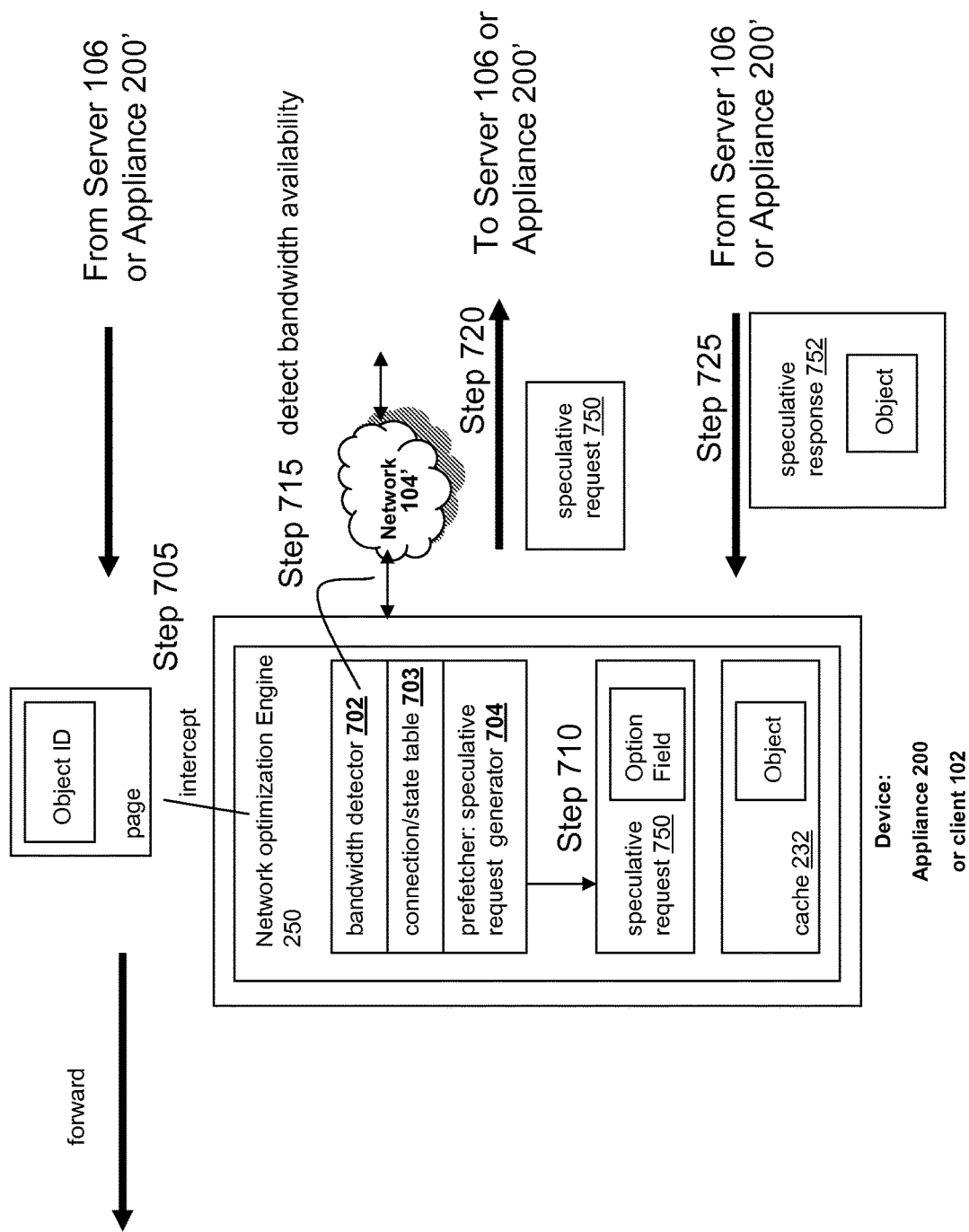
FIG. 7A is a block diagram of an example embodiment of a system for illustrating the QoS prefeshening technique of cached objects as described in conjunction with FIG. 7B.

Referring now to FIG. 7A, an appliance 200 having a network optimization engine 250 is depicted. In brief overview, the appliance 200 intercepts or otherwise receives communications, such as pages served from an originating server 106 or transmitted via another appliance 200' and forwards the page to the requesting client. The intercepted page may identify one or more objects, for example via uniform resource locators or hyperlinks. The appliance via the prefetcher 704 generates a speculative request 750 to obtain the object from a remote server 106. The request may be considered a prefetch in that the user receiving the page may have not yet requested the object identified by the page but the appliance 200 requests the object in anticipation of intercepting a request for the object from the user. The request is identified as speculative to indicate to a transmitter or the appliance that the request has a lower priority for transmission than non-speculative requests. The appliance 200 includes a bandwidth detector 704 that detects idleness or availability of bandwidth of one or more network connections of the appliance 200. In response to the bandwidth detector 702 detecting bandwidth availability, the prefetcher 704 transmits the speculative request to prefetch the object to the originating server 106. In some embodiments, the appliance 200 depicted in FIG. 7A is used for accelerating application protocol layer traffic such as HTTP traffic.

The network optimization engine 250, or any portion thereof, such as the protocol accelerator 234, may include the bandwidth detector 702. The bandwidth detector 702 may include software, hardware or any combination of software and hardware. The bandwidth detector 702 may comprise an application, program, script, library, process, service, driver, task, thread or any type and form of executable instructions. The bandwidth detector 702 includes or provides logic, business rules, functions or operations for determining an availability, idleness or utilization of network bandwidth for one or more network links or connections. In one embodiment, the bandwidth detector 702 measures round-trip or response times to a server 106. In other embodiments, the bandwidth detector 702 determines the number of packets on a queue waiting to be transmitted. In some embodiments, the bandwidth detector 702 detects the transition of a queue of network packets from empty to non-empty and vice-versa.

In yet other embodiments, the bandwidth detector 702 measures the utilization of a port or network connection of the appliance. In another embodiment, the bandwidth detector 702 determines the number of active connections, active users, or concurrent connections. In some embodiments, the bandwidth detector 702 detects the number of outstanding requests waiting responses. Based on the number of packets in a queue, the emptiness or state transitions of queue, response times of servers, round-trip times to and from a server, number of concurrent connections, number of concurrent users, the operational status of a CPU, port and memory usage of the appliance 200, the bandwidth detector 702 may determine that bandwidth is available for a lower priority request, such as the speculative prefetch request 750.

The network optimization engine 250, or any portion thereof, such as the protocol accelerator 234, may include the prefetcher 704. The prefetcher 704 may include software, hardware or any combination of software and hardware. The prefetcher 704 may comprise an application, program, script, library, process, service, driver, task, thread or any type and form of executable instructions. The prefetcher 704 includes or provides logic, business rules, functions or operations for generating requests or one or more packets for a request. In one embodiment, the prefetcher generates one or more packets identified as speculative, for either a request or a response. In some embodiments, the prefetcher 704 generates a request to prefetch identified objects, such as objects identified by intercepted pages and initiates the transmission of the generated request to a server 106. In one embodiment, the prefetcher 704 generates requests for prefreshening objects identified in the cache 232. In some embodiments, the prefetcher 704 generates a request 750 identified as speculative or with a QoS priority lower than non-prefetch requests. In other embodiments, the prefetcher 704 receives the response to the prefetch request and stores the object of the response to the cache 232. In some embodiments, the prefetcher 704 receives the response to a request and generates a response 752 identified as speculative. In another embodiment, the prefetcher 704 modifies one or more response packets to mark or identify the response 752 as speculative.

The prefetcher 704 generates a speculative request, such as the request 750, using any type and form of encoding scheme to mark or identify the request as speculative or to otherwise identify the one or more request packets as having a low priority. In one embodiment, the prefetcher 704 encodes a value of an option field of a transport protocol layer header, such as a Transport Control Protocol (TCP) header with a predetermined value. The predetermined value identifies to a transmitter of the packet that the packet is speculative. In some embodiments, the prefetcher 704 may tag any of the transport layer packets as discussed above in connection with the automatic WAN/LAN port detection techniques. As such, in these embodiments, a connection may be marked for handling speculative requests and/or responses or a packet may be tagged as a speculative request or response. In another embodiment, the prefetcher 704 encodes a value of an option field of an internet protocol or network layer header, such as the IP header, with a predetermined value. In some embodiments, the prefetcher 704 encodes a value in the TCP or IP options, or in the identification field of IP header or of a network packet. In still further embodiments, the prefetcher 704 may generate a response or request packet with any Type of Service (TOS) field or Differentiated Services Code Point (DSCP) field set to a predetermined value. In some embodiments, the predetermined value encoded by the prefetcher 704 identifies a low priority transmission request. In another embodiment, the prefetcher 704 encodes a value in any optional application protocol layer header, field or parameter to identifying the speculative priority of the request or response.

In some embodiments, the network optimization engine 250 via the prefetcher 704, flow controller 238 and/or QoS Engine 236 transmits requests and/or responses identified as speculative according to a transmission schedule or priority. In the these embodiments, the network optimization engine 250 transmits the speculative requests or responses at a pace or transmission rate that maintains bandwidth usage within a predetermined threshold or level. The network optimization engine 240 may transmits speculative requests or responses at a transmission rate or schedule that utilizes unused bandwidth or available bandwidth. In this manner, the speculative network packets may be transmitted such that the transmission does not reduce the bandwidth available to non-speculative requests and response. In some embodiments, the network optimization engine 250 transmits speculative requests or response such that the transmission does not reduce, or otherwise minimizes the reduction of, a round trip time of a non-speculative request and response. In other embodiments, the network optimization engine 250 transmits speculative requests or responses upon detecting that there are not any non-speculative requests or responses to transmit. In another embodiment, the network optimization engine 250 transmits speculative requests or responses upon detecting that there the number of non-speculative requests or responses to transmit is within a predetermined threshold. In yet another embodiment, the network optimization engine 250 transmits speculative requests or responses during any idle time between transmitting non-speculative requests and response.

In other embodiments, the bandwidth detector 702 and/or prefetcher 704 maintains, updates or accesses a connection or state table 703. The connection or state table 703 may include any type of data structure, object, file or database for storing, tracking and obtaining information related to a state of a connection. In one embodiment, the bandwidth detector 702 and/or prefetcher 704 uses the connection state table 703 for maintaining any one or more of the following: a status of the availability of idleness, bandwidth utilization of a connection, number of non-speculative requests and/or responses waiting to be responded to or transmitted, number of speculative requests or responses waiting to be transmitted or responded to, priorities of any network packets to be transmitted by the appliance, type and speed of a port or network connections, identification of any cooperating or partner appliances, device or clients, and any other operational conditions of the appliance 200 or device 100 or connections of the appliance 200 or the device 100.

Figure 7B:
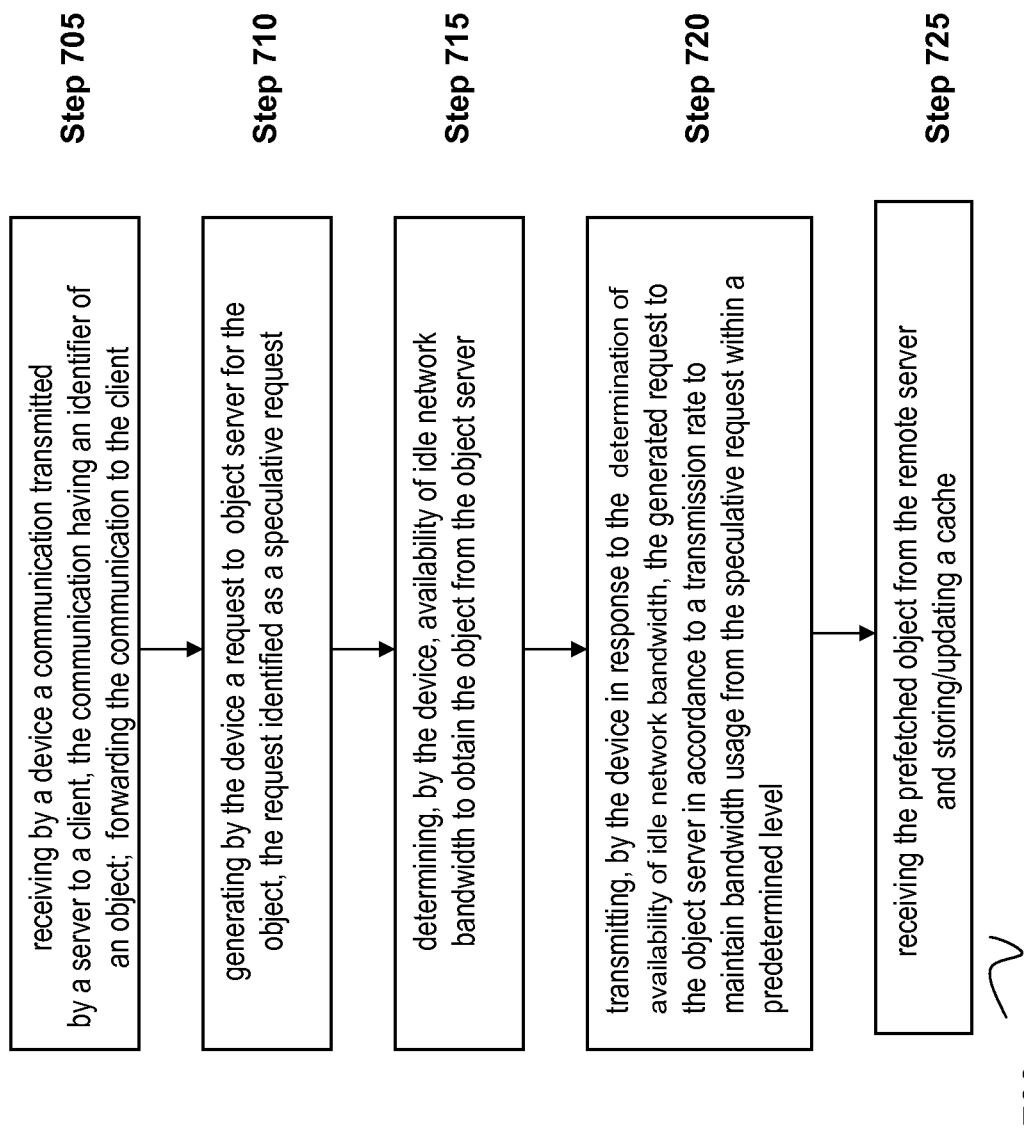
FIG. 7B is a flow diagram of steps of an embodiment of a method for providing QoS speculative requests for prefreshening cached objects.

Referring now to FIG. 7B. an embodiment of steps of a method 700 for prefetching requests using a speculative QoS scheme is depicted. In brief overview, at step 705, the appliance 200 intercepts or otherwise receives a page transmitted by a server 106 to a client 102. The page includes an identifier of one or more objects. The appliance 200 forwards the intercepted page to the client 102. At step 710, the appliance identifies the object and generates a request packet to a remote server for the object. The appliance 200 encodes the generated request as a speculative request. At step 715, the appliance determines availability of idle network bandwidth to transmit the generated request packet to the server 106. At step 720, the appliance 200 in response to the detection of available idle bandwidth transmits to the generated request packet to the server 106. At step 725, the appliance receives the prefetched object from the server 106 and stores the object to the cache 232.

In further details, at step 705, the appliance 200 intercepts or otherwise receives any type and form of communication from one device to another device identifying an object, such as from a server to a client. In one embodiment, the appliance 200 intercepts a response from a server to a client's request for an object. In some embodiments, the server 106 transmits one or more network packets having an application protocol layer payload identifying an object. For example, in one embodiment, the appliance 200 intercepts a web or HTTP page transmitted by a server 106 to a client 102 and the page includes a uniform resource locator (URL) or hyperlink identifying an object. In one embodiment, the protocol accelerator 234 of the network optimization engine 250 is HTTP aware and identifies an object identifier in HTTP content transmitted by a server 105. In yet another embodiment, the appliance 200 intercepts HTTP header information in response to client requests via a transport layer connection that identify an object. In some further embodiments, the appliance 200 intercepts responses from the server for a status of an object that identify the object. In yet other embodiments, the appliance 200 intercepts communications between a client and server intercepted and forwarded by another appliance.

At step 710, the appliance 200 or prefetcher 704 generates in response to identifying the object a request to obtain the object from an object server 106, such as the originating server of the page. In some embodiments, the prefetcher 704 checks or attempts to locate the identified object in the cache 232. In one embodiment, the prefetcher 704 does not locate the object in the cache 232 or otherwise determines the object does not exist in the cache 232. In these embodiments, the prefetcher 704 generates a request for the object referred to as a prefetch since the appliance or client has not obtained the object previously. In another aspect, the request is referred to as a prefetch in that the user of the client receiving the page has not yet requested the object from the page.

In other embodiments, the prefetcher 704 locates the object in the cache 232. In these embodiments, the prefetcher 704 generates a request for the object referred to as a prefeshening request since the object is located in the cache but the appliance is requesting a status or update to the object from the server before expiration of the cached object. As discussed above, the prefetcher 704 may identify or encode the generated request as speculative by a variety of means, including but not limited to encoding a predetermined priority value in an IP header field, IP header option, transport layer header option field or a field of the application layer protocol. In one embodiment, the prefetcher 702 may identity or set a priority of the speculative request in the connection state table 703.

At step 715, the bandwidth detector 702 of the appliance 200 detects, determines or otherwise identifies availability of bandwidth for transmitting a speculative request. In one embodiment, the bandwidth detector 702 detects the transition of a packet queue from non-empty top empty. In some embodiments, the bandwidth detector 702 determines that higher priority packet queues are below a predetermined threshold. In one embodiment, the bandwidth detector 702 detects that there are no non-speculative request packets to transmit at the point of determination. In yet other embodiments, the bandwidth detector 702 determines that a level of network traffic to the destination of the request packet is below a predetermined threshold. In one embodiment, the bandwidth detector 702 determines there are no responses outstanding to the appliance 200 or client 102 from the server 106.

In yet other embodiments, the bandwidth detector 702 determines that the response times from the server are below a predetermined threshold. In some embodiments, the bandwidth detector 702 determines that the number of packets in queue to be transmitted to the server is below a predetermined threshold. In yet other embodiments, the bandwidth detector 702 measures bandwidth utilization and determines that the bandwidth utilization is within a predetermined threshold. In still other embodiments, the bandwidth detector 702 determines that network conditions are suitable for transmitting a speculative request or that otherwise sending the speculative request will have negligible impact on non-speculative requests. In one embodiment, the bandwidth detector 702 checks a status of bandwidth utilization, the connection and/or packets to be transmitted via the connection to determine if the network condition is in a state for transmitting a speculative request At step 720, the appliance 200 in response to the detection of available idle bandwidth transmits the generated request to the server 106. In one embodiment, the appliance 200 transmits the generated request to the server 106. In some embodiments, the appliance 200 obtains the generated request from a queue of speculative requests waiting to be transmitted. For example, the queue may be a FIFO (First In First Out) or LIFO (Last In First Out) queue. In some embodiments, the appliance 200 transmits a plurality of generated requests to the server 106. For example, the prefetcher 704 may generate multiple requests for objects identified via one or more intercepted pages as originating from the server 106. In yet other embodiments, the appliance 200 transmits a first speculative request 750 to a first server 106A, and a second speculative request 750' to a second server 106B. In one embodiment, the appliance 200 transmits the speculative requests by the order in which they were generated.

Further to step 720, the appliance 200 or network optimization engine 250 transmits speculative request at a transmission rate or schedule to maintain bandwidth utilization within a predetermined threshold or level. In one embodiment, the network optimization engine 250 transmits the speculative request upon detecting by the bandwidth detector 702 that the bandwidth utilization is within a predetermined level. In another embodiment, the network optimization engine 250 transmits the speculative request upon determining that the number of non-speculative requests to transmit, or in a transmission queue, is below a predetermined threshold. In some embodiment, the network optimization engine 250 transmits the speculative request during any idle time available between transmissions of non-speculative requests. In other embodiments, the network optimization engine 250 transmits the speculative request such that bandwidth utilization by the speculative request is maintained within a predetermined level. In some embodiments, the network optimization engine 250 transmits the speculative request such that round trip times for non-speculative requests or responses are maintained at a predetermined level.

At step 725, the appliance 200 receives the object requested via the speculative request from the server 106. In one embodiment, the speculative request is a prefetch and the appliance 200 or prefetcher 702 stores the object in the cache 232. In another embodiment, the speculative request is a prefreshening request and the appliance 200 or prefetcher 702 updates the object stored in the cache 23 with a new version of the object.

The technique described above may be deployed on any device—client, appliance, or server. In some embodiments, the prefetching device described above may deployed on a client side of a network connection, such as on the client side of a WAN link. In other embodiments, the prefetching device described above may be deployed on a server side of a network connection, such as the server side of a WAN. In some embodiments, the appliance 200 may have a connection to an unpaced fast side or LAN connection and a connection to a paced slow side or WAN connection. In one embodiment, the device on the client side paces the incoming WAN data but not the outgoing LAN data. In another embodiment, the device on the server side paces the outgoing WAN data but not the incoming LAN data.

In some embodiments, the technique of generating speculative requests to a server is carried through to the responses 752 from the server. That is, in one embodiment, by identifying the request as speculative, the response 752 to the request is identified and handled at a QoS priority associated with the speculative designation. In one embodiment, identifying server's responses as speculative is handled by cooperating or partner appliances or devices. For example, as illustrated in FIGS. 1A-1C, a first appliance 200 may operate in conjunction with a second appliance 200'. In one embodiment, the first appliance 200 may be deployed on a WAN or client side of a network connection while the second appliance 200' is deployed on the LAN side or server side of the connection. Also, as discussed herein, a first appliance 200 may operate in conjunction with a network optimization engine 250 deployed on a client 102 and/or server 106.

Figure 7C:
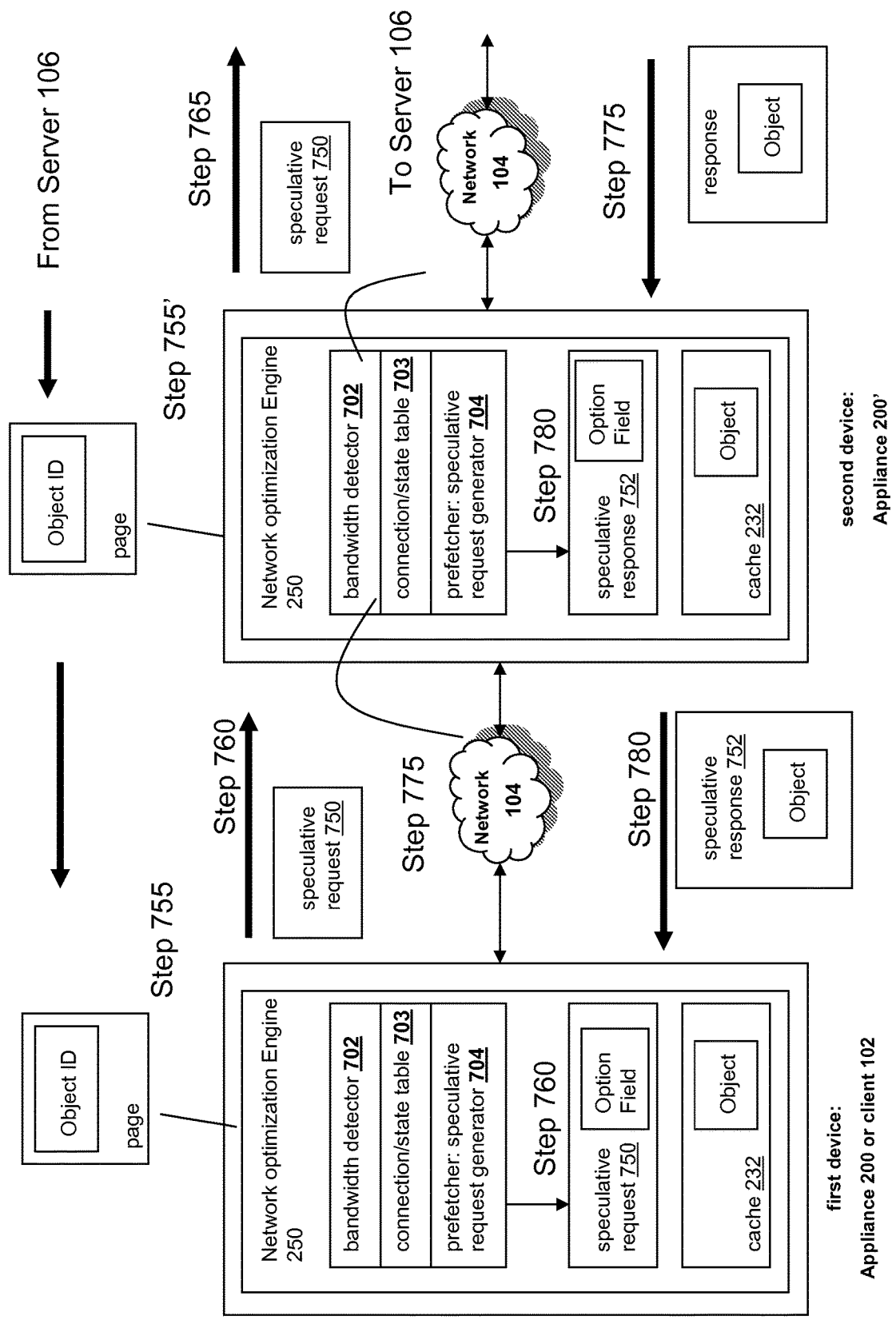
FIG. 7C is a block diagram of an example embodiment of a multiple appliance system for illustrating the QoS prefreshening technique of cached objects as described in conjunction with FIG. 7D.

By way of example and referring now to FIG. 7C, a dual appliance deployment or a deployment of a first network optimization engine 250 on a client 102 or first appliance 200' and a second network optimization engine 250' on a second appliance 200' or a server 106 is depicted. For example, the first device (client 102 or appliance 200) may be on the client side of a WAN in which the first device controls the transmission flow or paces incoming data from the WAN, such as WAN data received from the second device. The first device may transmit LAN data in an unpaced manner to the second device. The second device (appliance 200 or 200') may be on the server side of the WAN in which the second device controls the transmission flow or paces outgoing WAN data to the first device. The second device may transmit LAN data in an unpaced manner to the server.

In brief overview, a first device, such as an appliance 200 or client 102, intercepts or otherwise receives a page served by a server and identifies an object identifier in the page. The first device may forward the page to a client or an application on a client requesting the page. The first device generates a speculative request to prefetch from a server the object corresponding to the object identifier. The first device may transmit the speculative request packet to the server in accordance to a transmission rate to maintain bandwidth usage within a predetermined level. A second device, such as an appliance 200' or a server 106, intercepts the speculative request of the first device. The second device identifies the request as speculative and forwards the request to an originating server 106. Upon receiving the response from the server, the second device identifies the response as speculative or generates a speculative response. Upon detecting available of idle network bandwidth, the second device may transmit the response to the client 102 or appliance 200 in accordance to a transmission rate to maintain bandwidth usage within a predetermined level. The first and second devices can transmit the speculative requests and responses responsive to availability of idle network bandwidth detected by the bandwidth detector on either the receive or send side of a response and/or request, or both.

Figure 7D:
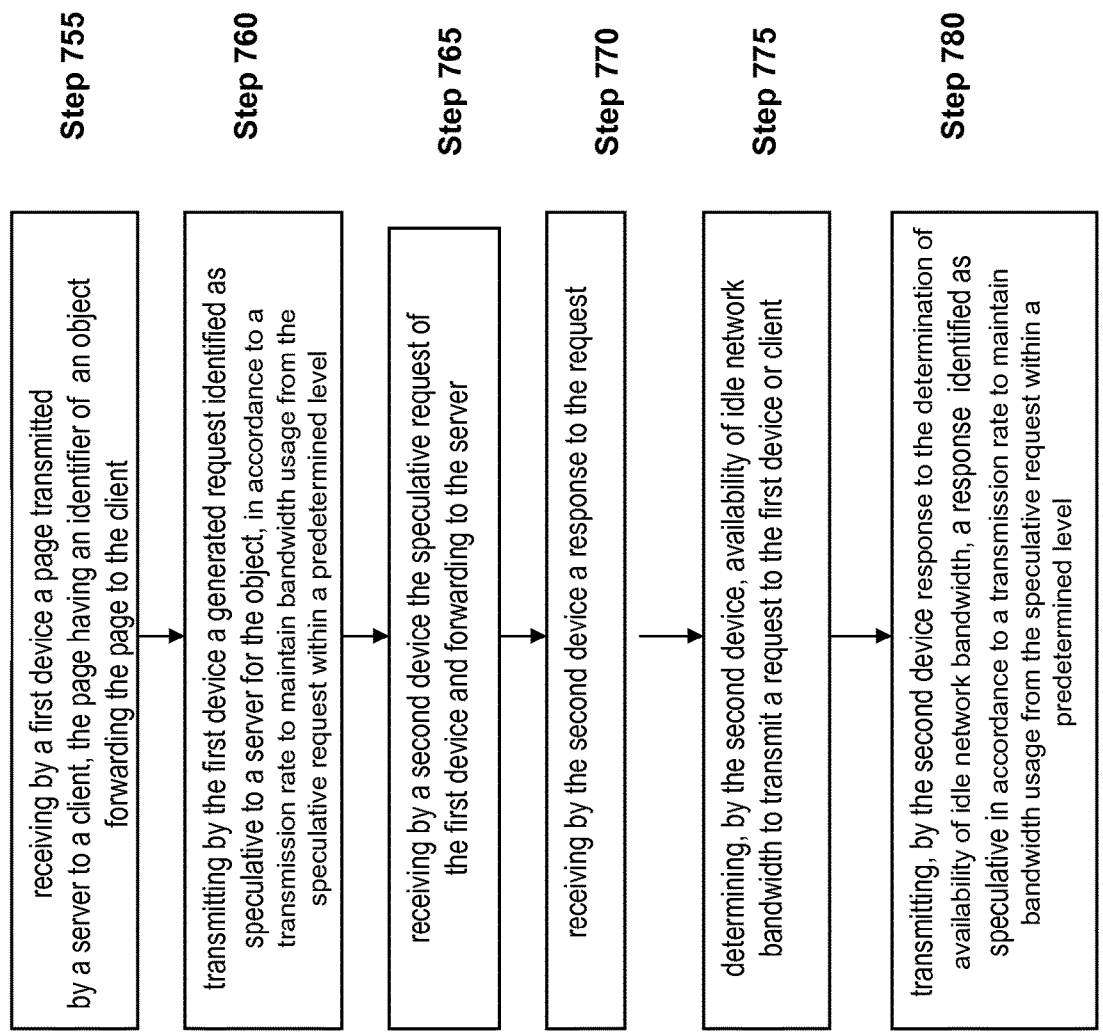
FIG. 7D is a flow diagram of steps of an embodiment of a method for providing QoS speculative requests for prefreshening cached objects.

Referring now to FIG. 7D, an embodiment of steps of a method 750 for a technique of handling speculative responses between devices is depicted. In brief overview, at step 755, a first device intercepts or otherwise receives a page identifying an object transmitted from a server to a requestor, such as a client. The first device forwards the page to the requestor. At step 760, the first device transmits a generated speculative request to the server to prefetch the object identified by the page. The first device may transmit the request at a transmission rate to maintain bandwidth usage within a predetermined level or to otherwise use idle or available bandwidth. At step 765, a second device intercepts the speculative request of the first device, and forwards the request to the server 106. At step 770, the second device receives a response from the server to the request. At step 775, the bandwidth detector 702 of the second device determines the availability of idle network bandwidth to transmit a speculative response to the first device or otherwise to the requestor. At step 780, the second device generates a speculative response or marks the received response as speculative, and transmits the speculative response in response to the determination of the bandwidth detector 702. The second device may transmit the response at a transmission rate to maintain bandwidth usage within a predetermined level or to otherwise use idle or available bandwidth.

In further details, at step 755, a first device intercepts or otherwise receives a page identifying an object transmitted by an originating server. In one embodiment, the first device is a client 102. In some embodiments, the first device is a first appliance 200. In another embodiment, the first device is deployed on the WAN side of a network connection. In one embodiment, the first device is deployed in a branch office. As discussed above in connection with step 705 of method 700, the first device may intercept any type and form of communication from one device to another device identifying an object. In yet another embodiment, both the first device and second device intercept the page identifying the object. In one embodiment, the second device intercepts and identifies the object for prefetching, such as in accordance with the embodiment of method 700.

At step 760, the first device may generate a speculative request 750. The first device may generate the speculative request using any of the encoding techniques discussed herein. In one embodiment, the first device transmits the speculative request 750 immediately or as soon as possible. In another embodiment, the first device transmits the speculative request 750 at the same priority as non-speculative request from the first device. In some embodiments, the first device transmits the speculative request 750 responsive to the bandwidth detector 702 of the first device determining available network bandwidth as described above.

In one embodiment, the network optimization engine 250 transmits the speculative request upon detecting by the bandwidth detector 702 that the bandwidth utilization is within a predetermined level. In another embodiment, the network optimization engine 250 transmits the speculative request upon determining that the number of non-speculative requests to transmit, or in a transmission queue, is below a predetermined threshold. In some embodiment, the network optimization engine 250 transmits the speculative request during any idle time available between transmissions of non-speculative requests. In other embodiments, the network optimization engine 250 transmits the speculative request such that bandwidth utilization by the speculative request is maintained within a predetermined level. In some embodiments, the network optimization engine 250 transmits the speculative request such that round trip times for non-speculative requests or responses is maintained at a predetermined level. The first device may transmit the response at a transmission rate to maintain bandwidth usage within a predetermined level or to otherwise use idle or available bandwidth.

At step 765, the second device intercepts or otherwise receives the speculative request 750 transmitted by the first device. In one embodiment, the second device is a second appliance 200'. In other embodiments, the second device is the server 106. In yet another embodiment, the second device is deployed on a LAN side of a network connection, such as at a corporate data center. In some embodiments, the first device transmits the speculative request 750 to the second device instead of the second device intercepting the transmission of the speculative request 750 to the server 106. In one embodiment, the second device identifies the intercepted request as speculative by detecting the speculative encoding scheme of the packet. The second device may identify from the encoding scheme of the packet that the request should be treated with a QoS priority associated with speculative prefetching.

In some embodiments, the second device forwards the speculative request 750 to the server 106. In other embodiments, the second device generates a non-speculative request for the object and transmits the request to the server. In another embodiment, the second device transmits the speculative request 750 or second request immediately or as soon as possible. In other embodiments, the second device transmits the speculative request 750 or second request as the same priority as non-speculative requests In one embodiment, the second device transmits the speculative request 750 or second request responsive to the bandwidth detector 702, such as the bandwidth detector 702 detecting availability of bandwidth to transmit a request to the server 106. In one embodiment, the network optimization engine 250 transmits the speculative request upon detecting by the bandwidth detector 702 that the bandwidth utilization is within a predetermined level. The second device may transmit the response at a transmission rate to maintain bandwidth usage within a predetermined level or to otherwise use idle or available bandwidth.

At step 770, the second device receives a response to the request for the object from the server 106. In one embodiment, the server 106 identifies the request as speculative and transmits the response upon detection of available bandwidth or upon QoS transmission scheduling mechanism identifying the response as low priority or speculative. In some embodiments, the second device receives the response and associates the response with an outstanding speculative request 750. For example, in one embodiment, the second device identifies the response as a response to a speculative request 750 via a connection state table 703.

In some embodiments, the second device generates or otherwise provides a speculative response 752. In one embodiment, the second device generates a response including content from the response received from the server and encodes the generated response as speculative. In another embodiment, the second device alters, modifies or changes the response packet from the server to identify the response 752 as speculative. In many embodiments, the response from the server 106 includes multiple network packets. In some of these embodiments, the second device generates, provides or identifies the response packets as speculative. The second device may identify the response packet 752 as speculative in the same manner or using the same encoding scheme as the request 750. In another embodiment, the second device may use a different speculative QoS encoding scheme recognized by the second device and/or the first device.

At step 775, in one embodiment, the bandwidth detector 702 of the second device detects availability of idle network bandwidth to the client 102 or first device in accordance with step 715 previously discussed above. At step 780, the second devices transmits the speculative response 752 in response to the bandwidth detector or otherwise in accordance with QoS transmission scheduling of speculative packets by the second device. The second device may transmit the response at a transmission rate to maintain bandwidth usage within a predetermined level or to otherwise use idle or available bandwidth. In some embodiments, the first device intercepts the speculative response 752 and stores the object to the cache 232 or updates the object in the cache 232.

In some embodiments, the first device and the second device, such as a first appliance 200 and a second appliance 200' may each transmit or forward the speculative request 752 to prefetch an object onto the originating server 106 in response to a bandwidth detector and at a lower priority QoS to reduce contention with non-speculative requests on bandwidth. Likewise, the first device and second device may each transmit or forward the response as a speculative response 752 in response to a bandwidth detector and at a lower priority QoS to reduce contention with non-speculative requests on bandwidth. Furthermore, the first and second devices may transmit the speculative requests at a same or similar priority as non-speculative requests and transmit the speculative responses according to a QoS priority designed for speculative transmission. In yet other embodiments, the first and second device may transmit speculative requests and responses according to a speculative QoS priority on ports associates with a WAN connection. In still another embodiment, the first and second device may transmit the speculative requests and responses at a transmission rate or pace to maintain bandwidth usage within a predetermined level or to otherwise use idle or available bandwidth.

Using the system and methods describe above, these speculative prefetching techniques reduce the time the user spends waiting. Speculative prefetching may reduce the average interactive transaction time. That is, in some case, we are prefetching the object the user has not asked for so that the object may be available in case the user does ask for the object. Thus, this technique may reduce the time the user spends waiting. Using the speculative prefetching technique above, unused or idle bandwidth is used such the cost of speculatively prefetching is minimal on bandwidth.

Although the systems and methods are generally described above in connection with HTTP type of prefetching, these techniques may be used and applied to any type and form of speculative fetching such as read-ahead, write-behind, and content distributions as well as prefreshening objects in a cache. For example, the speculative prefetching technique may used to obtain content for compression histories shared between compression engines of a plurality of devices. In another example, the appliance or appliances may provide the speculative pre-fetching techniques for read-aheads and write-behinds of documents and files, such as office documents, via the CIFS protocol. In one embodiment, a user in a branch office may be accessing a document over a WAN connection via one or more appliances to a server in a data center. The appliance 200 may intercept a request for a page of a document identifying objects or additional content of subsequent pages. The appliance 200 may prefetch the subsequent pages or objects in speculation that the user may request the pages or objects. The appliance may use the techniques in here to transmit these prefetch requests and responses in a lower priority manner in order to reduce network bandwidth contention with non-speculative requests and responses.

H. Systems and Methods for a Stack-Oriented Prefetching Technique

Figure 8A:
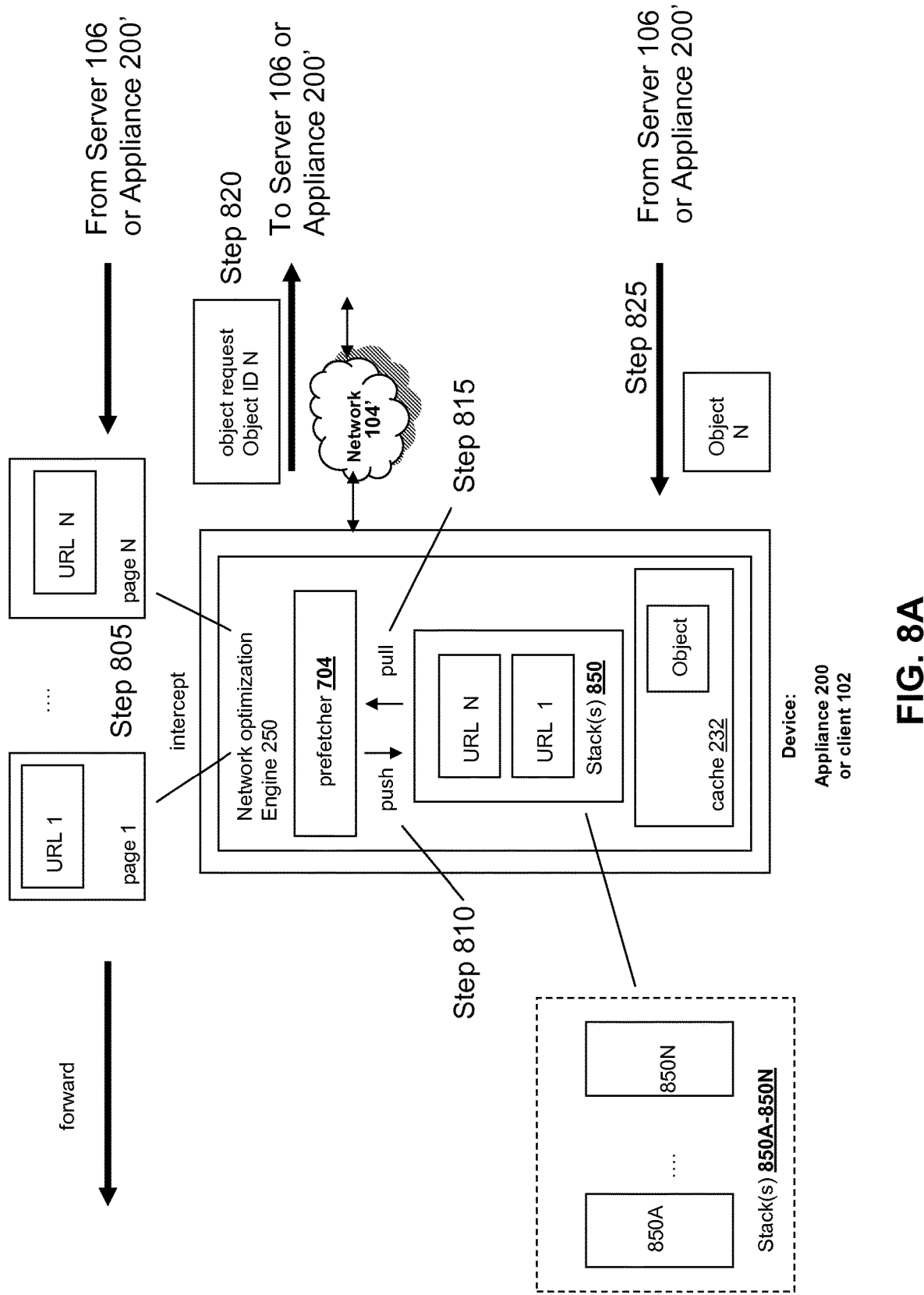
FIG. 8A is a block diagram of an example embodiment of a system for using a stack-oriented approach to prefetching objects to cache as described in conjunction with FIG. 8B.
Figure 8B:
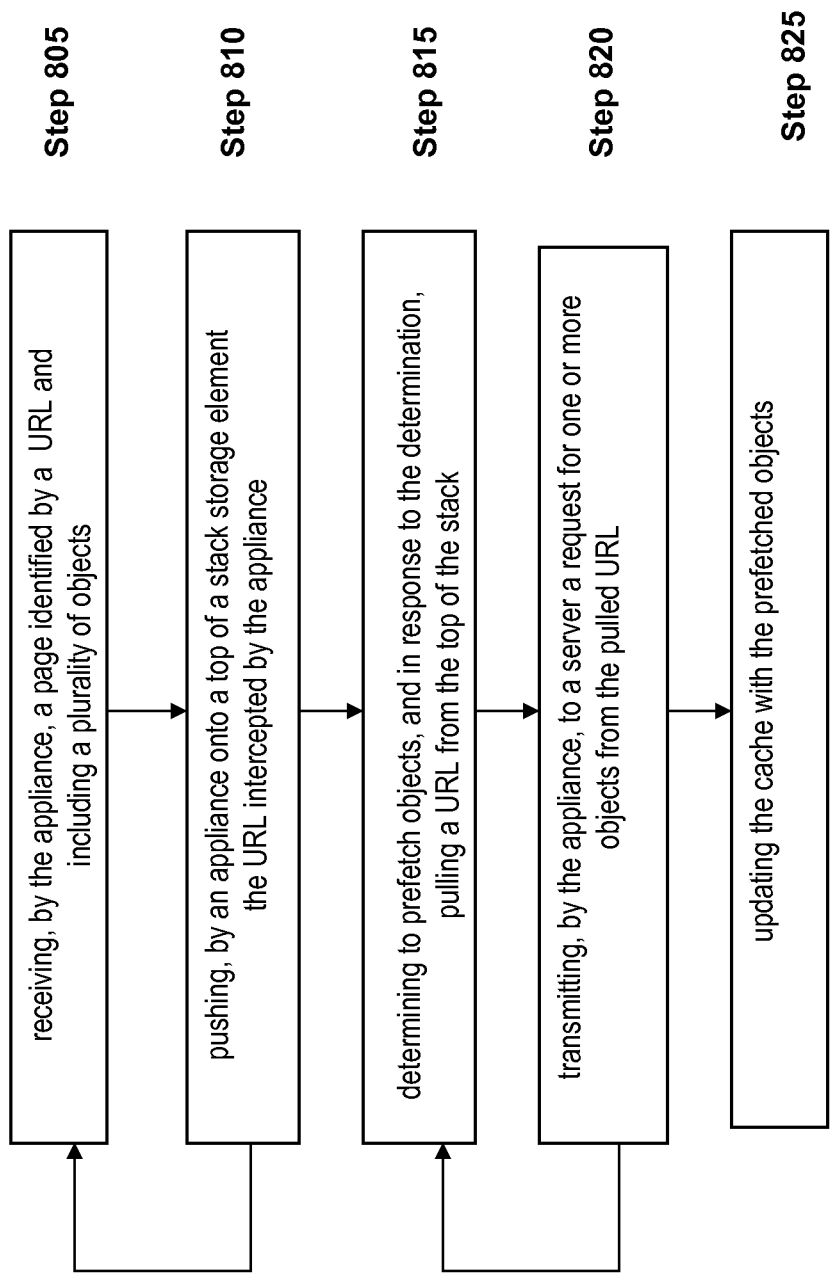
FIG. 8B is a flow diagram of steps of an embodiment of a method for providing a stack-oriented prefetching technique of objects to cache.

Referring now to FIGS. 8A and 8B, systems and methods of a technique for pushing and popping objects from a stack to determine the order of which to prefetch objects are depicted. This technique, referred as "stack-oriented prefetching" makes a prefetching determination responsive to the pages a user is currently visiting or has recently visited by using a stack. For example, a prefetching scheme may not desire to prefetch links from a first requested page after the user has wandered off to a second page. When the user requests a page, the technique pushes the uniform resource locator (URL) or object identifiers of the page onto a prefetching stack. When a prefetcher is ready to prefetch objects or content from a new page, the prefetcher pops a URL from the top of the stack, and fetches the objects or content identified via the popped URL. In this manner, the prefetcher gives precedence to prefetching objects of recent pages requests over previous page requests.

Referring now to FIG. 8A, an embodiment of a system for performing the stack-oriented prefetching technique is depicted. In brief overview, a device such as appliance 200 includes a network optimization engine 250 intercepting pages requested by a requestor, such as client, and served by an originating server 106. The appliance 200 identifies a uniform resource locator (URL) for an intercepted page, which may identify one or more objects associated with the page. The appliance 200 pushes the URL from the page on to the top of a stack element 850. As the appliance 200 intercepts each page, the appliances pushes an URL of the page onto the stack. At some point, a prefetcher 704 determines to perform prefetching of objects. The prefetcher 704 pops from the top of the stack the last URL pushed onto the stack. This URL represents the last page requested by a requestor and intercepted by the appliance. The prefetcher 704 determines one or more object identifiers from the URL, generates requests for the objects, and transmits the requests to a server. The appliance 200 receives the prefetched objects and stores them in the cache 232. The prefetched may continue popping URLs from the stack 850 to prefetch object while the appliances pushes new URLS of intercepted pages onto the stack.

As discussed above in connection with 7A, the prefetcher 704 may include software, hardware or any combination of software and hardware. The prefetcher 704 may comprise an application, program, script, library, process, service, driver, task, thread or any type and form of executable instructions. The prefetcher 704 includes or provides logic, business rules, functions or operations for generating packets, such as packets to requests objects from a server 106. In some embodiments, the prefetcher 704 receives the response to the prefetch request and stores the object of the response to the cache 232

The prefetcher 704 may also include logic, business rules, functions or operations for determining when to prefetch an object or content from a server. In one embodiment, the prefetcher 704 is designed and constructed to prefetch objects responsive to a predetermined frequency. In other embodiments, the prefetcher 704 is designed and constructed to prefetch objects responsive to the packet processing engine 240. In another embodiment, the prefetcher 704 is designed and constructed to prefetch objects responsive to a predetermined number of packets, sent and/or received, being processed by the packet processing engine 240. In other embodiments, the prefetcher 704 is designed and constructed to prefetch objects responsive to a timer. In one embodiment, the prefetcher 704 is designed and constructed to prefetch objects responsive to network bandwidth or utilization, such as via the bandwidth detector 702 discussed in conjunction with FIG. 7A. In yet another embodiment, the prefetcher 704 may be responsive to current load of the appliance 200, such as the number of concurrent connections, and CPU and memory usage.

In some embodiments, the prefetcher 704 is responsive to one or more policies of a policy engine 295 to determine when to prefetch objects. As such, the prefetcher 704, in some embodiments, may be configured and responsive to policies based on the identification or type of user, client, server, or network connection. In some embodiments, the prefetcher 704 may be responsive to policies based on any temporal information, such as frequency or time of day. In other embodiments, the prefetcher 704 may be responsive to policies based on the type of network traffic, protocol or any portion or content of a network packet, such as source and destination addresses and ports, and TCP or IP options. In one embodiment, the prefetcher 704 may be responsive to policies based on any attributes or characteristics of a client 102 or server 106 such as via end point detection, for example, via a collection agent 304 as described in conjunction with FIG. 3.

The prefetcher 704 is interfaced to or in communication with a stack 850. In one embodiment, the prefetcher 704 is integrated with the stack 850. In another embodiment, the prefetcher 704 includes the stack 850 or otherwise implements the stack 850. In some embodiments, the prefetcher 704 is designed and constructed to prefetch objects responsive to a size of the stack 850. In other embodiments, the prefetcher 704 is designed and constructed to prefetch objects responsive to a frequency of access of data to and from the stack 850. In yet another embodiment, the prefetcher 704 is designed and constructed to prefetch objects responsive to a history of the number of elements in the stack 850. In some embodiments, prefetcher 704 is designed and constructed to prefetch objects responsive to number of elements not fetched in the stack 850. In one embodiment, the prefetcher 704 is designed and constructed to prefetch objects that have been stored in the stack for a predetermined time period. In other embodiments, prefetcher 704 is designed and constructed to prefetch objects responsive to a predetermined number of elements pushed onto to the stack 850. In yet one embodiment, the prefetcher 704 is designed and constructed to prefetch objects responsive to a predetermined number of elements pushed on the stack 850 within a predetermined time period.

The stack 850 may include software, hardware or any combination of software and hardware. The stack 850 may comprise an application, program, script, library, process, service, driver, task, thread or any type and form of executable instructions. In some embodiments, the stack 850 may be implemented as one or more data structures, linked list, queues, variables, arrays or objects stored in memory. In other embodiments, the stack 850 may be implemented as a file or a database. In some embodiments, the executable instructions for the stack 85 includes or provides logic, business rules, functions or operations for storing elements to the stack 850 and access and/or remove elements from the stack 850. In one embodiment, the stack 850 is implemented as a Last In First Out (LIFO) stack or queue—that is, the last element stored to the stack is the first element retrieved or accessed from the stack. In these embodiments, the storing of an element to the top of a LIFO stack is referred to as pushing the element onto the stack. Also, in these embodiments, the retrieving or access an element from the top of the LIFO stack is referred to as popping the element from the stack. In yet another embodiment, the stack 850 includes an enumerated list of elements representing a LIFO scheme.

In some embodiments, the stack 850 includes a predetermined maximum number of elements allowed to be stored in the stack 850. In other embodiments, the stack 850 includes a maximum size in bytes allowed to be stored to the stack 850. In one embodiment, the stack 850 includes a predetermined size threshold for each element or data that is stored to the stack 850.

In yet other embodiments, the stack 850 may include a plurality of stacks 850A-850A. In some embodiments, the appliance 200 may dynamically create or establish stacks 850A-850N. In other embodiments, the appliance dynamically removes or destroys stacks. In yet another embodiment, the appliance 200 may copy and share stacks 850A-850N between users or clients. In some embodiments, the plurality of the stacks 850A-850N may be used for all connections traversing the appliance 200. In one embodiment, the appliance 200 may create, use and/or assign a stack 850A to each client 102A. In another embodiment, the appliance 200 may create, use and/or assign a stack 850A for each transport layer connection or application layer session. In another embodiment, the appliance 200 may create, use and/or assign a stack 850A for each server 106. In another embodiment, the appliance 200 may create, use and/or assign a stack 850A to a group of connections, users, clients or servers, such as for a group of users or clients of a branch office.

In one embodiment, the stack 850 provides functions, messages, or application programming interfaces (API) to store, access, manage, modify or manipulate the stack 850. In one embodiment, the prefetcher 704 may interface or communicate with the stack 850 using any type and form of application programming interface (API). In another embodiment, the prefetcher 704 may interface or communicate with the stack using any type and form of messaging. In some embodiments, the prefetcher 704 may interface or communicate with the stack 850 using any type and form of interprocess communications. In yet another embodiment, the prefetcher 704 includes and executes the operations, functionality or logic of the stack 850.

Referring now to FIG. 8B, an embodiment of steps of a method 800 for performing a stack-oriented prefetching technique is depicted. In brief overview, at step 805, an appliance intercepts or otherwise receives a page including one or more object identifiers. At step 810, the appliance 200 pushes onto a top of the stack 850 an object identifier or URL from the intercepted page. At step 815, the prefetcher of the appliance 200 determines to prefetch objects, and in response to the determination, pops one or more URLs or object identifiers from the top of the stack 850. At step 850, the appliance or prefetcher generates a request for an object identified by the popped URL and transmits the request to a server 106. At step 825, upon receipt of a response from the server, the appliance 200 or prefetcher 200 stores or updates the object in a cache 232.

In further details, at step 805, the appliance 200 intercepts or otherwise receives any type and form of communication from one device to another device identifying an object, such as a page transmitted from a server to a client. In one embodiment, the appliance 200 intercepts a response from a server to a client's request for an object. In some embodiments, the server 106 transmits one or more network packets having an application protocol layer payload identifying an object. For example, in one embodiment, the appliance 200 intercepts a web or HTTP page transmitted by a server 106 to a client 102 and the page includes a uniform resource locator (URL) or hyperlink identifying an object. In some embodiments, the appliance 200 intercepts a page identified by a URL and the page identifies one or more objects. After interception, the appliance 200 forwards or transmits the intercepted page to the requestor, such as client 102.

At step 810, the appliance 200 stores to the stack 810 an identifier of an object from the intercepted page. In some embodiments, the appliance 200 pushes a URL identifying an object on the page onto the top of the stack 850. In other embodiments, the appliance 200 stores a copy of the page onto the stack. In yet another embodiment, the appliance 200 stores the one or more object identifiers of the page to the top of the stack 850. In some embodiments, the appliance 200 stores one or more hyperlinks from the page to the top of the stack 850. In one embodiment, the appliance stores an identifier or URL of an object of the page to a first stack 850A. In some embodiments, the appliances stores an identifier or URL of an object the page to a stack associated with or assigned to the client 102, server 106, user or connection.

In many embodiments, the appliance 200 performs steps 805 and 810 for a plurality of pages transmitted via the appliance 200. In some embodiments, the appliance 200 stores multiple object identifiers or URLs to the top of the stack 850. In one embodiment, the appliance 200 stores a first object identifier or first URL to a first stack 850A and a second object identifier or second URL to a second stack 850B. In other embodiments, based on the client, server, user or other factors, such as a policy engine or condition of the stack, the appliance 200 may store, access and manage object identifiers or URL among a plurality of stacks 850A-850N. For example, the appliance 200 may store URLs from intercepted pages of client 102A to stack 850A and store URLs from intercepted pages of client 102B to stack 850B. In another example, the appliance 200 may store URLs from intercepted pages from server 106A to stack 850A and store URLS from intercepted pages from server 106B to stack 850B.

At step 815, the prefetcher 704 of the appliance 200 determines to prefetch objects. As discussed above, the prefetcher 704 may determine to perform prefetching based on or responsive to any one or more factors, conditions, status, a policy engine 295, or other programs. In response to the determination, the prefetcher 704 retrieves, pops or otherwise accesses the object identifier or URLs from the top of the stack 850. In one embodiment, the prefetcher 704 pops object identifier or URLs from the stack in a LIFO manner. In some embodiments, the prefetcher 704 pops one object identifier or URLs at a time from the stack 850. In another embodiment, the prefetcher 704 pops multiple URLs or object identifiers from the stack 850. In other embodiments, the prefetcher 704 pops a predetermined number of URLs or object identifiers from the stack 850. The predetermined number may be configurable or may be dynamically adjustable by the prefetcher 704.

In yet another embodiment, the prefetcher 704 pops a first object identifier or URL from a first stack 850A. In some embodiments, the prefetcher 704 pops a second object identifier or URL from a second stack 850B. In one embodiment, the prefetcher 704 pops a first predetermined number of object identifiers from a first stack 850A and then a second predetermined number of object identifiers from a second stack 850B. In some cases, the prefetcher 705 may use any round robin, weighted loading mechanism or fair distribution scheme to pop object identifiers or URLs from multiple stacks 850A-850N.

At step 820, the prefetcher 704 generates a request packet for the object identified by the object identifier or URL. In some embodiments, the prefetcher 704 generates a request packet to obtain the URL from a server 106. In other embodiments, the prefetcher 704 generates a request for multiple object identifiers or URLS popped from the stack 850. In yet another embodiment, the prefetcher 704 generates a request for each of a plurality of object identifiers or URLS popped from the stack 850. In yet a further embodiment, the prefetcher generates a request packet to obtain a status of the object. In one embodiment, the prefetcher generates a request packet for a conditional get of the object. The appliance 200 or prefetcher 704 transmits the one or more request packets to the server 106. In some embodiments, the appliance 200 or prefetcher 704 may use any QoS algorithm or technique to transmit the requests, such as, for example, the speculative QoS techniques of FIGS. 7A-7D.

In many embodiments, the appliance 200 performs steps 815 and 820 for a multiple object identifiers of one or more stacks 850A-850N. In some embodiments, the appliance 200 performs steps 815 and 820 a predetermined number of times before allowing another object identifier or URL to be pushed onto the stack. In other embodiments, the appliance 200 gives priority or precedence to a pending push onto the stack 850. In one embodiment, the appliance 200 transmits a generated request for the URL of the pending push and then continues popping URLs and transmitting requests in accordance with steps 815 and 820. In other embodiments, the appliance 250 continues performing steps 815 and 820 on a first stack 850A while the appliance pushes URLs or object identifiers to a second stack 850B. In yet another embodiment, during idle times, the prefetcher 704 performs steps 815 and 820 until a page is intercepted or the appliance is no longer idle.

At step 825, the appliance 200 or prefetcher 704 receives a response to a request from a server 106. In some embodiments, the appliance 200 receives multiple responses from multiples requests from one or more servers. In one embodiment, the appliance 200 identifies the object from a response and associates the object with an object identifier of a prefetch request. In another embodiment, the appliance 200 intercepts a response to a client's request having the object associated with the appliance's request. In these embodiments, the appliance 200 may use this object to satisfy the generated request of the appliance. The appliance 200 stores the object received from the server to the cache 232. In some embodiments, the appliance 200 updates the object stored in the cache 232.

The appliance may perform any of the steps 810, 815, 820 and/or 825 prior to a user receiving the requested page of step 805 requesting any one or more of the objects identifies by the URLs or object identifiers of the intercept page. In this manner and in some embodiments, the systems and methods of the techniques described above are for prefetching the object prior to the user requesting the object. In other embodiments, the objects identifies by the intercepted pages may be stored in cache, and the stack oriented techniques of method 800 may be performed to prefreshen or update cached objects in anticipation of a user requesting the object or response to transmission of the URL of the object to a requestor. For example, the prefetcher 704 may store object identifiers or URLs to the stack for objects having an expiration period about to expire or having a predetermined amount of expiration time.

Although the prefetcher 704 and stack 850 are described above in an example embodiment of an appliance 200, the stack-oriented systems and methods described herein may be deployed or implemented on any device, such as an end point of a client 102 or on any device deploying the network optimization engine 250, or any portion thereof.

I. Systems and Methods for Prefreshening Cached Objects

Figure 9A:
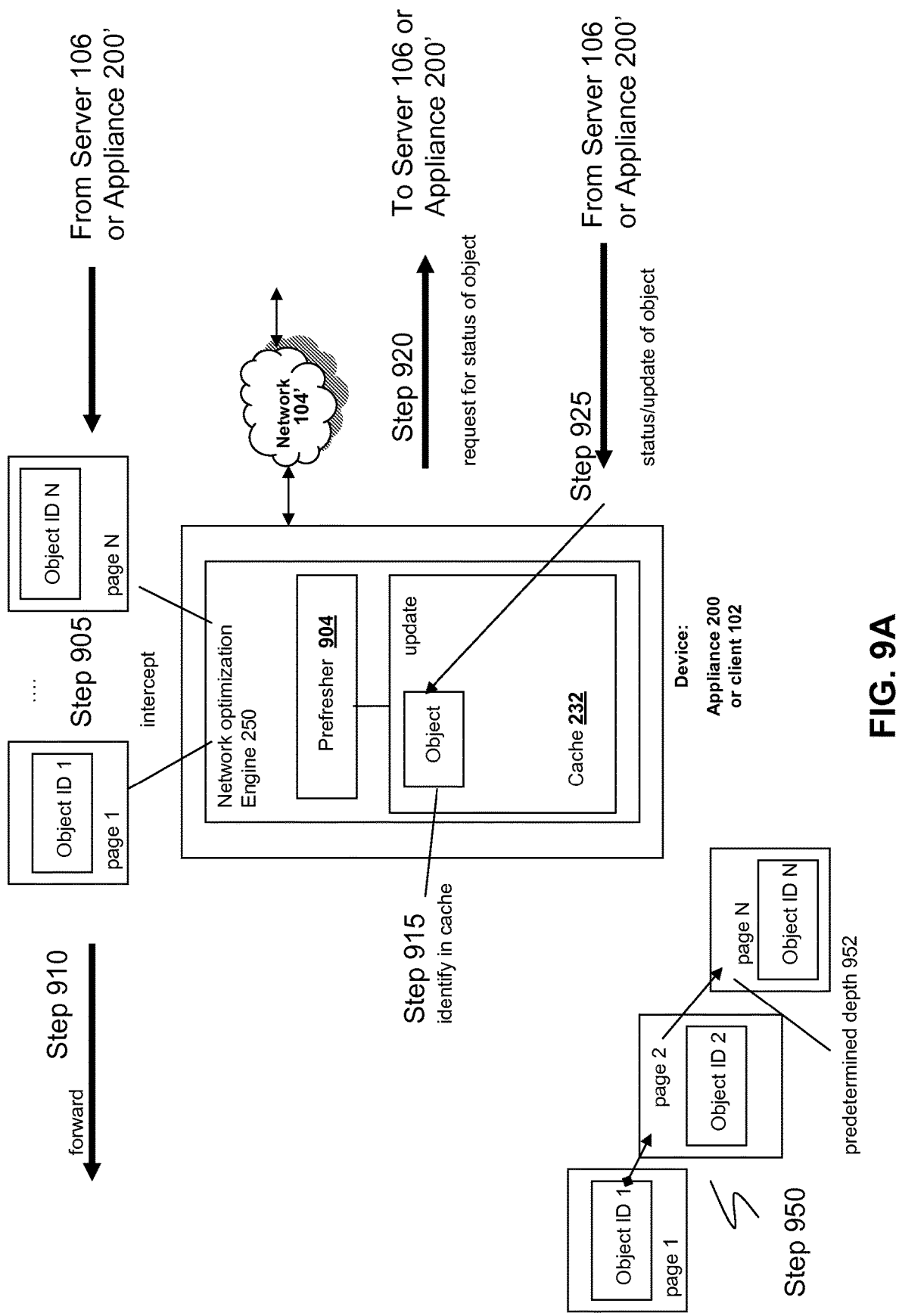
FIG. 9A is a block diagram of an example embodiment of a system for prefreshening objects in a cache prior to user requests for the object as described in conjunction with FIG. 9B.

Referring now to FIGS. 9A and 9B, systems and methods for an embodiment of a technique referred to as "prefreshening" is depicted. In brief overview of FIG. 9A, a device, such an appliance 200 or a client 102, performs this prefreshening technique by checking the status and/or updating cached objects identified in a page intercepted or otherwise received by a device. The device includes a network optimization engine 250 that intercepts pages communicated via the device, such as a page transmitted from a server 106 to a client. The device parses the hyperlinks or uniform resource locators of the page and determines that an object identified by the page is located in a cache 232. Prior to a user requesting the identified object from the page, a prefresher 904 of the device generates a request for a status or an update to the object in the cache 232 and transmits the generated request to a server 106. The prefresher 904 receives a response from the server 106 indicating a status of the object or providing an updated version of the object. Based on the response, the device validates or updates the object in the cache 232. In one embodiment, the technique is referred to as prefreshening, because the device validates or updates an object in the cache in anticipation of or prior to a user requesting the object identifies by the page.

In some embodiments, the network optimization engine 250 as described herein, or any portion thereof, such as the protocol accelerator 234, may include a prefresher 904. The prefresher 904 may include software, hardware or any combination of software and hardware. The prefresher 904 may comprise an application, program, script, library, process, service, driver, task, thread or any type and form of executable instructions. In some embodiments, the prefresher 904 includes the prefetcher 704 as described in FIGS. 7A-7D, and 8A-8B. In one embodiment, the prefresher 904 includes or provides logic, business rules, functions or operations for determining if the object identified by a page is located in the cache 232. In some embodiments, the prefresher 904 interfaces with or communicates to the cache manager 232 to determine if the object is located or stored in the cache 232. In another embodiment, the prefresher 904 queries a storage of the device to determine if the object is located or exists in the cache 232. In one embodiment, the prefresher 904 is part of the cache manager 232 or the cache manager 232 includes the prefresher 904. In other embodiments, the prefresher 904 checks or looks up in an index whether an object is stored in the cache 232. In some embodiments, the index comprises entries corresponding hashes or fingerprints of objects to objects stored in the cache 232.

In some embodiments, the prefresher 904 includes or provides logic, business rules, functions or operations for generating requests for objects. The prefresher 904 may generate a request for the status of the object. In other cases, the prefresher 904 generates a request for the object. In yet another case, the prefresher 904 generates a conditional get request for the object. That is, in some embodiments, the prefresher 904 generates a request to obtain the object only if the object has changed or has been modified. In some embodiments, the generated request comprises one packet. In other embodiments, the generated request comprises multiple packets.

In one embodiment, the prefresher 904 generates a request for an object located in the cache 232. In yet other embodiments, the prefresher 904 generates a request 750 identified as speculative or with a QoS priority lower than non-prefetch requests, such as discussed in conjunction with FIGS. 7A-7D. In some embodiments, the prefresher 904 generates a request for the object using an application layer protocol. In another embodiment, the prefresher 904 uses the same protocol as the intercepted page. In some embodiments, the prefresher 904 generates an HTTP request for the object. In another embodiment, the prefresher 904 uses an extensible markup language (XML) to generate a request for the object.

In some embodiments, the prefresher 904 transmits the generated request to a server 106. In one embodiment, the prefresher 904 transmits the generated request to the originating server or the server 106 transmitting the intercepted page. In other embodiment, the prefresher 904 transmits the generated request to one of a plurality of server 106A-160N having the object. In many embodiment, the prefresher 904 receives a response to the request. Based upon the response, the prefresher 904 may determine the object stored in the cache is valid, or does not otherwise need to be updated. In some embodiments, the prefresher 904 determines from the response from the server 106 that the object in the cache has been modified. In one embodiment, the prefresher 904 receives an updated version of the object with the response and stores the object to the cache 232. In yet another embodiment, the prefresher 804 receives with the response the portions of the object that have been modified. In some embodiments, the prefresher 904 receives a response having a status indicating that the object has been modified on the server. In response, the prefresher 904 may generate a second request to obtain the modified object from a server 106.

In one embodiment, the prefresher 904 is designed and constructed to generate requests for objects responsive to interception of the page and/or identification of objects. In other embodiments, the prefresher 904 is designed and constructed to generate requests for objects responsive to the packet processing engine 240. In another embodiment, the prefresher 904 is designed and constructed to generates requests for objects responsive to a predetermined number of packets, sent and/or received, being processed by the packet processing engine 240. In other embodiments, the 904 is designed and constructed to generates requests responsive to a timer. In one embodiment, the prefresher 904 is designed and constructed to generates requests responsive to network bandwidth or utilization, such as via the bandwidth detector 702 discussed in conjunction with FIG. 7A. In yet another embodiment, the prefresher 904 may be responsive to the current load of the device, such as the number of concurrent connections, and/or CPU, disk and memory usage.

In some embodiments, the prefresher 904 is responsive to one or more policies of a policy engine 295 to determine when to generates requests for objects and/or transmit requests for objects. As such, the prefresher 904, in some embodiments, may be configured and responsive to policies based on the identification or type of user, client, server, or network connection. In some embodiments, the prefresher 904 may be responsive to policies based on any temporal information, such as within a predetermined time threshold of intercepting a page. In other embodiments, the prefresher 904 may be responsive to policies based on the type of network traffic, protocol or any portion or content of a network packet, such as source and destination addresses and ports, and TCP or IP options. In one embodiment, the prefresher 904 may be responsive to policies based on any attributes or characteristics of a client 102 or server 106 such as via end point detection, for example, via a collection agent 304 as described in conjunction with FIG. 3.

Referring now to FIG. 9B, an embodiment of a method 900 for performing a technique of prefreshening cached objects by a device is depicted. The device may be an appliance 200 or an end node, such as a client 102. In brief overview, at step 905, a device intercepts or otherwise receives a page identifying one or more objects. At step 910, the device forwards the pages to the requestor. At step 915, the device determines the object identifying by the intercepted page is located or exists in the cache. At step 920, the device generates a request for a status or update of the object and transmits the request to the server. At step 925, the device receives a response from the server and determines a status of the object from the response. At step 930, the device determines from the response that the object has not been modified on the originating server. At step 935, the device determines from the response that the object has been modified on the originating server. In some embodiments, the device receives the updated object from the server's response. In other embodiments, the device obtains the object from the server in response to the determined status.

In further details, a step 905, the device intercepts or otherwise receives any type and form of communication from one device to another device identifying an object, such as a page transmitted from a server to a client. In one embodiment, the device intercepts a response from a server to a client's request for an object. In some embodiments, the server 106 transmits one or more network packets having an application protocol layer payload identifying an object. For example, in one embodiment, the device intercepts a web or HTTP page transmitted by a server 106 to a client 102 and the page includes a uniform resource locator (URL) or hyperlink identifying an object. In some embodiments, the appliance 200 intercepts a page identified by a URL and the page identifies one or more objects. At step 910, the device forwards or transmits the intercepted page to the requestor, such as client 102.

At step 915, the device or prefresher 904 determines if the object identified by the intercepted page is located or exists in a cache 232. In some embodiments, the cache 232 is located on the device. In other embodiments, the cache 232 is located on a second device. In one embodiment, the prefresher queries the cache 232 to locate the object in the cache 232. In some embodiments, the prefresher searches for the object in storage. In other embodiments, the prefresher 904 determines the object is in cache via a query or lookup in an object or cache index. In yet other embodiments, the prefresher 904 uses an application programming interface (API), function call or script to determine whether the object is located in storage of the device or a cache 232. In some embodiments, prefresher 904 sends a query via a message to another application, program, service, process or task to determine if the object is located in a cache 232 of the device intercepting the page or another device having the cache 232.

At step 920, the device or prefresher 904 generates a request for a status or update of the object and transmits the request to a server. In some embodiments, the prefresher 904 generates a request for a status of the object. In other embodiments, the prefresher 904 generates a request to obtain or get the object from a server. In yet another embodiment, the prefresher 904 generates a request for a conditional get of the object. In some embodiments, the prefresher 904 generates requests for a plurality of objects.

In one embodiment, the prefresher 904 generates requests for an object within a predetermined size. In some embodiments, the prefresher 904 skips generating requests for objects in the cache larger than a predetermined size. In yet another embodiment, the prefresher 904 does not generate requests for an object smaller than a predetermined size. In one embodiment, the prefresher 904 generates requests for objects larger than a predetermined size. In yet other embodiments, the prefresher 904 generates requests for objects within a predetermines size range—larger than a first predetermined size and smaller than a second predetermined size. In some embodiments, the prefresher 904 dynamically determines the size of objects to prefresh in accordance with a policy of the policy engine 295. In other embodiments, the prefresher 904 dynamically adjusts any predetermined size thresholds based on the operation and/or performance of the device, such as response time, number of concurrent connections, bandwidth availability or bandwidth utilizations, and CPU and memory usage.

In yet other embodiments, the prefresher 904 determines the remaining expiration time of the object in the cache 232.

In one embodiment, the prefresher 904 generates a request if the remaining expiration time is within a predetermined threshold. For example, if the object's expiration time indicates the object is relatively fresh or recently updates, then the prefresher 904 in one embodiment does not generates a request to prefreshen the object in the cache 232. In other embodiments, if the object's expiration time indicates the object is about to expire or expire within a predetermined time, then the prefresher 904 in another embodiment generates a request to prefreshen the object in the cache 232.

The device or prefresher 904 transmits the generated request to a server 106. In some embodiments, the prefresher 904 transmits the generated request to the originating server 106 or the server originating the intercepted page. In other embodiments, the prefresher 904 transmits the request to a server having a copy of the object or also providing the object. In another embodiment, the prefresher 904 transmits a plurality of generated requests to one or more servers. In one embodiment, the prefresher 904 transmits one or more requests to a server farm.

At step 925, the device or prefresher 904 receives a response from the server and determines a status of the object from the response. In some embodiments, the prefresher 904 determines the status of the object from the content of the application payload of the response. In other embodiments, the prefresher 904 determines the status of the object from header information of the response. In another embodiment, the prefresher 904 determines the status of the object from an object header. In one embodiment, the prefresher 904 determines the status of the object from a status identifier in the response. Based on the response and/or any content of the response, the prefresher 904 determines whether or not the object is valid or fresh.

At step 930, the device determines from the response that the object has not been modified on the originating server. For example, in an embodiment of an HTTP conditional get request, the device receives a "304 Not Modified Response." In one embodiment, the prefresher 904 determines the object has not been modified. In some embodiments, the prefresher 904 determines the object in the cache 232 is valid. In other embodiments, the prefresher 904 determines the object in the cache 232 does not need to be updated or freshened. In some embodiments, the prefresher 904 determines the expiration period of the object in the cache has not expired.

At step 935, the device determines from the response that the object has been modified. In one embodiment, the prefresher 904 updates the object in the cache with the status information. In another embodiment, the prefresher 904 receives the object with the response and stores or otherwise update the object in the cache 232. In one embodiment, the prefresher 904 receives via the response a portion of the object that has changed and stores the changes to the object in the cache 232 or otherwise updates the object in the cache 232. In other embodiments, the prefresher 904 receives an indicator the object in cache has been modified on the server or is otherwise expired. In one embodiment, the prefresher 904 transmits a request to obtain an update of the object, or portion thereof, which has been modified. Upon receipt of the update or changes portions to the object, the prefresher updates the object in the cache 232.

Although an embodiment of the method 900 is generally described above as prefreshening an object identified via a page, such as via HTTP, the method 900 may be practiced such as to prefreshen a plurality of objects identified via a plurality of sub-pages, hyperlinks, layers of content, or a hierarchy of pages. For example, as illustrated via the hierarchy or sets of pages 950, a first object identifier, URL or hyperlink of a first page may identify a second object identifier, URL or hyperlink of a second page, which in turn may identify a third object identifier, URL or hyperlink of a third page, and so on. As such, in some embodiments, a page intercepted by the device may have a hierarchy of sub-pages, hyperlinks, links to objects or content layers of a predetermined depth. Furthermore, although an embodiment of the method 900 is generally described above as prefreshening an object identified via a page, such as via HTTP, the method 900 may be practiced with non-HTTP protocols, objects and content.

In some embodiments, the prefreshening technique in an embodiment of method 700 is performed on a plurality of sub-pages and objects on the sub-pages identified via the intercepted page. In these embodiments, the device may perform steps 915 through 935 on each sub-page, layer or hierarchy to a predetermined depth threshold 952. In some embodiments, the device may performs steps 915 through 935 on a predetermined depth threshold 952 of 2. In some embodiments, the device may performs steps 915 through 935 on a predetermined depth threshold 952 of 3, 4 of 5. In yet another embodiment, the device may perform steps 915 through 935 for a predetermined depth threshold 952 equal to the depth of pages, hyperlinks or content layers that can be traversed or identified via the intercepted page at step 905. In one embodiment, the device may perform steps 915 through 935 until either the predetermined depth threshold 952 is reached or another page is intercepted.

In some embodiments, the device may perform steps 915 through 935 on a second depth or page upon receipt of a request of an object from a previous depth or page. For example, in one embodiment, the device performs steps 915 through 935 for one or more objects identified via a first page. The first page may have hyperlinks to sub-pages. The device then may perform steps 915 through 935 for a sub-ages upon intercepts a request from the receiver of the page for one or more objects from the first page. Then the device may performs steps 915 through 935 on the next page or to a predetermined depth threshold 952. In yet another embodiment, the device may dynamically adjust the predetermined depth threshold 952 based on any one or more operations or performance characteristics of the device, such as response time, number of concurrent connections, bandwidth availability or bandwidth utilizations, and CPU and memory usage.

In other embodiments of using this prefreshening technique as described above, the objects located in the cache may be identified as stale but have not been changed or modified on the originating server. In these embodiments, the prefreshening technique may result mostly in responses indicating the object has not been modified rather than actual object transfers. As such, in some cases, the bandwidth requirements and server load for this prefreshening technique may be very small or negligible. In one embodiment, this prefreshening technique may be performed using available or ordinary bandwidth without noticeable degradation in network or system performance. For example, the device identifies the generated requests as having the same priority as other non-prefreshening requests or network traffic. In other embodiments, this prefreshening technique is performed in conjunction with any type and form of QoS technique, such as the QoS prefetching technique illustrated by FIGS. 7A-7D. In these embodiments, the device generates prefreshening requests identified as speculative or having a lower priority than non-prefreshening requests.

J. Systems and Methods for Determining Whether to Prefetch or Freshen/PreFreshen an Object Based on Header Information of the Object Referring now to FIGS. 10A and 10B, systems and methods of using object header information for determining whether to prefetch an object are depicted. When a device, such as an appliance 200 or client 102 prefetches objects, the device parses intercepted pages looking for objects identified by links on the page. Then the device obtains the object targeted or identified by the link. In some embodiments, the device does not know whether the object is worth prefetching. As the link or identifier merely identifies the object, the device may not have enough information to determine whether the object is a type of object or has content the device desires to prefetch. The prefetching or freshening technique described herein allows the device to first obtain more information on the object prior to prefetching the object.

Figure 10A:
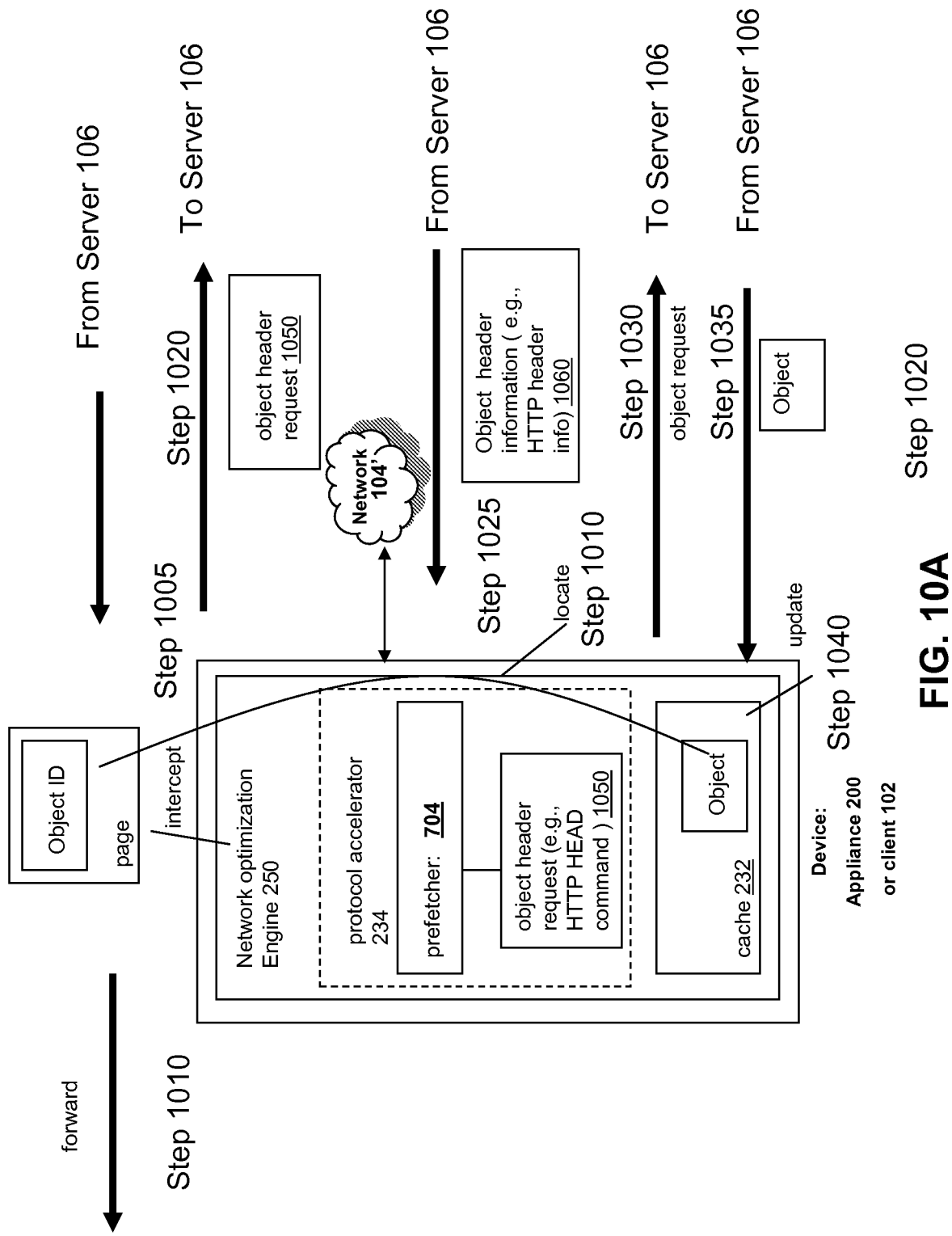
FIG. 10A is a block diagram of an example embodiment of a system for determining to prefetch an objects by requesting header information of the object from a server as described in conjunction with FIG. 10B.

In brief overview of FIG. 10A, a device, such as an appliance 200 or client 102, includes a network optimization engine 250. The network optimization engine 250 may include an HTTP protocol accelerator 234 having an embodiment of a prefetcher 704 as described in conjunction with FIG. 7A. In other embodiments, such as described in the conjunction with FIGS. 9A and 9B, the protocol accelerator 234 or prefetcher 704 includes the prefresher 904. In operation of the device and an example of HTTP, the device intercepts HTTP pages identifying one or more HTTP objects. In response to the identification of the HTTP objects or otherwise upon a determination to prefetch, the prefetcher 704 transmits an HTTP head command or request to a server 106 to obtain header information for the object. In response to the head command, the server may reply with a response returning the HTTP headers for the identified HTTP object. The prefetcher 904 then examines or inspects the header information of the response. Based on the header information, the prefetcher response to determine whether or not to obtain the object from the server 106

Figure 10B:
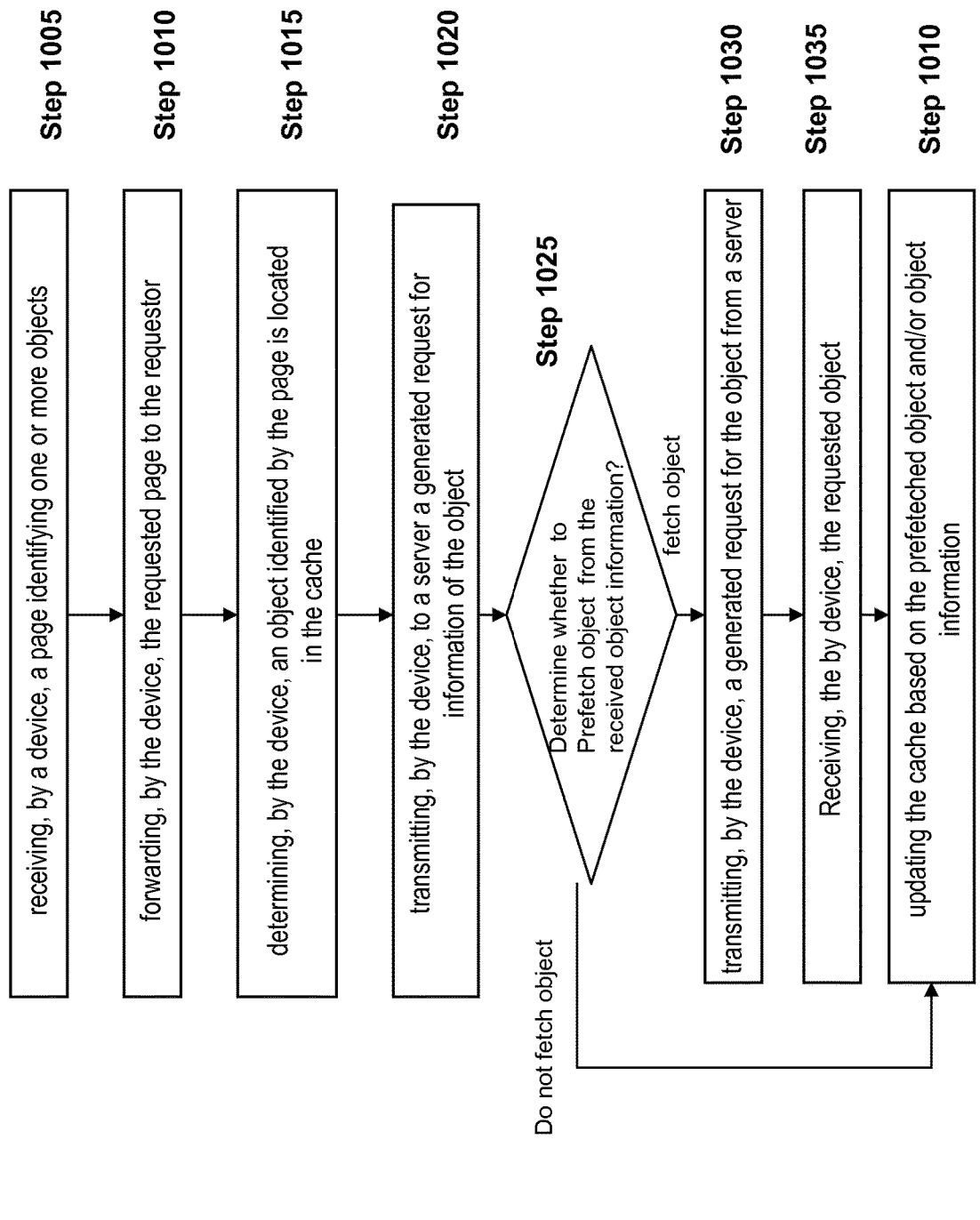
FIG. 10B is a flow diagram of steps of an embodiment of a method for determining to prefetch an object responsive to obtaining header information of the object from a server.

Referring now to FIG. 10B, an embodiment of a technique for using object information, such as HTTP header information, to determine whether or not to fetch or prefetch an object is depicted. Although an embodiment of this method 1000 will be discussed in the content of prefetching, embodiments of this method can be performed for freshening objects or for prefreshening, such as with the prefresher 904 of FIG. 8A.

In brief overview of method 1000, at step 1005, a device, such as an appliance 200 or client 102, intercepts or otherwise receives a communication, such as a page, identifying one or more objects. For example, the device may intercept a web page having one or more links or URLs to objects served by an originating server 106. As step 1010, the device forwards the intercepted page to the requestor, such as a client, user or application on a client. At step 1015, the device determines an object identified via the intercepted page is located or exists in the cache 232. In response to the determination, at step 1020, the device generates a request to obtain header information on the object, such as for example, via the HTTP head command. The device transmits the generated request to a server. At step 1025, the device receives a response from the server providing header information on the object, such an HTTP header values for an HTTP object. Based on the header information of the response, the device determines whether or not to fetch or prefetch the object from the server. In one embodiment, the device determines not to fetch the object. In these cases, the device may update information of the object in the cache 232 based on information received via the response. In some embodiments, the device determines to fetch the object based on the response. At step 1030, the device generates and transmits a request for the object from the server. At step 1035, the device receives from the server a response including the requested object. At step 1040, the devices updates the object stored in the cache based on the object received in the response at step 1035. In some embodiments, the device also updates the information of the object in the cache based on the header information received in the response at step 1025.

In further details, at step 1005, the device intercepts or receives any type and form of communication from one device to another device identifying an object, such as a page transmitted from a server to a client. In one embodiment, the device is an appliance 200. In another embodiment, the device is a client 102. In one embodiment, the device intercepts a response from a server to a client's request for an object. In some embodiments, the server 106 transmits one or more network packets having an application protocol layer payload identifying an object. For example, in one embodiment, the device intercepts a web or HTTP page transmitted by a server 106 to a client 102 and the page includes a uniform resource locator (URL) or hyperlink identifying an object. In some embodiments, the device, such as a client, intercepts a page identified by a URL and the page identifies one or more objects.

At step 1010, the device forwards or transmits the intercepted page, response or communication to the requestor. In one embodiment, the device forwards the intercepted page upon interception or immediately thereafter. In other embodiments, the device forwards the intercepted page after identifying one or objects on the page. In yet another embodiment, the device makes a copy of the intercepted page for further processing, and forwards the page to the requestor upon making the copy. In some embodiments, the device forwards the intercepted communication to the requestor of a client 102. In other embodiments, the device forwards the intercepted page to an application, such as a web browser. In another embodiment, the device forwards the page to a user.

At step 1015, the device and/or prefetcher 904 determines whether or not an object identified by the intercepted communication is located, stored or otherwise exists in a cache 232. In some embodiments, the cache 232 is located on the device. In other embodiments, the cache 232 is located on another device accessible by the appliance 200 or client 10. In one embodiment, the prefetcher 904 queries the cache 232 to locate the object in the cache 232. In some embodiments, the prefresher 904 searches for the object in storage. In other embodiments, the prefresher 904 determines the object is in cache via a query or lookup in an object or cache index. In yet other embodiments, the prefresher 904 uses an application programming interface (API), function call or script to determine whether the object is located in storage of the device or a cache 232. In some embodiments, prefresher 904 sends a query via a message to another application, program, service, process or task to determine if the object is located in a cache 232 of the device intercepting the page or to another device having the cache 232.

At step 1020, in response to determining the identified object is stored or located in a cache 232, the device and/or prefetcher 904 generates a request to obtain object information or header information of the object. In one embodiment, the prefetcher 904 generates an HTTP head command to request header information on the identified object. In other embodiments, the prefetcher 904 generates a request to query or obtain information on the object using any type and form of application protocol. For example, in one embodiment, the prefetcher 904 may use XML language to request object information or object header information. In some embodiments, the prefetcher 904 generates a request to obtain object information from a database system or object repository. In other embodiments, the prefetcher 904 generates a request to make a remote procedure call to obtain properties or attributes of an instance of the object in a remote system or application. In some embodiments, the prefetcher 904 generates the request with a priority for speculative prefetching such as described in conjunction with FIGS. 7A-7D. In other embodiments, the prefetcher 904 uses any type and form of QoS scheduling and/or priorities to schedule and transmit the generated request.

Further to step 1020, the device transmits the generated request for object information to a server 106. In one embodiment, the device transmits the generated request to the server originating the page. In another embodiment, the device transmits the generated request to a second server. In some embodiments, the device transmits the generated request to a server farm. In other embodiments, the device transmits the generated request to a second appliance 200'. In one embodiment, the device transmits the generated request in accordance with any QoS priority assigned to or associated with the generated request. In some embodiments, the device transmits the generated request at a priority lower than non-prefetching requests. In other embodiments, the device transmits the generated request at a priority lower than the non-prefetching requests received and processed by the device from clients, users or applications on a client.

At step 1025, the device receives a response from the server having information identifying information on the object. In one embodiment, the device receives a response having object header information. For example, in an embodiment of HTTP, the device receives a response of having any one or more HTTP headers. In some embodiments, the response has one or more of the following HTTP headers: accept-ranges, age, allow, cache-control, content-encoding, content-language, content-length, content-location, content-type, date, etag, expires, last-modified, location, pragma, proxy-authenticate, retry-after, server, and vary. In other embodiments, the device receives a response having an XML content identifying one or more attributes, properties or name-value pairs of an object. In another embodiment, the device receives a response having a message with name-value pairs identifying information of the object. In yet some embodiments, the device receives a remote procedure call response identifying properties or attributes of the object. In one embodiment, the device receives object information identifying one or more portions of the object that have been changed or modified.

Based on the object information received in the response, the device determines whether or not to fetch, pre-fetch or otherwise obtain the object from a server. In one embodiment, if the object information indicates the object stored in cache is expired, the prefetcher 904 determines to obtain the object from a server. In another embodiment, if the object information indicates the object stored in cache is about to expire, the prefetcher 904 determines to obtain the object from a server. In some embodiments, if the object information indicates the object has been modified on the originating server, the prefetcher 904 determines to obtain the object from a server. In other embodiments, if the object information indicates the size of the object is within a predetermined threshold, the prefetcher 904 determines to obtain the object from a server. In yet another embodiment, if the object information indicates the type and/or content of the object is acceptable, suitable or otherwise processable by the device, prefetcher 904, and/or cache 232, the prefetcher 904 determines to obtain the object from a server.

In response to determining to obtain the object from a server, at step 1035, the device and/or prefetcher 904 generates a request for the object. In one embodiment, prefetcher 904 generates an HTTP get request for the object. In some embodiments, the prefetcher 904 generates a conditional request for the object, such as an HTTP conditional get. In one embodiment, the prefetcher 904 generates a request to obtain portions of the object that have been modified. In other embodiments, the prefetcher generates a request for the object using any type and form of application layer protocol, such as XML. In one embodiment, the prefetcher 904 generates a request to obtain the object from a database. In other embodiments, the prefetcher 904 generates a request to obtain the object from a location identified by the object information, such as via an HTTP location header. In another embodiment, the prefetcher 904 generates a request to obtain the object from another device, such as a client 102, appliance 200 or a second cache 232'. In some embodiments, the prefetcher 904 generates a speculative request for the object as described in conjunction with FIGS. 7A-7D. In one embodiment, the prefetcher 904 generates the request for the object with a QoS associated with or assigned to prefetching requests and/or response.

At step 1030, the device transmits the generated request for the object to a server 106. In some embodiments, the device transmits the generated request to a server farm. In other embodiments, the device transmits the generated request to a second device or appliance 200'. In one embodiment, the device transmits the generated request in accordance with any QoS priority assigned to or associated with the generated request. In some embodiments, the device transmits the generated request at a priority lower than non-prefetching requests. In other embodiments, the device transmits the generated request at a priority lower than the non-prefetching requests received and processed by the device from clients, users or applications on a client.

At step 1035, the device receives a response to the generated and transmits request of step 1030. In one embodiment, the device receives a response having the object. For example, the device may receive an HTTP response having an HTTP body including the object. In some embodiments, the device receives the object via an application layer protocol. In one embodiment, the device receives the object via XML. In other embodiments, the device receives one or more portions of the object that have been modified. In another embodiment, in response to a conditional get, the device receives a response without the object. In this embodiment, the device may receive a second object header information. For example, the device may receive a second set of one or more HTTP headers identifying the object has not been modified.

At step 1040, the device and/or prefetcher 904 updates the object, or information thereof, stored in the cache 232. In one embodiment, the prefetcher 904 stores an updated version of the object in the cache 232. In another embodiment, the prefetcher 904 updates or stores the changes to portions of the object to the cache 232. In some embodiments, the prefetcher 905 updates object information of the cached object. For example, the prefetcher 904 updates expiration or validation information of the object in the cache 232.

In some embodiments, at step 1025, the device and/or prefetcher 904 does not fetch, pre-fetch or otherwise obtain the object from a server based on the received object information. In one embodiment, if the object information indicates the object stored in cache is fresh or otherwise not expires, the prefetcher 904 determines not to obtain the object from a server. In another embodiment, if the object information indicates the object stored in cache is not to expire for a predetermined time period, the prefetcher 904 determines not to obtain the object from a server. In some embodiments, if the object information indicates the object has not been modified on the originating server or is otherwise fresh, the prefetcher 904 determines not to obtain the object from a server. In other embodiments, if the object information indicates the size of the object exceeds a predetermined threshold, the prefetcher 904 determines not to obtain the object from a server. In yet another embodiment, if the object information indicates a type and/or content of the object is not acceptable, suitable or otherwise processable by the device or cache 232, the prefetcher 904 determines not to obtain the object from a server.

Although the device and/or prefetcher may determine not to fetch, pre-fetch or obtain the object at step 1025, the device and/or prefetcher 904 may update information on the object in the cache 232 based on the received object information. As such, the device and/or prefetcher 904 may update object information in the cache 232 at step 1040. For example, in the case of HTTP, the device and/or prefetcher 904 may use any of the HTTP header fields to update the object in the cache 232. In one embodiment, the prefetcher 904 compares the object header information receives at step 1025 with the header information stored in the cache 232. In some embodiments, if the information is different, the prefetcher 904 and/or cache manager 232 updates the header information stores in the cache 232.

Although this technique is generally described above in an embodiment of HTTP and obtaining HTTP header information of an object, the techniques described herein may be used with any other protocol in which information about an object may be obtained without fetching the object itself.

Furthermore, although the object header information technique of method 1000 is generally described in connection with prefetching objects, this technique can be used by a cache manager 232 or prefresher 904 to freshen or prefreshen a cached object, such as with the prefreshening techniques described in conjunction with FIGS. 9A and 9B. In some embodiments, the cache manager 232 uses these headers to update the freshness of an object that is stored in the cache 232. For example, in the case of HTTP headers, the "Expires," "max-age," and "Last-Modified" header fields that are returned in the header information are applied by the cache manager 232 to the cached object. In one embodiment, the cache manager 232 uses the updated header information to mark a stale object in the cache 232 as fresh. In another embodiment, the cache manager 232 uses the updated header information to extend the freshness lifetime of a cached object that is already marked fresh.

Figure 10C:
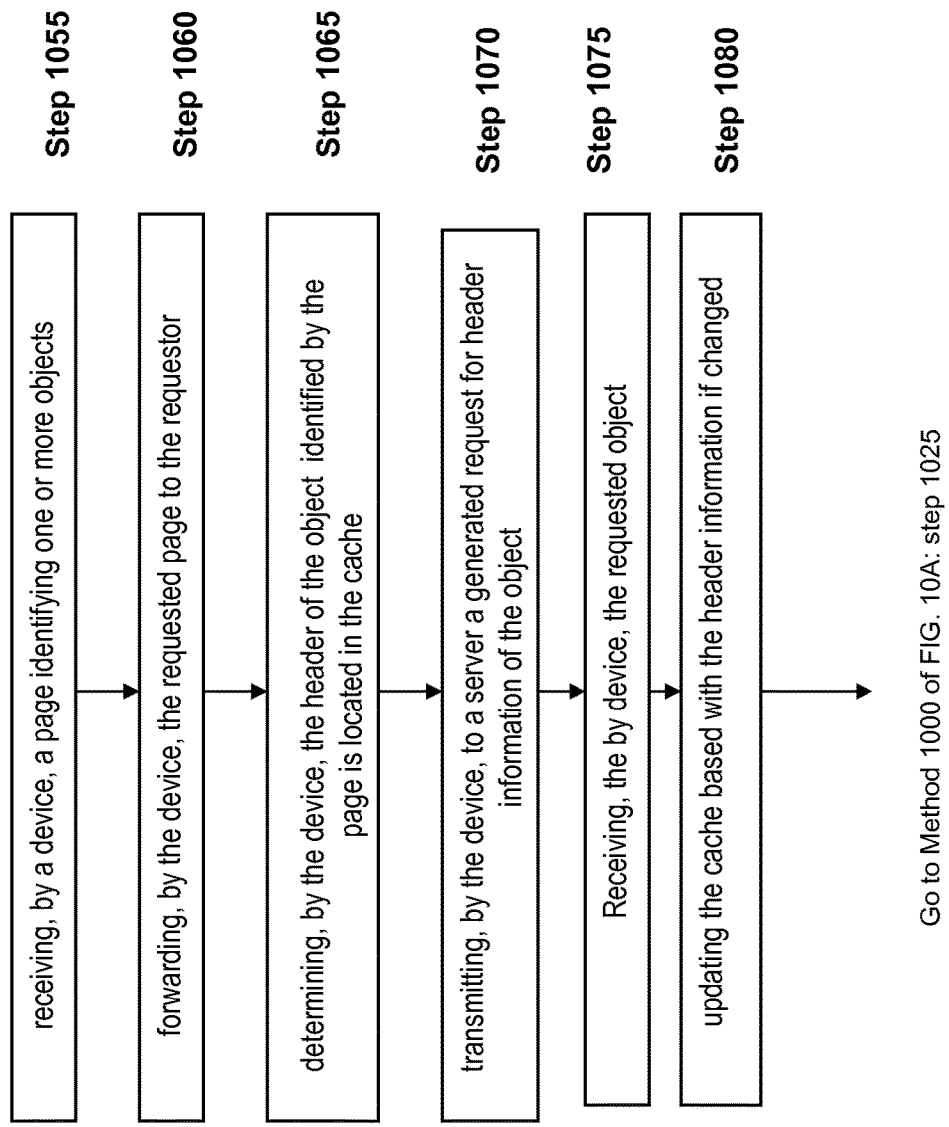
FIG. 10C is a flow diagram of steps of an embodiment of a method for updating header information of the object in the cache in conjunction with FIG. 10A.

Referring now to FIG. 10C, an embodiment of a method for prefetching object header information is depicted. In some embodiments, the caching device caches the status of object and may not have the object cached. For example, the caching device may cache the HTTP header of an HTTP based object. In some case, these cached headers may be considered stale by the client or the cache. The caching device may check the header information of an object with the origin server in advance of the client's request for the object. If the header of the object has change, the device stores the updated headers in the cache. If the client request the headers, either with an HTTP header command or implicitly through an "if-modified since" GET command, the device may service the request with the cached header information.

In brief overview of method 1050, at step 1055, a device, such as an appliance 200 or client 102, intercepts or otherwise receives a communication, such as a page, identifying one or more objects. For example, the device may intercept a web page having one or more links or URLs to objects served by an originating server 106. As step 1060, the device forwards the intercepted page to the requestor, such as a client, user or application on a client. At step 1065, the device determines the header information for an object identified via the intercepted page is located or exists in the cache 232. In response to the determination, at step 1070, the device generates a request to obtain the header information of the object, such as for example, via the HTTP head command. The device transmits the generated request to a server. At step 1075, the device receives a response from the server providing header information on the object, such an HTTP header values for an HTTP object. At step 1080, the devices updates the header information for object stored in the cache based on the header information received by the response from the server.

In further details, at step 1055, the caching device intercepts any type and form of communication from one device to another device identifying an object, such as a page transmitted from a server to a client. In one embodiment, the device is an appliance 200. In another embodiment, the device is a client 102. In one embodiment, the device intercepts a response from a server to a client's request for an object. In some embodiments, the server 106 transmits one or more network packets having an application protocol layer payload identifying an object.

At step 1060, the device forwards or transmits the intercepted page, response or communication to the requestor. In one embodiment, the device forwards the intercepted page upon interception or immediately thereafter. In other embodiments, the device forwards the intercepted page after identifying one or objects on the page. In yet another embodiment, the device makes a copy of the intercepted page for further processing, and forwards the page to the requestor upon making the copy. In some embodiments, the device forwards the intercepted communication to the requestor of a client 102. In other embodiments, the device forwards the intercepted page to an application, such as a web browser. In another embodiment, the device forwards the page to a user.

At step 1065, the device and/or prefetcher 904 determines whether or not header information for an object identified by the intercepted communication is located, stored or otherwise exists in a cache 232. In some embodiments, the cache 232 is located on the device. In other embodiments, the cache 232 is located on another device accessible by the appliance 200 or client 10. In one embodiment, the prefetcher 904 queries the cache 232 to locate the object header in the cache 232. In some embodiments, the prefresher 904 searches for the object header in storage. In other embodiments, the prefresher 904 determines the object header is in cache via a query or lookup in an object or cache index. In yet other embodiments, the prefresher 904 uses an application programming interface (API), function call or script to determine whether the object header is located in storage of the device or a cache 232. In some embodiments, prefresher 904 sends a query via a message to another application, program, service, process or task to determine if the header information for the object is located in a cache 232 of the device intercepting the page or to another device having the cache 232.

At step 1070, in response to determining the header information for the identified object is stored or located in a cache 232, the device and/or prefetcher 904 generates a request to obtain header information of the object. In one embodiment, the prefetcher 904 generates an HTTP head command to request header information on the identified object. In other embodiments, the prefetcher 904 generates a request to query or obtain header information on the object using any type and form of application protocol. For example, in one embodiment, the prefetcher 904 may use XML language to request object header information. In some embodiments, the prefetcher 904 generates a request to obtain the object's header information from a database system or object repository. In some embodiments, the prefetcher 904 generates the request with a priority for speculative prefetching such as described in conjunction with FIGS. 7A-7D. In other embodiments, the prefetcher 904 uses any type and form of QoS scheduling and/or priorities to schedule and transmit the generated request.

Further to step 1070, the device transmits the generated request for the header information of the identified object to a server 106. In one embodiment, the device transmits the generated request to the server originating the page. In another embodiment, the device transmits the generated request to a second server. In some embodiments, the device transmits the generated request to a server farm. In other embodiments, the device transmits the generated request to a second appliance 200'. In one embodiment, the device transmits the generated request in accordance with any QoS priority assigned to or associated with the generated request. In some embodiments, the device transmits the generated request at a priority lower than non-prefetching requests. In other embodiments, the device transmits the generated request at a priority lower than the non-prefetching requests received and processed by the device from clients, users or applications on a client.

At step 1075, the caching device receives a response from the server having information identifying the header information on the object. For example, in an embodiment of HTTP, the device receives a response of having any one or more HTTP headers. In some embodiments, the response has one or more of the following HTTP headers: accept-ranges, age, allow, cache-control, content-encoding, content-language, content-length, content-location, content-type, date, etag, expires, last-modified, location, pragma, proxy-authenticate, retry-after, server, and vary. In other embodiments, the device receives a response having an XML content identifying one or more attributes, properties or name-value pairs providing header information for object. In another embodiment, the device receives a response having a message with name-value pairs identifying header information of the object. In yet some embodiments, the device receives a remote procedure call response identifying properties or attributes of the object's header.

At step 1080, the caching device and/or prefetcher 904 updates the object's header information stored in the cache 232. In one embodiment, the prefetcher 904 stores an updated version of the header in the cache 232. In another embodiment, the prefetcher 904 updates or stores the changes to portions of the object header to the cache 232. For example, the prefetcher 904 updates expiration or validation information of the header information in the cache 232. In other embodiments, the device determines the header information has not changes and does not update the cached header information.

In some embodiments, upon prefetching the header information, the caching device may determine whether or not to prefetch the object identified in the intercepted communication. In one embodiment, the method 1050 continues at step 1025 of the embodiment of method 1000 described in FIG. 10B.

In many cases, a large proportion of cache hits are "near-hits"—objects that are in the cache and marked as stale, but are identical to the content on the server. A prefreshening algorithm that requests only header information such as via the HTTP head command will give significant benefits in determining whether or not to fetch, prefetch, prefresh or freshening the object but will use almost no or little bandwidth K. Systems and Methods for Prefetching or Using Non-Cacheable Content of Dynamically Generated Pages as Compression History Referring now to FIGS. 11A-11D systems and methods for using non-cacheable content of dynamically generated pages as data in a compression history between compressing and/or caching devices is depicted. In some cases, a server transmits to a first user a personalized version, or dynamically generated version of a requested web page. This dynamically generated page may not be identified as cacheable or under cache control. For example, one or more objects of the dynamically generated by the server may not be identified by the server as cacheable. The server may also transmit a personalized version of the web page to a second user. In some cases, portions of the data of the first user's personalized web page may be the same as portions of the second user's version of the same page. Similarly, the personalized version of the page the first user subsequently receives, say after an hour from the first request, may be the same or similar to the first previous personalized web-page of the first user. The systems and methods of the compression engine described below leverage the similarities of data between non-cacheable dynamically generated pages to improve compressibility of content communicated between compressing devices.

Figure 11A:
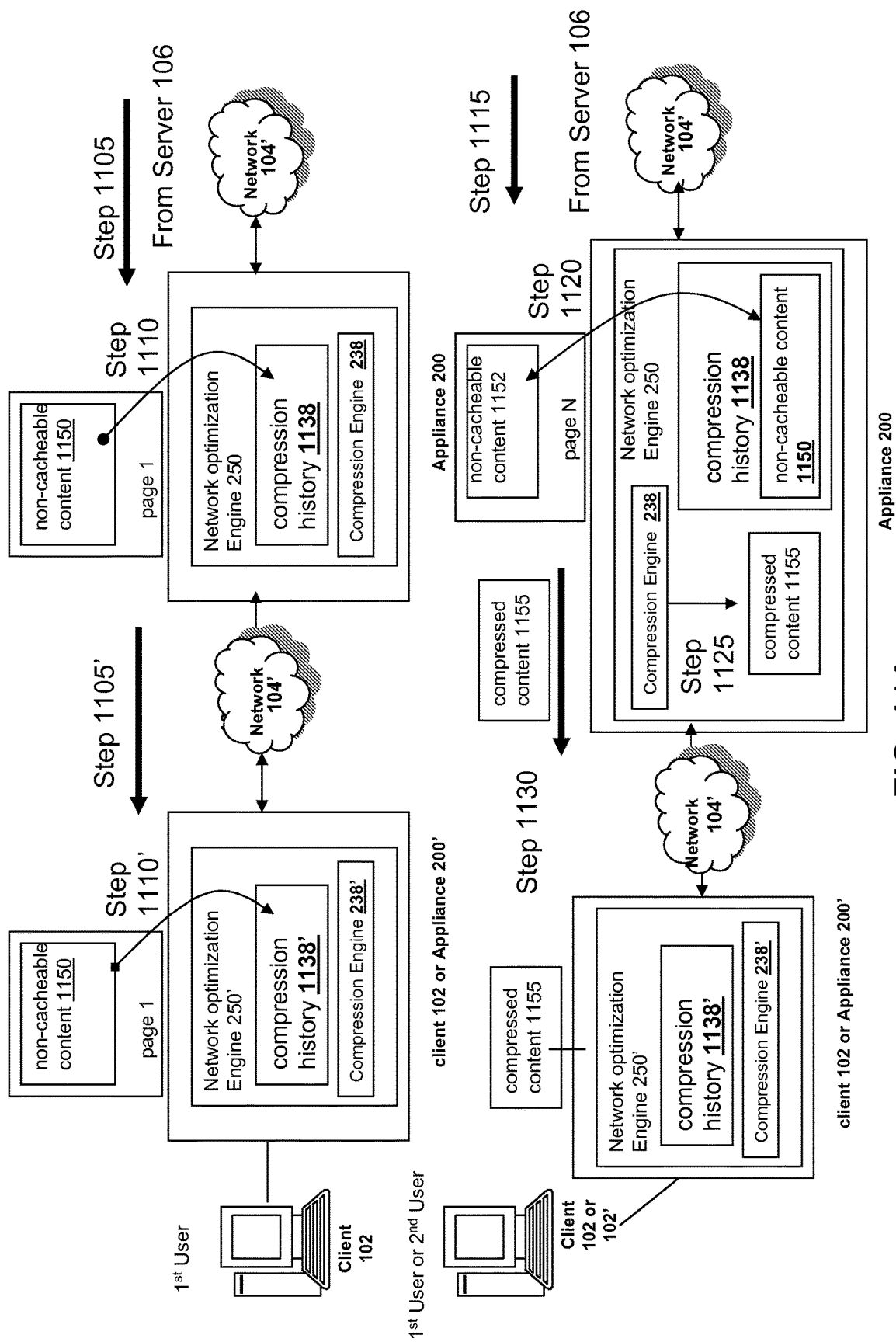
FIG. 11A is a block diagram of an example embodiment of a system for using non-cacheable content as compression history as described in conjunction with FIG. 11A.

Referring to FIG. 11A, embodiments of systems for using non-cacheable content as data of a compression history used between compression devices are depicted. In brief overview, a first device, such as a first appliance 200, and a second device, such as client 102 or a second appliance 200' compress communications transmitted between the devices using data of a compression history. The first appliance 200 has a first compression history 1138 that is shared, synchronized or used in conjunction with a second compression history 1138' of the second appliance 200' or the client 102. The first appliance 200 intercepts content from a server 106. A compression engine 238 of the appliance 200 compresses the intercepted content using data from the compression history 1138. The first appliance 200 transmits the compressed content. The second appliance 200' or client 102 receives the compressed content and a second compression engine 238' decompresses the compressed content using the data from the second compression history 1138'. The second compression history 1138' has the same data of the first compression history 1138 used by the compression engine 238 of appliance 200. Likewise, the second appliance 200' or client 102 transmits compressed content compressed via compression engine 238' and the second compression history 1138'. The first appliance 200 receives the compressed content and decompressed the content using the shared data of the first compression history 1138.

In further overview and as illustrated by the system embodiment at the top of FIG. 11A, the first appliance 200 may intercept non-cacheable content 1150 transmitted by a server 106 to a client 102. For example, the non-cacheable content 1150 may include a dynamically generated or personalized web page for a first user of a client 102. Although the appliance 200 identifies the content as non-cacheable, the appliance 200 stores the content to the compression history 1138, which may also be the cache 232, or a portion thereof. The second appliance 200' and/or client 102 may also intercept the non-cacheable content 1150, identify the content as non-cacheable and store the non-cacheable content to the compression history 1138'. The appliance 200, 200' and/or client 102 may intercept multiple pages of non-cacheable content 1150 and store the content to the respective compression histories 1138, 1138'.

As illustrated by the system embodiment located in the lower half of FIG. 11A, the first user or a second user of the client 102 may request a second dynamically generated or personalized page from the server 106. The first appliance 200 intercepts the second non-cacheable content 1152 transmitted by the server 106. A portion of data of the second non-cacheable content 1152 comprises the same data as a portion of data of the first non-cacheable content 1150 stored in the compression history 1138. The compression engine 238 generates a compressed version 1155 of the non-cacheable content 1152 based on the first non-cacheable content 1150 stored in the compression history 1138. The first appliance 200 transmits the compressed content 1155 to the client 102 or second appliance 200'. The client 102 or second appliance 200' intercepts the compressed content 1155, and the compression engine 238' decompresses the compressed version 1155 of the second non-cacheable content 1152 using the first non-cacheable content 1150 stored in the second compression history 1138'.

In some embodiments, the non-cacheable content 1150, 1152 includes one or more dynamically generated objects. In one embodiment, the non-cacheable content 1150, 1152 is identified as non-cacheable via identification of the dynamically generated content. In other embodiments, the non-cacheable content 1150, 1152 includes one or more objects not identified as cacheable or identified as non-cacheable. In another embodiment, a first object of the dynamically generated content is identified as cacheable or is under cache control while a second object is not identified as cacheable or is not under cache control. In some embodiments, the non-cacheable content 1150, 1152 includes HTTP content not having any HTTP cache-control headers or HTTP directives. In one embodiment, the non-cacheable content 1150, 1152 includes one or more objects not having HTTP cache-control headers or directives. In another embodiment, the non-cacheable content 1150, 1152 includes one or more object snot having HTTP etag directive information. In yet another embodiment, the non-cacheable content 1150, 1152 includes HTTP headers or directives identifying one or more objects as not cacheable. In some embodiments, non-cacheable content 1150, 1152 includes HTTP headers or directives information or directing a receiver to not cache one or more objects. In one embodiment, the non-cacheable content is dynamically generated based on parameters or information from a request for the content.

The appliance 200, 200' and client 102 (also referred herein as a compressing or compression device) may store any type and form of data to a compression history 1138, 1138', sometimes referred to as compression history 1138. In some embodiments, the compressing device intercepts network packets and stores any payload, or portion thereof, of any protocol layer of a network packet to the compression history 1138. In one embodiment, the compressing device stores application data obtained via an application layer protocol to the compression history 1138. In some embodiments, the compressing device stores headers of the network packet, such as application layer header of an HTTP payload, to the compression history 1138. In other embodiments, the compressing device does not store headers of the network packet.

The compressing engine 238 may store the compression history 1138 in storage 128, such as disk, memory, such as RAM, or a combination of storage and memory. In some embodiments, the compression engine 238 uses an object or data index to reference or identify corresponding objects or data stored in the compression history. In one embodiment, the compression engine 238 uses an object index stored in memory. In other embodiments, the compression engine 238 uses an object index stored to disk. The object index comprises any type and form of indexing scheme for corresponding an index to an object in the compression history 1138. In one embodiment, the object index is maintained in memory while the corresponding object is stored the compression history 1138. In some embodiments, the object index comprises an entry that references or identifies a location or pointer to the object stored in the compression history 1138. In one embodiment, the object index uses any type of hash, checksum or fingerprinting function on a name or identifier of the object as an entry or index. In some embodiments, the object index performs a hash, checksum or fingerprint on the object or portion of data in the compression history 1138. In another embodiment, the entry of the object index is a name or identifier of the object. In some embodiments, the value for the entry or index is a location identifier for the location in storage of the object. For example, the index value may comprise a pointer to a starting address or location of the object.

In yet another embodiment, the compression engine 238 establishes, organizes, arranges or maintains logical storage units for the compression history, referred to as "chunks". The compression engine 238 may maintain a unique identifier for each logical storage unit and associate a size and starting and end points in storage of the "chunk". In one example, the index value includes an identifier of a chunk and an offset into the chunk for the starting location of the object. The compression engine 238 may store in the index entries identifying portions of data corresponding to an identifier of the logical storage unit.

In one embodiment, the compression engine 238 stores to a compression history 1138 any amount and type of previously transmitted data traversing the compressing device or otherwise intercepted by the device. In some embodiments, the compression engine 238 stores all data that passes through the device to the compression history 1138. In other embodiments, a compression engine 238 may select portions of data from a data stream to be stored in the compression history 1138 based on any factor, including without limitation the data stream source, data stream destination, transmission protocol, application protocols, available disk space, current disk usage, available memory space, current available bandwidth, and size of the data portions. In some embodiments, the compression engine 238 may store data compressed in the compression history 1138 using any type and form of a lossless compression algorithm. In other embodiments, the compression engine 238 may store data encrypted in the compression history 1138 using any type and form of encryption algorithm.

In writing data, such as a portion of intercepted network traffic, to the compression history 1138, a device, such as the client 102 or appliance 200, may create a shared identifier to enable the device and a device receiving the transmitted data to refer to the portion of data in later communications. In one embodiment, this identifier may be a unique identifier between the two devices. In other embodiments, this shared identifier may be a globally unique identifier among a plurality of devices. The shared identifier may be created, for example, by tracking the number of bytes sent via a connection between the devices and assigning successive identifiers to successive bytes transmitted.

In operation, the appliance or client via compression engine 238 identifies portions of data from an intercepted data stream in the compression history 1138. The appliance then replaces those portions of the data stream with identifiers identifying the locations of the compression history 1138 having those portions. Upon receiving the data stream having a reference to a location in the compression history, the receiving device, such as client 102 or appliance 200 searches its compression history 1138 for the identified portion of data. The device then replaces the identifier in the data stream with the identified portion of data, and forwards the uncompressed data steam to the intended recipient. In one embodiment, the client forwards the uncompressed data to a requestor, such as a browser or application on the client. In another embodiment, the appliance forwards the uncompressed data to the client 102 or a second appliance 200'.

Figure 11B:
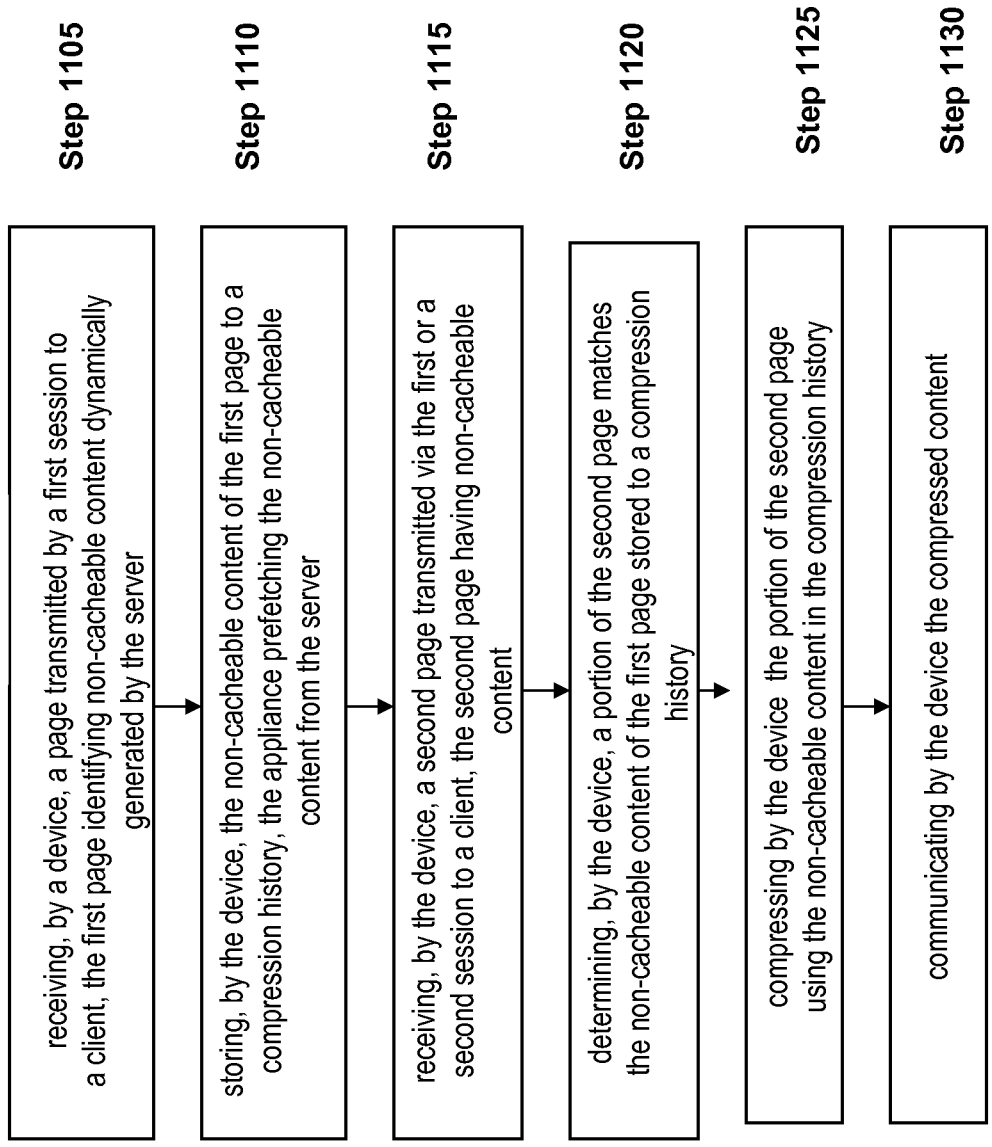
FIG. 11B is a flow diagram of steps of an embodiment of a method for using non-cacheable content as compression history.

Referring now to FIG. 11B, an embodiment of a method 1100 for using non-cacheable content of dynamically generated pages as data in a compression history between compressing and/or caching devices is depicted. In brief overview, at step 1105, a device intercepts or otherwise receives a first page transmitted via a first session to a client. The first page identifies non-cacheable content dynamically generated by the server. At step 1110, the device stored the non-cacheable content of the first page to a compression history. At step 1115, the device intercepts a second page transmitted via a second session to a client. The second page had non-cacheable content. At step 1120, the device determines at least a portion of the second page matches non-cacheable content of the first page stored to a compression history. At step 1125, the device compresses the portion of the second page using the matching non-cacheable content of the first page in the compression history. At step 1130, the device communicates or forwards the compressed content to the target recipient.

In further details, at step 1105, a device, such as client 102 or appliance 200, intercepts a first page transmitted via any type and form of session between a 102 client and a server 106. The device intercepts any type and form of communication from one device to another device identifying a non-cacheable object, such as a page transmitted from a server to a client. In one embodiment, the device intercepts a response from a server to a client's request for a dynamically generated object. In some embodiments, the server 106 transmits one or more network packets having an application protocol layer payload identifying a non-cacheable object. For example, in one embodiment, the device intercepts a web or HTTP page transmitted by a server 106 to a client 102 and the page includes a uniform resource locator (URL) or hyperlink identifying a non-cacheable object.

The session may include any type and form of application layer session, such as an HTTP session. In one embodiment, the session may include a session layer session such as SSL or TLS. In yet another embodiment, the session may include any session communication via a transport layer connection, such as a TCP/IP connection. In some embodiments, the session is established for or on behalf of a user, such as user of client 102 or an application thereof.

The first page identifies non-cacheable content such as dynamically generated by the server 106. In some embodiments, the first page is a version of content from the server personalized for a requestor, such as a user or an application. In other embodiments, the first page comprises dynamically generated content based on parameters or information from a request for the content. In another embodiment, the first page includes updates or changes to one or more previously served objects.

At step 1110, the device stores the non-cacheable content 1150 of the first page to a compression history. In one embodiment, the device identifies the non-cacheable content and in response to the identification, stores the non-cacheable content, or portion thereof, to a compression history 1138. In some embodiments, device identifies an object as non-cacheable and stores the identified object to the compression history 1138. In other embodiments, the device identifies the page has dynamically generated content and stores the content to the compression history 1138. In another embodiment, the device identifies that the server indicates an object is not cacheable or should not be cached, and the device stores the object to the compression history 1138. For example, an application layer header of the page or for the object may identify the object as non-cacheable.

At step 1110', in some embodiments, a second device, such as client 102 or appliance 200' also intercepts and stores the non-cacheable content intercepted and forwarded by the first device, such as appliance 200. In these embodiments, a second compression engine 238 and second compression history 1138' stores non-cacheable content in the compression history to synchronize or otherwise maintain shared portions of data between compressing devices. In other embodiments, the first device, such as appliance 200, transmits portions of the compression history 1138 to the second device, such as client 102, for the second device to store in the compression history 1138'.

In many embodiments, the device performs steps 1105 and 1110 multiples times across one or more sessions and/or for one or more users. In one embodiment, the device intercepts and stores non-cacheable content for a first session. In another embodiment, the device intercepts and stores non-cacheable content for a second session. In some embodiments, the device intercepts and stores non-cacheable content for a first user. In other embodiments, the device intercepts and stores non-cacheable content for a second user. In some embodiments, the device intercepts and stores non-cacheable content of a first type of session, such as an HTTP session. In other embodiments, the device intercepts and stores non-cacheable content of a second type of session, such as web application session or hosted service session. In yet other embodiments, the device intercepts and stores non-cacheable content of one or more session protocols, such as a first session protocol of SSL and a second session protocol of ICA. In still other embodiments, the device intercepts and stores non-cacheable content of a first protocol layer of a network stack and a second protocol layer of a network stack.

At step 1115, the device intercepts or otherwise receives a second page to a client transmitted via the first session or a second session. In one embodiment, the device intercepts a second page transmitted via the first session, such as to a first user. In another embodiment, the device intercepts a second page transmitted via a second session, such as a new session with a second user. In yet another embodiment, the device intercepts a second page of second session with the first user. In some embodiments, a server transmits the second page via a second session using a different session or application protocol than the first session. In yet one embodiment, the second page is transmitted via a second session for an application or hosted services different than or the same as the application or host service of the first session.

As described above in connection with the first page, the second page may include any type and form of non-cacheable content 1152 as described herein. For example, the second page includes a personalized version of a web page or HTTP content for a second user. In another embodiment, the second page includes one or more objects of the first page but dynamically generated by a different request. In one embodiment, the request to dynamically generate content for the first page has different parameters than a request to dynamically generate the second page. In some embodiments, the second page has the same cacheable content as the first page. In other embodiments, a portion of the non-cacheable content of the first page is the same as the second page.

At step 1120, the device determines at least a portion of the second page matches non-cacheable content of the first page stored to a compression history. In some embodiments, the compression engine 238 performs a match of data of the intercepted page to a compression history responsive to identifying non-cacheable content in the intercepted page. In one embodiment, the compression engine 238 determines the non-cacheable content of the second page was transmitted from the same server as other non-cacheable content stored to the compression history 1138. In another embodiment, the compression engine 238 determines the second page was transmitted via the same session as the non-cacheable content stored in the compression history 1138. In other embodiments, the compression engine 238 determines the second page was transmitted to the same client or application of the client as the non-cacheable content stored in the compression history 1138. In still other embodiments, the compression engine 238 determines the second page was transmitted to the same user as the non-cacheable content stored in the compression history 1138. In one embodiment, the compression engine 238 determines the second page has the same cacheable objects as the first page and therefore determines the non-cacheable content may be similar. In yet another embodiment, the compression engine matches a portion of a cacheable object of an intercepted page to a portion of non-cacheable content stored in the compression history 1138. In a further embodiment, the compression engine 238 matched a portion of a non-cacheable object of an intercepted page to a portion of a cacheable content stored in the compression history 1138.

In one embodiment, the compression engine 238 of the client or appliance determines that a sequence of one or more bytes of data in the non-cacheable content of the second page matches data in the compression history 1138. The compression engine 238 may use any type of fingerprinting algorithm or scheme to determine a match. In some embodiments, the compression engine compares a fingerprint of a portion of data of the intercepted second page to one or more fingerprints of portions of data in the compression history 1138. In one embodiment, the compression engine 238 compares a fingerprint of a portion of non-cacheable content 1152 of second page with a fingerprint of a portion of non-cacheable content 1150 of the first page stored in the compression history 1138. In one embodiment, the compression engine 238 determines a match by matching a fingerprint of data non-cacheable content to a fingerprint in the object index of the compression history 1138. In another embodiment, the compression engine 238 determines a match by searching for a sequence of data of the intercepted non-cacheable content to data in the compression history 11338.

At step 1125, the device compresses the portion of the second page using the matching non-cacheable content of the first page in the compression history. In some embodiments, the compression engine 238 compresses all or any portion of the intercepted page to form a compressed representation 1155 of the second page. In one embodiment, the compression engine 238 compresses one or more portions of the non-cacheable content of the second page using one or more portions of the non-cacheable first page stored in the compression history 1138. In some embodiments, the compression engine 238 compresses a first non-cacheable object of the second page using a portion of a non-cacheable object of the first page stored in the compression history 1138. In yet another embodiment, the compression engine 238 compresses a first non-cacheable object of the second page using a portion of a first non-cacheable object and a portion of a second non-cacheable object in the compression history 1138. In other embodiments, the compression engine 238 compresses at least a portion of the personalized content of the second page using one or more portions of personalized pages stored in the compression history 1138. In still one embodiment, the compression engine 238 compresses at least a portion of a cacheable object of the second page using a portion of non-cacheable content of the first page stored in the compression history 1138. In one embodiment, the compression engine 238 compresses at least a portion of a non-cacheable object of the second page using a portion of cacheable content stored in the compression history 1138.

At step 1130, the device communicates the compressed content 1155 to the intended receiver or target recipient. In some embodiments, a client 102 communicates the compressed content to an appliance 200 or server 106. In another embodiment, the client 102 communicates the compressed content to an application on the client 102, such as a browser. In other embodiments, the appliance 102 communicates the compressed content to a client 102 or a second appliance 200'. The receiver, such as client 102, intercepts the compressed content 1155, and decompresses the compressed content 1155 using its copy of the data in the compression history 1138' corresponding to the compression used by the sending device.

Figure 11C:
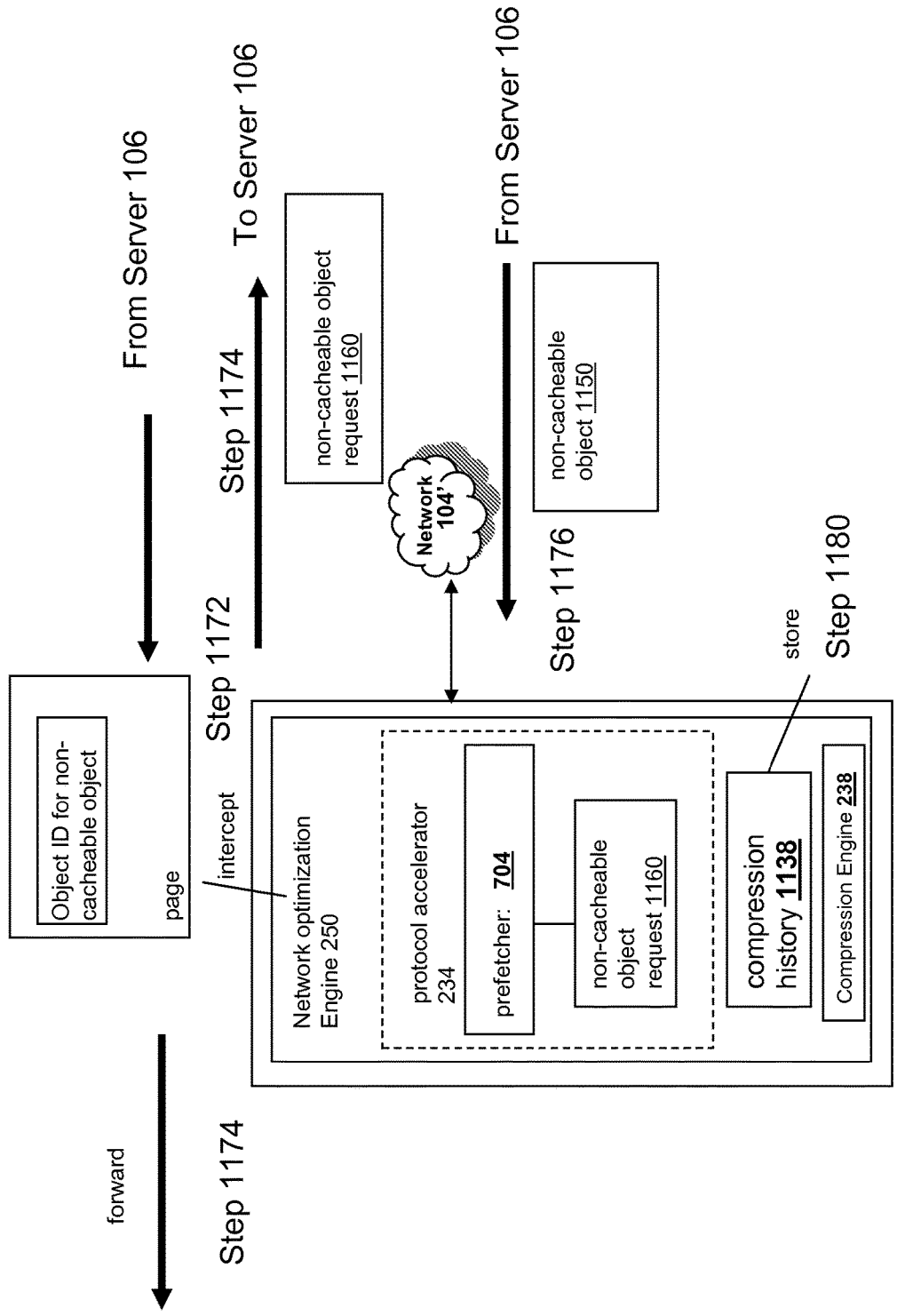
FIG. 11C is a block diagram of an example embodiment of a system for prefetching non-cacheable content as compression history as described in conjunction with FIGS. 11B and 11A.
Figure 11D:
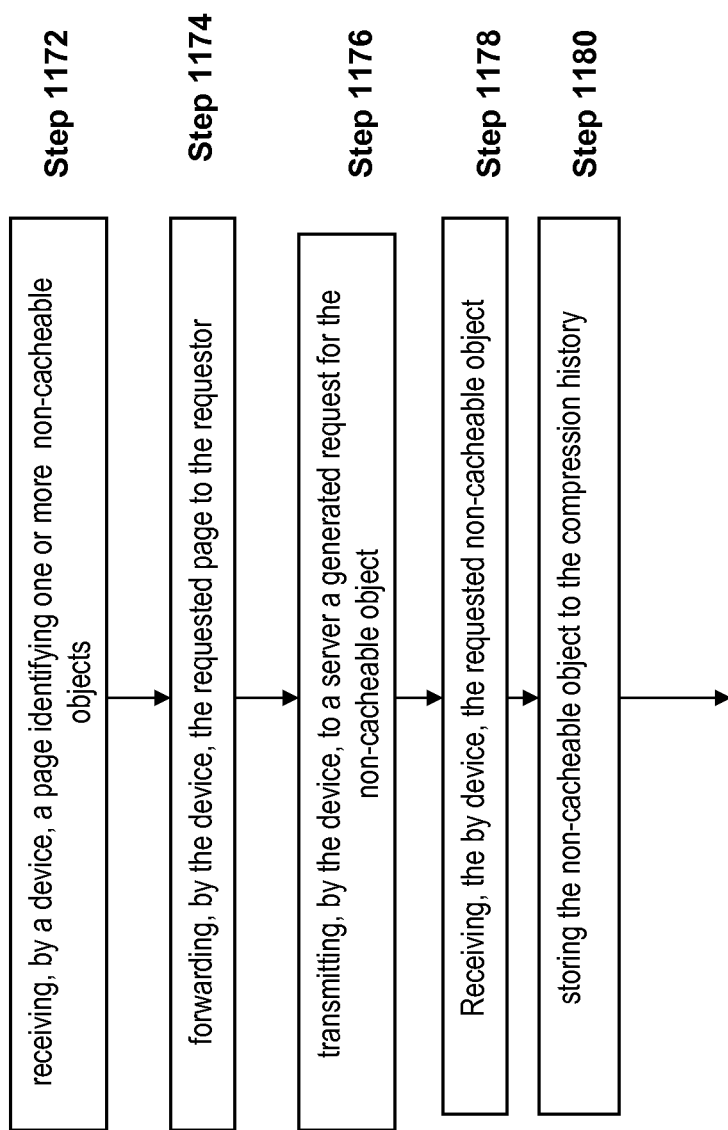
FIG. 11D is a flow diagram of steps of an embodiment of a method for prefetching non-cacheable content as compression history.

Referring now to FIGS. 11C and 11D, embodiments of systems and method for prefetching non-cacheable content or objects and storing to a compression history is depicted. In brief overview of FIG. 11C, an appliance 200 having a network optimization engine 250 is depicted. The device, such as appliance 200 or client 102, intercepts or receives communications or pages served from an originating server 106 or transmitted via another appliance 200' and forwards the page to the requesting client. The received page may identify one or more non-cacheable objects, for example via uniform resource locators or hyperlinks. The appliance via the prefetcher 704 generates a request 1160 to obtain the non-cacheable object from a server 106. The request may be considered a prefetch in that the user receiving the page may have not yet requested the object identified by the page but the appliance 200 requests the object in anticipation of intercepting a request for the object from the user. The prefetcher 704 transmits to the originating server 106 the request to prefetch the non-cacheable object. The appliance receives a response from the server including the non-cacheable object and stores the object in the compression history used by the appliance.

As previously discussed in conjunction with FIGS. 7A-7D, the prefetcher 704 includes or provides logic, business rules, functions or operations for generating requests or packet(s) for the request. In one embodiment, the prefetcher generates one or more packets for either a request or a response. In some embodiments, the prefetcher 704 generates a request to prefetch identified objects, such as objects identified by intercepted pages and initiates the transmission of the generated request to a server 106. In one embodiment, the prefetcher 704 generates requests 1160 for non-cacheable objects identified via the page. In other embodiments, the prefetcher generates a request 1160 for a non-cacheable object based on a user. In another embodiment, the prefetcher generates a request 1160 for a non-cacheable object that the server dynamically generates. In one case, the request 1160 causes the server to dynamically generate the non-cacheable object, such as an object for a personalized web page. In some embodiments, the prefetcher 704 generates a non-cacheable object request 1160 identified as speculative or with a QoS priority lower than non-prefetch requests. In other embodiments, the prefetcher 704 receives the response to the prefetch request and stores the non-cacheable object of the response to the compression history 1138.

Although the prefetcher 704 is illustrated as a part of the protocol accelerator, the prefetcher may be included in any part of the network optimization engine 250. For example, in some embodiments, the compression engine 238 comprises the prefetcher for prefetching cacheable and/or non-cacheable objects for the compression history 1138.

Referring now to FIG. 11D, an embodiment of steps of a method 1170 for prefetching non-cacheable content for the compression history 1138 is depicted. In brief overview, at step 1172, a device, such as the appliance 200 or client 102, intercepts or otherwise receive a communication identifying one or more non-cacheable objects. At step 1174, the device forwards the communication to the requestor. At step 1176, the device generates a request for the non-cacheable object and transmits the generated request to a server. At step 1178, the device stores the non-cacheable object to the compression history 1138. The compression engine 238 may use the stored non-cacheable object to compress content of subsequent communications between one or more clients and one or more servers.

In further details, at step 1172, the device intercepts or receives any type and form of communication from one device to another device identifying a non-cacheable object, such as a page transmitted from a server to a client. In one embodiment, the device is an appliance 200. In another embodiment, the device is a client 102. In one embodiment, the device intercepts a response from a server to a client's request for a non-cacheable object. In some embodiments, the server 106 transmits one or more network packets having an application protocol layer payload identifying a non-cacheable object. For example, in one embodiment, the device intercepts a web or HTTP page transmitted by a server 106 to a client 102 and the page includes a uniform resource locator (URL) or hyperlink identifying a non-cacheable object. In some embodiments, the device, such as a client, intercepts a page identified by a URL and the page identifies one or more non-cacheable objects.

At step 1174, the device forwards or transmits the page, response or communication to the requestor. In one embodiment, the device forwards the page upon interception, receipt or immediately thereafter. In other embodiments, the device forwards the page after identifying one or objects on the page. In yet another embodiment, the device makes a copy of the page for further processing, and forwards the page to the requestor upon making the copy. In some embodiments, the device forwards the received communication to the requestor of a client 102. In other embodiments, the device forwards the intercepted page to an application, such as a web browser. In another embodiment, the device forwards the page to a user.

At step 1176, in response to identifying the non-cacheable object, the device and/or prefetcher 704 generates a request 1160 to the non-cacheable object from a server of the object. In one embodiment, the prefetcher 904 generates an HTTP request for the non-cacheable object. In other embodiments, the prefetcher 704 generates a request to query or obtain the non-cacheable object using any type and form of application protocol. For example, in one embodiment, the prefetcher 704 may use XML language to request non-cacheable object. In another embodiment, the prefetcher 704 generates a request for a non-cacheable object that identifies the user of the communication received at step 1172. In some embodiments, the prefetcher 704 generates a request for a non-cacheable object that identifies another user, such as a user of the device. In one embodiment, the prefetcher 704 generates a request that triggers the server to dynamically generated the object. In one case, the request identifies a user for dynamically generating the object, such as for a personalized web page. In some embodiments, the prefetcher 704 generates the request for the non-cacheable object with a priority for speculative prefetching such as described in conjunction with FIGS. 7A-7D. In other embodiments, the prefetcher 904 uses any type and form of QoS scheduling and/or priorities to schedule and transmit the generated request.

Further to step 1176, the device transmits the generated request 1160 for the non-cacheable object to a server 106. In one embodiment, the device transmits the generated request to the server originating the page. In another embodiment, the device transmits the generated request to a second server. In some embodiments, the device transmits the generated request to a server farm. In other embodiments, the device transmits the generated request to a second appliance 200'. In one embodiment, the device transmits the generated request in accordance with any QoS priority assigned to or associated with the generated request. In some embodiments, the device transmits the generated request at a priority lower than non-prefetching requests. In other embodiments, the device transmits the generated request at a priority lower than the non-prefetching requests received and processed by the device from clients, users or applications on a client.

At step 1178, the device receives a response from the server having the non-cacheable object or content thereof. In one embodiment, the device receives a non-cacheable object generated for a specific user. In another embodiment, the device receives a non-cacheable object that is not user dependent. In some embodiments, the device receives an object dynamically generated by the server upon receipt of the request. In other embodiments, the devices receives the non-cacheable object from a cache of another device, such as an appliance, client or server.

At step 1180, the device stores the non-cacheable object to the compression history 1138. In some embodiments, the device stores the non-cacheable object to both the compression history 1138 and a cache. In one embodiment, the compression history 1138 and the cache 232 use the same storage, or portion thereof. In another embodiment, the compression engine 238 uses the cache 232 or portion thereof as a compression history.

By preloading or prefetching the compression history with intercepted non-cacheable HTTP content, the compression engine can improve or increase the compressibility of cacheable and non-cacheable content of HTTP network traffic. Although the systems and methods above are generally described above in connection with pages, such as HTTP pages, the techniques of method 1100 or embodiments of the system of FIG. 11A may be used with non-HTTP protocols.

With the multi-protocol and multi-session compression engine 238 storing non-cacheable content to the compression history, the compression engine 238 increases compressibility of content communicated over WAN and/or LAN links to reduce bandwidth, decrease latency, and improve response times.

L. Systems and Methods for Using Non-Http Network File Transfer as Compression History for Http Based Traffic Referring now to FIGS. 12A and 12B, systems and methods for using non-HTTP file transfer data in a compression history for compressing HTTP based traffic are depicted. With these techniques, non-HTTP accessed traversing a compression device may use the data from such non-HTTP accessed to improve compressibility of HTTP traffic. For example, network file transfers can be used to preload a compression history with a remote copy command, such as: rcp remote-file /dev/null. The remote file is copied across the network and then discarded, but the compression engine stores the data in a compression history. If a user accesses the file via an HTTP request, the compression engine uses the data of the non-HTTP file transfer in the compression history. With this technique described in more detail below, non-HTTP or ad-hoc network file transfers are used to provide content distribution to compression devices for compressing HTTP network traffic.

Figure 12A:
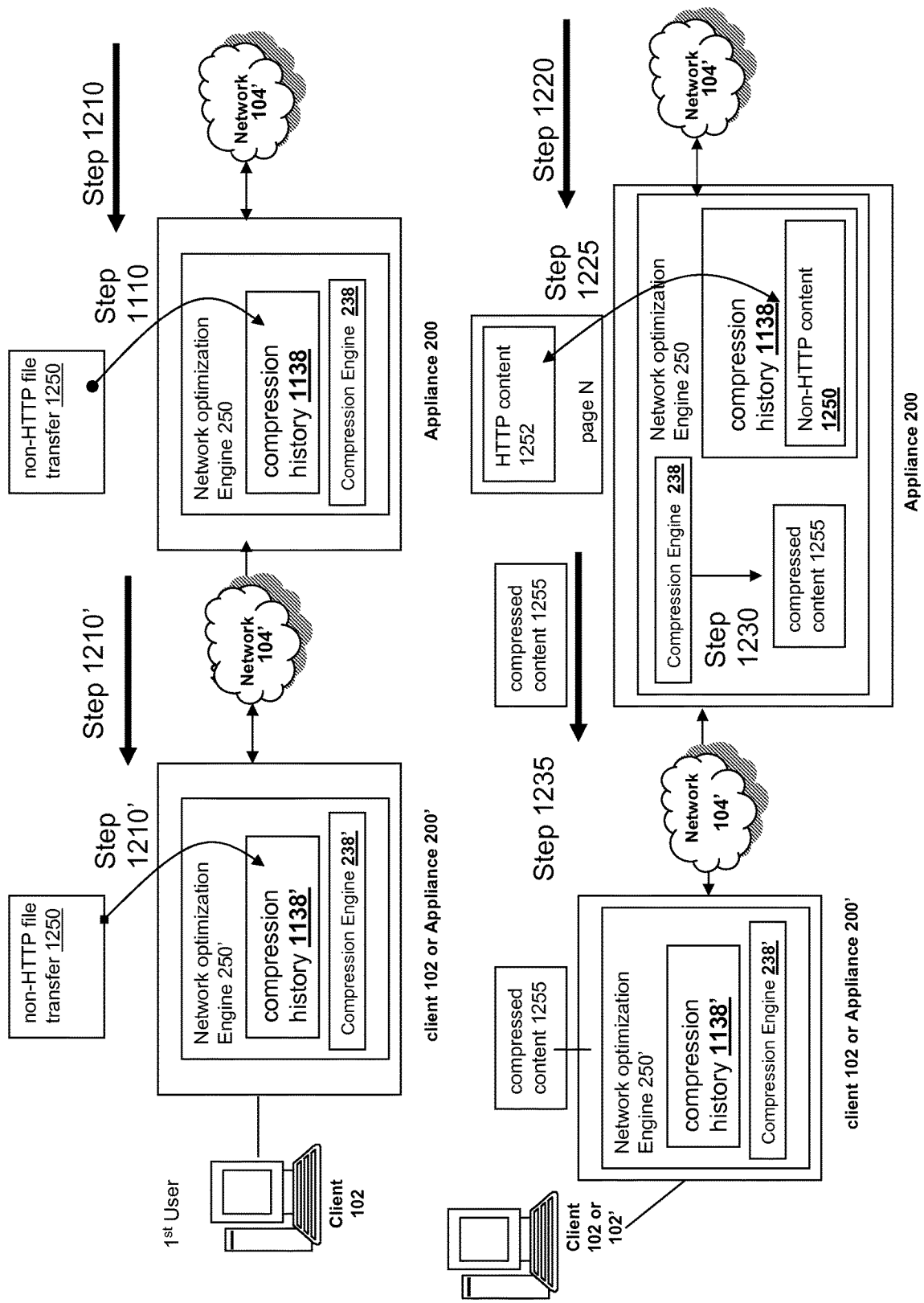
FIG. 12A is a block diagram of an example embodiment of a system for using non-HTTP network file transfer as compression history as described in conjunction with FIG. 12B.

Referring to FIG. 12A, an embodiment of a system for distributing or fetching non-HTTP content for a compression device to later compress HTTP content is depicted. In brief overview and as discussed above in conjunction with FIGS. 11A and 11B, a first device, such as a first appliance 200, and a second device, such as client 102 or a second appliance 200' compress communications transmitted between the devices using data of a compression history 1138 that is shared synchronized. A user, application or device initiates a non-HTTP network file transfer 1250, such as a remote copy of one or more files from a first system to a second system or an ftp of a file from one device to another. For example, a user may execute a remote copy of one or more files from a server 106 to the client 102. In another example, a system administrator of an appliance 200 may execute a remote copy of files from a server 106 in order to preload the compression history 1138 of the appliance with files. This non-HTTP network file transfer may traverse one or more compression devices, such as appliance 200 and the client 102 or a second appliance 200'.

In further overview and as illustrated by the system embodiment at the top of FIG. 13A, the first appliance 200 may intercept or otherwise receive a non-HTTP file transfer 1250, such as a file transmitted by a server 106 to a client 102. Although the appliance 200 identifies the content as non-HTTP, the appliance 200 stores the content to the compression history 1138, which may also be the cache 232, or a portion thereof. The second appliance 200' and/or client 102 may also intercept the non-HTTP network file transfer 1250, and store content from the file transfer to the compression history 1138'. The appliance 200, 200' and/or client 102 may intercept multiple non-HTTP file transfers and store files or contents thereof to the respective compression histories 1138, 1138'.

As illustrated by the system embodiment located in the lower half of FIG. 12A, a user of the client 102 may request HTTP content from a server 106. For example, the client may transmit an HTTP request to a server for one or more files or objects. In response to the request, the server transmits an HTTP response include the requested object or file. The first appliance 200 intercepts the HTTP content 1252 transmitted by the server 106. A portion of data of the HTTP content 1252 comprises the same data as a portion of the non-HTTP file transfer content stored in the compression history 1138. In response to detecting a match between intercepted data and data in the compression history 1139, the compression engine 238 generates a compressed version 1255 of HTTP content 1252 based on the non-HTTP content 1250 stored in the compression history 1138. The first appliance 200 transmits the compressed content 1255 to the client 102 or second appliance 200'. The client 102 or second appliance 200' intercepts the compressed content 1255, and the compression engine 238' decompresses the compressed version 1255 of the HTTP content 1252 using the non-HTTP file transfer content 1250 stored in the second compression history 1138'.

Figure 12B:
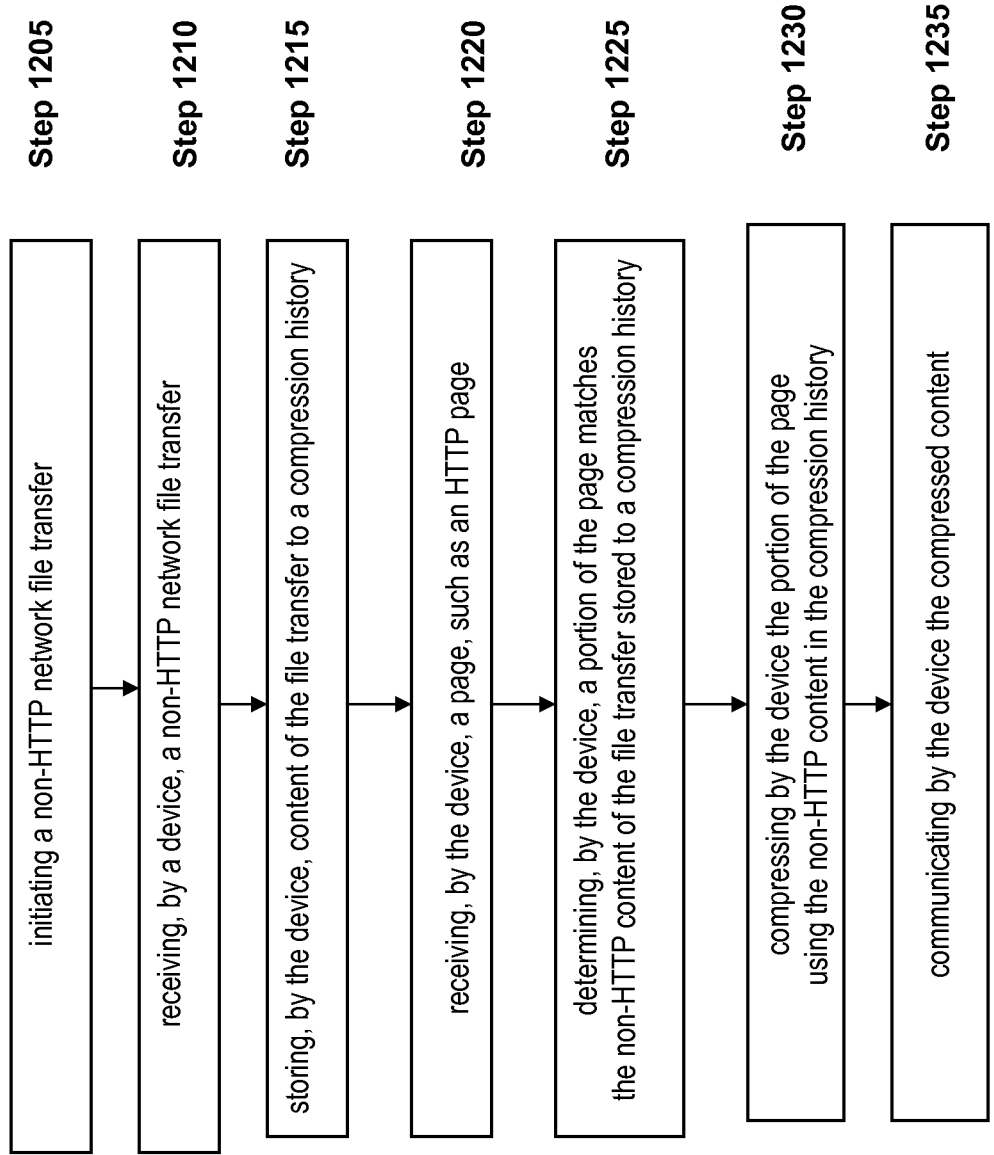
FIG. 12B is a flow diagram of steps of an embodiment of a method for using non-HTTP network file transfer content as compression history.

Referring to FIG. 12B, an embodiment of steps of a method 1200 for using non-HTTP content for compressing HTTP traffic is depicted. In brief overview, at step 1205, a user or application executes a non-HTTP file transfer, such as a system administrator initiating a remote copy of files from a server. At step 1210, a device, such as appliance 200 or client 102, intercepts or otherwise receives network packets of the non-HTTP network file transfer 1250. At step 1215, the device in response to identifying the non-HTTP network file transfer 1250 stores content of the file transfer to a compression history. At step 1220, the device intercepts communications having HTTP content 1252, such an HTTP page. At step 1225, the device determines a portion of the HTTP content 1252 matches a portion of the non-HTTP file transfer 1252 stored in the compression history 1138. At step 1230, the device compressed the portion of the HTTP content using the non-HTTP content stores in the compression history 1138. At step 1235, the device communicates the compressed content 1255 to the target receiver.

In further details, at step 1205, a user or application initiates or executes any type and form of network file transfer 1250. In some embodiments, the network file transfer uses any type and form of application layer protocol. In one embodiment, the network file transfer uses a non-HTTP protocol. In another embodiment, the network file transfer uses a file transfer protocol, such any version and type of FTP. In other embodiments, the network file transfer uses a Network Basic Input/Output System, NetBioS, to transfer a file. In one embodiment, the network file transfers uses NetBEUI protocol to transfer a file. In some embodiments, the network file transfer uses a Server Message Block (SMB) protocol. In yet another embodiment, the network file transfers uses the CIFS protocol for transferring one or more files. In still another embodiment, the network file transfer users a Message Application Programming Interface (MAPI), such as via email, to transfer a file. In some embodiments, the network file transfer includes any protocol for communicating data to or via a printer, serial port, parallel port or other communication port or device.

In some embodiments, a user initiates a network file transfer via a remote copy command. In one embodiment, the network file transfer copies one or more files from one system to a null device of a second device, referred as /dev/null on Linux or Unix operating system and also sometimes referred to as a "bit bucket". In some embodiments, the network file transfer only copies the files to a system temporarily and not for permanent storage. In yet another embodiment, a user initiates a print or fax of data over the network, such as printing or faxing a file or document from a network drive or a folder on a server 106. In some embodiments, a user emails one or more documents over a network, such as a LAN or WAN. In still other embodiments, a user via a file explorer or user interface copies one or more files from storage of a first device to storage of a second device via a network, such as by dragging and dropping file. In another embodiment, a user via file a transport protocol program, application or user interface transfers one or more files between devices.

In some embodiments, the compression device, such as a the client 102 or appliance 200 initiates a network file transfer. For example, in one embodiment, the network optimization engine 250 includes logic, functions or operations to execute a network transfer of files that traverses the device in order to prefetch or populate the compression history 1138 with data. In some embodiments, the network optimization engine 250 responsive to detecting requests to and/or network traffic from a server, initiates a network transfer of files from the server to another device. In yet another embodiment, the network optimization engine 250 based on one or more policies of a policy engine 295 triggers execution of a network file transfer to populate the compression history 1138 with desired data. In one embodiment, a system administrator of the appliance 200 or compression device executes a network file transfer in order to populate the compression history with specified data.

At step 1210, a device, such as client 102 or appliance 200, intercepts or otherwise receives the network file transfer 1250 communicated between devices. In one embodiment, the device intercepts any type and form of communication from one device to another device identifying a non-HTTP file transfer such as a remote copy or otherwise having file content. In some embodiments, the device intercepts one or more network packets identifying a file transfer. In another embodiment, the device intercepts application payload of network packets having content of one or more files. In other embodiments, the device intercepts one or more network packets of network file transfer execute via a: remote copy, file transfer protocol (FTP), an email, a print or fax.

At step 1215, the device stores all or any portion of the content 1250 to a compression history 1138. In one embodiment, the device identifies the non-HTTP network file transfer and in response to the identification, stores the content, or portion thereof, to a compression history 1138. In some embodiments, the device identifies a file in the content 1250 and stores the file to the compression history 1138. In other embodiments, the device identifies the payload of a network packet has data of a file and stores the data to the compression history 1138. In another embodiment, the device determined that a network packet identifies that subsequent network packets have content of a file, and stores the contents of the subsequent network packets to the compression history 1138.

At step 1215', in some embodiments, a second device, such as client 102 or appliance 200' also intercepts and stores the network file transfer content intercepted and forwarded by the first device, such as appliance 200. In these embodiments, a second compression engine 238' and second compression history 1138' stores the file transfer content, or any portion thereof, in the compression history 1138' to synchronize or otherwise maintain shared portions of data between compressing devices. In other embodiments, the first device, such as appliance 200, transmits portions of the compression history 1138 to the second device, such as client 102, for the second device to store in the compression history 1138'.

In many embodiments, the device performs steps 1210 and 1215 multiples times for one or more network file transfers 1250, 1250' In one embodiment, the device intercepts and stores content from a network file transfer via a remote copy. In some embodiments, the device intercepts and stores content from a network file transfer via a FTP. In another embodiment, the device intercepts and stores content from a network file transfer via an email or via the MAPI protocol. In some embodiments, the device intercepts and stores network file transfer content for a first user. In other embodiments, the device intercepts and stores network file transfer content for a second user. In some embodiments, the device intercepts and stores network file transfer content of a first type of protocol, such as FTP. In other embodiments, the device intercepts and stores network file transfer content of a second type of protocol, such as ICA or RDP.

At step 1220, the device, such as client 102 or appliance 200, intercepts or otherwise receives any type and form of HTTP communication 1252 between devices. In one embodiment, the device intercepts an HTTP page 1252 transmitted to a client from a server 106. In another embodiment, the device intercepts an HTTP page transmitted via any one or more HTTP sessions. In another embodiment, the device intercepts a page transmitted to a browser of a user. In some embodiments, the device intercepts a first page of first session with a first user. In other embodiments, the device intercepts a second page of second session with a second user. In one embodiment, the device intercepts HTTP content 1252 having one or more objects. In another embodiment, the device intercepts HTTP content 1252 having one or more files. In yet another embodiment, the HTTP content 1252 may include non-cacheable content 1152 as described above in conjunction with FIGS. 11A-11B. For example, the HTTP content 1252 in one embodiment may include a personalized version of an HTTP page for a first user. In another embodiment, the HTTP content 1252 may include a personalized version of an HTTP page for a second user.

At step 1225, the device determines at least a portion of the HTTP content 1252 matches content of the network file transfer 1250 stored to a compression history 1138. In some embodiments, the compression engine 238 performs a match of data of the intercepted HTTP content 1252 to a compression history responsive to identifying the communication includes HTTP. In other embodiments, the compression engine 238 performs a match of data of the intercepted HTTP content 1252 to a compression history responsive to identifying the content 1252 includes one or more files. In one embodiment, the compression engine 238 performs a match of data of the intercepted HTTP content 1252 to a compression history responsive to identifying the content 1252 includes a name or URL of a file of the network file transfer 1250.

In one embodiment, the compression engine 238 determines the HTTP content 1252 was transmitted from the same server as the network file transfer content stored to the compression history 1138. In other embodiments, the compression engine 238 determines the HTTP content was transmitted to the same device as the network file transfer content stored in the compression history 1138. In one embodiment, the compression engine 238 determines the HTTP content 1252 has the same objects or files as the network file transfer 1250. In yet another embodiment, the compression engine 238 matches a portion of the intercepted HTTP content 1252 to a portion of network file transfer content 1250 stored in the compression history 1138. In a further embodiment, the compression engine 238 matches a portion of a non-cacheable object of an intercepted page to a portion of the network file transfer content stored in the compression history 1138. In one embodiment, the compression engine 238 matches a portion of a cacheable object of an intercepted page to a portion of the network file transfer content stored in the compression history 1138.

In some embodiments, the compression engine 238 of the client or appliance determines that a sequence of one or more bytes of data in the HTTP content 252 matches data in the compression history 1138. The compression engine 238 may use any type of fingerprinting algorithm or scheme to determine a match. In some embodiments, the compression engine 238 compares a fingerprint of a portion of data of the intercepted HTTP content 1250 to one or more fingerprints of portions of data in the compression history 1138. In one embodiment, the compression engine 238 compares a fingerprint of a portion of HTTP content 1252 of with a fingerprint of a portion of network file transfer 1252 stored in the compression history 1138. In one embodiment, the compression engine 238 determines a match by matching a fingerprint of data of the HTTP content 1252 to a fingerprint in the object index of the compression history 1138. In another embodiment, the compression engine 238 determines a match by searching for a sequence of data of the intercepted HTTP content 1252 to data in the compression history 1138.

At step 1230, the device compresses the portion of the HTTP content using the matching network file transfer content in the compression history. In some embodiments, the compression engine 238 compresses all or any portion of the intercepted HTTP content 1250 to form a compressed representation 1255 of the second page. In one embodiment, the compression engine 238 compresses one or more portions of the HTTP content using one or more portions of the network file transfer content stored in the compression history 1138. In some embodiments, the compression engine 238 compresses a first file of the HTTP content using a portion of one or more files of the network file transfer stored in the compression history 1138. In yet another embodiment, the compression engine 238 compresses a first object of the HTTP content using a portion of a first file and a portion of a second file of the network file transfer stored in the compression history 1138. In other embodiments, the compression engine 238 compresses at least a portion of the personalized HTTP content 1252 using one or more portions of network file transfer stored in the compression history 1138. In still one embodiment, the compression engine 238 compresses at least a portion of a cacheable object of the HTTP content using a portion of network file transfer content stored in the compression history 1138. In one embodiment, the compression engine 238 compresses at least a portion of a non-cacheable object of the HTTP content using a portion of the network file transfer content stored in the compression history 1138.

At step 1235, the device communicates the compressed content 1255 to the intended receiver or target recipient. In some embodiments, a client 102 communicates the compressed content to an appliance 200 or server 106. In another embodiment, the client 102 communicates the compressed content to an application on the client 102, such as a browser. In other embodiments, the appliance 102 communicates the compressed content to a client 102 or a second appliance 200'. The receiver, such as client 102, intercepts the compressed content 1255, and decompresses the compressed content 1255 using its copy of the data in the compression history 1138' corresponding to the compression used by the sending device.

M. Systems and Methods for Determining Whether to Prefetch/Prefresh an Object Based on Operational Condition of the Device or a Status of the Connection or Server Referring now to FIGS. 13A and 13B, systems and methods for dynamically determining whether to prefetch, freshen or pre-freshen an object based on operational condition of the link to the originating server or the operational status of the prefetching or prefreshening device and/or server are depicted. In many embodiments, originating servers deliver objects without an expiration date. Without expiration information, it may be up to the caching device to decide how long these objects are to remain "fresh." If an object is not fresh, the caching device checks with the originating server to see if the object has changed. In some cases, it may not make sense to serve relatively stale data if the originating server is very close and verifying freshness takes very little time. In other cases, it may not make sense to serve relatively fresh data if the link is so slow and congested that checking takes too long or longer than desired.

The dynamic freshness heuristic technique described in conjunction with FIGS. 13A and 13B dynamically takes into account the operational and performance conditions of the link (connection), caching device and/or server to determine whether or not to check a status of the object or to obtain the object from the server. For example, if the condition of the link is below a desired threshold, the caching device may check the freshness of an object less frequently or rarely, and relatively stale data may be served instead. In another example, if the status of the link or server indicates the link or server is no longer operational, the caching device may cease checking freshness of objects with that server until communication is re-established. In other example, if the performance of the link and server may be such that the caching device determines to check freshness of objects more frequently.

Referring now to FIG. 13A, a device such as an appliance 200 or client 102 having a network optimization engine 250 is depicted. In brief overview, the appliance 200 intercepts or otherwise receives pages served from an originating server 106 or transmitted via another appliance 200' and forwards the page to the requestor. The network optimization engine 250 may include an operation condition detector 1302 for dynamically determining the operational and/or performance status, condition or characteristics of the connection to the server, the server and/or the device (e.g. appliance 200 or client 102). Based on the dynamically detected operational conditions, the device determines whether or not to obtain a status of an object in the cache or to obtain an update of the object from a server. In one embodiment, the network optimization engine 250 determines to prefetch an object via a prefetcher 704 responsive to the operation condition detector 1302. In another embodiment, the network optimization engine 250 determines to prefresh an object via a prefresher 904 responsive to the operation condition detector 1302. In other embodiments, the network optimization engine 250 determines not to prefetch, freshen or prefresh an object responsive to the operation condition detector 1302.

As illustrated in FIG. 13A, the network optimization engine 250 may include an operation condition detector 1302. The operation condition detector 1302 includes software, hardware or any combination of software and hardware. The operation condition detector 1302 may include an application, program, script, library, process, service, driver, task, thread or any type and form of executable instructions. The operation condition detector 1302 includes or provides logic, business rules, functions or operations for detecting or determining an operational condition, status, characteristic and/or performance of one or more of: a network connection or link such as between the device and a server 106, the caching device, such as appliance 200 or client 102, and one or more servers 106. In some embodiments, the operation condition detector 1302 includes the bandwidth detector 702, or the logic, functionality and/or operations thereof, as described above in conjunction with FIGS. 7A-7D.

In one embodiment, the operation condition detector 1302 detects or determines the operational condition of a network connection to a server having one or more objects. In some embodiments, the operation condition detector 1302 determines a type and speed of the network connection. For example, the operation condition detector 1302 determines if the link or connection is to a WAN or LAN network. In other embodiments, the operation condition detector 1302 determines if there is a cooperating or partner device, such as appliance 200', in the path of the network connection between the device of the operation condition detector 1302 and the server 106. In another embodiment, the operation condition detector 1302 determines utilization, availability or remaining capacity of bandwidth of the network connection between the network optimization engine 240 and the server 106. In one embodiment, the operation condition detector 1302 determines throughput rates, response times or performance of network traffic delivery via the network connection. In some embodiments, the operation condition detector 1302 determines a level or rate of congestion, collisions, and/or dropped packets of network traffic via the network connection.

In yet another embodiment, the operation condition detector 1302 determines whether or not a transport layer connection is active, established or operational. In one embodiment, the operation condition detector 1302 determines whether or not a transport layer connection is inactive, disconnected or not operational. In some embodiments, the operation condition detector 1302 checks or monitors the condition of a transport layer connection between the device of the operation condition detector 1302 and the server 106. In other embodiments, the operation condition detector 1302 checks or monitors the condition of a transport layer connection between a client 102 and the server 106. In one embodiment, the device of the operation condition detector 1302 proxies, transparently or otherwise, a transport layer connection between a first device 102 and a second device 106.

In some embodiments, the operation condition detector 1302 determines a distance, absolute or relative, between the device of the operation condition detector 1302 and a server 106. In other embodiments, the operation condition detector 1302 determines a closeness between the network optimization engine 250 and one or more servers 106. In one embodiment, the operation condition detector 1302 determines the distance or closeness via a measurement of one or more round trip times. In another embodiment, the operation condition detector 1302 determines the distance or closeness via time information returned by a ping or ICMP (Internet Control Message Protocol) echo request to a server. In some embodiments, the operation condition detector 1302 determines the distance or closeness of one or more servers via network configuration information.

In some embodiments, the operation condition detector 1302 detects or determines the operational condition or performance of a server, such as an originating server serving objects stored in a cache 232. In one embodiment, the operation condition detector 1302 determines a server is running or operational, or otherwise not running or operational, via one of a ping, ICMP echo request or trace route command. In other embodiments, the operation condition detector 1302 determines a server is running or operational, or otherwise not running or operational, by request a transport layer connection with the server. In some cases, the operation condition detector 1302 sends an application layer protocol request, such an HTTP request, to the server and compares a received response to an expected response. In another embodiment, the operation condition detector 1302 determines an operational condition of the server by measuring or monitoring the number of concurrent connections to the server. In some embodiments, the operation condition detector 1302 determines an operational condition of the server by measuring or monitoring a rate of the number of connections established with the server.

In yet other embodiments, the operation condition detector 1302 determines a load of a server by any one or more of the following: 1) numbers and types of connections, 2) resource usage, such as CPU, disk and memory usage, 3) resource availability such as CPU, disk and memory availability, 4) number of requests outstanding, 5) number of requests transmitted, 6) number of clients servicing, 7) response time information, including average and historical response times, 8) errors, status, performance or bandwidth of a connection, 9) number of sessions, and states or status thereof, and 10) a weight assigned to the server. In one embodiment, the server 106 transmits information, including any of the above items, regarding its operations, status, load or performance to the network optimization engine 250 and/or the operation condition detector 1302. In some embodiments, the operation condition detector 1302 receives information on the operational condition or performance of a server from another device, such as an appliance 200 or appliance 205.

In some embodiments, the operation condition detector 1302 detects or determines the operational condition or performance of the caching device or the device executing the operation condition detector 1302. In one embodiment, the device is a WAN optimization appliance 200. In another embodiment, the device is a proxying device or proxying network appliance. In other embodiments, the device is a network acceleration device for LAN or WAN. In some embodiments, the device is a load-balancer and/or content-switching device. In any of these embodiments, the operational condition detector 1302 detects or determines the operational condition or performance of the device relative to the functionality and operations for which the device was designed and constructed. In one embodiment, the operational condition detector 1302 determines a performance throughput or rate of servicing network traffic traversing the device. In some embodiments, the operational condition detector 1302 detects or determines any one or more of the following: 1) numbers and types of connections, 2) resource usage, such as CPU, disk and memory usage, 3) resource availability, such as CPU, disk and memory availability, 4) number of requests outstanding, 5) number of requests transmitted, 6) number of clients servicing, 7) response time information, including average and historical response times, 8) errors, status, performance or bandwidth of a connection, and 9) number of sessions, and states or status thereof.

In some embodiments, the operation condition detector 1302 may use one or more monitoring agents 1303. The monitoring agent 1303 may include software, hardware or a combination of software and hardware. The monitoring agent 1303 may be an application, program, script, library, process, service, driver, task, thread or any type and form of executable instructions. In one embodiment, the monitoring agent 1303 monitors an operational condition of a server or a network service of a server 106, such as a web or HTTP service. In some embodiments, the monitoring agent 1303 monitors an operation condition of a network connection. In other embodiments, the monitoring agent 1303 monitors the device of the operation condition detector 1302. In one embodiment, the monitoring agent 1303 determines operational conditions of the monitored resource, such as a server or connection, on a predetermined frequency, such as every 1 sec, or 1 msec, or at any frequency between 1 msec and 1 sec.

In some embodiments, the operation condition detector 1302 uses one or more predetermined thresholds 1304 to determine whether or not to obtain a status of an object or obtain the object from a server based on the operational condition or performance of the network connection, server or device. A predetermined threshold 1303 may include any type and form of value or values, such as ranges. The predetermined threshold 1303 may identify or indicate a desired, suitable or acceptable level for the resource, condition or characteristic under detection or monitoring by the operation condition detector 1302. In one embodiment, each of the one or more predetermined thresholds 1304 may be weighted using any type and form of weighting scheme. In some embodiments, a user of the device, such an administrator of the appliance 200, may select or establish the predetermined threshold values and/or corresponding weights.

In some embodiments, the operation condition detector 1302 determines if the operational condition of a connection, server and/or the device is within or below one or more of the predetermined thresholds 1304. Based on this determination, the operation condition detector 1302 indicates or communicates to the prefetcher 704 and/or prefresher 904 that the operational conditions are as such that the prefetcher 704 and/or prefresher 904 should perform any of the fetching, prefetching, freshening and/or prefreshening techniques described herein. In one embodiment, the prefetcher 704 and/or prefresher generates a request to obtain a status of one or more objects from a server responsive to a signal or communication from the operation condition detector 1302. In another embodiment, the prefetcher 704 and/or prefresher 904 generates a request to obtain one or more objects from a server responsive to a signal or communication from the operation condition detector 1302. In yet another embodiment, the prefetcher 704 and/or prefresher 904 generates a request for a conditional get of one or more objects from a server responsive to a signal or communication from the operation condition detector 1302.

In other embodiments, the operation condition detector 1302 determines if the operational condition of a connection, server and/or the device exceeds or is about to exceed one or more of the predetermined thresholds 1304. In some of these embodiments, the operation condition detector 1302 indicates or communicates to the prefetcher 704 and/or prefresher 904 to not perform any of fetching, prefetching, freshening and/or prefreshening of objects. In another of these embodiments, the operation condition detector 1302 does not communicate a signal or otherwise indicate to the prefetcher 704 and/or prefresher 904 to perform any of fetching, prefetching, freshening and/or prefreshening of objects.

Referring now to FIG. 13B, an embodiment of steps of a method 1300 for performing heuristic based and dynamically determining whether to prefetch, freshen or prefreshen an object based on operational condition of the link to the originating server or the operational status of the prefetching or prefreshening device and/or server is depicted. In brief overview, at step 1305, intercepting by a device, such as a client 102 or appliance 200, an object transmitted from a server via a network connection, such as a transport layer connection. For example, the device may intercept an HTTP response to a user request for an object. At step 1305, the device stores or updates the object in the cache 232. At step 1310, the device detects whether or not an operational condition of the connection or server is within a predetermined threshold. As step 1315, in response to the detection, the device determines whether or not to transmit a request to the server to obtain a status or an updated copy of the object in the cache. At step 1317, if the detected operational condition or conditions exceeds one or more predetermined thresholds, the device does not generate or transmit a request to obtain information about the object from the server. At step 1320, if the detected operational condition or conditions is within a predetermined threshold or thresholds, the device generates a request for the status or updated copy of the object and transmits the generated request to the server. At step 1325, the device updates the object stored in the cache based on the response received from the server.

In further details, at step 1305, the device intercepts or otherwise receives any type and form of communication from one device to another device identifying or comprising an object, such as a page transmitted from a server to a client. In one embodiment, the device intercepts a response from a server to a client's request for an object. In some embodiments, the server 106 transmits one or more network packets having an application protocol layer payload providing or identifying an object. For example, in one embodiment, the device intercepts a web or HTTP page transmitted by a server 106 to a client 102 and the page includes a uniform resource locator (URL) or hyperlink identifying an object. In some embodiments, the appliance 200 intercepts a page identified by a URL and the page identifies one or more objects. In some embodiments, the device identifies the object from the intercepted communication and obtains the object from the server. At step 1205, the device forwards or transmits the intercepted communication to the requestor, such as client 102, or an application or user of the client 102. The device also stores the object, or a copy or portion thereof, to the cache 232.

At step 1310, the device detects via the operation condition detector 1302 whether or not an operational condition of the connection or server is within one or more predetermined thresholds. In one embodiment, the device detects whether or not an operational condition of the device itself is within a predetermined threshold As discussed above, the operation condition detector 1302 may detect or monitor any type and form of operational or performance condition, status, or characteristic of a network connection, server or the device. In some embodiments, the operation condition detector 1302 may use any combination of predetermined thresholds, weighted or not weighted, to determine if the operational condition of a network connection, server and/or device is within a desired threshold.

As step 1315, in response to the detection, the device determines whether or not to transmit a request to the server to obtain a status or an updated copy of the object in the cache. In some embodiments, the network optimization engine 250 makes this determination based on which operational conditions are within predetermined thresholds. In other embodiments, the network optimization engine 250 makes this determination based on which operations conditional exceed predetermined thresholds. In another embodiment, the network optimization engine 250 determines whether or not to obtain a status or an updated copy of the object based on one or more currently intercepted pages. In one embodiment, network optimization engine 250 determines whether or not to obtain a status or an updated copy of the object based on the size of the object. In other embodiments, the network optimization engine 250 determines whether or not to obtain a status or an updated copy of the object based on expiration period of the object. In some embodiments, the network optimization engine 250 determines whether or not to obtain a status or an updated copy of the object based on temporal information, such as the last request for the object. In yet another embodiment, the network optimization engine 250 determines whether or not to obtain a status or an updated copy of the object based on the detected operational conditions in combination with user demand, size, expiration period, or other temporal information of the object stored in the cache 232. In some embodiments, the network optimization engine 250 makes this determination based on one or more policies of a policy engine 295.

In one embodiment, the device and/or operation condition detector 1302 determines operational condition(s) exceeds one or more predetermined threshold 1303 or that the device should otherwise should not obtain a status or copy of the object for the cache 232. In these embodiments, at step 1317, in response to the detection, the device does not generate or transmit a request to obtain information about the object from the server.

In other embodiments, the device and/or operation condition detector 1302 determines operational condition(s) exceeds one or more predetermined threshold 1303 or that the device should otherwise obtain a status or copy of the object for the cache. In these embodiments, the device, at step 1320, generates a request for a status or copy of the object and transmit the request to a server. In one embodiment, the prefetcher 704 generates a request for the status or an updated copy of the object responsive to the operation condition detector 1302. In other embodiments, the prefresher 904 generates a request for the status or an updated copy of the object responsive to the operation condition detector 1302. In yet another embodiment, the network optimization engine 250 generates a request to obtain a status or copy of the object responsive to the operation condition detector 1302. In one embodiment, the network optimization engine 250 generates a conditional request for the object. In some embodiments, any of the prefetching and/or prefreshening techniques described herein, such as in conjunction with FIGS. 7A-7D, 8A-8B, 9A-9B and 10A-10B may be triggered responsive to the detection of operational conditions by the operation condition detector 1302.

At step 1325, the device or and/or network optimization engine 250 may update the object stored in the cache based on the response received from the server. n one embodiment, the network optimization engine 250 stores an updated version of the object in the cache 232. In another embodiment, the network optimization engine 250 updates or stores the changes to portions of the object to the cache 232. In some embodiments, the network optimization engine 250 updates object information of the cached object. For example, the network optimization engine 250 updates expiration or validation information of the object in the cache 232. In another embodiment, the network optimization engine 250 updates object header information in the cache 232. In some embodiments, the network optimization engine 250 determines the object in the cache is fresh or valid.

In some embodiments of method 1300, steps 1305 and/or 1310 and/or 1315 are performed a plurality of times to dynamically trigger or not trigger fetching, pre-fetching, freshening or pre-freshening of an object based on the operational condition of a network connection, server or the device. As conditions change over time, in one point in time, the network optimization engine 250 may generate and transmit a request for the object responsive to operational conditions, while in another point in time or a next point in time, the network optimization engine 250 may not generate and transmit a request for a status or copy of the object responsive to operational conditions. In some embodiments, the network optimization engine 250 may stop performing step 1320 until one or more operational conditions fall below one or more predetermined thresholds, for example, upon a server status indicating the server's load is at a desired level.

N. Systems and Methods for Determining Expiration of a Cached Object Responsive to Refresh Requests for the Object Referring now to FIGS. 14A, 14B and 14C, systems and methods for determining or updating the expiration of a cached object responsive to refresh requests for the object are depicted. In some cases, a caching device may serve a cached object or page too long, and a user may need to request a refresh of the page via a refresh button to reload the current page. With the refresh button technique described below, the caching device is responsive to the indicated use of the refresh button and identifies the requested URL as a page that should expire faster than the heuristics or expiration information would otherwise indicate. This technique recognizes that each refresh request is a vote by a user for greater freshness of a cached object.

Figure 14A:
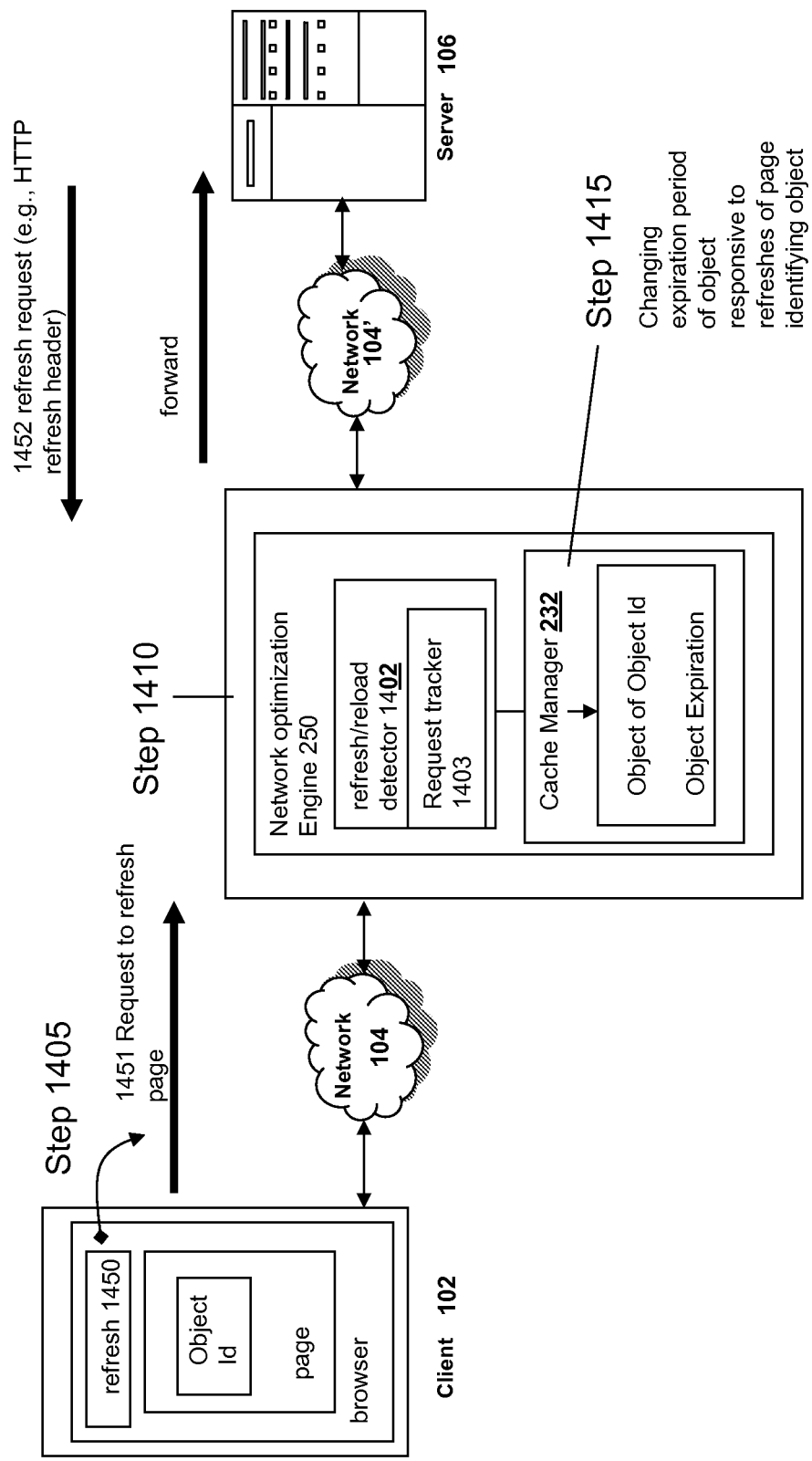
FIG. 14A is a block diagram of an example embodiment of a system for determining expiration of a cached object responsive to refresh requests for the object.

Referring to FIG. 14A, an embodiment of an appliance for detecting refresh request(s) and updating expiration information of objects in the cache responsive to the request(s) is depicted. In this embodiment, the network optimization engine 250 is deployed on an appliance. In brief overview, a client 102 executes a browser displaying one or more pages served from a server 106. The page may include or identify one or more objects. The client 102 or browser may have a refresh button, script or program 1450 selected by the user to refresh a page of the browser. In response to the refresh selection, the client 102 or browser transmits a request to refresh or reload the page to a server 106. An appliance 200 having a refresh detector 1402 intercepts the communication transmitted by the client 102 and identifies the communication as requesting a refresh or reload of the page. The refresh detector 1402 tracks a number of requests to refresh or reload a page or fetch an object. In response to the refresh request or a number of refresh requests reaching a predetermined threshold, the refresh detector updates the cache 232 to decrease the expiration time or remaining freshness of the cached object.

Figure 14B:
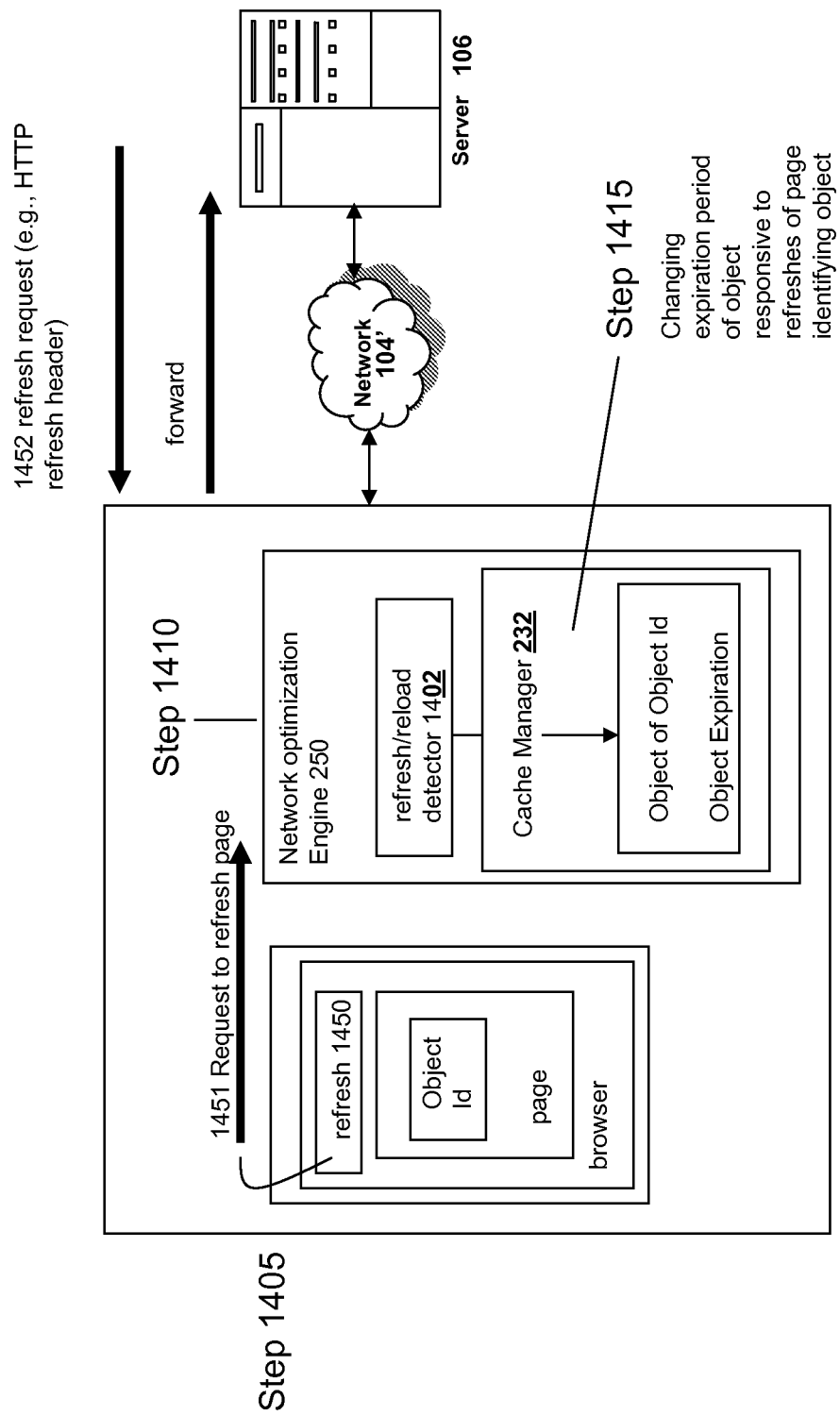
FIG. 14B is a block diagram of another embodiment of a system for determining expiration of a cached object responsive to refresh requests for the object.

Referring to FIG. 14B, another embodiment of a system for detecting refresh request(s) and updating expiration information of objects in the cache responsive to the request(s) is depicted. In this embodiment, the network optimization engine 250 is deployed on a client 102. In brief overview, a client 102 executes a browser displaying one or more pages served from a server 106. The page may include or identify one or more objects. The client 102 or browser may have a refresh button, script or program 1450 selected by the user to refresh a page of the browser. In response to the refresh selection, the client 102 or browser transmits a request to refresh or reload the page to a server 106. In one embodiment, the refresh detector 1402 on the client intercepts the communication transmitted by the client 102 and identifies the communication as requesting a refresh or reload of the page. In another embodiment, the refresh detector 1402 on the client intercepts an event of the selection of the refresh button. The refresh detector 1402 tracks a number of requests to refresh or reload a page or fetch an object. In response to the refresh request or a number of refresh requests reaching a predetermined threshold, the refresh detector updates the cache 232 on the client to decrease the expiration time or remaining freshness of the cached object.

Figure 14C:
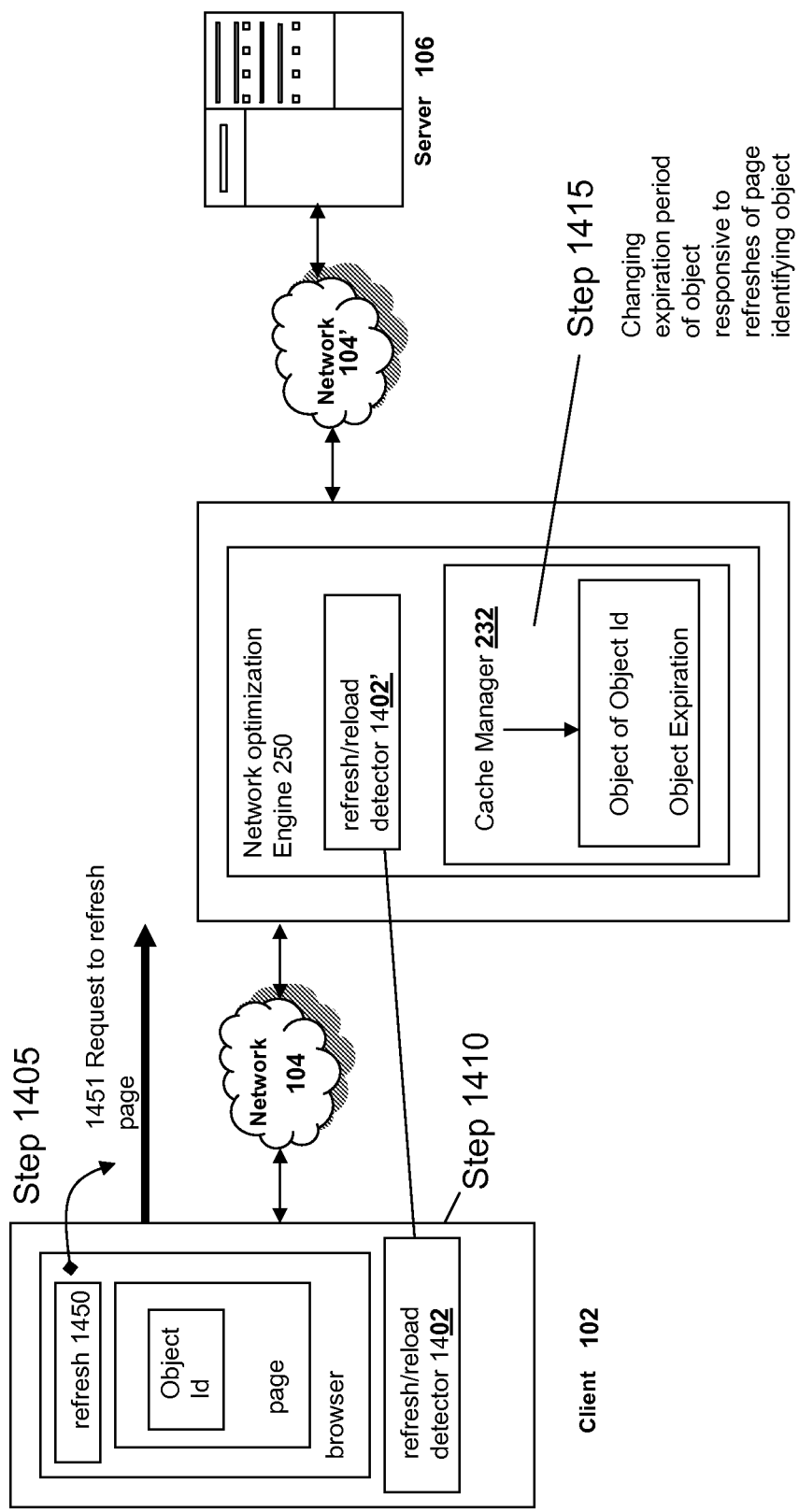
FIG. 14C is a block diagram of another example embodiment of a system for determining expiration of a cached object responsive to refresh requests for the object.

In yet another embodiment of the system and referring to FIG. 14C, the refresh detector may be distributed or otherwise deployed on a first device, such as the client 102, and a second device, such as the caching device or appliance 200. In brief overview, a client 102 executes a browser displaying one or more pages including or identifying one or more objects. The client 102 or browser may have a refresh button, script or program 1450 selected by the user to refresh a page of the browser. In response to the refresh selection, the client 102 or browser transmits a request to refresh or reload the page to a server 106. In one embodiment, the refresh detector 1402 on the client intercepts the refresh selection or the communication transmitted by the client 102 and identifies a user or the client has requested a refresh or reload of the page. The refresh detector 1402 may communicate or interface with the refresh detector 1402' on the appliance 200 to inform this caching device of the refresh request event. In response to the refresh request or a number of refresh requests reaching a predetermined threshold, the refresh detector 1402' updates the cache 232 on the appliance 200 to decrease the expiration time or remaining freshness of the cached object.

In view of FIGS. 14A, 14B and/or 14C, the client 102 may execute or operate any type and form of browser. In one embodiment, the browser is any version of Internet Explorer manufactured by Microsoft Corporation of Redmond, Wash. In another embodiment, the browser is any version of the Netscape browser manufactured by the Netscape Communications Corporation. In other embodiments, the browser is any version of the open source browser referred to as Firefox and provided by Mozilla Foundation of California and found at www.mozilla.com. In yet another embodiment, the browser is any version of the browser referred to as Opera manufactured by Opera Software ASA of Oslo, Norway. In some embodiments, the client 102 executes or included any type and form of application or program for displaying web pages, web content or HTTP content. In one embodiment, the client 102 may execute a remote display client, such as an ICA client manufactured by Citrix Systems, Inc or a Remote Desktop Protocol manufactured by the Microsoft Corporation. In these embodiments, a server 106 may execute the browser on behalf of the client and display output from the browser on the client 102 via a remote display protocol, such as ICA or RSDP, to the remote display client. The client 102 via the browser, an applicant or remote desktop client may display one or more pages, such as any web or HTTP page or content, served from a server 106. The page or pages may include or more objects. The page or pages may identify one or more objects. For example, a page may identify an object via a URL or hyperlink.

The client 102 may include any type and form of execution method 1450 to refresh or reload a page, or object thereof, provided via the browser, application or remote desktop client. In one embodiment, the browser or application includes a refresh user interface element 1450, such as a refresh button. Upon selection of the refresh button 1450 by a user or another application, the browser or application generates and transmits a request 1451 to the server 106 to refresh or reload the content or objects of one or more pages. In some embodiments, the refresh execution method 1450 includes any type and form of selectable user interface element of a browser or application. In yet another embodiment, the refresh user interface element 1450 includes any type and form of script or scripting language, such as Javascript or an ActiveX control. In other embodiments, the refresh execution method 1450 includes any type and form of program, service, process, thread or task for requesting a refresh or reload of a page, such as a process executing in the background of the operating system. In one embodiment, the refresh execution method 1450 includes executable instructions to refresh or reload a page, or object thereof, from a cache 232.

A user, a plurality of users or any application, program, process, service, thread or task on the client 102 may execute, initiate or trigger the refresh execution method 1450. The request generated by selection of the refresh 1450 may include any type and form of application protocol layer request. In some embodiments, the refresh user interface element 1450 generates and transmits an HTTP request 1451 to refresh one or more HTTP pages served by the server 106. In other embodiments, the refresh element 1450 generates and executes a function call or application programming interface (API). In one embodiment, the function or API executes on the client 102. In another embodiment, the function or API executes on the server 106.

In some embodiments, the server 106 generates and/or transmits a request 1452 to the client 102 to refresh a page. The server 106 may transmits a refresh request to the client 102 via any type and form of application layer protocol. In one embodiment, the server 106 transmits an HTTP refresh header 1452 to the browser of the client 102. In some embodiments, the server 106 serves the HTTP refresh header 1452 with pages or content served by the server 106 to the client 102. In other embodiments, the server 106 transmits a script or set of one or more executable instructions for the browser or application of the client 102 to execute to reload the page or request a refresh. In some embodiments, the script or executable instructions includes a function or API call to reload or refresh a page. In other embodiments, the script or executable instructions updates the page via a cache 232.

In some embodiments, the network optimization engine 250 as described herein, or any portion thereof, such as the protocol accelerator 234, may include a refresh detector 1402. In other embodiments, the cache or cache manager 232 includes the refresh detector 1402. The refresh detector 1402 may include software, hardware or any combination of software and hardware. The refresh detector 1402 may include an application, program, script, library, process, service, driver, task, thread or any type and form of executable instructions. In one embodiment, the refresh detector 1402 includes or provides logic, business rules, functions or operations for detecting a selection of a refresh user interface element 1450 or determining the refresh 1450 was selected. For example, a refresh detector 1402 on the client 102 may detect an event, call back or function was called via selection of a refresh button 1450. In some embodiments, the refresh detector 1402 includes or provides logic, business rules, functions or operations for intercepting and detecting a communication requesting a refresh or reload of a page. For example, a refresh detector 1402 on an appliance 200 may intercept application layer traffic via a transport protocol connection and determine or identify the application layer payload includes a refresh request.

In the embodiment of a refresh detector 1402 on a client 102, the refresh detector 1402 may include any type and form of executable instructions to detect a selection of a refresh or reload button 1450 of a browser or application. In one embodiment, the refresh detector 1402 includes an event handler or callback function for a selection event of a user interface element. In another embodiment, the refresh detector 1402 includes a hooking or filtering mechanism to capture any event related to the refresh user interface element 1450. In some embodiments, the refresh detector 1402 includes executable instructions in the script, program or executable instructions of the refresh user interface element 1450 to perform any of the operations described herein. In another embodiment, the refresh detector 1402 includes an interceptor 305 of a client agent 302 as described in FIG. 3. In these embodiments, the refresh detector 1402 intercepts at any point or layer in a network stack of the client 102 a communication requesting a refresh or reload of a page.

In an embodiment of a refresh detector 1402 on the appliance 200 or intermediary caching device, the refresh detector 1402 includes any type and form of executable instructions to intercept and/or determine from network traffic traversing the appliance 200 that a refresh of a page or object has been requested. In one embodiment, the refresh detector 1402 intercepts and/or determines a refresh request of communications from a client 102 to a server 106. In another embodiment, the refresh detector 1402 intercepts and/or determines a refresh request of communications from a server 106 to a client 102. In other embodiments, the refresh detector 1402 intercepts and/or determines a refresh request from communications transmitted between a server 106 and a client 102. In some embodiments, the refresh detector 1402 identifies in the payload of one or more intercepted network packets that the payload includes a request to refresh a page or object thereof, such as URL or hyperlink. In one embodiment, the refresh detector 1402 determines a refresh request from any type and form of application layer protocol. In other embodiments, the refresh detector 1402 identifies or determines from header information of an HTTP communication that the communication includes a refresh or reload request. In yet another embodiment, the refresh detector 1402 applies a filter to intercepted network packets to determine if one or more network packets include or identify a refresh request, such as request 1451 or 1452.

As illustrated in FIG. 14A, the refresh detector 1402 may include a request tracker 1403. The request tracker 1403 may include any type and form of tracking mechanism or scheme for tracking a number of refresh or reload requests, such as requests 1451 and 152. The request tracker 1403 may include a data structure, object, queue, list file or database to track and maintain a number of refresh requests. The request tracker 1403 may include any type and form of executable instructions for recording, tracking, updating or managing a number of refresh requests. In one embodiment, the request tracker 1403 tracks a number of refresh requests from a client 102. In some embodiments, the request tracker 1403 tracks a number of refresh requests from a browser or application. In other embodiments, the request tracker 1403 tracks a number of refresh requests from a user. In another embodiment, the request tracker 1403 tracks a number of refresh requests from a server 106. In some embodiments, the request tracker 1403 tracks a number of refresh requests from a group of users, clients, servers, or browsers, such as a group of users or client at a branch office. The request tracker 1403 may use any type and form of counter and counting schemes for tracking a number of refresh requests. The request tracker 1403 may track and count a number of refresh requests on a per page basis or per object basis, such as for each URL, hyperlink or object identifier.

In one embodiment, the request tracker 1403 tracks a number of refresh requests over any time period. In some embodiments, the request tracker 1403 tracks a number of refresh requests during an application layer session, such as between a browser and a server. In other embodiments, the request tracker 1403 tracks a number of refresh requests during a transport layer connection, such as between a client and a server. In one embodiment, the request tracker 1403 tracks a number of refresh requests between a start and termination of a session or a connection. In yet another embodiment, the request tracker 1403 tracks a number of refresh requests until a count of a number of requests for a page or object has reached a predetermined threshold. In some embodiments, the request tracker 1402 resets a counter for a number of request for page based on any temporal data or terminations of a session or a counter.

In some embodiments, the request detector 1402 interfaces with or is in communication with the cache manager 232. In one embodiment, the request detector 1402 is integrated or incorporated in the cache manager 232. Responsive to tracking refresh requests, the request detector 1402 request the cache manager 232 to update or change information of a cached object. In some embodiments, the request detector 1402 changes the expiration period or freshness information for a cached object. In other embodiments, the request detector 1402 establishes an expiration period for a cached object based on tracked refresh request information. In another embodiment, the request detector 1402 marks a cached object as invalid, expired or otherwise not fresh or not validated responsive to tracked refresh request information. In still other embodiments, the request detector 1402 may trigger or execute any of the prefetching or prefreshening techniques described herein, such as via FIGS. 7A-7D, 8A-8B, 9A-9B and 10A-10B, responsive to tracked refresh request information.

Figure 14D:
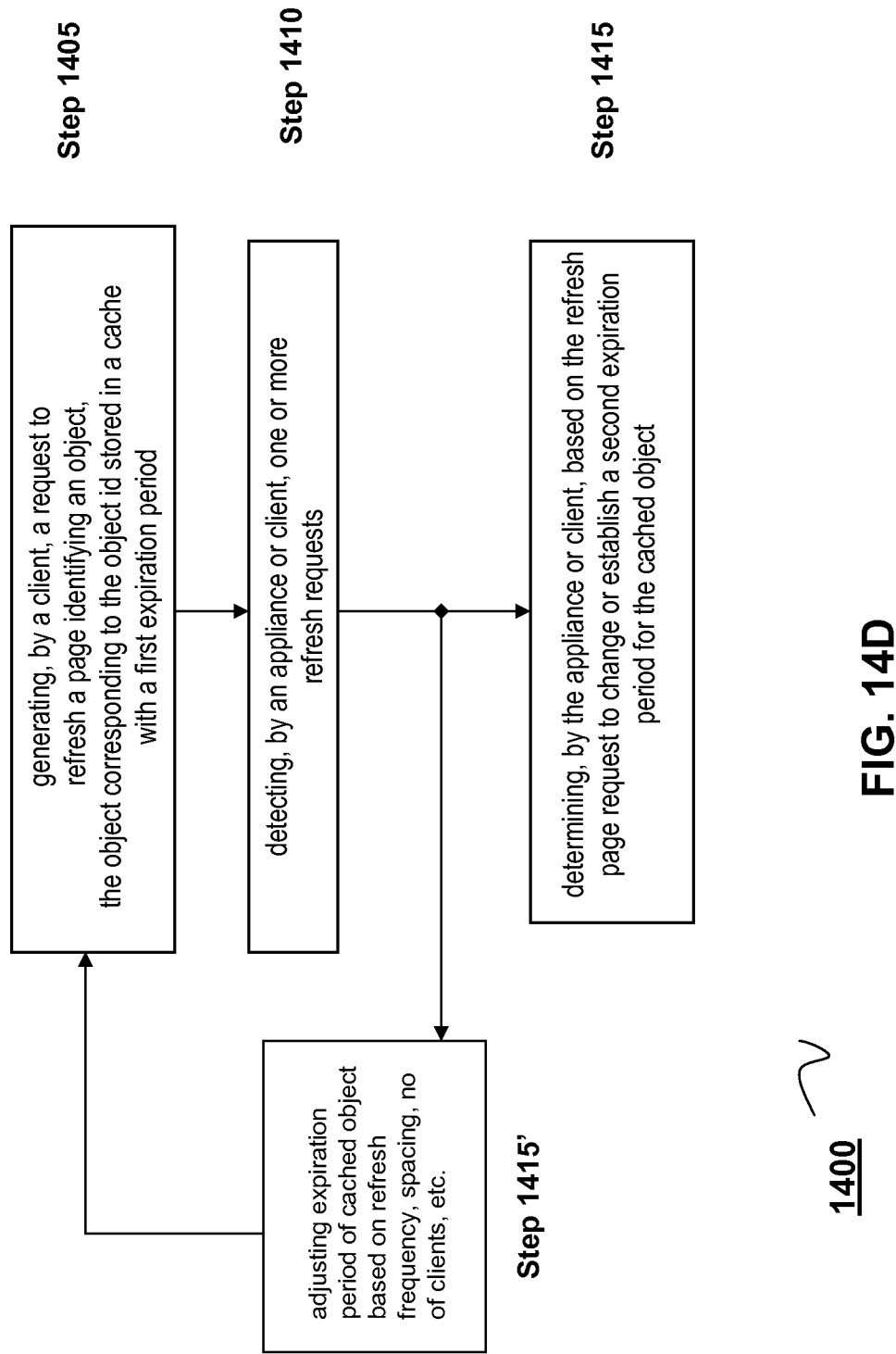
FIG. 14D is a flow diagram of steps of an embodiment of a method for determining expiration of a cached object responsive to refresh requests for the object.

Referring now to FIG. 14D, an embodiment of a method 1400 for determining or updating the expiration of a cached object responsive to refresh requests for the object is depicted. In brief overview, at step 1405, a client 102 generates a request to refresh or reload a page identifying one or more objects stores in a cache 232. The object stored in the cache 232 has a first expiration period. At step 1410, a device, such as an appliance 200 or client, detects one or more requests to refresh the page. At step 1415, the device determines responsive to the detection of the one or more refresh requests to establish a second expiration period for the object in the cache 232. For example, based on user demand for a cached object detected by the refresh requests, a caching device may shorten the expiration period of the cached object to increase the frequency of freshening the object in the cache. In some embodiments, at step 1415', the caching device adjusts the expiration period of the cached object responsive to the number of refresh requests, frequency of the refresh requests, and/or number of users, clients, servers or browsers sending and/or receiving refresh requests associated with the cached object.

In further detail, at step 1405, a client, browser or application may generate via any type and form of refresh execution method 1450 a refresh request 1451. In some embodiments, a user generates the refresh or reload request 1451 by selecting a refresh user interface element 1451. In other embodiments, a program, script or executable instructions generates the refresh or reload request 1451 on a predetermined frequency or in response to any user interaction with the client 102 or browser. In yet another embodiment, a server 106 transmits a refresh request 1452 to the client 102.

At step 1410, a device, such as an appliance 200 or client, detects one or more requests to refresh the page. In one embodiment, a refresh detector 1402 on the client 102 detects a selection of a user interface element of a browser or application on the client. In another embodiment, a refresh detector 1402 on the client 102 detects a communication from the client to a server to refresh a page via interception at any point or layer in the network stack of the client 102. In other embodiments, a refresh detector 1402 on an appliance 200 detects a refresh request via interception and inspection of network packets traversing the appliance 200. In one embodiment, the refresh detector 1402 of the appliance 200 determines a client's network communication to a server includes a refresh request 1451. In another embodiment, the refresh detector 1402 of the appliance 200 determines a servers' network communication to a client includes a refresh request 1452. In still another embodiment, a refresh detector 1402 of the client 102 detects a selection of a refresh user interface element 1450 or communication of a refresh request 1451, and transits a communication or a message to refresh detector 1402' of the appliance 200. In these embodiments, the first refresh detector 1402 informs the second refresh detector 1402' of the detection of the refresh request.

At step 1410, the refresh detector 1402 tracks a number of detected refresh requests. In some embodiments, the refresh detector 1402 tracks a number of detected refresh requests for each page, object, URL or hyperlink. In one embodiment, the refresh detector 1402 tracks a number of detected refresh requests for a user. In other embodiments, the refresh detector 1402 tracks a number of detected refresh requests on a client 102, browser or application basis. In yet another embodiment, the refresh detector 1402 tracks a number of detected refresh requests on a server basis. In still other embodiments, the refresh detector 1402 tracks a number of detected refresh requests on a basis of a group of users, clients, browsers, applications, or servers. In some embodiments, the refresh detector 1402 tracks a number of detected refresh requests over any time period, such as for a predetermined time period, or during any session or connection.

At step 1415, the device determines responsive to the detection of the one or more refresh requests to establish a second expiration period or otherwise change the expiration period for the object in the cache 232. In one embodiment, the refresh detector 1402 and/or cache manager 232 decreases the expiration period of a cached object by a predetermined amount for each detected refresh request for the object. In another embodiment, the refresh detector 1402 and/or cache manager 232 decreases the expiration period of a cached object by a predetermined amount upon detecting a predetermined number of refresh requests for the object. In other embodiments, the refresh detector 1402 and/or cache manager 232 decreases an expiration period of a cached object by an amount determined or computed based on a number of refresh requests and/or the frequency of refresh requests for the object.

In some embodiments, the refresh detector 1402 and/or cache manager 232 increases the expiration period of a cached object, such as a previously decreased expiration period, based on a change in the number or frequency of refresh requests for the object. For example, if the refresh detector 1403 does not detect a refresh request for an object within a predetermined time, the refresh detector 1402 and/or cache manager 232 may increase the expiration period of the cached object or reset to the expiration period to an initial or default value. In other embodiments, the refresh detector 1402 and/or cache manager 232 increases the expiration period of a cached object by a predetermined factor based on a decrease in the number or frequency of refresh requests for the object.

In one embodiment, the refresh detector 1402 and/or cache manager 232 establishes an expiration period for the cached object responsive to detecting refresh requests for the object. In some embodiments, the cached object may not have an expiration period. In these embodiments, the refresh detector 1402 and/or cache manager 232 establishes an expiration period for the object based on demand determines via the detected refresh requests for the object. In another embodiment, the refresh detector 1402 stops detecting refresh requests for an object upon a number of requests exceeding a predetermined threshold or the expiration period of the cached object reaching a predetermined threshold. In still other embodiments, the refresh detector 1402 and/or cache manager 232 may update any information of the object in the cache 232, such as validation or freshness information responsive to the detection of refresh requests. For example, the refresh detector 1402 and/or cache manager 232 may mark an otherwise fresh object as invalid or expired responsive to the detection of a refresh request.

In some embodiments, at step 1415' the refresh detector 1402 continually detects refresh requests for one or more objects, the refresh detector 1402 and/or cache manager 232 may adjust—increase and/or decrease—the expiration period for the object. The refresh detector 1402 and/or cache manager 232 may update object information, such as expiration or freshness, based on any of the following: 1) number of refresh requests, 2) frequency of refresh requests, 3) time from a last or previous refresh request, 4) time to a first refresh request, 5) number of users, client, browsers or applications requesting a refresh, 6) number of servers responding to refresh requests, 7) number of server refresh requests, 8) size of the object in the cache, 9) last time object or object information was updated, 10) temporal information related to duration of session or connection, 11) establishment or disconnection of a session or a connection.

With the systems and methods described above, a caching device can update cached objects responsive to user demand as detected via refresh requests.

O. Systems and Methods for Domain Name Resolution Interception Caching and Prefeshening/Prefetching Techniques for Cached DNS Information.

Figure 15A:
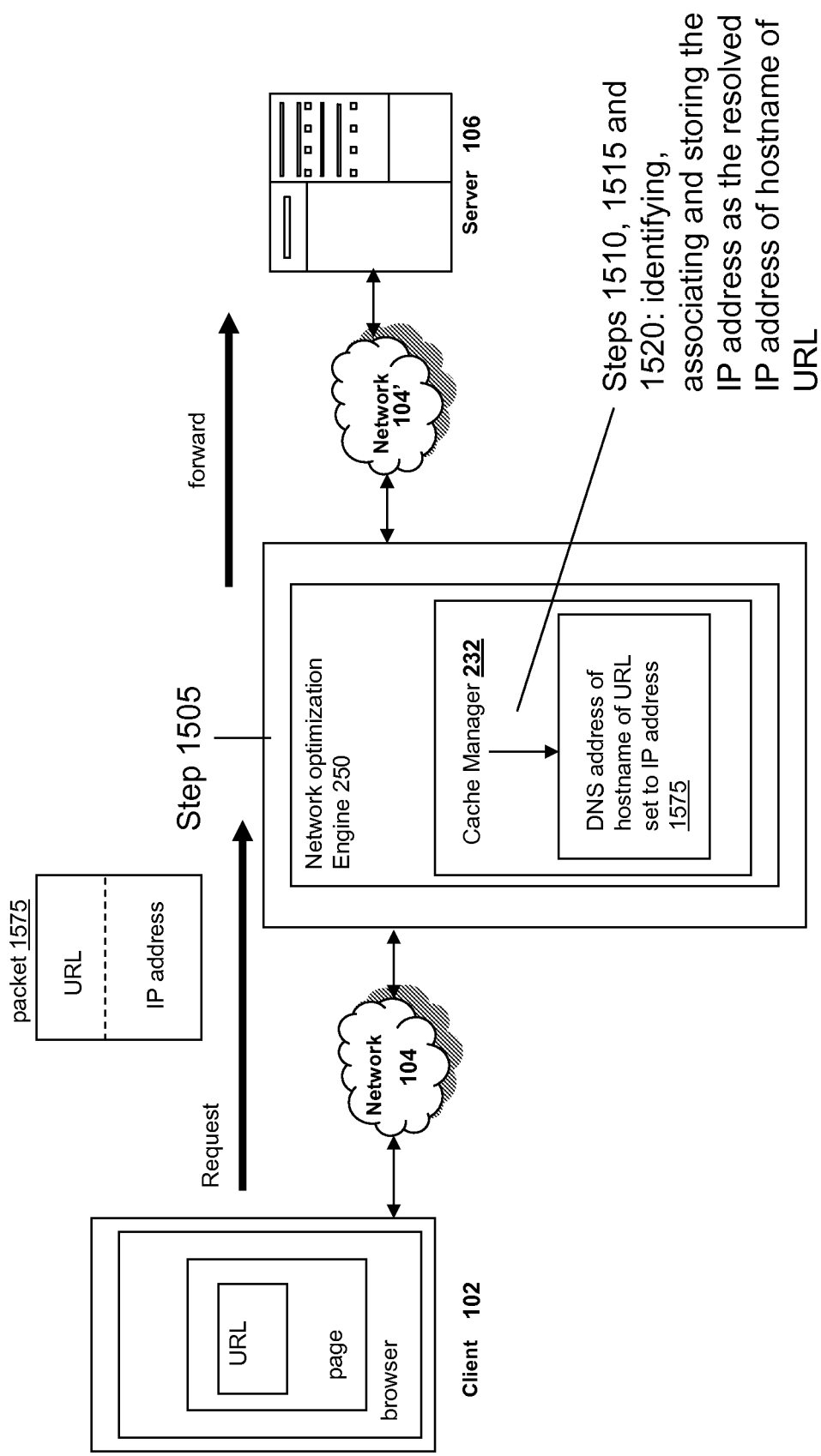
FIG. 15A is a block diagram of an example embodiment of a system for interception caching of domain name resolution as described in conjunction with FIG. 15C.
Figure 15B:
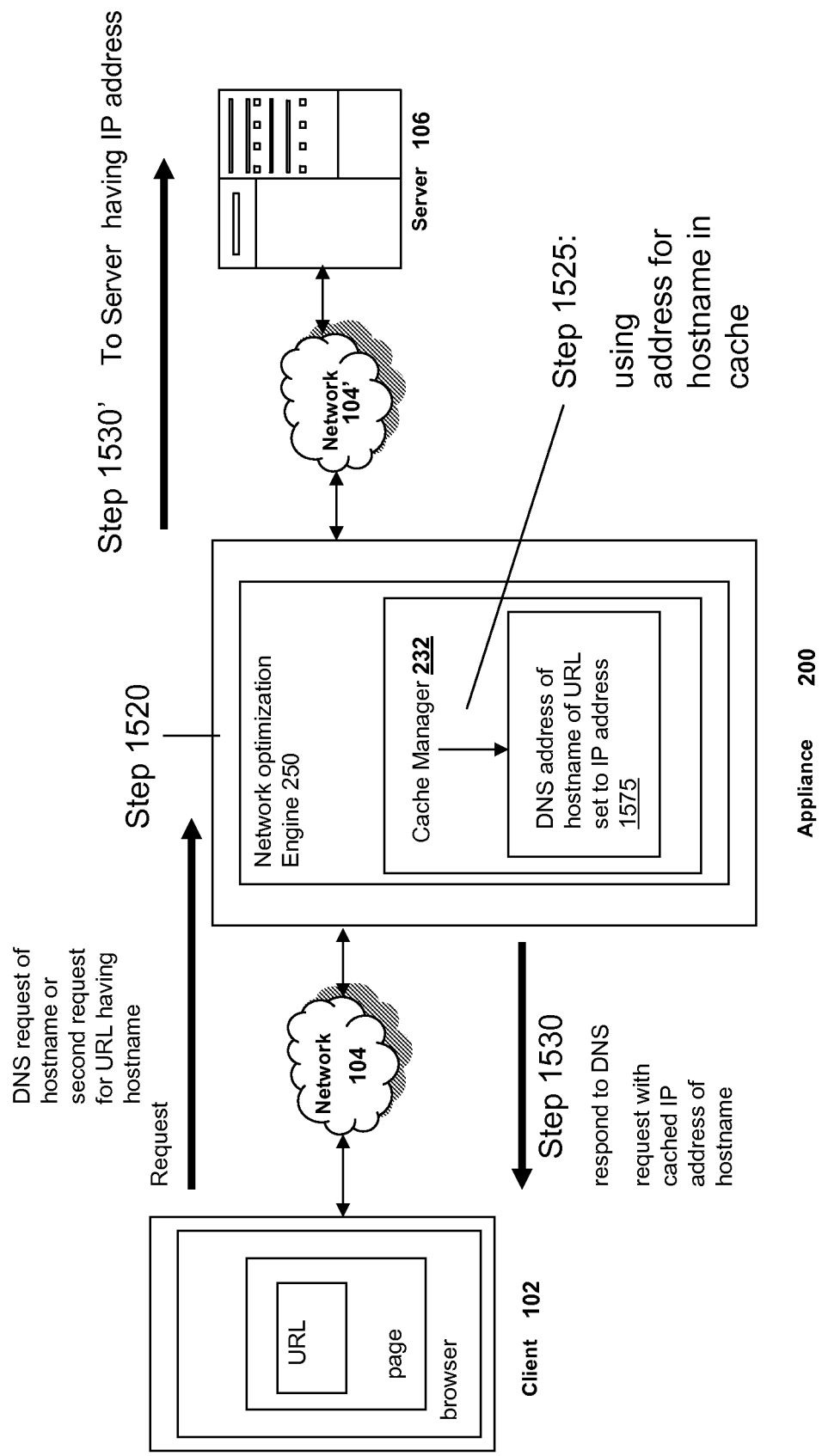
FIG. 15B is a block diagram of an example embodiment of a system for interception caching of domain name resolution as described in conjunction with FIG. 15C.
Figure 15C:
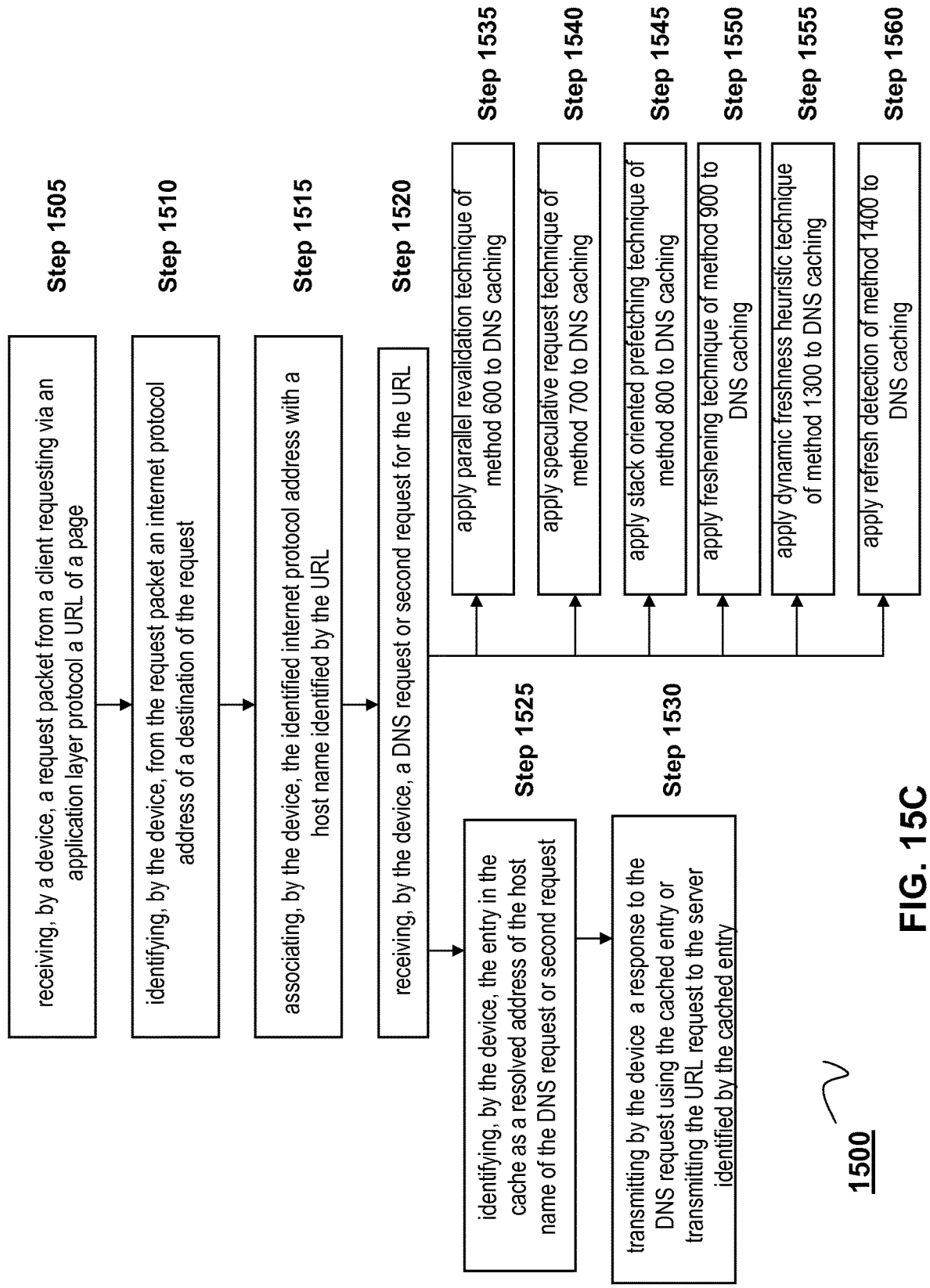
FIG. 15C is a flow diagram of steps of an embodiment of a method for performing domain name resolution interception, caching and updating techniques.

Referring now to FIGS. 15A-15C, systems and methods are depicted for techniques of performing domain name resolution for interception caching and applying any of the prefeshening and/or prefetching techniques described herein to cached domain name server information. In some embodiments, a caching device may be on a different part of a network than the client 102. In these embodiments, the cache may not be able to resolve IP names in the same way that the user would. In one embodiment, this may cause additional trouble when the client is connected to a network via a virtual private network, such as an SSL VPN. The caching device may encounter a URL or link that does not have a domain name on the virtual private network. In one case, if the user's browser has a proxy configures, the client sends HTTP requests to the proxy without turning addresses of URLS into IP addresses via domain name resolution. In other cases, if the user's browser does not know there is a proxy, for example, in case of transparent intercept caching, the client tries to resolve the URL addressed into IP addresses itself. The user browser resolves the URL address first so that it can open a connection to the server serving the URL.

Using the techniques described herein, the caching device obtains the IP destination address of packets intercepted from clients. The clients may have resolved the addresses of the URLs and are now requesting connections to the resolved IP addresses. In some embodiments, the interception cache does not perform domain name resolution for the URL but instead uses the destination IP of the intercepted network packet as the resolved IP address of the URL. By using this technique, the caching device avoids domain name resolution problems, such as those caused via a VPN, simplifies configuration and increases transparency of the intercepting cache. Furthermore, the caching device may maintain and update cached DNS information using any of the prefetching and/or prefreshening techniques described herein.

Referring now to FIG. 12A, an embodiment of a system for using the destination IP address of intercepted network packets associated with the URL or link as the resolved domain name address is depicted. In brief overview, a client 102 may have a browser or application for receiving and displaying content transmitted via a network, such as a web page served by a server 106. In some cases, the client 102 may communicate with the server via a VPN established by appliance 200' or an appliance 205. The page may have or more URLs or hyperlinks. The client 102 and/or browser may resolve one or more URLs of the page via a Domain Name Server (DNS) such as server 106N. The client 102 and/or browser obtains the content or object identified via the URL by requesting a connection to a server identified by the IP address resolved by the client via DNS. As depicted in FIG. 12A, the client 102 transmits one or more packets 1575 for the URL to a destination IP address of the server 106. An intercepting cache, such as appliance 200, intercepts the request from the client 102. The appliance 200 identifies the destination IP address and the URL from the packet. Instead of resolving the IP address of the domain name of the URL, the appliance 200 uses the destination IP address of the packet 1575 as the DNS resolved IP address for the URL. The appliance 200 stores this information 1580 in the cache 232. For subsequent requests for the URL or for domain resolution of the URL, the appliance 200 may use the cached information 1580 as the resolved IP address of the URL.

In some embodiments, the application layer of the network packet 1575 identifies the URL. In other embodiments, the application layer of the network packet 1575 identifies a domain name to be resolved to an IP address, such as a domain name of the URL. In one embodiment, the client 102 or browser requests a URL, or content thereof, via any type and form of application layer protocol, such as HTTP. In another embodiment, the network or IP layer of the network packet 1575 identifies the destination IP address of the request. In yet another embodiment, the transport layer of the network packet 1575 identifies the destination IP address of the request. For example, in one embodiment, a client 102 may request to open a transport layer connection, such as a TCP connection, to a server. The transport layer connection request identifies the server as the destination IP address. In some embodiments, the destination IP address of the network packet 1575 comprises an IP address resolved by the requestor for the URL or domain name of the URL.

Referring now to FIG. 15B, an embodiment of a system for serving and updating cached DNS information of URLs is depicted. In brief overview, an intercepting cache, such as appliance 200 stores cached information 580 associating a URL with a resolved IP address of the URL. In one embodiment, the IP address for the URL in the cached information 580 includes the IP address intercepted from the network packet 1575 as discussed in conjunction with FIG. 15A. In one case, a client 102 having a browser or application may request DNS resolution of a URL. In one embodiment, the client 102 requests DNS resolution of the URL from the appliance 200. In another embodiment, the client 102 requests DNS resolution from a server 106 and the request traverses appliance 200. The appliance 200 may respond to the request by serving the IP address associated with the URL from the cached information 1580. Furthermore, the appliance 200 in response to the request may freshen the IP address of the URL in cached information 1580 by generating and transmitting a request for domain name resolution of the URL. In another embodiment, the appliance 200 in response to the request may prefetch the URL from the server and store content from the URL in the cache 232. In some embodiments, the appliance 200 in response to the request may prefreshen cached URL content by requesting a status and/or update of the content from a server.

In other cases, a client 102 may request the content or object of a previously requested URL. In one embodiment, the appliance 200 intercepts the request of the client 102 and identifies the destination IP address of the request. In some embodiments, the appliance 200 forwards the request to the destination IP address. In other embodiments, the appliance 200 identifies the URL of the request and forwards the request to the IP address for the URL stored in the cache 232. In yet another embodiment, the appliance 200 updates the cached information 1580 for the URL with the destination IP address of the intercepted packet. Based on the request, the appliance 200 may also perform any of the prefreshening techniques of the cached information 1580 to update the IP address of the URL stored in the cache.

Although FIGS. 15A and 15B depict embodiments of systems having an appliance 200 practicing the DNS related techniques described herein, these techniques may be deployed on an end node such as via a client 102 having the network optimization engine 250. In some embodiments, the client 102 has a cache 232 for storing cached DNS information 1580. In another embodiment, the network optimization engine 250 and/or the client agent 120 of the client 120 has logic, functions, and operations for responding to and processing DNS requests of the client 102 as described herein.

Referring now to FIG. 15C, an embodiment of steps of a method 1500 for performing domain name resolution for interception caching and applying any of prefreshening and/or prefetching techniques to intercepting caching and DNS cached information. In brief overview, at step 1505, a device, such as appliance 200 intercepts a request for a URL. At step 1510, the appliance 200 identifies from a packet of the request a destination IP address of the request. At step 1515, the appliance 200 associates the identified destination IP address from the intercepted packet with the URL of the request. For example, the appliance 200 may consider the destination IP address as the resolved DNS address of the URL. At step 1520, the appliance 200 intercepts a DNS request of the client to resolve the DNS address of the URL or intercepts a request for the URL from the server. At step 1525, in one embodiment, the appliance 200 identifies the IP address stored in the cache 232 as the resolved IP address of the URL. At step 1530, in some embodiments, the appliance 200 serves the identified IP address from the cache 232 as the resolved DNS address of the URL in response to the client's DNS request. In other embodiments and in the case of a request for the URL, at step 1530', the appliance 200 transmits the request for the URL to the server having the IP address identified in the cache 232 for the URL.

Embodiments of method 1500 may perform any of the fetching, prefetching, freshening or prefreshening techniques described herein to DNS cached information and DNS requests. In one embodiment, at step 1535, the intercepting device may perform a parallel revalidation technique of the DNS cached information 1580 in accordance with the systems and methods described in conjunction with FIGS. 6A and 6B. In another embodiment, at step 1540, the intercepting device performs a speculative QoS request/response technique for DNS information in accordance with the systems and methods described in conjunction with FIGS. 7A-7D. In some embodiments, at step 1545, the intercepting device performs a stack oriented prefetching technique for DNS requests in accordance with the systems and methods described in conjunction with FIGS. 8A and 8B. In one embodiment, at step 1550, the intercepting device perform a freshening technique for DNS requests in accordance with the systems and methods described in conjunction with FIGS. 9A and 9B. In some embodiments, at step 1555, the intercepting device performs a dynamic freshness heuristic techniques for DNS cached information 1580 in accordance with the systems and methods described in conjunction with FIGS. 13A and 13B. In yet another embodiment, at step 1560, the intercepting device performs cache expiration techniques for DNS cached information 1580 responsive to refresh requests in accordance with the systems and methods described in conjunction with FIGS. 14A and 14B.

In further details, at step 1505, the device, such as appliance 200, intercepts any type and form of communication from one device to another device, such as between a client and a server. In one embodiment, the appliance 200 intercepts a request from a client or a browser of a client to open a transport layer connection with a server. In another embodiment, the appliance 200 intercepts a request for a URL from a server. In some embodiments, the device intercepts a DNS request or a request to resolve a domain name into an IP address.

At step 1510, the device identifies from a packet a destination IP address of the request. In one embodiment, the appliance 200 identifies from a network or IP layer of the packet 1575 a destination IP address of the request. In another embodiment, the appliance 200 identifies from the transport layer of the packet 1575 the destination IP address. In some embodiments, the device intercepts a request to open a transport layer connection and identifies a destination IP address from the connection request. In yet another embodiment, the device identifies from an application layer protocol of the packet 1575 or subsequent packets 1575 a URL or domain name associated with the destination IP address. In some embodiment, the network optimization engine 250, or portion thereof, such as an HTTP accelerator 234, operates in user mode or at an application layer of the network stack and uses application programming interface (API) calls to obtain the destination IP addressed identifies via lower layers of the network stack, such as the network or transport layer.

At step 1515, the appliance 200 associates the identified destination IP address from the intercepted packet 1575 with a URL. In one embodiment, the appliance 200 does not perform any domain name resolution on the URL, but instead, uses the identified destination IP address from the intercepted packet 1575 as the resolved IP address of the URL. In some embodiments, the appliance 200 assigns the destination IP address as the resolved DNS address of the URL. In another embodiment, the appliance 200 stores the identified destination IP address 1580 in the cache 232. In one embodiment, the appliance 200 stores the identified IP address in the cache 232 in association with the URL. In some embodiments, the appliance 200 stores the identified IP address in the cache in association with a domain name, such as any domain name identified via a portion of the URL.

In some cases, the caching or interception device, such as appliance 200, responds to DNS requests using the cached DNS information 1580. At step 1520, the appliance 200 intercepts a DNS request of the client to resolve the DNS address of the URL. In one embodiment, the appliance 200 intercepts a request from a client to a server to resolve the domain name identified via the URL into an IP address. In some embodiments, the appliance 200 receives the request from the client to resolve a domain name of the URL into an IP address. For example, the client 102 or browser of the client 102 may be configured to use the appliance 200 as a proxy. In another example, the client 102 or browser of the client 102 may be configured to use the appliance 200 as a DNS server or domain name service.

At step 1525, in one embodiment, the appliance 200 identifies the IP address stored in the cache 232 as the resolved IP address for the DNS request. In some embodiments, the appliance 200 identifies the destination IP address determined at step 1510 and stored at step 1515 as the resolved IP address for the domain name of the DNS request. At step 1530, in some embodiments, the appliance 200 serves the identified IP address from the cache 232 as the resolved DNS address of the URL in response to the client's DNS request. In one embodiment, the appliance 200 transmits a response to the client's DNS request identifying the destination IP address determined at step 1510.

In other cases, the caching or intercepting device, such as appliance 200, processes requests for URLs from servers using the cached DNS information 1580. At step 1520, the appliance 200 intercepts a request for the URL from a server. In one embodiment, the appliance 200 intercepts a request from a client to a server to obtain the content or object identified via the URL. In one embodiment, the client 102 transmits the request for the URL without resolving the domain name identified by the URL into an IP address. For example, in some embodiments, the appliance 200 intercepts the client's request transmitted to a proxy. In other embodiments, the appliance 200 acts as a proxy and receives the client's request. For example, the client 102 or browser of the client 102 may be configured to use the appliance 200 as a proxy. In yet another embodiment, the client 102 transmits the request for the URL for which the client 102 has resolved the domain name identified by the URL into an IP address. For example, the client 102 transmits the request for the URL via a transport layer connection established with the destination IP address resolved by the client 102. In some of these embodiments, the appliance 200 intercepts the request for the URL via the transport layer connection for which the appliance 200 is a proxy or otherwise proxies.

In other embodiments and in the case of a request for the URL, at step 1530', the appliance 200 transmits the request for the URL to the server having the IP address identified in the cache 232 for the URL. At step 1525, in one embodiment, the appliance 200 identifies the IP address stored in the DNS information 1580 if the cache 232 as the resolved IP address for the URL request. In some embodiments, the appliance 200 identifies the destination IP address determined at step 1510 and stored at step 1515 as the destination IP address for URL request. At step 1530', in some embodiments, the appliance 200 forwards the intercepted request to the IP address of the cached DNS information 1580. In one embodiment, the appliance 200 forwards the intercepted URL request to the destination IP address identified via a packet 1575 of the request for the URL.

In some embodiments, at step 1535m the intercepting device, such as appliance 200 or client 102, performs a parallel revalidation technique of the DNS cached information 1580 in accordance with method 600 as discussed in conjunction with FIG. 6B. In these embodiments, the intercepting device responds to the DNS request with the IP address from the DNS cached information 1580, such as described in step 1530, and generates and transmits a request to update the DNS information in the cache 232. In one embodiment, the device generates and transmits a request to a DNS server 106 to resolve a domain name. For example, the domain name corresponds to a domain name of a URL for which the device served the DNS information from the cache 232 at step 1530. In some embodiments, the device generates and transmits the DNS request to resolve the domain name to an IP address in parallel, concurrently, substantially parallel or concurrently, or otherwise, to serving the DNS information from the cache 232. The device receives a response to the DNS request and updates the DNS cached information 1580. In some embodiments, the IP address for the resolved domain name has changed, while, in other embodiments, the IP address for the resolved domain name has not changed.

In other embodiments, at step 1540, the intercepting device, such as appliance 200 or client 102, performs a speculative request, such as a prefetch or prefresh, of the DNS cached information 1580 in accordance with methods 700 and/or 750 as discussed in conjunction with FIGS. 7B and 7D. In these embodiments, the device intercepts a page transmitted to a client 102. The device identifies one or more URLs of the page and generates a DNS request to resolve the domain name identified via a URL into an IP address. The device encodes the generated DNS request with a speculative QoS priority and transmits the generated DNS request according to this assigned priority. In this manner, the device transmits the speculative DNS requests and receives a response that does not contend with non-speculative requests. Upon receipt of the response, the device stores the IP address of the resolved domain name in the cache 232 to provide the cached DNS information 1580. If the device intercepts a client's request to resolve the domain name of the intercepted URL or the device intercepts a request for the URL, the device may use the cached DNS information 1580 in responding to or otherwise processing the request as described above.

In another embodiment, at step 1545, the intercepting device, such as appliance 200 or client 102, uses any of the stack oriented prefetching techniques described in conjunction with method 800 and FIG. 8B. For example, in some embodiments, the intercepting device intercepts one or more pages identifying URLs and stores the pages onto a stack in a LIFO manner. Upon determination to prefetch DNS information, the device pops the last stored URL from the stack and generates a DNS request to resolve a domain identified by the page or a URL of the page. The device transmits the DNS request to any type and form of domain name resolution service, such as a DNS server 106. From the response, the device stores the IP address of the resolved domain name in the cache 232 to provide the cached DNS information 1580. In one embodiment, the device generates and transmits the DNS request using the stack-oriented technique of method 800 with the speculative request and response techniques of methods 700 and/or 750.

In some embodiments, at step 1550, the intercepting device, such as appliance 200 or client 102, uses any of the freshening techniques described in conjunction with method 900 and FIG. 9B. For example, in one embodiment, the device intercepts pages communicated via the device, such as a page transmitted from a server to a client. The device parses a URL of the page and determines that the IP address for a domain name identified by the URL is located in a cache 232. Prior to a user requesting the identified URL from the page, the device generates a request for a status or an update to the IP address of the domain name in the cache 232 and transmits the generated request to a domain name service, such as a DNS server 106. The device receives a response from the server indicating a status of the DNS information or providing a second or new IP address for the domain name. Based on the response, the device validates or updates the DNS information 1580 stored in the cache 232.

In one embodiment, at step 1555, the intercepting device, such as appliance 200 or client 102, uses any of the dynamic freshness heuristic techniques described in conjunction with method 1300 and FIG. 13B. Using these techniques, the device dynamically takes into account the operational and performance conditions of the link (connection), caching device and/or server to determine whether or not to check a status of the DNS information stored in the cache or to obtain updated DNS resolution information from a DNS service or server. For example, the device may intercept a DNS request or a request for URL. The device detects whether or not an operational condition of the connection or server is within a predetermined threshold. In response to the detection, the device determines whether or not to transmit a request to the server to obtain a status or an updated copy of the DNS information in the cache. If the detected operational condition or conditions exceeds one or more predetermined thresholds, the device does not generate or transmit a request to obtain or update the DNS information. For example, instead the device may use the cached DNS information to service client requests. If the detected operational condition or conditions is within a predetermined threshold or thresholds, the device generates a request for the status or updated DNS information and transmits the generated request to a DNS service, such as a server. Based on the received response, the device updates the DNS information stored in the cache.

In yet another embodiment, at step 1560, the intercepting device, such as appliance 200 or client 102, uses any of the cache expiration techniques responsive to refresh requests as described in conjunction with method 1400 and FIG. 14B. For example, in some embodiments, a client 102 generates a request to refresh or reload a page identifying a URL. The device stores in the cache DNS information corresponding to a domain name of the URL. The cached DNS information may have a first cache expiration period. The device detects one or more requests to refresh the URL and responsive to the detection determines to establish a second expiration period for the cached DNS information. For example, based on user demand for a URL detected by the refresh requests, a caching device may shorten the expiration period of the DNS information to increase the frequency of freshening the information in the cache. In some embodiments, the caching device adjusts the expiration period of the cached DNS information responsive to the number of refresh requests, frequency of the refresh requests, and/or number of users, clients, servers or browsers sending and/or receiving refresh requests associated with the cached object.

Browser Implementation and Deployment

Any of the techniques, systems and methods described above may be deployed in a browser or for a browser. In some embodiments, any portion of the network optimization engine 250 may be built into a browser. For example, in one embodiment, a browser may designed, constructed or configured to use any of the techniques described herein. In another embodiment, a browser is customized or implemented to include one or all of these techniques. In other embodiments, any portion of the network optimization engine 250 may be implemented as any type and form of add-in or component, such as an ActiveX control, to the browser. In some embodiments, any portion of the network optimization engine 250 may be implemented or deployed as a script, such as a Visual Basic or Java script. In other embodiments, any portion of the network optimization engine may be provided or served to a browser as browser executable instructions, such as via web pages or HTTP content.

In one embodiment, the browser implements, deploys, uses or provides a multiple tier cache as described in conjunction with FIGS. 4A-4F. In another embodiment, the browser implements, deploys, uses or provides any of the security and reliability proxying techniques described in conjunction with FIGS. 5A and 5B. In some embodiments, the browser implements, deploys, uses or provides parallel revalidation techniques of cached objects as described in conjunction with FIGS. 6A and 6B. In other embodiments, the browser implements, deploys, uses or provides the QoS prefreshening and prefetching techniques for cached objects as described in conjunction with FIGS. 7A-7D. In yet another embodiment, the browser implements, deploys, uses or provides a stack-oriented approach to prefetching objects to cache as described in conjunction with FIGS. 8A and 8B. In one embodiment, the browser implements, deploys, uses or provides for prefreshening objects in a cache prior to user requests for the object as described in conjunction with FIGS. 9A-9B. In other embodiments, the browser implements, deploys, uses or provides for determining to prefetch an object by requesting header information of the object from a server as described in conjunction with FIGS. 10A-10B. In another embodiment, the browser implements, deploys, uses or provides a technique for updating header information of the object in the cache as described in FIG. 10C.

In yet another embodiment, the browser implements, deploys, uses or provides techniques for using non-cacheable content as compression history as described in conjunction with FIG. 11A-11D. In some embodiments, the browser implements, deploys, uses or provides for using non-HTTP network file transfer as compression history as described in conjunction with FIGS. 12A-12B. In one embodiment, the browser implements, deploys, uses or provides technique for determining whether to prefetch/ prefresh an object based on operational condition of the device or a status of the connection as described in conjunction with FIGS. 13A-13B. In other embodiments, the browser implements, deploys, uses or provides techniques for determining expiration of a cached object responsive to refresh requests for the object as described in conjunction with FIGS. 14A-14C. In yet another embodiment, the browser implements, deploys, uses or provides techniques for interception caching and updating of domain name resolution as described in conjunction with FIGS. 15A-15C.

What is claimed:

1. A method comprising:
   (a) receiving, by an agent intermediary to an application on a client device and a server, an object transmitted from the server to the application via a transport layer connection between the agent and the server, the agent storing the object in a cache and forwarding the object to the application responsive to a first request;
   (b) determining, by the agent prior to a second request for the object from the application, whether to generate and transmit a third request to the server to check a freshness of the object stored in the cache based on an operational characteristic of the transport layer connection between the agent and the server;
   (c) generating, by the agent, the third request responsive to determining that the operational characteristic of the transport layer connection between the agent and the server is within a predetermined threshold; and
   (d) transmitting, by the agent in response to determining that the operational characteristic of the transport layer connection between the agent and the server is within the predetermined threshold, the third request to the server to check the freshness of the object stored in the cache.

2. The method of claim 1, wherein (a) further comprises establishing the transport layer connection between the server and the agent.

3. The method of claim 1, wherein the operational characteristic comprises bandwidth and the predetermined threshold comprises a bandwidth limit.

4. The method of claim 1, wherein the operational characteristic comprises a round trip time between the client and the server.

5. The method of claim 1, wherein the agent executes on the client.

6. The method of claim 1, wherein the application is a browser.

7. A method comprising:
   (a) receiving, by an application executing on a client device, an object transmitted from a server to the client via a transport layer connection between the application and the server responsive to a first request, the application storing the object in a cache;
   (b) determining, by the application prior to a second request for the object from the application, whether to generate and transmit a third request to the server to check a freshness of the object stored in the cache based on an operational characteristic of the transport layer connection between the application and the server;
   (c) generating, by the application, the third request responsive to determining that the operational characteristic of the transport layer connection between the application and the server is within a predetermined threshold; and
   (d) transmitting, by the application in response to determining that the operational characteristic of the transport layer connection between the application and the server is within the predetermined threshold, the third request to the server to check the freshness of the object stored in the cache.

8. The method of claim 7, wherein the application is a browser.

9. The method of claim 7, wherein the client device is a mobile device.

10. The method of claim 7, wherein (a) further comprising establishing the transport layer connection between the application and the server.

11. The method of claim 7, wherein the operational characteristic comprises bandwidth and the predetermined threshold comprises a bandwidth limit.

12. The method of claim 7, wherein the operational characteristic comprises a round trip time between the application and the server.

13. The method of claim 7, wherein the request to the server to check the freshness of the object comprising a conditional request for the object from the server.

14. A method comprising:
   (a) receiving, by an intermediary between an application on a client and a server, an object transmitted from the server to the application, the intermediary storing the object in a cache and forwarding the object to the application responsive to a first request;
   (b) determining, by the intermediary prior to a second request for the object from the application, whether to generate and transmit a third to the server to check a freshness of the object stored in the cache based on an operational characteristic of the server;
   (c) generating, by the intermediary, the third request responsive to determining that the operational characteristic of the server is within a predetermined threshold; and
   (d) communicating, by the intermediary in response to determining that the operational characteristic of the server is within the predetermined threshold, the third request to the server to check the freshness of the object stored in the cache.

15. The method of claim 14, wherein the intermediary executes on a mobile device in communication via a network with the server.

16. The method of claim 14, wherein the intermediary executes on a network device in communication with the client and the server.

17. The method of claim 14, wherein the intermediary executes on the server.

18. The method of claim 14, wherein the application is a browser.

* * * * *